US011797606B2

(12) United States Patent
Chen

(10) Patent No.: US 11,797,606 B2
(45) Date of Patent: Oct. 24, 2023

(54) USER INTERFACES FOR A PODCAST BROWSING AND PLAYBACK APPLICATION

(71) Applicant: Apple Inc., Cupertino, CA (US)

(72) Inventor: Elbert D. Chen, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/888,453

(22) Filed: May 29, 2020

(65) Prior Publication Data

US 2020/0380029 A1 Dec. 3, 2020

Related U.S. Application Data

(60) Provisional application No. 62/855,822, filed on May 31, 2019.

(51) Int. Cl.
*G06F 3/048* (2013.01)
*G06F 16/64* (2019.01)
(Continued)

(52) U.S. Cl.
CPC ............ *G06F 16/64* (2019.01); *G06F 3/0482* (2013.01); *G06F 3/0488* (2013.01); *G06F 16/639* (2019.01); *G06F 16/686* (2019.01)

(58) Field of Classification Search
CPC ...... G06F 16/64; G06F 16/686; G06F 16/639; G06F 3/0482; G06F 3/0488;
(Continued)

(56) References Cited

U.S. PATENT DOCUMENTS 2,718,550 A 9/1955 Hoyt et al.
4,672,677 A 6/1987 Yamakawa
(Continued)

FOREIGN PATENT DOCUMENTS

AU 2009255409 B2 7/2012
AU 2016100476 A4 5/2016
(Continued)

OTHER PUBLICATIONS

International Search Report received for PCT Patent Application No. PCT/US2020/035423, dated Oct. 13, 2020, 4 pages.
(Continued)

*Primary Examiner* — Aleksey Olshannikov
(74) *Attorney, Agent, or Firm* — Kubota & Basol LLP

(57) ABSTRACT

In some embodiments, an electronic device receives, via one or more input devices, an input corresponding to a request to search content available on the electronic device, wherein the input includes one or more search terms. In some embodiments in response receiving the input corresponding to the request to search content available on the electronic device, an electronic device displays, via a display device, one or more representations of one or more search results including a first representation of a first search result, wherein the first search result is a first content item that is associated with a first transcript of dialog included in the first content item, and the first search result is included in the one or more search results as a result of a relationship between the one or more search terms and the first transcript for the first content item.

45 Claims, 64 Drawing Sheets

(51) Int. Cl.
*G06F 16/68* (2019.01)
*G06F 16/638* (2019.01)
*G06F 3/0482* (2013.01)
*G06F 3/0488* (2022.01)

(58) Field of Classification Search
CPC ............ G06F 3/04883; G06F 3/04886; G06F 2203/04803; G06F 2203/04808; G06F 3/0237; G06F 3/0354; G06F 3/04817; G06F 16/685
USPC ........................................................ 715/716
See application file for complete search history.

(56) References Cited

U.S. PATENT DOCUMENTS

| | | |
|---|---|---|
| 5,029,223 A | 7/1991 | Fujisaki |
| 5,483,261 A | 1/1996 | Yasutake |
| 5,488,204 A | 1/1996 | Mead et al. |
| 5,585,866 A | 12/1996 | Miller et al. |
| 5,596,373 A | 1/1997 | White et al. |
| 5,621,456 A | 4/1997 | Florin et al. |
| 5,825,352 A | 10/1998 | Bisset et al. |
| 5,835,079 A | 11/1998 | Shieh |
| 5,880,411 A | 3/1999 | Gillespie et al. |
| 5,886,690 A | 3/1999 | Pond et al. |
| 5,926,230 A | 7/1999 | Niijima et al. |
| 6,021,320 A | 2/2000 | Bickford et al. |
| 6,028,600 A | 2/2000 | Rosin et al. |
| 6,049,333 A | 4/2000 | Lajoie et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,405,371 B1 | 6/2002 | Oosterhout et al. |
| 6,487,722 B1 | 11/2002 | Okura et al. |
| 6,570,557 B1 | 5/2003 | Westerman et al. |
| 6,628,304 B2 | 9/2003 | Mitchell et al. |
| 6,677,932 B1 | 1/2004 | Westerman |
| 6,690,387 B2 | 2/2004 | Zimmerman et al. |
| 6,745,391 B1 | 6/2004 | Macrae et al. |
| 6,909,837 B1 | 6/2005 | Unger |
| 6,928,433 B2 | 8/2005 | Goodman et al. |
| 7,015,894 B2 | 3/2006 | Morohoshi |
| 7,039,879 B2 | 5/2006 | Bergsten et al. |
| 7,103,906 B1 | 9/2006 | Katz et al. |
| 7,134,089 B2 | 11/2006 | Celik et al. |
| 7,184,064 B2 | 2/2007 | Zimmerman et al. |
| 7,213,255 B2 | 5/2007 | Markel et al. |
| 7,293,275 B1 | 11/2007 | Krieger et al. |
| 7,330,192 B2 | 2/2008 | Brunner et al. |
| 7,596,761 B2 | 9/2009 | Lemay et al. |
| 7,614,008 B2 | 11/2009 | Ording |
| 7,631,278 B2 | 12/2009 | Miksovsky et al. |
| 7,633,076 B2 | 12/2009 | Huppi et al. |
| 7,636,897 B2 | 12/2009 | Koralski et al. |
| 7,649,526 B2 | 1/2010 | Ording et al. |
| 7,650,569 B1 | 1/2010 | Allen et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,694,231 B2 | 4/2010 | Kocienda et al. |
| 7,712,051 B2 | 5/2010 | Chadzelek et al. |
| 7,783,892 B2 | 8/2010 | Russell et al. |
| 7,810,043 B2 | 10/2010 | Ostojic et al. |
| 7,814,023 B1 | 10/2010 | Rao et al. |
| 7,827,483 B2 | 11/2010 | Unbedacht et al. |
| 7,836,475 B2 | 11/2010 | Angiolillo et al. |
| 7,844,914 B2 | 11/2010 | Andre et al. |
| 7,849,487 B1 | 12/2010 | Vosseller |
| 7,856,605 B2 | 12/2010 | Ording et al. |
| 7,917,477 B2 | 3/2011 | Hutson et al. |
| 7,956,846 B2 | 6/2011 | Ording et al. |
| 7,957,762 B2 | 6/2011 | Herz et al. |
| 7,970,379 B2 | 6/2011 | White et al. |
| 8,006,002 B2 | 8/2011 | Kalayjian et al. |
| 8,026,805 B1 | 9/2011 | Rowe |
| 8,082,523 B2 | 12/2011 | Forstall et al. |
| 8,094,132 B1 | 1/2012 | Frischling et al. |
| 8,115,731 B2 | 2/2012 | Varanda |
| 8,145,617 B1* | 3/2012 | Verstak ................. G06F 16/951 707/708 |
| 8,170,931 B2 | 5/2012 | Ross et al. |
| 8,205,240 B2 | 6/2012 | Ansari et al. |
| 8,239,784 B2 | 8/2012 | Hotelling et al. |
| 8,279,180 B2 | 10/2012 | Hotelling et al. |
| 8,291,452 B1 | 10/2012 | Yong et al. |
| 8,299,889 B2 | 10/2012 | Kumar et al. |
| 8,301,484 B1 | 10/2012 | Kumar |
| 8,312,484 B1 | 11/2012 | Mccarty et al. |
| 8,312,486 B1 | 11/2012 | Briggs et al. |
| 8,325,160 B2 | 12/2012 | St. Pierre et al. |
| 8,346,798 B2 | 1/2013 | Spiegelman et al. |
| 8,370,874 B1 | 2/2013 | Chang et al. |
| 8,381,135 B2 | 2/2013 | Hotelling et al. |
| 8,386,588 B1 | 2/2013 | Cooley |
| 8,407,737 B1 | 3/2013 | Ellis |
| 8,416,217 B1 | 4/2013 | Eriksson et al. |
| 8,418,202 B2 | 4/2013 | Ahmad-Taylor |
| 8,424,048 B1 | 4/2013 | Lyren et al. |
| 8,479,122 B2 | 7/2013 | Hotelling et al. |
| 8,495,499 B1 | 7/2013 | Denise |
| 8,516,063 B2 | 8/2013 | Fletcher |
| 8,516,525 B1 | 8/2013 | Jerding et al. |
| 8,560,398 B1 | 10/2013 | Few et al. |
| 8,584,165 B1 | 11/2013 | Kane et al. |
| 8,607,163 B2 | 12/2013 | Plummer |
| 8,613,015 B2 | 12/2013 | Gordon et al. |
| 8,613,023 B2 | 12/2013 | Narahara et al. |
| 8,625,974 B1 | 1/2014 | Pinson |
| 8,674,958 B1 | 3/2014 | Kravets et al. |
| 8,683,362 B2 | 3/2014 | Shiplacoff et al. |
| 8,683,517 B2 | 3/2014 | Carpenter et al. |
| 8,730,190 B2 | 5/2014 | Moloney |
| 8,742,885 B2 | 6/2014 | Brodersen et al. |
| 8,754,862 B2 | 6/2014 | Zaliva |
| 8,762,852 B2 | 6/2014 | Davis et al. |
| 8,769,408 B2 | 7/2014 | Madden et al. |
| 8,782,706 B2 | 7/2014 | Ellis |
| 8,850,471 B2 | 9/2014 | Kilar et al. |
| 8,850,490 B1 | 9/2014 | Thomas et al. |
| 8,869,207 B1 | 10/2014 | Earle |
| 8,887,202 B2 | 11/2014 | Hunter et al. |
| 8,930,839 B2 | 1/2015 | He et al. |
| 8,952,987 B2 | 2/2015 | Momeyer et al. |
| 8,963,847 B2 | 2/2015 | Hunt |
| 8,983,950 B2 | 3/2015 | Askey et al. |
| 8,988,356 B2 | 3/2015 | Tseng |
| 8,990,857 B2 | 3/2015 | Yong et al. |
| 9,007,322 B1 | 4/2015 | Young |
| 9,066,146 B2 | 6/2015 | Suh et al. |
| 9,081,421 B1 | 7/2015 | Lai et al. |
| 9,092,057 B2 | 7/2015 | Varela et al. |
| 9,116,569 B2 | 8/2015 | Stacy et al. |
| 9,118,967 B2 | 8/2015 | Sirpal et al. |
| 9,129,656 B2 | 9/2015 | Prather et al. |
| 9,141,200 B2 | 9/2015 | Bernstein et al. |
| 9,196,309 B2 | 11/2015 | Schultz et al. |
| 9,214,290 B2 | 12/2015 | Xie et al. |
| 9,215,273 B2 | 12/2015 | Jonnala et al. |
| 9,219,634 B1 | 12/2015 | Morse et al. |
| 9,235,317 B2 | 1/2016 | Matas et al. |
| 9,241,121 B2 | 1/2016 | Rudolph |
| 9,244,600 B2 | 1/2016 | Mcintosh et al. |
| 9,247,014 B1 | 1/2016 | Rao |
| 9,247,174 B2 | 1/2016 | Sirpal et al. |
| 9,285,977 B1 | 3/2016 | Greenberg et al. |
| 9,319,727 B2 | 4/2016 | Phipps et al. |
| 9,348,458 B2 | 5/2016 | Hotelling et al. |
| 9,357,250 B1 | 5/2016 | Newman et al. |
| 9,380,343 B2 | 6/2016 | Webster et al. |
| 9,414,108 B2 | 8/2016 | Sirpal et al. |
| 9,454,288 B2 | 9/2016 | Raffle et al. |
| 9,514,476 B2 | 12/2016 | Kay et al. |
| 9,532,111 B1 | 12/2016 | Christie et al. |

(56) References Cited

U.S. PATENT DOCUMENTS

| | | |
|---|---|---|
| 9,538,310 B2 | 1/2017 | Fjeldsoe-nielsen et al. |
| 9,542,060 B1 | 1/2017 | Brenner et al. |
| 9,560,399 B2 | 1/2017 | Kaya et al. |
| 9,575,944 B2 | 2/2017 | Neil et al. |
| 9,591,339 B1 | 3/2017 | Christie et al. |
| 9,600,159 B2 | 3/2017 | Lawson et al. |
| 9,602,566 B1 | 3/2017 | Lewis et al. |
| 9,639,241 B2 | 5/2017 | Penha et al. |
| 9,652,118 B2 | 5/2017 | Hill et al. |
| 9,652,448 B2 | 5/2017 | Pasquero et al. |
| 9,658,740 B2 | 5/2017 | Chaudhri |
| 9,774,917 B1 | 9/2017 | Christie et al. |
| 9,792,018 B2 | 10/2017 | Van Os et al. |
| 9,807,462 B2 | 10/2017 | Wood |
| 9,864,508 B2 | 1/2018 | Dixon et al. |
| 9,864,509 B2 | 1/2018 | Howard et al. |
| 9,871,905 B1 | 1/2018 | Habiger et al. |
| 9,913,142 B2 | 3/2018 | Folse et al. |
| 9,933,937 B2 | 4/2018 | Lemay et al. |
| 9,973,800 B2 | 5/2018 | Yellin et al. |
| 10,019,142 B2 | 7/2018 | Van Os et al. |
| 10,025,499 B2 | 7/2018 | Howard et al. |
| 10,079,872 B1 | 9/2018 | Thomas et al. |
| 10,091,558 B2 | 10/2018 | Christie et al. |
| 10,116,996 B1 | 10/2018 | Christie et al. |
| 10,126,904 B2 | 11/2018 | Agnetta et al. |
| 10,168,871 B2 | 1/2019 | Wallters et al. |
| 10,200,761 B1 | 2/2019 | Christie et al. |
| 10,205,985 B2 | 2/2019 | Lue-sang et al. |
| 10,209,866 B2 | 2/2019 | Johnston et al. |
| 10,237,599 B1 | 3/2019 | Gravino et al. |
| 10,275,148 B2 | 4/2019 | Matas et al. |
| 10,282,088 B2 | 5/2019 | Kim et al. |
| 10,303,422 B1 | 5/2019 | Woo et al. |
| 10,405,015 B2 | 9/2019 | Kite et al. |
| 10,521,188 B1 | 12/2019 | Christie et al. |
| 10,551,995 B1 | 2/2020 | Ho et al. |
| 10,552,470 B2 | 2/2020 | Todd et al. |
| 10,564,823 B1 | 2/2020 | Dennis et al. |
| 10,601,808 B1 | 3/2020 | Nijim et al. |
| 10,606,539 B2 | 3/2020 | Bernstein et al. |
| 10,631,042 B2 | 4/2020 | Zerr et al. |
| 10,795,490 B2 | 10/2020 | Chaudhri et al. |
| 10,827,007 B2 | 11/2020 | Kode et al. |
| 11,062,358 B1 | 7/2021 | Lewis et al. |
| 2002/0015024 A1 | 2/2002 | Westerman et al. |
| 2002/0026637 A1 | 2/2002 | Markel et al. |
| 2002/0042920 A1 | 4/2002 | Thomas et al. |
| 2002/0060750 A1 | 5/2002 | Istvan et al. |
| 2002/0085045 A1 | 7/2002 | Vong et al. |
| 2002/0100063 A1 | 7/2002 | Herigstad et al. |
| 2002/0112239 A1 | 8/2002 | Goldman |
| 2002/0113816 A1 | 8/2002 | Mitchell et al. |
| 2002/0144269 A1 | 10/2002 | Connelly |
| 2002/0171686 A1 | 11/2002 | Kamen et al. |
| 2003/0001907 A1 | 1/2003 | Bergsten et al. |
| 2003/0005445 A1 | 1/2003 | Schein et al. |
| 2003/0009757 A1 | 1/2003 | Kikinis |
| 2003/0011641 A1 | 1/2003 | Totman et al. |
| 2003/0013483 A1 | 1/2003 | Ausems et al. |
| 2003/0088872 A1 | 5/2003 | Maissel et al. |
| 2003/0093790 A1 | 5/2003 | Logan et al. |
| 2003/0126600 A1 | 7/2003 | Heuvelman |
| 2003/0149628 A1 | 8/2003 | Abbosh et al. |
| 2003/0158950 A1 | 8/2003 | Sako |
| 2003/0167471 A1 | 9/2003 | Roth et al. |
| 2003/0177075 A1 | 9/2003 | Burke |
| 2003/0177498 A1 | 9/2003 | Ellis et al. |
| 2003/0192060 A1 | 10/2003 | Levy |
| 2003/0221191 A1 | 11/2003 | Khusheim |
| 2003/0228130 A1 | 12/2003 | Tanikawa et al. |
| 2003/0234804 A1 | 12/2003 | Parker et al. |
| 2004/0019497 A1 | 1/2004 | Volk et al. |
| 2004/0046801 A1 | 3/2004 | Lin et al. |
| 2004/0070573 A1 | 4/2004 | Graham |
| 2004/0088328 A1 | 5/2004 | Cook et al. |
| 2004/0090463 A1 | 5/2004 | Celik et al. |
| 2004/0133909 A1 | 7/2004 | Ma |
| 2004/0139401 A1 | 7/2004 | Unbedacht et al. |
| 2004/0161151 A1 | 8/2004 | Iwayama et al. |
| 2004/0168184 A1 | 8/2004 | Steenkamp et al. |
| 2004/0193421 A1 | 9/2004 | Blass |
| 2004/0252120 A1 | 12/2004 | Hunleth et al. |
| 2004/0254883 A1 | 12/2004 | Kondrk et al. |
| 2004/0254958 A1 | 12/2004 | Volk |
| 2004/0267715 A1 | 12/2004 | Polson et al. |
| 2005/0012599 A1 | 1/2005 | Dematteo |
| 2005/0071761 A1 | 3/2005 | Kontio |
| 2005/0071785 A1 | 3/2005 | Chadzelek et al. |
| 2005/0076363 A1 | 4/2005 | Dukes et al. |
| 2005/0091254 A1 | 4/2005 | Stabb et al. |
| 2005/0091597 A1 | 4/2005 | Ackley |
| 2005/0162398 A1 | 7/2005 | Eliasson et al. |
| 2005/0162402 A1 | 7/2005 | Watanachote |
| 2005/0186988 A1 | 8/2005 | Lim et al. |
| 2005/0190059 A1 | 9/2005 | Wehrenberg |
| 2005/0223335 A1 | 10/2005 | Ichikawa |
| 2005/0235316 A1 | 10/2005 | Ahmad-taylor |
| 2005/0257166 A1 | 11/2005 | Tu |
| 2005/0283358 A1 | 12/2005 | Stephanick et al. |
| 2006/0017692 A1 | 1/2006 | Wehrenberg et al. |
| 2006/0020904 A1 | 1/2006 | Aaltonen et al. |
| 2006/0026521 A1 | 2/2006 | Hotelling et al. |
| 2006/0029374 A1 | 2/2006 | Park |
| 2006/0031872 A1 | 2/2006 | Hsiao et al. |
| 2006/0033724 A1 | 2/2006 | Chaudhri et al. |
| 2006/0053449 A1 | 3/2006 | Gutta |
| 2006/0071905 A1 | 4/2006 | Varanda |
| 2006/0080352 A1 | 4/2006 | Boubez et al. |
| 2006/0097991 A1 | 5/2006 | Hotelling et al. |
| 2006/0107304 A1 | 5/2006 | Cleron et al. |
| 2006/0112346 A1 | 5/2006 | Miksovsky et al. |
| 2006/0112352 A1 | 5/2006 | Tseng et al. |
| 2006/0117267 A1 | 6/2006 | Koralski et al. |
| 2006/0195479 A1 | 8/2006 | Spiegelman et al. |
| 2006/0195512 A1 | 8/2006 | Rogers et al. |
| 2006/0197753 A1 | 9/2006 | Hotelling |
| 2006/0224987 A1 | 10/2006 | Caffarelli |
| 2006/0248113 A1 | 11/2006 | Leffert et al. |
| 2006/0265637 A1 | 11/2006 | Marriott et al. |
| 2006/0271968 A1 | 11/2006 | Zellner |
| 2006/0282856 A1 | 12/2006 | Errico et al. |
| 2006/0294545 A1 | 12/2006 | Morris et al. |
| 2007/0005569 A1 | 1/2007 | Hurst-Hiller et al. |
| 2007/0009229 A1 | 1/2007 | Liu |
| 2007/0011702 A1 | 1/2007 | Vaysman |
| 2007/0028267 A1 | 2/2007 | Ostojic et al. |
| 2007/0038957 A1 | 2/2007 | White |
| 2007/0073596 A1 | 3/2007 | Alexander et al. |
| 2007/0092204 A1 | 4/2007 | Wagner et al. |
| 2007/0150802 A1 | 6/2007 | Wan et al. |
| 2007/0154163 A1 | 7/2007 | Cordray |
| 2007/0157220 A1 | 7/2007 | Cordray et al. |
| 2007/0157249 A1 | 7/2007 | Cordray et al. |
| 2007/0168413 A1 | 7/2007 | Barletta et al. |
| 2007/0186254 A1 | 8/2007 | Tsutsui et al. |
| 2007/0199035 A1 | 8/2007 | Schwartz et al. |
| 2007/0204057 A1 | 8/2007 | Shaver et al. |
| 2007/0229465 A1 | 10/2007 | Sakai et al. |
| 2007/0233880 A1 | 10/2007 | Nieh et al. |
| 2007/0244902 A1* | 10/2007 | Seide ............... G06F 16/78 |
| 2007/0248１ A1 | 10/2007 | Bahn |
| 2008/0046928 A1 | 2/2008 | Poling et al. |
| 2008/0059884 A1 | 3/2008 | Ellis et al. |
| 2008/0065989 A1 | 3/2008 | Conroy et al. |
| 2008/0066010 A1 | 3/2008 | Brodersen et al. |
| 2008/0077562 A1 | 3/2008 | Schleppe |
| 2008/0092168 A1 | 4/2008 | Logan et al. |
| 2008/0092173 A1 | 4/2008 | Shannon et al. |
| 2008/0111822 A1* | 5/2008 | Horowitz ......... H04N 21/485 |
| | | 345/530 |
| 2008/0120668 A1 | 5/2008 | Yau |
| 2008/0155475 A1 | 6/2008 | Duhig |
| 2008/0189740 A1 | 8/2008 | Carpenter et al. |

(56) References Cited

U.S. PATENT DOCUMENTS

| | | |
|---|---|---|
| 2008/0189742 A1 | 8/2008 | Ellis et al. |
| 2008/0216020 A1 | 9/2008 | Plummer |
| 2008/0222677 A1 | 9/2008 | Woo et al. |
| 2008/0235588 A1 | 9/2008 | Gonze et al. |
| 2008/0243817 A1 | 10/2008 | Chan et al. |
| 2008/0250312 A1 | 10/2008 | Curtis |
| 2008/0260252 A1 | 10/2008 | Borgaonkar et al. |
| 2008/0270886 A1 | 10/2008 | Gossweiler et al. |
| 2008/0276279 A1 | 11/2008 | Gossweiler et al. |
| 2008/0301579 A1 | 12/2008 | Jonassen et al. |
| 2008/0301734 A1 | 12/2008 | Goldeen et al. |
| 2008/0307343 A1 | 12/2008 | Robert et al. |
| 2008/0307458 A1 | 12/2008 | Kim et al. |
| 2008/0307459 A1 | 12/2008 | Migos |
| 2008/0320391 A1 | 12/2008 | Lemay et al. |
| 2008/0320532 A1 | 12/2008 | Lee |
| 2009/0055385 A1 | 2/2009 | Jeon et al. |
| 2009/0063521 A1 | 3/2009 | Bull et al. |
| 2009/0063975 A1 | 3/2009 | Rottler et al. |
| 2009/0089837 A1 | 4/2009 | Momosaki |
| 2009/0094662 A1 | 4/2009 | Chang et al. |
| 2009/0119754 A1 | 5/2009 | Schubert |
| 2009/0158325 A1 | 6/2009 | Johnson |
| 2009/0158326 A1 | 6/2009 | Hunt et al. |
| 2009/0161868 A1 | 6/2009 | Chaudhry |
| 2009/0165054 A1 | 6/2009 | Rudolph |
| 2009/0174679 A1 | 7/2009 | Westerman |
| 2009/0177301 A1 | 7/2009 | Hayes |
| 2009/0177989 A1 | 7/2009 | Ma et al. |
| 2009/0178083 A1 | 7/2009 | Carr et al. |
| 2009/0228491 A1 | 9/2009 | Malik |
| 2009/0239587 A1 | 9/2009 | Negron et al. |
| 2009/0256807 A1 | 10/2009 | Nurmi |
| 2009/0259957 A1 | 10/2009 | Slocum et al. |
| 2009/0278916 A1 | 11/2009 | Ito |
| 2009/0288079 A1 | 11/2009 | Zuber et al. |
| 2009/0313100 A1* | 12/2009 | Ingleshwar ............ G06F 16/951 707/E17.014 |
| 2009/0322962 A1 | 12/2009 | Weeks |
| 2009/0327952 A1 | 12/2009 | Karas et al. |
| 2010/0009629 A1 | 1/2010 | Jung et al. |
| 2010/0031162 A1 | 2/2010 | Wiser et al. |
| 2010/0053220 A1 | 3/2010 | Ozawa et al. |
| 2010/0053432 A1 | 3/2010 | Cheng et al. |
| 2010/0057696 A1 | 3/2010 | Miyazawa et al. |
| 2010/0064313 A1 | 3/2010 | Beyabani |
| 2010/0080163 A1 | 4/2010 | Krishnamoorthi et al. |
| 2010/0083181 A1 | 4/2010 | Matsushima et al. |
| 2010/0095240 A1 | 4/2010 | Shiplacoff et al. |
| 2010/0100899 A1 | 4/2010 | Bradbury et al. |
| 2010/0104269 A1 | 4/2010 | Prestenback et al. |
| 2010/0115592 A1 | 5/2010 | Belz et al. |
| 2010/0121714 A1* | 5/2010 | Bovenschulte .... G06Q 30/0257 705/14.55 |
| 2010/0146442 A1 | 6/2010 | Nagasaka et al. |
| 2010/0153881 A1 | 6/2010 | Dinn |
| 2010/0153999 A1 | 6/2010 | Yates |
| 2010/0159898 A1 | 6/2010 | Krzyzanowski et al. |
| 2010/0162172 A1 | 6/2010 | Aroner |
| 2010/0194998 A1 | 8/2010 | Lee et al. |
| 2010/0198822 A1 | 8/2010 | Glennon et al. |
| 2010/0205628 A1 | 8/2010 | Davis et al. |
| 2010/0211636 A1 | 8/2010 | Starkenburg et al. |
| 2010/0223646 A1 | 9/2010 | Goldeen et al. |
| 2010/0229194 A1 | 9/2010 | Blanchard et al. |
| 2010/0235744 A1 | 9/2010 | Schultz et al. |
| 2010/0251304 A1 | 9/2010 | Donoghue et al. |
| 2010/0257005 A1 | 10/2010 | Phenner et al. |
| 2010/0269145 A1* | 10/2010 | Ingrassia ............... H04H 20/26 725/110 |
| 2010/0275143 A1 | 10/2010 | Fu et al. |
| 2010/0277337 A1 | 11/2010 | Brodersen et al. |
| 2010/0293190 A1 | 11/2010 | Kaiser et al. |
| 2010/0293586 A1 | 11/2010 | Simoes et al. |
| 2010/0312824 A1 | 12/2010 | Smith et al. |
| 2010/0325660 A1 | 12/2010 | Holden |
| 2010/0333142 A1 | 12/2010 | Busse et al. |
| 2010/0333143 A1 | 12/2010 | Civanlar et al. |
| 2011/0004831 A1 | 1/2011 | Steinberg et al. |
| 2011/0047513 A1 | 2/2011 | Onogi et al. |
| 2011/0052146 A1 | 3/2011 | Murthy et al. |
| 2011/0054649 A1 | 3/2011 | Sarkis et al. |
| 2011/0055762 A1 | 3/2011 | Jung et al. |
| 2011/0055870 A1 | 3/2011 | Yum et al. |
| 2011/0071977 A1 | 3/2011 | Nakajima et al. |
| 2011/0078739 A1 | 3/2011 | Grad |
| 2011/0080935 A1 | 4/2011 | Kim et al. |
| 2011/0087992 A1 | 4/2011 | Wang et al. |
| 2011/0090402 A1 | 4/2011 | Huntington et al. |
| 2011/0093415 A1 | 4/2011 | Rhee et al. |
| 2011/0119715 A1 | 5/2011 | Chang et al. |
| 2011/0131607 A1 | 6/2011 | Thomas et al. |
| 2011/0154194 A1 | 6/2011 | Mathai et al. |
| 2011/0154305 A1 | 6/2011 | Leroux et al. |
| 2011/0157029 A1 | 6/2011 | Tseng |
| 2011/0162022 A1 | 6/2011 | Xia |
| 2011/0163971 A1 | 7/2011 | Wagner et al. |
| 2011/0167339 A1 | 7/2011 | Lemay |
| 2011/0175930 A1 | 7/2011 | Hwang et al. |
| 2011/0179388 A1 | 7/2011 | Fleizach et al. |
| 2011/0179453 A1 | 7/2011 | Poniatowski |
| 2011/0197153 A1 | 8/2011 | King et al. |
| 2011/0209177 A1 | 8/2011 | Sela et al. |
| 2011/0218948 A1 | 9/2011 | De Souza et al. |
| 2011/0231280 A1 | 9/2011 | Farah |
| 2011/0231823 A1 | 9/2011 | Fryc et al. |
| 2011/0231872 A1 | 9/2011 | Gharachorloo et al. |
| 2011/0231878 A1 | 9/2011 | Hunter et al. |
| 2011/0246332 A1 | 10/2011 | Alcodray et al. |
| 2011/0281517 A1 | 11/2011 | Ukkadam |
| 2011/0283304 A1 | 11/2011 | Roberts et al. |
| 2011/0283333 A1 | 11/2011 | Ukkadam |
| 2011/0289064 A1 | 11/2011 | Lebeau et al. |
| 2011/0289317 A1 | 11/2011 | Darapu et al. |
| 2011/0289419 A1 | 11/2011 | Yu et al. |
| 2011/0289421 A1 | 11/2011 | Jordan et al. |
| 2011/0289452 A1 | 11/2011 | Jordan et al. |
| 2011/0289531 A1 | 11/2011 | Moonka et al. |
| 2011/0289534 A1 | 11/2011 | Jordan et al. |
| 2011/0296351 A1 | 12/2011 | Ewing et al. |
| 2011/0302532 A1 | 12/2011 | Missig |
| 2011/0307631 A1 | 12/2011 | Park et al. |
| 2011/0312278 A1 | 12/2011 | Matsushita et al. |
| 2011/0321072 A1 | 12/2011 | Patterson et al. |
| 2012/0019674 A1 | 1/2012 | Ohnishi et al. |
| 2012/0036552 A1 | 2/2012 | Dare et al. |
| 2012/0042245 A1 | 2/2012 | Askey et al. |
| 2012/0042343 A1 | 2/2012 | Laligand et al. |
| 2012/0053887 A1 | 3/2012 | Nurmi |
| 2012/0054178 A1 | 3/2012 | Tran et al. |
| 2012/0054642 A1 | 3/2012 | Balsiger et al. |
| 2012/0054797 A1 | 3/2012 | Skog et al. |
| 2012/0059910 A1 | 3/2012 | Cassidy |
| 2012/0060092 A1 | 3/2012 | Hill et al. |
| 2012/0064204 A1 | 3/2012 | Davila et al. |
| 2012/0084136 A1 | 4/2012 | Seth et al. |
| 2012/0093481 A1 | 4/2012 | Mcdowell et al. |
| 2012/0096011 A1 | 4/2012 | Kay et al. |
| 2012/0102573 A1 | 4/2012 | Spooner et al. |
| 2012/0105367 A1 | 5/2012 | Son et al. |
| 2012/0110616 A1 | 5/2012 | Kilar et al. |
| 2012/0110621 A1 | 5/2012 | Gossweiler, III |
| 2012/0114303 A1 | 5/2012 | Chung et al. |
| 2012/0117584 A1 | 5/2012 | Gordon |
| 2012/0139938 A1 | 6/2012 | Khedouri et al. |
| 2012/0144003 A1 | 6/2012 | Rosenbaum et al. |
| 2012/0158524 A1 | 6/2012 | Hintz et al. |
| 2012/0173991 A1 | 7/2012 | Roberts et al. |
| 2012/0174157 A1 | 7/2012 | Stinson et al. |
| 2012/0198020 A1 | 8/2012 | Parker et al. |
| 2012/0198336 A1 | 8/2012 | Novotny et al. |
| 2012/0210366 A1 | 8/2012 | Wong et al. |
| 2012/0215684 A1 | 8/2012 | Kidron |
| 2012/0216113 A1 | 8/2012 | Li |

(56) References Cited

U.S. PATENT DOCUMENTS

| | | |
|---|---|---|
| 2012/0216117 A1 | 8/2012 | Arriola et al. |
| 2012/0216296 A1* | 8/2012 | Kidron .................. G06F 16/639 726/28 |
| 2012/0221498 A1 | 8/2012 | Kaszynski et al. |
| 2012/0222056 A1 | 8/2012 | Donoghue et al. |
| 2012/0233640 A1 | 9/2012 | Odryna et al. |
| 2012/0242704 A1 | 9/2012 | Bamford et al. |
| 2012/0260291 A1 | 10/2012 | Wood |
| 2012/0260293 A1 | 10/2012 | Young et al. |
| 2012/0262371 A1 | 10/2012 | Lee et al. |
| 2012/0262407 A1 | 10/2012 | Hinckley et al. |
| 2012/0266069 A1 | 10/2012 | Moshiri et al. |
| 2012/0272261 A1 | 10/2012 | Reynolds et al. |
| 2012/0284753 A1 | 11/2012 | Roberts et al. |
| 2012/0290933 A1 | 11/2012 | Rajaraman et al. |
| 2012/0291079 A1 | 11/2012 | Gordon et al. |
| 2012/0308143 A1 | 12/2012 | Bellegarda et al. |
| 2012/0311443 A1 | 12/2012 | Chaudhri et al. |
| 2012/0311638 A1 | 12/2012 | Reyna et al. |
| 2012/0317482 A1 | 12/2012 | Barraclough et al. |
| 2012/0323938 A1 | 12/2012 | Skeen et al. |
| 2012/0324504 A1 | 12/2012 | Archer et al. |
| 2012/0327125 A1 | 12/2012 | Kutliroff et al. |
| 2013/0014150 A1 | 1/2013 | Seo et al. |
| 2013/0014159 A1 | 1/2013 | Wiser et al. |
| 2013/0021288 A1 | 1/2013 | Kaerkkaeinen et al. |
| 2013/0024895 A1 | 1/2013 | Yong et al. |
| 2013/0031585 A1 | 1/2013 | Itagaki et al. |
| 2013/0033643 A1 | 2/2013 | Kim et al. |
| 2013/0042271 A1 | 2/2013 | Yellin et al. |
| 2013/0061234 A1 | 3/2013 | Piira et al. |
| 2013/0061267 A1 | 3/2013 | Cansino et al. |
| 2013/0067366 A1 | 3/2013 | Almosnino |
| 2013/0073403 A1 | 3/2013 | Tuchman et al. |
| 2013/0083076 A1 | 4/2013 | Liu et al. |
| 2013/0097009 A1 | 4/2013 | Akadiri |
| 2013/0110978 A1 | 5/2013 | Gordon et al. |
| 2013/0124998 A1 | 5/2013 | Pendergast et al. |
| 2013/0132874 A1 | 5/2013 | He et al. |
| 2013/0132966 A1 | 5/2013 | Chanda et al. |
| 2013/0151300 A1 | 6/2013 | Le et al. |
| 2013/0173034 A1 | 7/2013 | Reimann et al. |
| 2013/0174193 A1 | 7/2013 | Yu et al. |
| 2013/0179812 A1 | 7/2013 | Bianrosa et al. |
| 2013/0179995 A1 | 7/2013 | Basile et al. |
| 2013/0198686 A1 | 8/2013 | Kawai et al. |
| 2013/0205312 A1 | 8/2013 | Huang |
| 2013/0212531 A1 | 8/2013 | Yoshida |
| 2013/0227482 A1 | 8/2013 | Thorsander et al. |
| 2013/0247105 A1 | 9/2013 | Jovanovski et al. |
| 2013/0262431 A1 | 10/2013 | Garner et al. |
| 2013/0262558 A1 | 10/2013 | Wood et al. |
| 2013/0262619 A1 | 10/2013 | Goodwin et al. |
| 2013/0262633 A1 | 10/2013 | Goodwin et al. |
| 2013/0263189 A1 | 10/2013 | Garner |
| 2013/0283154 A1 | 10/2013 | Sasakura |
| 2013/0283168 A1 | 10/2013 | Brown et al. |
| 2013/0283317 A1 | 10/2013 | Guntupalli et al. |
| 2013/0283318 A1 | 10/2013 | Wannamaker |
| 2013/0285937 A1 | 10/2013 | Billings et al. |
| 2013/0290233 A1 | 10/2013 | Ferren et al. |
| 2013/0290848 A1 | 10/2013 | Billings et al. |
| 2013/0291018 A1 | 10/2013 | Billings et al. |
| 2013/0291037 A1 | 10/2013 | Im et al. |
| 2013/0294755 A1 | 11/2013 | Arme et al. |
| 2013/0312044 A1 | 11/2013 | Itagaki |
| 2013/0326499 A1 | 12/2013 | Mowatt et al. |
| 2013/0326554 A1 | 12/2013 | Shkedi |
| 2013/0326561 A1 | 12/2013 | Pandey |
| 2013/0332838 A1 | 12/2013 | Naggar et al. |
| 2013/0332960 A1 | 12/2013 | Young et al. |
| 2013/0340006 A1 | 12/2013 | Kwan |
| 2013/0346564 A1 | 12/2013 | Warrick et al. |
| 2013/0347044 A1 | 12/2013 | Lee et al. |
| 2014/0006635 A1 | 1/2014 | Braness et al. |
| 2014/0006795 A1 | 1/2014 | Han et al. |
| 2014/0006951 A1 | 1/2014 | Hunter |
| 2014/0012859 A1 | 1/2014 | Heilprin et al. |
| 2014/0013283 A1 | 1/2014 | Matas et al. |
| 2014/0020017 A1 | 1/2014 | Stern et al. |
| 2014/0024341 A1 | 1/2014 | Johan |
| 2014/0033245 A1 | 1/2014 | Barton et al. |
| 2014/0049692 A1 | 2/2014 | Sirpal et al. |
| 2014/0052683 A1 | 2/2014 | Kirkham et al. |
| 2014/0053116 A1 | 2/2014 | Smith et al. |
| 2014/0053195 A1 | 2/2014 | Sirpal et al. |
| 2014/0059605 A1 | 2/2014 | Sirpal et al. |
| 2014/0059615 A1 | 2/2014 | Sirpal et al. |
| 2014/0059625 A1 | 2/2014 | Dourado et al. |
| 2014/0059635 A1 | 2/2014 | Sirpal et al. |
| 2014/0071068 A1 | 3/2014 | Shih et al. |
| 2014/0074454 A1 | 3/2014 | Brown et al. |
| 2014/0075313 A1 | 3/2014 | Bachman et al. |
| 2014/0075316 A1 | 3/2014 | Li |
| 2014/0075394 A1 | 3/2014 | Nawle et al. |
| 2014/0075574 A1 | 3/2014 | Zheng et al. |
| 2014/0082497 A1 | 3/2014 | Chalouhi et al. |
| 2014/0088952 A1 | 3/2014 | Fife et al. |
| 2014/0089816 A1 | 3/2014 | Dipersia et al. |
| 2014/0098102 A1 | 4/2014 | Raffle et al. |
| 2014/0104646 A1 | 4/2014 | Nishiyama |
| 2014/0109204 A1 | 4/2014 | Papillon et al. |
| 2014/0111416 A1 | 4/2014 | Sugiura |
| 2014/0115636 A1 | 4/2014 | Stuckman |
| 2014/0123006 A1 | 5/2014 | Chen et al. |
| 2014/0129232 A1 | 5/2014 | Jones et al. |
| 2014/0130097 A1 | 5/2014 | Londero |
| 2014/0136946 A1 | 5/2014 | Matas |
| 2014/0137029 A1 | 5/2014 | Stephenson et al. |
| 2014/0137030 A1 | 5/2014 | Matas |
| 2014/0143260 A1 | 5/2014 | Simonson et al. |
| 2014/0143683 A1 | 5/2014 | Underwood et al. |
| 2014/0156792 A1 | 6/2014 | Roberts et al. |
| 2014/0157204 A1 | 6/2014 | Roberts et al. |
| 2014/0157329 A1 | 6/2014 | Roberts et al. |
| 2014/0164966 A1 | 6/2014 | Kim et al. |
| 2014/0168071 A1 | 6/2014 | Ahmed et al. |
| 2014/0171153 A1 | 6/2014 | Kienzle et al. |
| 2014/0172953 A1 | 6/2014 | Blanksteen |
| 2014/0173660 A1 | 6/2014 | Correa et al. |
| 2014/0184471 A1 | 7/2014 | Martynov et al. |
| 2014/0189523 A1 | 7/2014 | Shuttleworth et al. |
| 2014/0189574 A1 | 7/2014 | Stallings et al. |
| 2014/0189606 A1 | 7/2014 | Shuttleworth et al. |
| 2014/0196064 A1 | 7/2014 | Kennedy et al. |
| 2014/0208268 A1 | 7/2014 | Jimenez |
| 2014/0208360 A1 | 7/2014 | Kardatzke |
| 2014/0219637 A1 | 8/2014 | Mcintosh et al. |
| 2014/0224867 A1 | 8/2014 | Werner et al. |
| 2014/0244751 A1 | 8/2014 | Tseng |
| 2014/0245148 A1 | 8/2014 | Silva et al. |
| 2014/0245186 A1 | 8/2014 | Tseng |
| 2014/0245222 A1 | 8/2014 | Kovacevic et al. |
| 2014/0250465 A1 | 9/2014 | Mulholland et al. |
| 2014/0250479 A1 | 9/2014 | Lee et al. |
| 2014/0253463 A1 | 9/2014 | Hicks |
| 2014/0259074 A1 | 9/2014 | Ansari et al. |
| 2014/0278072 A1 | 9/2014 | Fino et al. |
| 2014/0278940 A1 | 9/2014 | Wade |
| 2014/0282208 A1 | 9/2014 | Chaudhri |
| 2014/0282636 A1 | 9/2014 | Petander et al. |
| 2014/0282677 A1 | 9/2014 | Mantell et al. |
| 2014/0289226 A1* | 9/2014 | English .................. G06F 16/685 707/722 |
| 2014/0289751 A1 | 9/2014 | Hsu et al. |
| 2014/0310742 A1 | 10/2014 | Kim |
| 2014/0317653 A1 | 10/2014 | Mlodzinski |
| 2014/0333530 A1 | 11/2014 | Agnetta et al. |
| 2014/0337607 A1 | 11/2014 | Peterson et al. |
| 2014/0340358 A1 | 11/2014 | Martinoli |
| 2014/0341109 A1 | 11/2014 | Cartmell et al. |
| 2014/0344247 A1 | 11/2014 | Procopio et al. |
| 2014/0344291 A9 | 11/2014 | Simonson et al. |

(56) References Cited

U.S. PATENT DOCUMENTS

| | | | |
|---|---|---|---|
| 2014/0344294 A1* | 11/2014 | Skeen | G06F 16/686 707/754 |
| 2014/0351691 A1 | 11/2014 | Neil et al. | |
| 2014/0359598 A1 | 12/2014 | Oliver et al. | |
| 2014/0365479 A1 | 12/2014 | Lyons et al. | |
| 2014/0365481 A1* | 12/2014 | Novosel | G06F 16/904 707/728 |
| 2014/0365919 A1 | 12/2014 | Shaw et al. | |
| 2014/0366040 A1 | 12/2014 | Parker et al. | |
| 2014/0366047 A1 | 12/2014 | Thomas et al. | |
| 2015/0020127 A1 | 1/2015 | Doshi et al. | |
| 2015/0039685 A1 | 2/2015 | Lewis et al. | |
| 2015/0046866 A1 | 2/2015 | Shimadate | |
| 2015/0067582 A1 | 3/2015 | Donnelly et al. | |
| 2015/0067724 A1 | 3/2015 | Johnson et al. | |
| 2015/0074552 A1 | 3/2015 | Chai et al. | |
| 2015/0074603 A1 | 3/2015 | Abe et al. | |
| 2015/0082187 A1 | 3/2015 | Wallters et al. | |
| 2015/0095460 A1 | 4/2015 | Berger et al. | |
| 2015/0095845 A1 | 4/2015 | Chun et al. | |
| 2015/0113429 A1 | 4/2015 | Edwards et al. | |
| 2015/0134653 A1 | 5/2015 | Bayer et al. | |
| 2015/0150049 A1 | 5/2015 | White | |
| 2015/0150066 A1 | 5/2015 | Park et al. | |
| 2015/0153571 A1 | 6/2015 | Ballard et al. | |
| 2015/0161251 A1 | 6/2015 | Ramanarayanan et al. | |
| 2015/0169705 A1 | 6/2015 | Korbecki et al. | |
| 2015/0169975 A1 | 6/2015 | Kienzle et al. | |
| 2015/0186002 A1 | 7/2015 | Suzuki et al. | |
| 2015/0189347 A1* | 7/2015 | Oztaskent | G06F 16/951 725/32 |
| 2015/0195624 A1 | 7/2015 | Gossweiler, III | |
| 2015/0205591 A1 | 7/2015 | Jitkoff et al. | |
| 2015/0237389 A1 | 8/2015 | Grouf et al. | |
| 2015/0296072 A1 | 10/2015 | Zhou et al. | |
| 2015/0301729 A1 | 10/2015 | Wang et al. | |
| 2015/0309670 A1 | 10/2015 | Wheeler et al. | |
| 2015/0312603 A1 | 10/2015 | Singh et al. | |
| 2015/0317343 A1 | 11/2015 | Cselle et al. | |
| 2015/0334464 A1 | 11/2015 | Shin | |
| 2015/0346975 A1 | 12/2015 | Lee et al. | |
| 2015/0350741 A1 | 12/2015 | Rajaraman et al. | |
| 2015/0355816 A1 | 12/2015 | Shim | |
| 2015/0363035 A1 | 12/2015 | Hinckley et al. | |
| 2015/0365729 A1 | 12/2015 | Kaya et al. | |
| 2015/0370435 A1* | 12/2015 | Kirmse | G06F 16/438 715/716 |
| 2015/0370455 A1 | 12/2015 | Van Os et al. | |
| 2015/0370920 A1 | 12/2015 | Van Os et al. | |
| 2015/0373107 A1 | 12/2015 | Chan et al. | |
| 2015/0382047 A1 | 12/2015 | Van Os et al. | |
| 2016/0004425 A1 | 1/2016 | Yoon et al. | |
| 2016/0004772 A1 | 1/2016 | Kim et al. | |
| 2016/0004773 A1* | 1/2016 | Jannink | G06F 16/60 707/741 |
| 2016/0005013 A1 | 1/2016 | Perry | |
| 2016/0014461 A1 | 1/2016 | Leech et al. | |
| 2016/0021412 A1 | 1/2016 | Zito, Jr. | |
| 2016/0035119 A1 | 2/2016 | Lee et al. | |
| 2016/0036897 A1 | 2/2016 | Kim et al. | |
| 2016/0041702 A1 | 2/2016 | Wang | |
| 2016/0043962 A1 | 2/2016 | Kim et al. | |
| 2016/0066004 A1 | 3/2016 | Lieu et al. | |
| 2016/0066021 A1 | 3/2016 | Thomas et al. | |
| 2016/0066040 A1 | 3/2016 | Webster et al. | |
| 2016/0066049 A1 | 3/2016 | Mountain | |
| 2016/0078526 A1 | 3/2016 | Nations et al. | |
| 2016/0080815 A1 | 3/2016 | Ruffini et al. | |
| 2016/0092042 A1 | 3/2016 | Yenigalla et al. | |
| 2016/0092559 A1 | 3/2016 | Lind et al. | |
| 2016/0096113 A1 | 4/2016 | Decoufle | |
| 2016/0099991 A1 | 4/2016 | Lonkar et al. | |
| 2016/0105540 A1 | 4/2016 | Kwon et al. | |
| 2016/0110064 A1 | 4/2016 | Shapira | |
| 2016/0127783 A1 | 5/2016 | Garcia Navarro | |
| 2016/0127789 A1 | 5/2016 | Roberts et al. | |
| 2016/0133230 A1 | 5/2016 | Daniels et al. | |
| 2016/0142783 A1 | 5/2016 | Bagga et al. | |
| 2016/0165307 A1 | 6/2016 | Lavender et al. | |
| 2016/0188902 A1 | 6/2016 | Jin | |
| 2016/0191639 A1 | 6/2016 | Dai et al. | |
| 2016/0192017 A1 | 6/2016 | Tirpak | |
| 2016/0231885 A1 | 8/2016 | Lee et al. | |
| 2016/0249105 A1 | 8/2016 | Carney Landow | |
| 2016/0255379 A1 | 9/2016 | Langan et al. | |
| 2016/0277785 A1 | 9/2016 | Newman et al. | |
| 2016/0345070 A1 | 11/2016 | Beeson et al. | |
| 2016/0357305 A1 | 12/2016 | Wells et al. | |
| 2016/0357352 A1 | 12/2016 | Matas et al. | |
| 2016/0357355 A1 | 12/2016 | Carrigan et al. | |
| 2016/0357366 A1 | 12/2016 | Migos et al. | |
| 2016/0370982 A1 | 12/2016 | Penha et al. | |
| 2017/0010846 A1 | 1/2017 | Bernstein et al. | |
| 2017/0010847 A1 | 1/2017 | Bernstein et al. | |
| 2017/0013295 A1 | 1/2017 | Wertheimer et al. | |
| 2017/0046039 A1 | 2/2017 | Karunamuni et al. | |
| 2017/0046339 A1 | 2/2017 | Bhat et al. | |
| 2017/0068402 A1 | 3/2017 | Lochhead et al. | |
| 2017/0068511 A1 | 3/2017 | Brown et al. | |
| 2017/0094360 A1 | 3/2017 | Keighran et al. | |
| 2017/0097969 A1 | 4/2017 | Stein et al. | |
| 2017/0115867 A1 | 4/2017 | Bargmann | |
| 2017/0124594 A1 | 5/2017 | Naiga et al. | |
| 2017/0132659 A1 | 5/2017 | Dirks et al. | |
| 2017/0132829 A1 | 5/2017 | Blas et al. | |
| 2017/0134778 A1 | 5/2017 | Christie et al. | |
| 2017/0140748 A1 | 5/2017 | Roberts et al. | |
| 2017/0188116 A1 | 6/2017 | Major et al. | |
| 2017/0192642 A1 | 7/2017 | Fishman et al. | |
| 2017/0195736 A1 | 7/2017 | Chai et al. | |
| 2017/0201850 A1 | 7/2017 | Raleigh et al. | |
| 2017/0214975 A1 | 7/2017 | Schmidt et al. | |
| 2017/0242913 A1* | 8/2017 | Tijssen | G06F 40/247 |
| 2017/0245017 A1 | 8/2017 | Chaudhri et al. | |
| 2017/0251257 A1 | 8/2017 | Obrien | |
| 2017/0300151 A1 | 10/2017 | Lue-sang et al. | |
| 2017/0339443 A1 | 11/2017 | Lue-sang et al. | |
| 2017/0344553 A1 | 11/2017 | Evnine et al. | |
| 2017/0345040 A1 | 11/2017 | Pirnack et al. | |
| 2017/0353603 A1 | 12/2017 | Grunewald et al. | |
| 2017/0357387 A1 | 12/2017 | Clarke | |
| 2017/0359722 A1 | 12/2017 | Folse et al. | |
| 2017/0364246 A1 | 12/2017 | Van Os et al. | |
| 2018/0011580 A1 | 1/2018 | Lebowitz et al. | |
| 2018/0041814 A1 | 2/2018 | Christie et al. | |
| 2018/0063591 A1 | 3/2018 | Newman et al. | |
| 2018/0070121 A1 | 3/2018 | Zimmerman et al. | |
| 2018/0070138 A1 | 3/2018 | Chai et al. | |
| 2018/0107353 A1 | 4/2018 | Lee | |
| 2018/0113579 A1 | 4/2018 | Johnston et al. | |
| 2018/0130097 A1 | 5/2018 | Tran et al. | |
| 2018/0136800 A1 | 5/2018 | Johnston et al. | |
| 2018/0146377 A1 | 5/2018 | Folse et al. | |
| 2018/0189076 A1 | 7/2018 | Liston et al. | |
| 2018/0253900 A1 | 9/2018 | Finding et al. | |
| 2018/0275855 A1 | 9/2018 | Van Os et al. | |
| 2018/0293771 A1 | 10/2018 | Piemonte et al. | |
| 2018/0295403 A1 | 10/2018 | Christie et al. | |
| 2018/0302680 A1 | 10/2018 | Cormican | |
| 2018/0343497 A1 | 11/2018 | Brown et al. | |
| 2018/0349509 A1 | 12/2018 | Abou Mahmoud et al. | |
| 2018/0367834 A1 | 12/2018 | Carpenter et al. | |
| 2019/0012048 A1 | 1/2019 | Johnston et al. | |
| 2019/0020925 A1 | 1/2019 | Christie et al. | |
| 2019/0028769 A1 | 1/2019 | Jeon et al. | |
| 2019/0045271 A1 | 2/2019 | Christie et al. | |
| 2019/0052744 A1 | 2/2019 | Jung et al. | |
| 2019/0058921 A1 | 2/2019 | Christie et al. | |
| 2019/0066672 A1* | 2/2019 | Wood | G10L 15/22 |
| 2019/0073104 A1 | 3/2019 | Wang | |
| 2019/0073680 A1 | 3/2019 | Knox | |
| 2019/0129588 A1 | 5/2019 | Johnston et al. | |
| 2019/0138163 A1 | 5/2019 | Howland et al. | |

(56) References Cited

U.S. PATENT DOCUMENTS

| | | | |
|---|---|---|---|
| 2019/0141399 A1 | 5/2019 | Auxer et al. | |
| 2019/0258373 A1 | 8/2019 | Davydov et al. | |
| 2019/0272853 A1* | 9/2019 | Moore | G11B 27/036 |
| 2019/0342616 A1 | 11/2019 | Domm et al. | |
| 2019/0354264 A1 | 11/2019 | Van Os et al. | |
| 2019/0373320 A1 | 12/2019 | Balsamo | |
| 2020/0068274 A1 | 2/2020 | Aher et al. | |
| 2020/0084488 A1 | 3/2020 | Christie et al. | |
| 2020/0099985 A1 | 3/2020 | Keighran et al. | |
| 2020/0133631 A1 | 4/2020 | Christie et al. | |
| 2020/0137175 A1 | 4/2020 | Ganci et al. | |
| 2020/0257415 A1 | 8/2020 | Clarke | |
| 2020/0272666 A1 | 8/2020 | Van Os et al. | |
| 2020/0301567 A1 | 9/2020 | Park et al. | |
| 2020/0301575 A1 | 9/2020 | Lindholm et al. | |
| 2020/0304863 A1 | 9/2020 | Domm et al. | |
| 2020/0304876 A1 | 9/2020 | Cielak et al. | |
| 2020/0304879 A1 | 9/2020 | Ellingford | |
| 2020/0304880 A1 | 9/2020 | Diaz Delgado et al. | |
| 2020/0363934 A1 | 11/2020 | Van Os et al. | |
| 2020/0382845 A1 | 12/2020 | Payne | |
| 2020/0396507 A1 | 12/2020 | Balsamo | |
| 2021/0021903 A1 | 1/2021 | Christie et al. | |
| 2021/0168424 A1 | 6/2021 | Sharma | |
| 2021/0181901 A1 | 6/2021 | Johnston et al. | |
| 2021/0195277 A1 | 6/2021 | Thurlow et al. | |
| 2021/0286454 A1 | 9/2021 | Beaumier et al. | |
| 2021/0306711 A1 | 9/2021 | Ellingford et al. | |
| 2021/0337280 A1 | 10/2021 | Diaz Delgado et al. | |
| 2021/0345004 A1 | 11/2021 | Christie et al. | |
| 2021/0365134 A1 | 11/2021 | Beaumier et al. | |
| 2021/0397306 A1 | 12/2021 | Rajam et al. | |
| 2021/0406995 A1 | 12/2021 | Peters et al. | |
| 2022/0179526 A1 | 6/2022 | Schöberl | |
| 2022/0244824 A1 | 8/2022 | Cielak | |
| 2022/0321940 A1 | 10/2022 | Christie et al. | |
| 2022/0329891 A1 | 10/2022 | Christie et al. | |
| 2022/0337914 A1 | 10/2022 | Christie et al. | |
| 2022/0360858 A1 | 11/2022 | Christie et al. | |
| 2022/0413796 A1 | 12/2022 | Christie et al. | |
| 2023/0022781 A1 | 1/2023 | Lindholm et al. | |
| 2023/0033604 A1 | 2/2023 | Diaz Delgado et al. | |
| 2023/0096458 A1 | 3/2023 | Van Os et al. | |
| 2023/0127228 A1 | 4/2023 | Clarke | |
| 2023/0132595 A1 | 5/2023 | Van Os et al. | |

FOREIGN PATENT DOCUMENTS

| | | |
|---|---|---|
| AU | 2017101431 A4 | 11/2017 |
| AU | 2018100810 A4 | 7/2018 |
| CN | 1295419 A | 5/2001 |
| CN | 1985277 A | 6/2007 |
| CN | 101160932 A | 4/2008 |
| CN | 101228570 A | 7/2008 |
| CN | 101317149 A | 12/2008 |
| CN | 101370104 A | 2/2009 |
| CN | 101436110 A | 5/2009 |
| CN | 101465993 A | 6/2009 |
| CN | 101706704 A | 5/2010 |
| CN | 101719125 A | 6/2010 |
| CN | 101860447 A | 10/2010 |
| CN | 102098537 A | 6/2011 |
| CN | 102103460 A | 6/2011 |
| CN | 102265586 A | 11/2011 |
| CN | 102325144 A | 1/2012 |
| CN | 102819715 A | 12/2012 |
| CN | 102859484 A | 1/2013 |
| CN | 102880404 A | 1/2013 |
| CN | 102890615 A | 1/2013 |
| CN | 102955653 A | 3/2013 |
| CN | 102981695 A | 3/2013 |
| CN | 103037265 A | 4/2013 |
| CN | 103177738 A | 6/2013 |
| CN | 103399967 A | 11/2013 |
| CN | 103516933 A | 1/2014 |
| CN | 103546816 A | 1/2014 |
| CN | 103562848 A | 2/2014 |
| CN | 103620531 A | 3/2014 |
| CN | 103620541 A | 3/2014 |
| CN | 103686418 A | 3/2014 |
| CN | 103985045 A | 8/2014 |
| CN | 104508618 A | 4/2015 |
| CN | 104822098 A | 8/2015 |
| CN | 105264479 A | 1/2016 |
| CN | 105303372 A | 2/2016 |
| CN | 105308634 A | 2/2016 |
| CN | 105308923 A | 2/2016 |
| CN | 105657554 A | 6/2016 |
| CN | 105812849 A | 7/2016 |
| CN | 105828098 A | 8/2016 |
| CN | 105955520 A | 9/2016 |
| CN | 105955607 A | 9/2016 |
| CN | 105989085 A | 10/2016 |
| CN | 105992068 A | 10/2016 |
| CN | 106101982 A | 11/2016 |
| DE | 202016003233 U1 | 8/2016 |
| EP | 0608708 A2 | 8/1994 |
| EP | 0624853 A2 | 11/1994 |
| EP | 2386984 A2 | 11/2011 |
| EP | 2453667 A1 | 5/2012 |
| EP | 2535844 A2 | 12/2012 |
| EP | 2574089 A1 | 3/2013 |
| EP | 2605203 A1 | 6/2013 |
| EP | 2642402 A2 | 9/2013 |
| EP | 2672703 A1 | 12/2013 |
| EP | 2704032 A2 | 3/2014 |
| EP | 2725531 A1 | 4/2014 |
| EP | 2879398 A1 | 6/2015 |
| JP | 2000-112977 A | 4/2000 |
| JP | 2000-163031 A | 6/2000 |
| JP | 2001-197445 A | 7/2001 |
| JP | 2002-27381 A | 1/2002 |
| JP | 2002-342033 A | 11/2002 |
| JP | 2003-99452 A | 4/2003 |
| JP | 2003-534737 A | 11/2003 |
| JP | 2004-62237 A | 2/2004 |
| JP | 2006-31219 A | 2/2006 |
| JP | 2007-512640 A | 5/2007 |
| JP | 2007-140910 A | 6/2007 |
| JP | 2007-294068 A | 11/2007 |
| JP | 2008-71112 A | 3/2008 |
| JP | 2008-135911 A | 6/2008 |
| JP | 2009-60328 A | 3/2009 |
| JP | 2009-260947 A | 11/2009 |
| JP | 2010-28437 A | 2/2010 |
| JP | 2010-56595 A | 3/2010 |
| JP | 2010-509684 A | 3/2010 |
| JP | 2010-114733 A | 5/2010 |
| JP | 2011-512701 A | 4/2011 |
| JP | 2011-154455 A | 8/2011 |
| JP | 2011-205562 A | 10/2011 |
| JP | 2011-257930 A | 12/2011 |
| JP | 2012-95123 A | 5/2012 |
| JP | 2012-123685 A | 6/2012 |
| JP | 2012-208622 A | 10/2012 |
| JP | 2013-8369 A | 1/2013 |
| JP | 2013-223150 A | 10/2013 |
| JP | 2014-81740 A | 5/2014 |
| JP | 2014-102660 A | 6/2014 |
| JP | 2015-50655 A | 3/2015 |
| KR | 2001-0005939 A | 1/2001 |
| KR | 10-2001-0035356 A | 5/2001 |
| KR | 10-2002-0010151 A | 2/2002 |
| KR | 10-2007-0114329 A | 12/2007 |
| KR | 10-2009-0106104 A | 10/2009 |
| KR | 10-2010-0039194 A | 4/2010 |
| KR | 10-2011-0036408 A | 4/2011 |
| KR | 10-2011-0061811 A | 6/2011 |
| KR | 10-2012-0076682 A | 7/2012 |
| KR | 10-2012-0124445 A | 11/2012 |
| KR | 10-2013-0014712 A | 2/2013 |
| KR | 10-2013-0058034 A | 6/2013 |
| KR | 10-2013-0137969 A | 12/2013 |
| KR | 10-2014-0041939 A | 4/2014 |

(56) References Cited

FOREIGN PATENT DOCUMENTS

| | | |
|---|---|---|
| KR | 10-2019-0033658 A | 3/2019 |
| KR | 10-2022-0041231 A | 3/2022 |
| TW | 200622893 A | 7/2006 |
| TW | 200719204 A | 5/2007 |
| TW | 201337717 A | 9/2013 |
| TW | 201349049 A | 12/2013 |
| TW | 201351261 A | 12/2013 |
| WO | 1994/009438 A2 | 4/1994 |
| WO | 1999/040728 A1 | 8/1999 |
| WO | 2004/063862 A2 | 7/2004 |
| WO | 2005/050652 A1 | 6/2005 |
| WO | 2005/109345 A1 | 11/2005 |
| WO | 2007/078623 A2 | 7/2007 |
| WO | 2008/005135 A1 | 1/2008 |
| WO | 2008/060486 A2 | 5/2008 |
| WO | 2009/016607 A2 | 2/2009 |
| WO | 2009/039786 A1 | 4/2009 |
| WO | 2009/148781 A1 | 12/2009 |
| WO | 2010/022570 A1 | 3/2010 |
| WO | 2010/025168 A1 | 3/2010 |
| WO | 2010/118690 A1 | 10/2010 |
| WO | 2011/095693 A1 | 8/2011 |
| WO | 2012/012446 A2 | 1/2012 |
| WO | 2012/061760 A2 | 5/2012 |
| WO | 2012/088665 A1 | 7/2012 |
| WO | 2013/000741 A1 | 1/2013 |
| WO | 2013/149128 A2 | 10/2013 |
| WO | 2013/169849 A2 | 11/2013 |
| WO | 2013/169877 A2 | 11/2013 |
| WO | 2013/149128 A3 | 2/2014 |
| WO | 2014/105276 A1 | 7/2014 |
| WO | 2014/144908 A1 | 9/2014 |
| WO | 2014/177929 A2 | 11/2014 |
| WO | 2014/200730 A1 | 12/2014 |
| WO | 2015/200227 A1 | 12/2015 |
| WO | 2015/200228 A1 | 12/2015 |
| WO | 2015/200537 A2 | 12/2015 |
| WO | 2016/048308 A1 | 3/2016 |
| WO | 2016/048310 A1 | 3/2016 |
| WO | 2016/111065 A1 | 7/2016 |
| WO | 2017/008079 A1 | 1/2017 |
| WO | 2017/124116 A1 | 7/2017 |
| WO | 2017/200923 A1 | 11/2017 |
| WO | 2017/218104 A1 | 12/2017 |
| WO | 2018/081157 A1 | 5/2018 |

OTHER PUBLICATIONS

Advisory Action received for U.S. Appl. No. 15/167,801, dated Feb. 16, 2018, 4 pages.
Applicant Initiated Interview Summary received for U.S. Appl. No. 15/167,801, dated Apr. 23, 2018, 3 pages.
Applicant Initiated Interview Summary received for U.S. Appl. No. 15/167,801, dated Jul. 29, 2019, 3 pages.
Corrected Notice of Allowance received for U.S. Appl. No. 14/242,575, dated Dec. 15, 2016, 7 pages.
Corrected Notice of Allowance received for U.S. Appl. No. 14/242,575, dated Nov. 16, 2016, 7 pages.
Corrected Notice of Allowance received for U.S. Appl. No. 14/255,664, dated Aug. 29, 2017, 4 pages.
Corrected Notice of Allowance received for U.S. Appl. No. 14/267,671, dated Nov. 29, 2018, 3 pages.
Corrected Notice of Allowance received for U.S. Appl. No. 14/749,288, dated Sep. 21, 2017, 5 pages.
Corrected Notice of Allowance received for U.S. Appl. No. 15/276,633, dated Sep. 10, 2019, 7 pages.
Corrected Notice of Allowance received for U.S. Appl. No. 15/695,880, dated Jun. 11, 2018, 6 pages.
Corrected Notice of Allowance received for U.S. Appl. No. 15/714,904, dated Sep. 7, 2018, 5 pages.
Corrected Notice of Allowance received for U.S. Appl. No. 15/876,715, dated Oct. 20, 2021, 2 pages.
Corrected Notice of Allowance received for U.S. Appl. No. 16/010,280, dated Aug. 6, 2019, 2 pages.
Corrected Notice of Allowance received for U.S. Appl. No. 16/036,810, dated Nov. 19, 2018, 6 pages.
Cover Flow—Wikipedia, Available online at: <https://en.wikipedia.org/w/index.php?t%20itle=Cover%20Flow&oldid=879285208>, Jan. 20, 2019, 3 pages.
Examiner Initiated Interview Summary received for U.S. Appl. No. 15/390,377, dated Oct. 30, 2017, 2 pages.
Examiner's Answer to Appeal Brief received for U.S. Appl. No. 15/876,715, dated Aug. 18, 2020, 16 pages.
Extended European Search Report received for European Patent Application No. 17813728.7, dated Feb. 11, 2019, 8 pages.
Extended European Search Report received for European Patent Application No. 20190698.9, dated Oct. 30, 2020, 6 pages.
Extended European Search Report received for European Patent Application No. 20199219.5, dated Apr. 22, 2021, 8 pages.
Final Office Action received for U.S. Appl. No. 14/255,664, dated Oct. 17, 2016, 16 pages.
Final Office Action received for U.S. Appl. No. 14/267,671, dated May 23, 2018, 17 pages.
Final Office Action received for U.S. Appl. No. 14/267,671, dated Oct. 26, 2016, 21 pages.
Final Office Action received for U.S. Appl. No. 14/271,179, dated Dec. 15, 2016, 10 pages.
Final Office Action received for U.S. Appl. No. 14/271,179, dated Jun. 20, 2019, 15 pages.
Final Office Action received for U.S. Appl. No. 14/271,179, dated Jun. 21, 2018, 14 pages.
Final Office Action received for U.S. Appl. No. 14/746,095, dated Jul. 16, 2018, 33 pages.
Final Office Action received for U.S. Appl. No. 14/746,662, dated Apr. 24, 2017, 8 pages.
Final Office Action received for U.S. Appl. No. 14/746,662, dated Jun. 27, 2017, 9 pages.
Final Office Action received for U.S. Appl. No. 15/167,801, dated Apr. 5, 2019, 18 pages.
Final Office Action received for U.S. Appl. No. 15/167,801, dated May 28, 2020, 17 pages.
Final Office Action received for U.S. Appl. No. 15/167,801, dated Nov. 29, 2017, 12 pages.
Final Office Action received for U.S. Appl. No. 15/235,000, dated Dec. 19, 2018, 33 pages.
Final Office Action received for U.S. Appl. No. 15/235,000, dated Mar. 13, 2018, 31 pages.
Final Office Action received for U.S. Appl. No. 15/272,393, dated Mar. 25, 2019, 54 pages.
Final Office Action received for U.S. Appl. No. 15/272,397, dated Mar. 7, 2017, 23 pages.
Final Office Action received for U.S. Appl. No. 15/276,633, dated Jul. 26, 2017, 15 pages.
Final Office Action received for U.S. Appl. No. 15/276,633, dated Oct. 29, 2018, 12 pages.
Final Office Action received for U.S. Appl. No. 15/390,377, dated Nov. 9, 2017, 18 pages.
Final Office Action received for U.S. Appl. No. 15/507,229, dated Jul. 15, 2020, 20 pages.
Final Office Action received for U.S. Appl. No. 15/507,229, dated Sep. 18, 2019, 15 pages.
Final Office Action received for U.S. Appl. No. 15/719,404, dated Aug. 8, 2019, 19 pages.
Final Office Action received for U.S. Appl. No. 15/719,404, dated Mar. 30, 2021, 19 pages.
Final Office Action received for U.S. Appl. No. 15/876,715, dated Nov. 5, 2018, 15 pages.
Final Office Action received for U.S. Appl. No. 16/108,519, dated Dec. 12, 2019, 10 pages.
Final Office Action received for U.S. Appl. No. 16/108,519, dated Nov. 25, 2020, 12 pages.
Final Office Action received for U.S. Appl. No. 16/126,962, dated Apr. 8, 2020, 20 pages.
Final Office Action received for U.S. Appl. No. 16/136,005, dated Mar. 9, 2020, 9 pages.

(56) References Cited

OTHER PUBLICATIONS

Final Office Action received for U.S. Appl. No. 16/142,635, dated Feb. 3, 2021, 23 pages.
Final Office Action received for U.S. Appl. No. 16/144,077, dated Jul. 12, 2019, 22 pages.
Final Office Action received for U.S. Appl. No. 16/175,565, dated Nov. 12, 2020, 40 pages.
Final Office Action received for U.S. Appl. No. 16/233,990, dated Jan. 11, 2021, 17 pages.
Final Office Action received for U.S. Appl. No. 16/584,790, dated Jun. 15, 2021, 30 pages.
Final Office Action received for U.S. Appl. No. 16/584,790, dated May 27, 2020, 27 pages.
Final Office Action received for U.S. Appl. No. 16/682,443, dated Mar. 9, 2021, 9 pages.
Final Office Action received for U.S. Appl. No. 16/697,090, dated Jan. 27, 2021, 18 pages.
Final Office Action received for U.S. Appl. No. 16/827,918, dated Jul. 8, 2021, 31 pages.
Final Office Action received for U.S. Appl. No. 16/827,926, dated Mar. 17, 2021, 44 pages.
Final Office Action received for U.S. Appl. No. 16/865,172, dated Feb. 12, 2021, 29 pages.
Final Office Action received for U.S. Appl. No. 16/888,478, dated Nov. 15, 2021, 7 pages.
International Search Report received for PCT Patent Application No. PCT/US2014/057272, dated May 28, 2015, 4 pages.
International Search Report received for PCT Patent Application No. PCT/US2014/057280, dated May 27, 2015, 4 pages.
International Search Report received for PCT Patent Application No. PCT/US2015/037027, dated Sep. 28, 2015, 3 pages.
International Search Report received for PCT Patent Application No. PCT/US2015/037030, dated Dec. 10, 2015, 7 pages.
International Search Report received for PCT Patent Application No. PCT/US2015/037520, dated Mar. 7, 2016, 6 pages.
International Search Report received for PCT Patent Application No. PCT/US2017/029448, dated Jul. 13, 2017, 3 pages.
International Search Report received for PCT Patent Application No. PCT/US2017/031764, dated Aug. 7, 2017, 2 pages.
International Search Report received for PCT Patent Application No. PCT/US2017/058132, dated Mar. 27, 2018, 6 pages.
International Search Report received for PCT Patent Application No. PCT/US2019/034921, dated Nov. 19, 2019, 5 pages.
International Search Report received for PCT Patent Application No. PCT/US2020/024452, dated Aug. 6, 2020, 6 pages.
International Search Report received for PCT Patent Application No. PCT/US2020/024485, dated Aug. 3, 2020, 6 pages.
International Search Report received for PCT Patent Application No. PCT/US2020/024486, dated Aug. 11, 2020, 6 pages.
International Search Report received for PCT Patent Application No. PCT/US2020/024492, dated Aug. 10, 2020, 6 pages.
Non-Final Office Action received for U.S. Appl. No. 14/208,099, dated Jun. 25, 2015, 12 pages.
Non-Final Office Action received for U.S. Appl. No. 14/242,575, dated Mar. 21, 2016, 12 pages.
Non-Final Office Action received for U.S. Appl. No. 14/255,664, dated Apr. 1, 2016, 15 pages.
Non-Final Office Action received for U.S. Appl. No. 14/262,435, dated Feb. 22, 2016, 22 pages.
Non-Final Office Action received for U.S. Appl. No. 14/267,671, dated Apr. 1, 2016, 16 pages.
Non-Final Office Action received for U.S. Appl. No. 14/267,671, dated Dec. 1, 2017, 18 pages.
Non-Final Office Action received for U.S. Appl. No. 14/267,671, dated May 26, 2017, 18 pages.
Non-Final Office Action received for U.S. Appl. No. 14/271,179, dated May 29, 2015, 25 pages.
Non-Final Office Action received for U.S. Appl. No. 14/271,179, dated Oct. 5, 2018, 15 pages.
Non-Final Office Action received for U.S. Appl. No. 14/271,179, dated Sep. 21, 2017, 12 pages.
Non-Final Office Action received for U.S. Appl. No. 14/746,095, dated Dec. 1, 2017, 34 pages.
Non-Final Office Action received for U.S. Appl. No. 14/746,095, dated Jul. 25, 2019, 33 pages.
Non-Final Office Action received for U.S. Appl. No. 14/746,620, dated Jan. 11, 2017, 16 pages.
Non-Final Office Action received for U.S. Appl. No. 14/746,662, dated Aug. 9, 2016, 8 pages.
Non-Final Office Action received for U.S. Appl. No. 14/749,288, dated Oct. 12, 2016, 11 pages.
Non-Final Office Action received for U.S. Appl. No. 15/167,801 dated Mar. 24, 2017, 12 Pages.
Non-Final Office Action received for U.S. Appl. No. 15/167,801, dated Aug. 30, 2018, 15 pages.
Non-Final Office Action received for U.S. Appl. No. 15/167,801, dated Dec. 11, 2020, 18 pages.
Non-Final Office Action received for U.S. Appl. No. 15/167,801, dated Sep. 3, 2021, 17 pages.
Non-Final Office Action received for U.S. Appl. No. 15/167,801, dated Sep. 26, 2019, 18 pages.
Non-Final Office Action received for U.S. Appl. No. 15/224,370, dated Oct. 3, 2017, 14 pages.
Non-Final Office Action received for U.S. Appl. No. 15/235,000, dated Jul. 14, 2017, 31 pages.
Non-Final Office Action received for U.S. Appl. No. 15/235,000, dated Jul. 25, 2018, 31 pages.
Non-Final Office Action received for U.S. Appl. No. 15/235,000, dated Jun. 26, 2019, 31 pages.
Non-Final Office Action received for U.S. Appl. No. 15/272,393, dated Oct. 2, 2018, 52 pages.
Non-Final Office Action received for U.S. Appl. No. 15/272,397, dated Nov. 22, 2016, 20 pages.
Non-Final Office Action received for U.S. Appl. No. 15/276,633, dated Feb. 23, 2018, 12 pages.
Non-Final Office Action received for U.S. Appl. No. 15/276,633, dated Mar. 5, 2019, 16 pages.
Non-Final Office Action received for U.S. Appl. No. 15/276,633, dated Nov. 17, 2016, 12 pages.
Non-Final Office Action received for U.S. Appl. No. 15/390,377, dated Apr. 5, 2017, 17 pages.
Non-Final Office Action received for U.S. Appl. No. 15/414,493, dated Oct. 6, 2017, 15 pages.
Non-Final Office Action received for U.S. Appl. No. 15/507,229, dated Feb. 27, 2020, 16 pages.
Non-Final Office Action received for U.S. Appl. No. 15/507,229, dated Jun. 3, 2019, 14 pages.
Non-Final Office Action received for U.S. Appl. No. 15/674,992, dated May 11, 2018, 8 pages.
Non-Final Office Action received for U.S. Appl. No. 15/719,404, dated Dec. 14, 2018, 14 pages.
Non-Final Office Action received for U.S. Appl. No. 15/719,404, dated Oct. 16, 2020, 18 pages.
Non-Final Office Action received for U.S. Appl. No. 15/798,092, dated Dec. 20, 2017, 20 pages.
Non-Final Office Action received for U.S. Appl. No. 15/876,715, dated Jun. 4, 2018, 12 pages.
Non-Final Office Action received for U.S. Appl. No. 15/876,715, dated Sep. 10, 2019, 13 pages.
Non-Final Office Action received for U.S. Appl. No. 15/990,327, dated Jul. 31, 2018, 8 pages.
Non-Final Office Action received for U.S. Appl. No. 16/010,280, dated Mar. 7, 2019, 5 pages.
Non-Final Office Action received for U.S. Appl. No. 16/108,519, dated Apr. 5, 2021, 13 pages.
Non-Final Office Action received for U.S. Appl. No. 16/108,519, dated Aug. 2, 2019, 10 pages.
Non-Final Office Action received for U.S. Appl. No. 16/108,519, dated May 8, 2020, 11 pages.
Non-Final Office Action received for U.S. Appl. No. 16/126,962, dated Aug. 25, 2020, 22 pages.

(56) References Cited

OTHER PUBLICATIONS

Non-Final Office Action received for U.S. Appl. No. 16/126,962, dated Sep. 3, 2019, 16 pages.
Non-Final Office Action received for U.S. Appl. No. 16/136,005, dated Sep. 9, 2020, 10 pages.
Non-Final Office Action received for U.S. Appl. No. 16/136,005, dated Sep. 18, 2019, 9 pages.
Non-Final Office Action received for U.S. Appl. No. 16/142,635, dated Jun. 8, 2020, 19 pages.
Non-Final Office Action received for U.S. Appl. No. 16/142,635, dated Jun. 11, 2021, 23 pages.
Non-Final Office Action received for U.S. Appl. No. 16/144,077, dated Feb. 19, 2019, 24 pages.
Non-Final Office Action received for U.S. Appl. No. 16/144,077, dated Nov. 27, 2019, 40 pages.
Non-Final Office Action received for U.S. Appl. No. 16/175,565, dated Sep. 20, 2021, 33 pages.
Non-Final Office Action received for U.S. Appl. No. 16/233,990, dated Jul. 9, 2021, 18 pages.
Non-Final Office Action received for U.S. Appl. No. 16/233,990, dated Jun. 18, 2020, 17 pages.
Non-Final Office Action received for U.S. Appl. No. 16/392,467, dated Sep. 27, 2019, 5 pages.
Non-Final Office Action received for U.S. Appl. No. 16/584,790, dated Dec. 23, 2020, 30 pages.
Non-Final Office Action received for U.S. Appl. No. 16/584,790, dated Dec. 26, 2019, 24 pages.
Non-Final Office Action received for U.S. Appl. No. 16/682,443, dated Sep. 23, 2020, 10 pages.
Non-Final Office Action received for U.S. Appl. No. 16/697,090, dated Aug. 3, 2021, 16 pages.
Non-Final Office Action received for U.S. Appl. No. 16/697,090, dated Jul. 6, 2020, 14 pages.
Non-Final Office Action received for U.S. Appl. No. 16/827,910, dated Jun. 17, 2021, 16 pages.
Non-Final Office Action received for U.S. Appl. No. 16/827,918, dated Dec. 10, 2020, 28 pages.
Non-Final Office Action received for U.S. Appl. No. 16/827,926, dated Oct. 29, 2020, 45 pages.
Non-Final Office Action received for U.S. Appl. No. 16/827,931, dated Mar. 3, 2021, 24 pages.
Non-Final Office Action received for U.S. Appl. No. 16/865,172 dated Jun. 29, 2021, 29 pages.
Non-Final Office Action received for U.S. Appl. No. 16/865,172, dated Aug. 20, 2020, 19 pages.
Non-Final Office Action received for U.S. Appl. No. 16/872,274, dated Jul. 9, 2021, 19 pages.
Non-Final Office Action received for U.S. Appl. No. 16/888,478, dated Feb. 8, 2021, 24 pages.
Non-Final Office Action received for U.S. Appl. No. 16/945,724, dated Jul. 19, 2021, 8 pages.
Non-Final Office Action received for U.S. Appl. No. 17/065,387, dated Jan. 28, 2021, 28 pages.
Non-Final Office Action received for U.S. Appl. No. 17/065,387, dated Jun. 1, 2021, 25 pages.
Non-Final Office Action received for U.S. Appl. No. 17/133,550, dated Jun. 8, 2021, 23 pages.
Non-Final Office Action received for U.S. Appl. No. 17/210,352, dated Oct. 18, 2021, 18 pages.
Non-Final Office Action received for U.S. Appl. No. 17/353,527, dated Oct. 5, 2021, 14 pages.
Non-Final Office Action received for U.S. Appl. No. 16/175,565, dated Mar. 4, 2020, 36 pages.
Non-Final Office Action received for U.S. Appl. No. 15/719,404, dated Nov. 26, 2021, 19 pages.
Notice of Allowance received for U.S. Appl. No. 14/208,099, dated Feb. 3, 2016, 10 pages.
Notice of Allowance received for U.S. Appl. No. 14/242,575, dated Oct. 27, 2016, 11 pages.
Notice of Allowance received for U.S. Appl. No. 14/255,664, dated May 5, 2017, 7 pages.
Notice of Allowance received for U.S. Appl. No. 14/262,435, dated Aug. 16, 2016, 6 pages.
Notice of Allowance received for U.S. Appl. No. 14/267,671, dated Sep. 19, 2018, 8 pages.
Notice of Allowance received for U.S. Appl. No. 14/746,095, dated Dec. 31, 2019, 8 pages.
Notice of Allowance received for U.S. Appl. No. 14/746,620, dated Sep. 25, 2017, 8 pages.
Notice of Allowance received for U.S. Appl. No. 14/746,662, dated Sep. 25, 2017, 7 pages.
Notice of Allowance received for U.S. Appl. No. 14/749,288, dated May 25, 2017, 8 pages.
Notice of Allowance received for U.S. Appl. No. 15/272,393, dated Jan. 15, 2020, 7 pages.
Notice of Allowance received for U.S. Appl. No. 15/272,393, dated Sep. 18, 2019, 10 pages.
Notice of Allowance received for U.S. Appl. No. 15/272,397, dated Oct. 18, 2017, 8 pages.
Notice of Allowance received for U.S. Appl. No. 15/276,633, dated Aug. 26, 2019, 8 pages.
Notice of Allowance received for U.S. Appl. No. 15/390,377, dated Jul. 2, 2018, 9 pages.
Notice of Allowance received for U.S. Appl. No. 15/414,493, dated Mar. 14, 2018, 7 pages.
Notice of Allowance received for U.S. Appl. No. 15/674,992, dated Oct. 1, 2018, 7 pages.
Notice of Allowance received for U.S. Appl. No. 15/695,880, dated Feb. 28, 2018, 10 pages.
Notice of Allowance received for U.S. Appl. No. 15/695,880, dated Oct. 18, 2017, 9 pages.
Notice of Allowance received for U.S. Appl. No. 15/714,904, dated May 22, 2018, 8 pages.
Notice of Allowance received for U.S. Appl. No. 15/798,092, dated Jun. 7, 2018, 9 pages.
Notice of Allowance received for U.S. Appl. No. 15/798,092, dated Oct. 9, 2018, 5 pages.
Notice of Allowance received for U.S. Appl. No. 15/833,618, dated Mar. 14, 2018, 9 pages.
Notice of Allowance received for U.S. Appl. No. 15/876,715, dated Oct. 14, 2021, 7 pages.
Notice of Allowance received for U.S. Appl. No. 15/990,327, dated Jan. 11, 2019, 7 pages.
Notice of Allowance received for U.S. Appl. No. 16/010,280, dated Jul. 29, 2019, 7 pages.
Notice of Allowance received for U.S. Appl. No. 16/036,810, dated Oct. 31, 2018, 9 pages.
Notice of Allowance received for U.S. Appl. No. 16/108,519, dated Sep. 21, 2021, 8 pages.
Notice of Allowance received for U.S. Appl. No. 16/136,005, dated Feb. 24, 2021, 8 pages.
Notice of Allowance received for U.S. Appl. No. 16/136,005, dated Jun. 9, 2021, 7 pages.
Notice of Allowance received for U.S. Appl. No. 16/144,077, dated May 8, 2020, 15 pages.
Notice of Allowance received for U.S. Appl. No. 16/392,467, dated Mar. 23, 2020, 9 pages.
Notice of Allowance received for U.S. Appl. No. 16/682,443, dated Aug. 20, 2021, 7 pages.
Notice of Allowance received for U.S. Appl. No. 16/726,179, dated Jun. 17, 2021, 9 pages.
Notice of Allowance received for U.S. Appl. No. 16/726,179, dated Sep. 30, 2021, 8 pages.
Notice of Allowance received for U.S. Appl. No. 16/827,926, dated Nov. 1, 2021, 35 pages.
Notice of Allowance received for U.S. Appl. No. 16/827,931, dated Sep. 15, 2021, 11 pages.
Notice of Allowance received for U.S. Appl. No. 16/827,942, dated Apr. 28, 2021, 5 pages.
Notice of Allowance received for U.S. Appl. No. 16/827,942, dated Jan. 22, 2021, 5 pages.

(56) References Cited

OTHER PUBLICATIONS

Notice of Allowance received for U.S. Appl. No. 16/827,942, dated Oct. 5, 2020, 10 pages.
Notice of Allowance received for U.S. Appl. No. 16/142,635, dated Nov. 10, 2021, 8 pages.
Notice of Allowance received for U.S. Appl. No. 16/682,443, dated Nov. 17, 2021, 8 pages.
Notice of Allowance received for U.S. Appl. No. 17/065,387, dated Dec. 1, 2021, 10 pages.
Patent Board Decision received for U.S. Appl. No. 15/876,715, mailed on Aug. 3, 2021, 8 pages.
Restriction Requirement received for U.S. Appl. No. 14/208,099, dated Feb. 24, 2015, 5 pages.
Search Report received for Chinese Patent Application No. 201580028382.1, dated Oct. 12, 2018, 5 pages (2 pages of English Translation & 3 pages of Official copy).
Search Report received for Chinese Patent Application No. 201780033590.X, dated Mar. 24, 2021, 4 pages (2 page of English Translation and 2 pages of Official Copy).
Search Report received for Chinese Patent Application No. 201910469185.3, dated Feb. 23, 2021, 6 pages (3 page of English Translation and 3 page of Official Copy).
Search Report received for Danish Patent Application No. PA 201670581, dated Apr. 4, 2017, 2 pages.
Search Report received for Danish Patent Application No. PA 201670581, dated Feb. 5, 2018, 1 page.
Search Report received for Danish Patent Application No. PA 201670581, dated Nov. 3, 2016, 1 page.
Search Report received for Danish Patent Application No. PA 201870354, dated Sep. 26, 2018, 4 pages.
Search Report received for Danish Patent Application No. PA201670582, dated Feb. 9, 2017, 1 page.
Search Report received for Danish Patent Application No. PA201670582, dated Mar. 6, 2018, 2 pages.
Search Report received for Danish Patent Application No. PA201670582, dated Oct. 28, 2016, 4 pages.
Search Report received for Danish Patent Application No. PA201770200, Completed on Jul. 12, 2017, 4 pages.
Search Report received for Taiwanese Patent Application No. 104120369, dated Aug. 8, 2016, 2 Pages (1 page of official copy & 1 page of English translation).
Search Report received for Taiwanese Patent Application No. 104120385, dated Nov. 25, 2016, 2 Pages (1 page of official copy & 1 page of English translation).
Supplemental Notice of Allowability received for U.S. Appl. No. 16/827,942, dated Nov. 4, 2020, 3 pages.
Supplemental Notice of Allowance received for U.S. Appl. No. 15/798,092, dated Jan. 9, 2019, 2 pages.
Akhtar Iyaz, "Movies Anywhere: Everything You Need To Know", Available online at: <https://www.cnet.com/how-to/movies-anywhere-ultraviolet-movies-locker-streaming-redeem-faq/>, 2017, 8 pages.
Alvarez Edgar, "Sling TV Redesign Makes It Easy To Find Your Favorite Content", Engadget, Available online at: <https://www.engadget.com/2016/01/05/sling-tv-major-redesign/>, May 1, 2016, pp. 1-12.
Bishop Bryan, "Netflix Introduces One Unified TV Interface to Rule them All", The Verge, Available online at: <https://www.theverge.com/2013/11/13/5098224/netflix-introduces-one-unified-tv-interface-to-rule-them-all>, Nov. 13, 2013, 3 pages.
Bohn Dieter, "Rebooting WebOS: How LG Rethought The Smart TV", The Verge, Available online at: <http://www.theverge.com/2014/1/6/5279220/rebooting-webos-how-lg-rethought-the-smart-tv>, Jan. 6, 2014, 5 pages.
Cheredar Tom, "Verizon's Viewdini Lets You Watch Netflix, Comcast, & Hulu Videos from a Single App", venturebeat.com, May 22, 2012, 6 pages.
episodecalendar.com, "Keep track of your favorite TV shows!—TV Episode Calendar", Available Online At: <https://web.archive.org/web/20140517060612/https://episodecalendar.com/>, May 17, 2014, 6 pages.
Fingas Roger, "Walmart's Vudu to get Native Apple TV", AppleInsider, 2017, pp. 1-4.
Grey Melissa, "Comcast's New X2 Platform Moves your DVR Recordings from the Box to the Cloud", Engadget, Available online at: <http://www.engadget.com/2013/06/11/comcast-x2-platform/>, Jun. 11, 2013, 15 pages.
International Standard—ISO, "Ergonomic Requirements for Office Work with Visual Display Terminals (VDTs)", Part 13: User Guidance, Zurich, CH, vol. 9241-13, XP001525163, Section 10, Jul. 15, 1998, 40 pages.
Kaijser Martijn, "Mimic Skin for Kodi 15.x: Installation and Showcase", Time 2:23-2:28, Available online at: <https://www.youtube.com/watch?v=RGfpbUWVkgQ&t=143s>, Aug. 3, 2015, 1 page.
Lee et al., "A Multi-Touch Three Dimensional Touch-Sensitive Tablet", CHI'85 Proceedings, Apr. 1985, pp. 21-25.
Li Xiaoshan, "CNTV, Hulu, BBC iPlayer Comparative Study on User Interface of Three Network TV Stations", Modern Communication (Journal of Communication University of China), Issue 11, Nov. 5, 2010, pp. 156-158. See attached Communication 37 CFR § 1.98(a) (3).
Ng Gary, "New Netflix User Interface Coming This Month, First Redesign in Four Years", iPhone in Canada, Available online at: <https://www.iphoneincanada.ca/news/new-netflix-user-interface/>, Jun. 1, 2015, 3 pages.
Panzarino Matthew, "Apple Announces Voice Activated Siri Assistant Feature For iOS 5, Integrates Wolfram Alpha and Wikipedia", Available online at: <www.thenextweb.com>, Oct. 4, 2011, pp. 1-6.
Pierce David, "Got Hulu and Netflix? You Need an App to Search It All", Wired, Available online at: <https://www.wired.com/2016/03/got-hulu-netflix-need-app-search/>, Mar. 10, 2016, pp. 1-4.
Rubine Dean, "Combining Gestures and Direct Manipulation", CHI'92, May 3-7, 1992, pp. 659-660.
Rubine Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.
Westerman Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.
Applicant Initiated Interview Summary received for U.S. Appl. No. 17/210,352, dated Feb. 28, 2022, 4 pages.
Corrected Notice of Allowability received for U.S. Appl. No. 16/108,519, dated Dec. 22, 2021, 3 pages.
Corrected Notice of Allowance received for U.S. Appl. No. 15/876,715, dated Apr. 11, 2022, 4 Pages.
Corrected Notice of Allowance received for U.S. Appl. No. 15/876,715, dated Apr. 19, 2022, 4 Pages.
Corrected Notice of Allowance received for U.S. Appl. No. 16/142,635, dated Mar. 10, 2022, 2 Pages.
Corrected Notice of Allowance received for U.S. Appl. No. 16/233,990, dated Mar. 8, 2022, 4 pages.
Corrected Notice of Allowance received for U.S. Appl. No. 16/827,931, dated Dec. 6, 2021, 4 pages.
Corrected Notice of Allowance received for U.S. Appl. No. 16/872,274, dated Aug. 12, 2022, 5 pages.
Corrected Notice of Allowance received for U.S. Appl. No. 16/945,724, dated Aug. 31, 2022, 2 pages.
Corrected Notice of Allowance received for U.S. Appl. No. 17/000,112, dated Jun. 17, 2022, 2 pages.
Corrected Notice of Allowance received for U.S. Appl. No. 17/065,387, dated Mar. 30, 2022, 2 Pages.
Extended European Search Report received for European Patent Application No. 22167405.4, dated Jul. 4, 2022, 11 Pages.
Final Office Action received for U.S. Appl. No. 16/175,565, dated May 27, 2022, 33 pages.
Final Office Action received for U.S. Appl. No. 16/584,790, dated Jun. 14, 2022, 37 pages.
Final Office Action received for U.S. Appl. No. 16/697,090, dated Feb. 23, 2022, 25 pages.

(56) References Cited

OTHER PUBLICATIONS

Final Office Action received for U.S. Appl. No. 16/827,910, dated Feb. 28, 2022, 17 pages.
Final Office Action received for U.S. Appl. No. 16/872,274, dated Dec. 23, 2021, 20 pages.
Final Office Action received for U.S. Appl. No. 17/133,550, dated Feb. 11, 2022, 18 pages.
Final Office Action received for U.S. Appl. No. 17/210,352, dated Jun. 3, 2022, 21 pages.
Final Office Action received for U.S. Appl. No. 17/353,527, dated May 11, 2022, 17 Pages.
Non-Final Office Action received for U.S. Appl. No. 15/167,801, dated May 18, 2022, 17 Pages.
Non-Final Office Action received for U.S. Appl. No. 16/584,790, dated Feb. 1, 2022, 33 pages.
Non-Final Office Action received for U.S. Appl. No. 16/697,090, dated Jul. 7, 2022, 25 pages.
Non-Final Office Action received for U.S. Appl. No. 16/827,910, dated Sep. 14, 2022, 18 pages.
Non-Final Office Action received for U.S. Appl. No. 16/827,926, dated Apr. 25, 2022, 27 pages.
Non-Final Office Action received for U.S. Appl. No. 16/888,478, dated May 2, 2022, 29 pages.
Non-Final Office Action received for U.S. Appl. No. 17/000,112, dated Dec. 7, 2021, 15 pages.
Non-Final Office Action received for U.S. Appl. No. 17/133,550, dated Sep. 9, 2022, 23 pages.
Non-Final Office Action received for U.S. Appl. No. 17/379,785, dated Mar. 30, 2022, 18 Pages.
Non-Final Office Action received for U.S. Appl. No. 17/457,901, dated Apr. 28, 2022, 24 Pages.
Notice of Allowance received for U.S. Appl. No. 15/719,404, dated Jul. 13, 2022, 8 Pages.
Notice of Allowance received for U.S. Appl. No. 15/876,715, dated Apr. 4, 2022, 7 pages.
Notice of Allowance received for U.S. Appl. No. 15/876,715, dated Aug. 3, 2022, 7 Pages.
Notice of Allowance received for U.S. Appl. No. 16/233,990, dated Feb. 22, 2022, 8 pages.
Notice of Allowance received for U.S. Appl. No. 16/233,990, dated May 26, 2022, 5 pages.
Notice of Allowance received for U.S. Appl. No. 16/233,990, dated Oct. 5, 2022, 5 pages.
Notice of Allowance received for U.S. Appl. No. 16/827,918, dated Feb. 7, 2022, 9 pages.
Notice of Allowance received for U.S. Appl. No. 16/827,918, dated Jun. 8, 2022, 9 Pages.
Notice of Allowance received for U.S. Appl. No. 16/827,931, dated Apr. 19, 2022, 7 Pages.
Notice of Allowance received for U.S. Appl. No. 16/827,931, dated Jan. 5, 2022, 7 pages.
Notice of Allowance received for U.S. Appl. No. 16/865,172, dated Apr. 13, 2022, 8 pages.
Notice of Allowance received for U.S. Appl. No. 16/865,172, dated Aug. 25, 2022, 8 Pages.
Notice of Allowance received for U.S. Appl. No. 16/865,172, dated Dec. 16, 2021, 10 pages.
Notice of Allowance received for U.S. Appl. No. 16/872,274, dated Apr. 19, 2022, 10 Pages.
Notice of Allowance received for U.S. Appl. No. 16/945,724, dated Apr. 4, 2022, 8 Pages.
Notice of Allowance received for U.S. Appl. No. 16/945,724, dated Dec. 20, 2021, 7 pages.
Notice of Allowance received for U.S. Appl. No. 16/945,724, dated Jul. 20, 2022, 8 Pages.
Notice of Allowance received for U.S. Appl. No. 17/000,112, dated Jun. 3, 2022, 14 pages.
Search Report received for Chinese Patent Application No. 201680050096.X, dated Jan. 10, 2022, 4 pages (2 pages of English Translation and 2 pages of Official Copy).
Search Report received for Chinese Patent Application No. 201910587972.8, dated Jan. 4, 2022, 4 pages (2 pages of English Translation and 2 pages of Official Copy).
Corrected Notice of Allowance received for U.S. Appl. No. 16/233,990, dated Oct. 20, 2022, 2 pages.
Final Office Action received for U.S. Appl. No. 16/697,090, dated Dec. 14, 2022, 28 pages.
Final Office Action received for U.S. Appl. No. 16/827,910, dated Mar. 15, 2023, 18 pages.
Final Office Action received for U.S. Appl. No. 16/827,926, dated Apr. 18, 2023, 32 pages.
Final Office Action received for U.S. Appl. No. 16/888,478, dated Feb. 13, 2023, 27 pages.
Final Office Action received for U.S. Appl. No. 17/133,550, dated Feb. 15, 2023, 22 pp.
Final Office Action received for U.S. Appl. No. 17/379,785, dated Oct. 28, 2022, 14 pages.
Final Office Action received for U.S. Appl. No. 17/586,625, dated May 4, 2023, 15 pages.
Final Office Action received for U.S. Appl. No. 17/660,622, dated May 24, 2023, 20 pags.
Non-Final Office Action received for U.S. Appl. No. 15/167,801, dated Feb. 8, 2023, 23 pages.
Non-Final Office Action received for U.S. Appl. No. 15/719,404, dated May 10, 2023, 14 pages.
Non-Final Office Action received for U.S. Appl. No. 16/175,565, dated Feb. 17, 2023, 33 pages.
Non-Final Office Action received for U.S. Appl. No. 17/353,527, dated Dec. 8, 2022, 17 pages.
Non-Final Office Action received for U.S. Appl. No. 17/379,785, dated Mar. 9, 2023, 14 pages.
Non-Final Office Action received for U.S. Appl. No. 17/586,625, dated Sep. 1, 2022, 13 pages.
Non-Final Office Action received for U.S. Appl. No. 17/651,731, dated Apr. 25, 2023, 9 pages.
Non-Final Office Action received for U.S. Appl. No. 17/656,610, dated Feb. 6, 2023, 10 pages.
Non-Final Office Action received for U.S. Appl. No. 17/660,622, dated Dec. 20, 2022, 17 pages.
Non-Final Office Action received for U.S. Appl. No. 17/937,410, dated Mar. 2, 2023, 15 pages.
Non-Final Office Action received for U.S. Appl. No. 17/937,704, dated Mar. 30, 2023, 18 pages.
Non-Final Office Action received for U.S. Appl. No. 18/060,902, dated Mar. 10, 2023, 8 pages.
Notice of Allowability received for U.S. Appl. No. 17/457,901, dated Mar. 8, 2023, 9 pages.
Notice of Allowance received for U.S. Appl. No. 15/719,404, dated Nov. 9, 2022, 7 pages.
Notice of Allowance received for U.S. Appl. No. 16/233,990, dated Jan. 31, 2023, 5 pages.
Notice of Allowance received for U.S. Appl. No. 16/584,790, dated Feb. 3, 2023, 9 pages.
Notice of Allowance received for U.S. Appl. No. 17/000,112, dated Oct. 18, 2022, 10 pages.
Notice of Allowance received for U.S. Appl. No. 17/210,352, dated Dec. 5, 2022, 9 pages.
Notice of Allowance received for U.S. Appl. No. 17/210,352, dated Mar. 16, 2023, 7 pages.
Notice of Allowance received for U.S. Appl. No. 17/367,227, dated Mar. 23, 2023, 12 pages.
Notice of Allowance received for U.S. Appl. No. 17/457,901, dated Nov. 16, 2022, 9 pages.
Notice of Allowance received for U.S. Appl. No. 17/654,578, dated Feb. 15, 2023, 8 pages.
Notice of Allowance received for U.S. Appl. No. 17/654,578, dated Oct. 25, 2022, 8 pages.
Search Report received for Chinese Patent Application No. 201780066823.6, dated Nov. 1, 2022, 4 pages (2 pages of English Translation and 2 pages of Official Copy).
Search Report received for Chinese Patent Application No. 201811143102.3, dated Nov. 22, 2022, 5 pages (2 pages of English Translation and 3 pages of Official Copy).

(56) References Cited

OTHER PUBLICATIONS

Search Report received for Chinese Patent Application No. 201911313480.6, dated Jan. 20, 2023, 4 pages (2 pages of English Translation and 2 pages of Official Copy).
Search Report received for Chinese Patent Application No. 201911313496.7, dated Jan. 20, 2023, 4 pages (2 pages of English Translation and 2 pages of Official Copy).
Search Report received for Chinese Patent Application No. 201911313497.1, dated Apr. 11, 2023, 5 pages (2 pages of English Translation and 3 pages of Official Copy).
Search Report received for Chinese Patent Application No. 201911313497.1, dated Dec. 14, 2022, 3 pages (1 page of English Translation and 2 pages of Official Copy).
Search Report received for Chinese Patent Application No. 202010011436.6, dated Dec. 15, 2022, 9 pages (4 pages of English Translation and 5 pages of Official Copy).
Search Report received for Chinese Patent Application No. 202001 0662190.9, dated Apr. 28, 2023, 5 pages (2 pages of English Translation and 3 Pages of Official Copy).
Search Report received for Chinese Patent Application No. 202010662206.6, dated Apr. 28, 2023, 5 pages (2 pages of English Translation and 3 pages of Official Copy).
Search Report received for Chinese Patent Application No. 202010662994.9, dated Apr. 28, 2023, 5 pages (2 pages of English Translation and 3 pages of Official Copy).
Search Report received for European Patent Application No. 20718506.7, dated Mar. 21, 2023, 2 pages.
Anonymous, "Video Progress Bar—YouTube Help", Retrieved from the Internet: <URL:https://web.archive.org/web/20190317001501/https://support.google.com/youtube/answer/7174115?hl=en>, [retrieved on Mar. 22, 2023], Mar. 17, 2019, 2 pages.
Apple, "The control is all yours", Available online at: <https://www.apple.com.cn/privacy/control/>, [Retrieved Dec. 29, 2022], Nov. 30, 2022, 12 pages. See attached Communication 37 CFR § 1.98(a)(3).
Beer et al., "The Odds of Running A Nonlinear TV Program Using Web Technologies", IEEE International Symposium on Broadband Multimedia Systems and Broadcasting (BMSB), 2011, 4 pages.
Biao et al., "Research on UI Optimization of Chinese Network Television Stations", Southeast Communication, 2013, 4 pages. See attached Communication 37 CFR § 1.98(a)(3).
Budhraja et al., "Probability Based Playlist Generation Based on Music Similarity and User Customization", National Conference On Computing And Communication Systems, 2012, 5 pages.
Cheng, Luo, "The Designing of Dynamic Play-list Based on Flash Streaming Media Technology", Computer and Telecommunication, 2008, 3 pages. See attached Communication 37 CFR § 1.98(a)(3).
Drews et al., "Virtual Jukebox—Reviving a Classic", Proceedings of the 35th Hawaii International Conference on System Sciences, 2022, 7 pages.
Jin et al., "Pricing Sponsored Content in Wireless Networks with Multiple Content Providers", The Fourth IEEE Workshop on Smart Data Pricing 2015, 2015, pp. 668-673.
Kimbler Kristofer, "App Store Strategies for Service Providers", 2010 4th International Conference on Intelligence in Next Generation Networks, Nov. 18, 2010, 5 pages.
Liu, Chang, "Functions and Design of Multi-Screen Playing System in TV Variety Studio", Modern TV Technology, 2013, 5 pages. See attached Communication 37 CFR § 1.98(a)(3).
Meng et al., "Role Authorization Based Web Service Access Control Model", Journal of Lanzhou University (Natural Science Edition), vol. 42, No. 2, 2007, pp. 84-88. See attached Communication 37 CFR § 1.98(a)(3).
Tinari George, "What's New in the Netflix Redesign and How to Use It", Retrieved from the Internet: <https://web.archive.org/web/20161110092133/https://www.guidingtech.com/48443/netflix-redesign-overview/>, [retrieved on Mar. 22, 2023], Nov. 10, 2016, 9 pages.
Wang et al., "Authorization Management Mechanism of Web Application System", Network and Information Technology, vol. 25, No. 11, 2006, 3 pages. See attached Communication 37 CFR § 1.98(a)(3).
Zhang et al., "Music Playlist Prediction Via Detecting Song Moods", IEEE China Summit and International Conference on Signal and Information Processing, 2013, pp. 174-178.

\* cited by examiner

USER INTERFACES FOR A PODCAST BROWSING AND PLAYBACK APPLICATION

CROSS REFERENCE TO RELATED APPLICATIONS

This application claims the benefit of U.S. Provisional Application No. 62/855,822, filed May 31, 2019, the content of which is hereby incorporated by reference in its entirety for all purposes.

FIELD OF THE DISCLOSURE

This relates generally to user interfaces that enable a user to interact with a podcast browsing and playback application on an electronic device.

BACKGROUND OF THE DISCLOSURE

User interaction with electronic devices has increased significantly in recent years. These devices can be devices such as computers, tablet computers, televisions, multimedia devices, mobile devices, and the like.

In some circumstances, such a device presents items of content using a podcast browsing and playback application. In some circumstances, the items of content are provided by a variety of sources. In some circumstances, an electronic device is able to search for content associated with a podcast. Enhancing the user's interactions with the device improves the user's experience with the device and decreases user interaction time, which is particularly important where input devices are battery-operated.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

SUMMARY OF THE DISCLOSURE

Some embodiments described in this disclosure are directed to one or more electronic devices that searches for content associated with podcasts. The full descriptions of the embodiments are provided in the Drawings and the Detailed Description, and it is understood that the Summary provided above does not limit the scope of the disclosure in any way.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

DETAILED DESCRIPTION

Figure 1A:
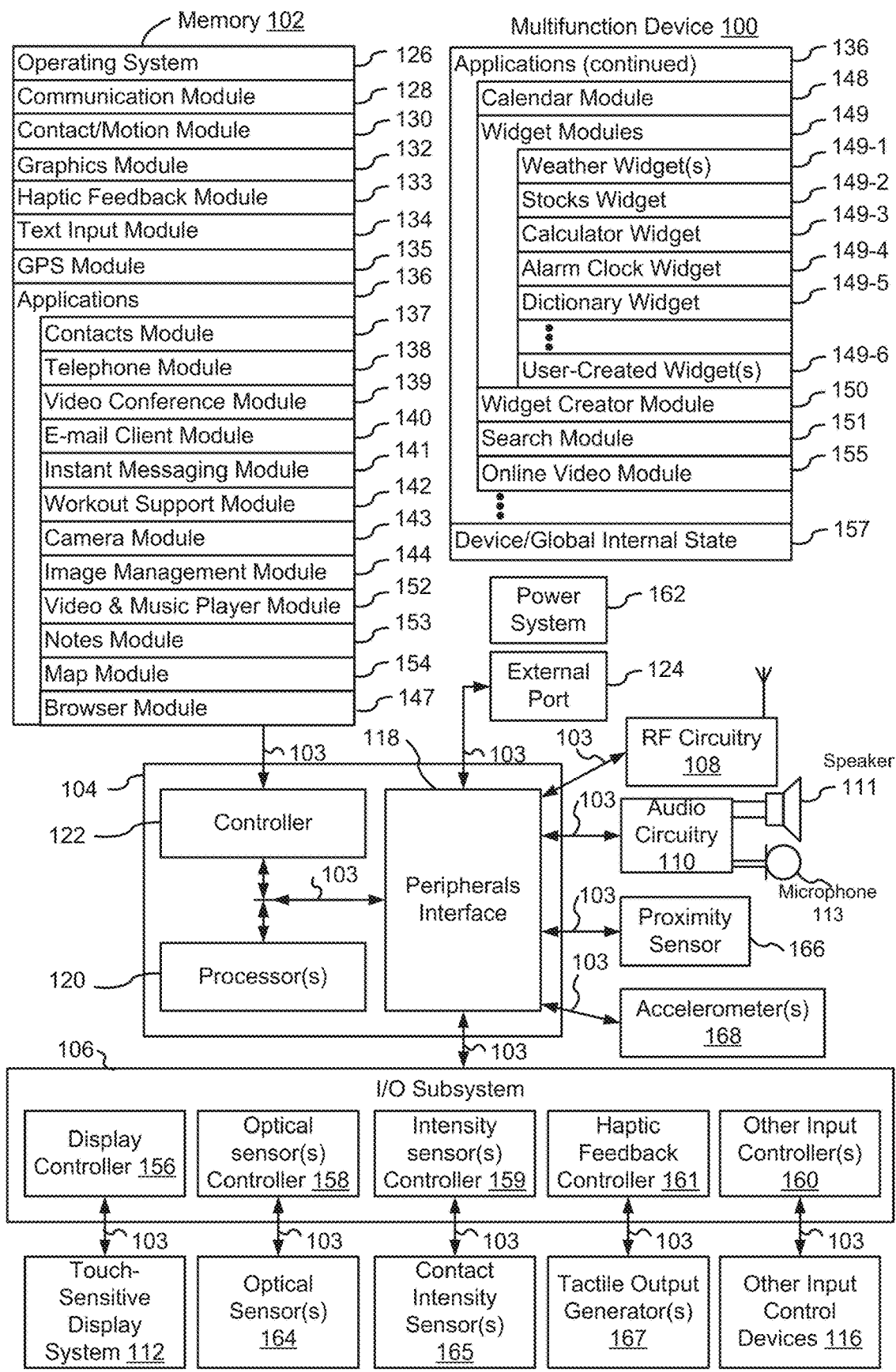
FIG. 1A is a block diagram illustrating a multifunction device with a touch-sensitive display in accordance with some embodiments of the disclosure.

In the following description of embodiments, reference is made to the accompanying drawings which form a part hereof, and in which it is shown by way of illustration specific embodiments that are optionally practiced. It is to be understood that other embodiments are optionally used and structural changes are optionally made without departing from the scope of the disclosed embodiments. Further, although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Exemplary Devices

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer or a television with a touch-sensitive surface (e.g., a touch screen display and/or a touch pad). In some embodiments, the device does not have a touch screen display and/or a touch pad, but rather is capable of outputting display information (such as the user interfaces of the disclosure) for display on a separate display device, and capable of receiving input information from a separate input device having one or more input mechanisms (such as one or more buttons, a touch screen display and/or a touch pad). In some embodiments, the device has a display, but is capable of receiving input information from a separate input device having one or more input mechanisms (such as one or more buttons, a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable or non-portable devices with touch-sensitive displays, though the devices need not include touch-sensitive displays or displays in general, as described above. FIG. 1A is a block diagram illustrating portable or non-portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable or non-portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits. Further, the various components shown in FIG. 1A are optionally implemented across two or more devices; for example, a display and audio circuitry on a display device, a touch-sensitive surface on an input device, and remaining components on device 100. In such an embodiment, device 100 optionally communicates with the display device and/or the input device to facilitate operation of the system, as described in the disclosure, and the various components described herein that relate to display and/or input remain in device 100, or are optionally included in the display and/or input device, as appropriate.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. As described above, the touch-sensitive operation and the display operation of touch-sensitive display 112 are optionally separated from each other, such that a display device is used for display purposes and a touch-sensitive surface (whether display or not) is used for input detection purposes, and the described components and functions are modified accordingly. However, for simplicity, the following description is provided with reference to a touch-sensitive display. Display controller 156 receives and/or sends electrical signals from/ to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable or non-portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
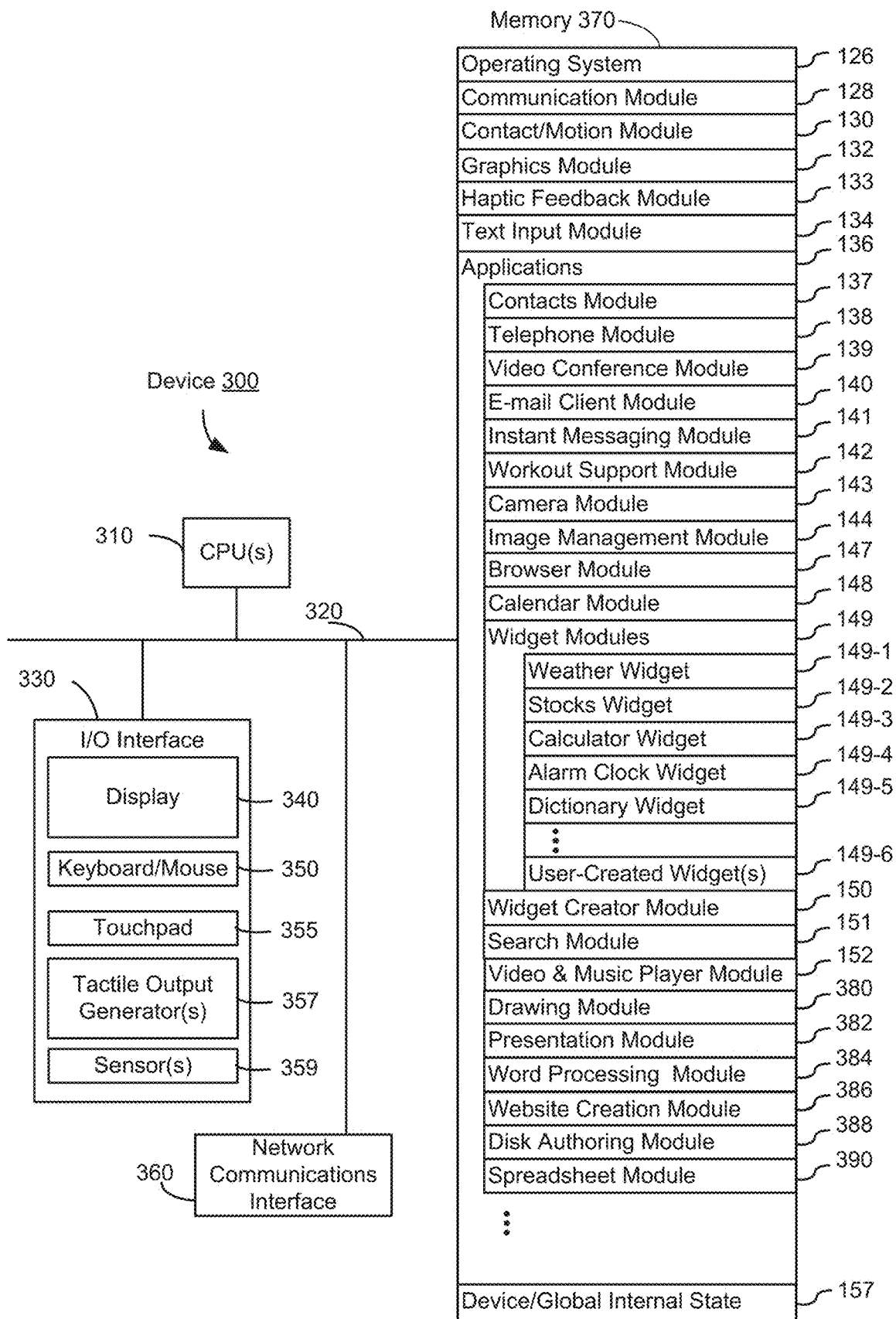
FIG. 3 is a block diagram of an exemplary multifunction device with a display and a touch-sensitive surface in accordance with some embodiments of the disclosure.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- video player module;
- music player module;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module and music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
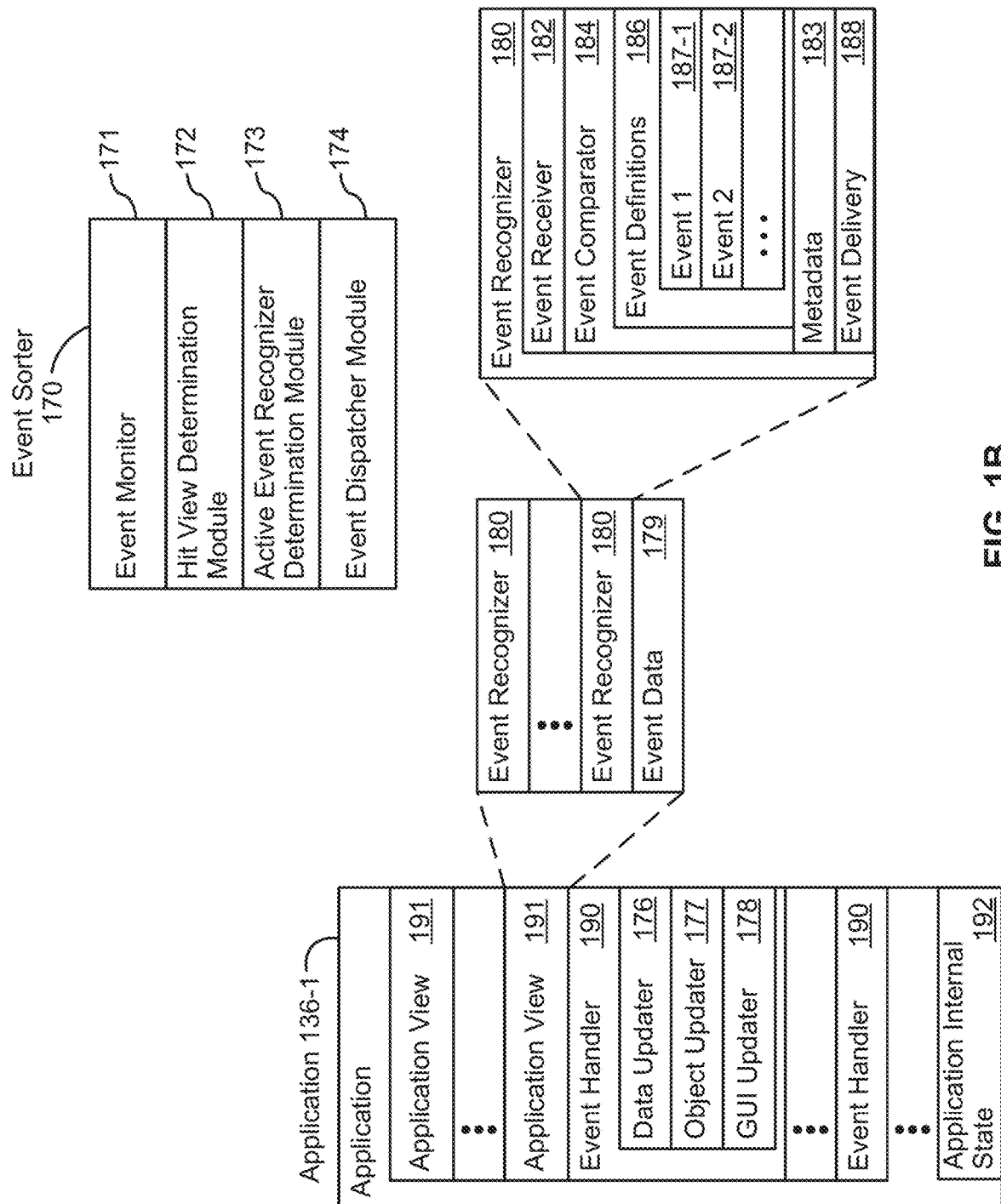
FIG. 1B is a block diagram illustrating exemplary components for event handling in accordance with some embodiments of the disclosure.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
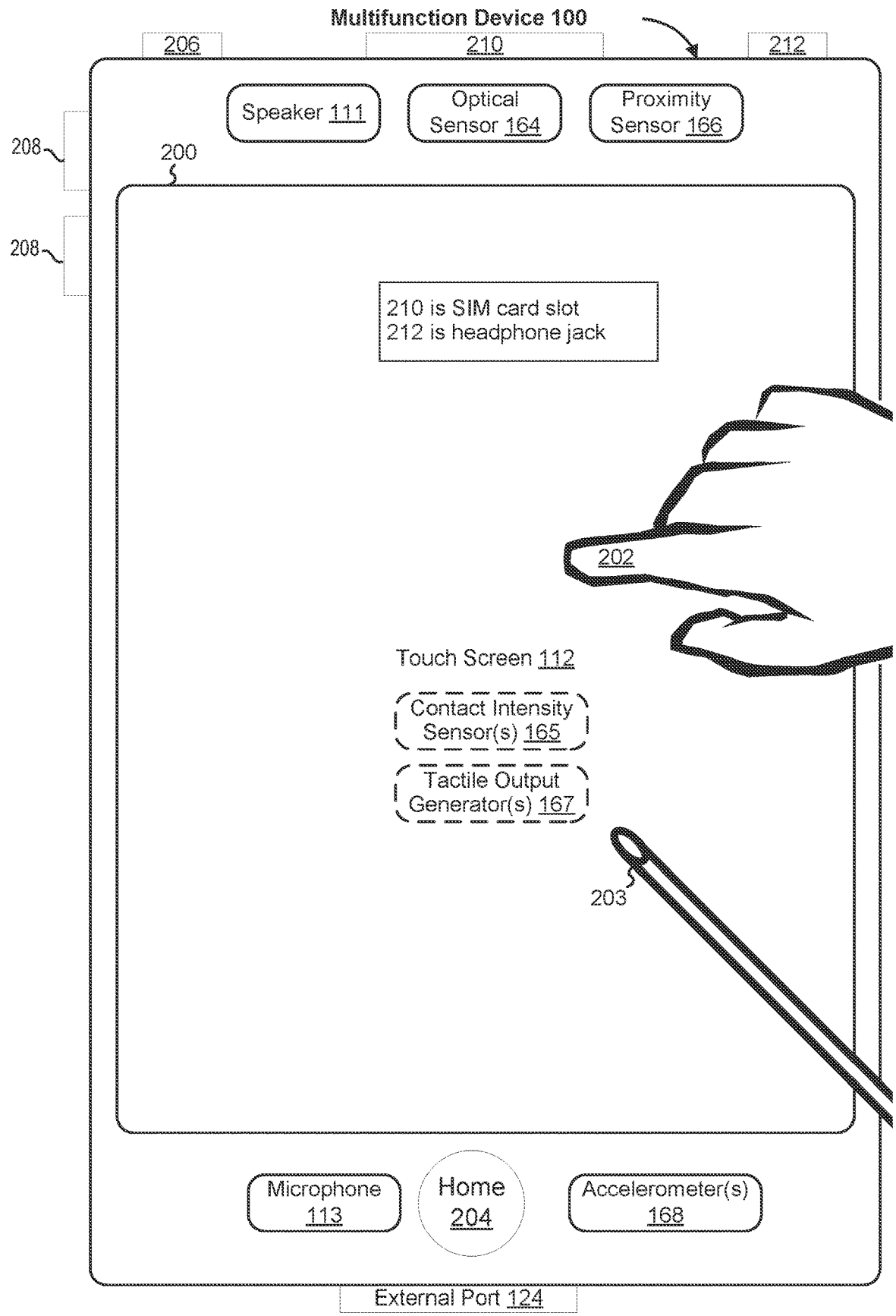
FIG. 2 illustrates a multifunction device having a touch screen in accordance with some embodiments of the disclosure.

FIG. 2 illustrates a portable or non-portable multifunction device 100 having a touch screen 112 in accordance with some embodiments. As stated above, multifunction device 100 is described as having the various illustrated structures (such as touch screen 112, speaker 111, accelerometer 168, microphone 113, etc.); however, it is understood that these structures optionally reside on separate devices. For example, display-related structures (e.g., display, speaker, etc.) and/or functions optionally reside on a separate display device, input-related structures (e.g., touch-sensitive surface, microphone, accelerometer, etc.) and/or functions optionally reside on a separate input device, and remaining structures and/or functions optionally reside on multifunction device 100.

The touch screen 112 optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As previously described, menu button 204 is, optionally, used to navigate to any application 136 in a set of applications that are, optionally executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not include the display and the touch-sensitive surface, as described above, but rather, in some embodiments, optionally communicates with the display and the touch-sensitive surface on other devices. Additionally, device 300 need not be portable. In some embodiments, device 300 is a laptop computer, a desktop computer, a tablet computer, a multimedia player device (such as a television or a set-top box), a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable or non-portable multifunction device 100 (FIG. 1A), or a subset thereof. Furthermore, memory 370 optionally stores additional programs, modules, and data structures not present in memory 102 of portable or non-portable multifunction device 100. For example, memory 370 of device 300 optionally stores drawing module 380, presentation module 382, word processing module 384, website creation module 386, disk authoring module 388, and/or spreadsheet module 390, while memory 102 of portable or non-portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Figure 4:
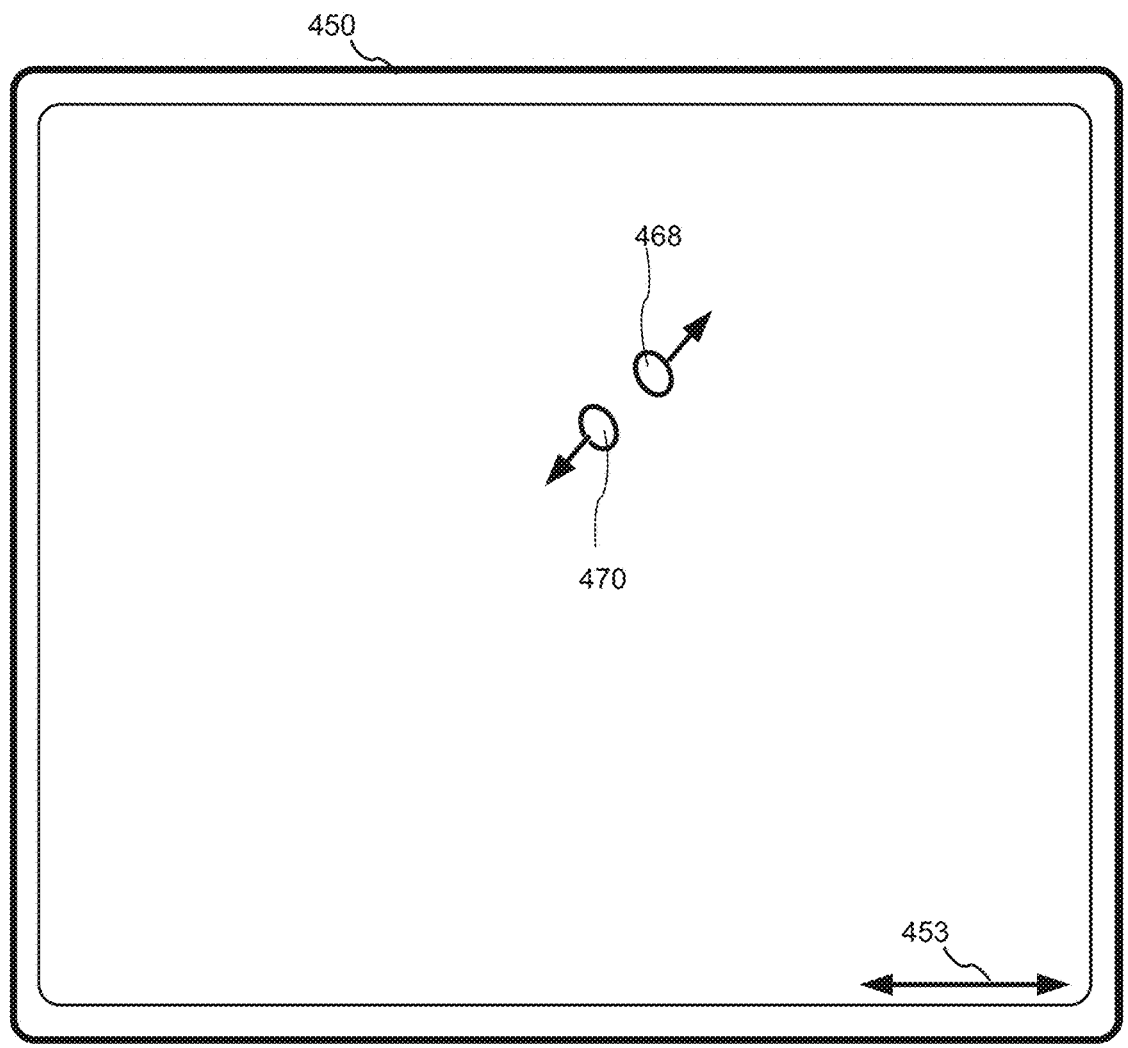
FIG. 4 illustrates an exemplary user interface for a multifunction device with a touch-sensitive surface that is separate from the display in accordance with some embodiments of the disclosure.
Figure 4:
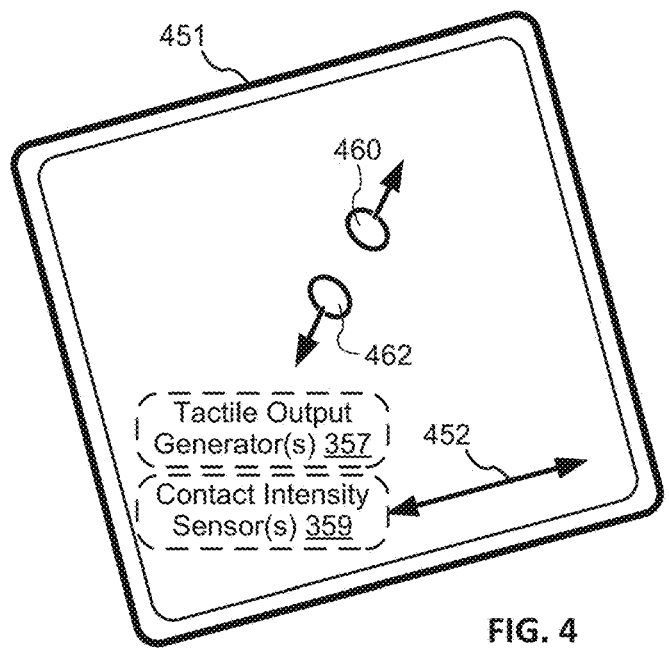

FIG. 4 illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples that follow will be given with reference to inputs on touch screen display 112 (where the touch sensitive surface and the display are combined), in some embodiments, the device detects inputs on a touch-sensitive surface that is separate from the display, as shown in FIG. 4. In some embodiments the touch sensitive surface (e.g., 451 in FIG. 4) has a primary axis (e.g., 452 in FIG. 4) that corresponds to a primary axis (e.g., 453 in FIG. 4) on the display (e.g., 450). In accordance with these embodiments, the device detects contacts (e.g., 460 and 462 in FIG. 4) with the touch-sensitive surface 451 at locations that correspond to respective locations on the display (e.g., in FIG. 4, 460 corresponds to 468 and 462 corresponds to 470). In this way, user inputs (e.g., contacts 460 and 462, and movements thereof) detected by the device on the touch-sensitive surface (e.g., 451 in FIG. 4) are used by the device to manipulate the user interface on the display (e.g., 450 in FIG. 4) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 5A:
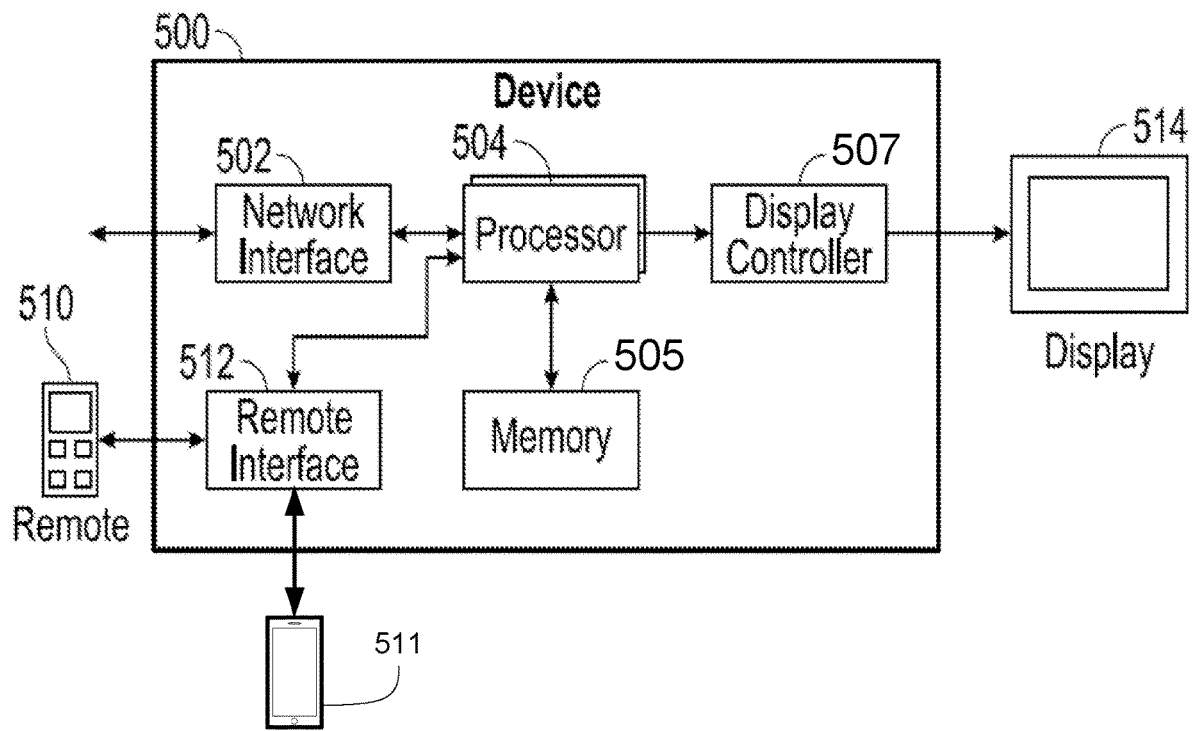
FIGS. 5A-5C illustrate block diagrams of exemplary architectures for devices according to some embodiments of the disclosure.

FIG. 5A illustrates a block diagram of an exemplary architecture for the device 500 according to some embodiments of the disclosure. In the embodiment of FIG. 5A, media or other content is optionally received by device 500 via network interface 502, which is optionally a wireless or wired connection. The one or more processors 504 optionally execute any number of programs stored in memory 505 or storage, which optionally includes instructions to perform one or more of the methods and/or processes described herein (e.g., method 700).

In some embodiments, display controller 507 causes the various user interfaces of the disclosure to be displayed on display 514. Further, input to device 500 is optionally provided by remote 510 via remote interface 512, which is optionally a wireless or a wired connection. In some embodiments, input to device 500 is provided by a multifunction device 511 (e.g., a smartphone) on which a remote control application is running that configures the multifunction device to simulate remote control functionality, as will be described in more detail below. In some embodiments, multifunction device 511 corresponds to one or more of device 100 in FIGS. 1A and 2, and device 300 in FIG. 3. It is understood that the embodiment of FIG. 5A is not meant to limit the features of the device of the disclosure, and that other components to facilitate other features described in the disclosure are optionally included in the architecture of FIG. 5A as well. In some embodiments, device 500 optionally corresponds to one or more of multifunction device 100 in FIGS. 1A and 2 and device 300 in FIG. 3; network interface 502 optionally corresponds to one or more of RF circuitry 108, external port 124, and peripherals interface 118 in FIGS. 1A and 2, and network communications interface 360 in FIG. 3; processor 504 optionally corresponds to one or more of processor(s) 120 in FIG. 1A and CPU(s) 310 in FIG. 3; display controller 507 optionally corresponds to one or more of display controller 156 in FIG. 1A and I/O interface 330 in FIG. 3; memory 506 optionally corresponds to one or more of memory 102 in FIG. 1A and memory 370 in FIG. 3; remote interface 512 optionally corresponds to one or more of peripherals interface 118, and I/O subsystem 106 (and/or its components) in FIG. 1A, and I/O interface 330 in FIG. 3; remote 512 optionally corresponds to and or includes one or more of speaker 111, touch-sensitive display system 112, microphone 113, optical sensor(s) 164, contact intensity sensor(s) 165, tactile output generator(s) 167, other input control devices 116, accelerometer(s) 168, proximity sensor 166, and I/O subsystem 106 in FIG. 1A, and keyboard/mouse 350, touchpad 355, tactile output generator(s) 357, and contact intensity sensor(s) 359 in FIG. 3, and touch-sensitive surface 451 in FIG. 4; and, display 514 optionally corresponds to one or more of touch-sensitive display system 112 in FIGS. 1A and 2, and display 340 in FIG. 3.

Figure 5B:
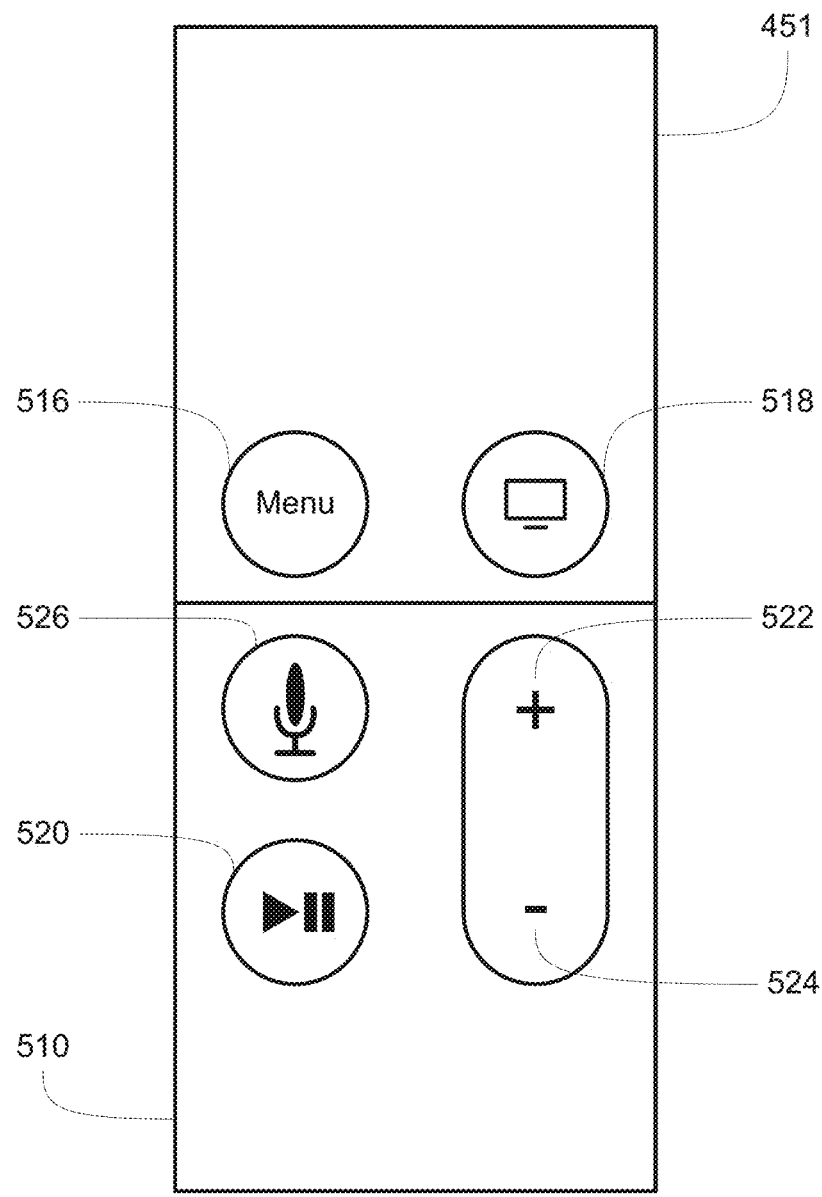

FIG. 5B illustrates an exemplary structure for remote 510 according to some embodiments of the disclosure. In some embodiments, remote 510 optionally corresponds to one or more of multifunction device 100 in FIGS. 1A and 2 and device 300 in FIG. 3. Remote 510 optionally includes touch-sensitive surface 451. In some embodiments, touch-sensitive surface 451 is edge-to-edge (e.g., it extends to the edges of remote 510, such that little or no surface of remote 510 exists between the touch-sensitive surface 451 and one or more edges of remote 510, as illustrated in FIG. 5B). Touch-sensitive surface 451 is optionally able to sense contacts as well as contact intensities (e.g., clicks of touch-sensitive surface 451), as previously described in this disclosure. Further, touch-sensitive surface 451 optionally includes a mechanical actuator for providing physical button click functionality (e.g., touch-sensitive surface 451 is "clickable" to provide corresponding input to device 500). Remote 510 also optionally includes buttons 516, 518, 520, 522, 524 and 526. Buttons 516, 518, 520, 522, 524 and 526 are optionally mechanical buttons or mechanical button alternatives that are able to sense contact with, or depression of, such buttons to initiate corresponding action(s) on, for example, device 500. In some embodiments, selection of "menu" button 516 by a user navigates device 500 backwards in a currently-executing application or currently-displayed user interface (e.g., back to a user interface that was displayed previous to the currently-displayed user interface), or navigates device 500 to a one-higher-level user interface than the currently-displayed user interface. In some embodiments, selection of "home" button 518 by a user navigates device 500 to a main, home, or root user interface from any user interface that is displayed on device 500 (e.g., to a home screen of device 500 that optionally includes one or more applications accessible on device 500). In some embodiments, selection of the "home" button 518 causes the electronic device to navigate to a unified media browsing application. In some embodiments, selection of "play/pause" button 520 by a user toggles between playing and pausing a currently-playing content item on device 500 (e.g., if a content item is playing on device 500 when "play/pause" button 520 is selected, the content item is optionally paused, and if a content item is paused on device 500 when "play/pause" button 520 is selected, the content item is optionally played). In some embodiments, selection of "+" 522 or "−" 524 buttons by a user increases or decreases, respectively, the volume of audio reproduced by device 500 (e.g., the volume of a content item currently-playing on device 500). In some embodiments, selection of "audio input" button 526 by a user allows the user to provide audio input (e.g., voice input) to device 500, optionally, to a voice assistant on the device. In some embodiments, remote 510 includes a microphone via which the user provides audio input to device 500 upon selection of "audio input" button 526. In some embodiments, remote 510 includes one or more accelerometers for detecting information about the motion of the remote.

Figure 5C:
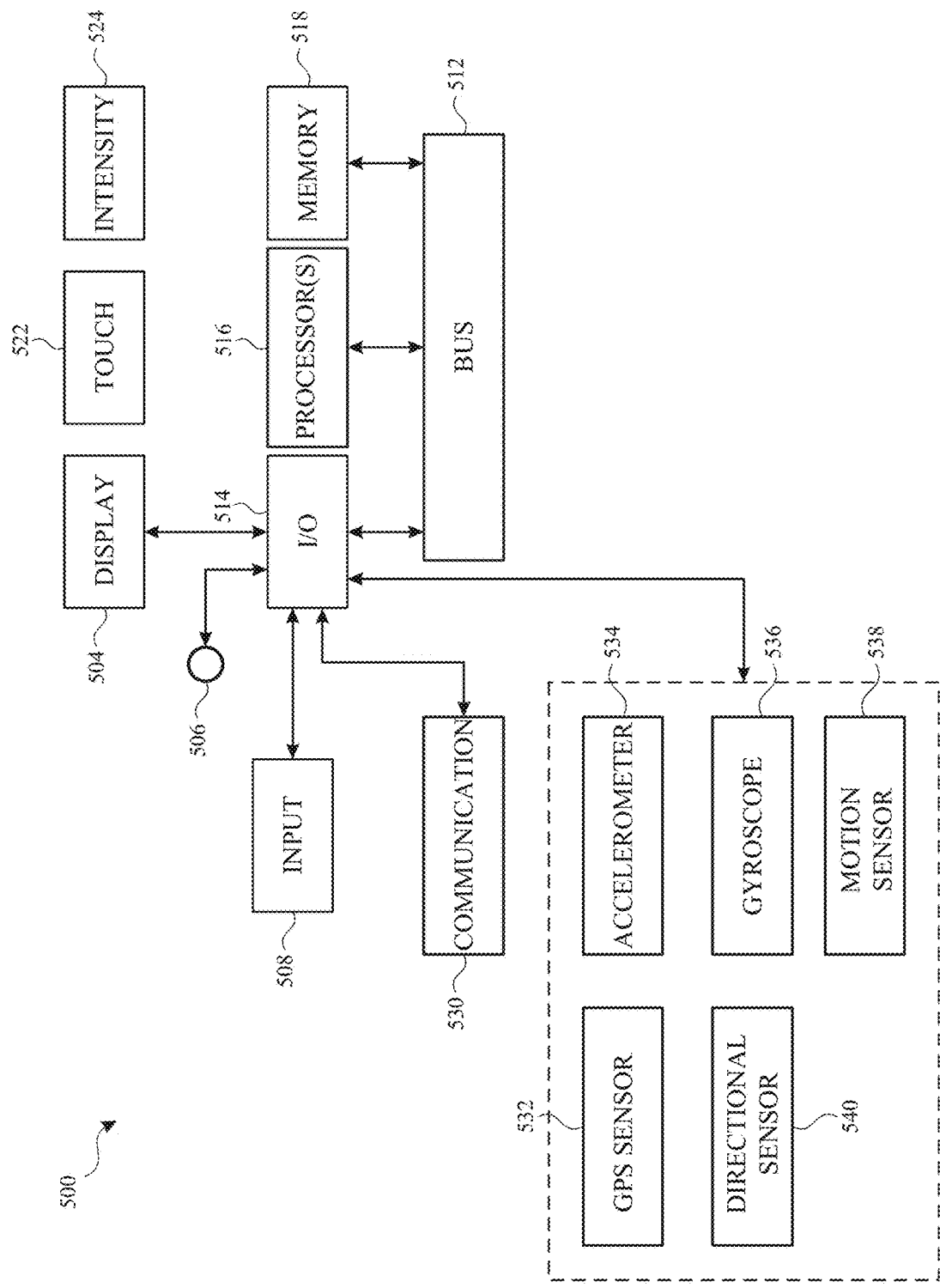

FIG. 5C depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes described with reference to FIGS. 6-7. A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5C, but can include other or additional components in multiple configurations.

As used here, the term "affordance" refers to a user-interactive graphical user interface object that is, optionally, displayed on the display screen of devices 100, 300, 500 and/or 511 (FIGS. 1A, 3, and 5A-5C). For example, an image (e.g., icon), a button, and text (e.g., hyperlink) each optionally constitute an affordance.

As used herein, "installed application" refers to a software application that has been downloaded onto an electronic device (e.g., devices 100, 300, 500, and/or 511) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, device 500, or device 511.

User Interfaces and Associated Processes

Searching for Content Associated with Podcasts

Users interact with electronic devices in many different manners, including using an electronic device to browse and access podcasts in a podcast browsing and playback application. The embodiments described below provide ways in which an electronic device searches for content associated with podcasts, thus enhancing the user's interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 6A:
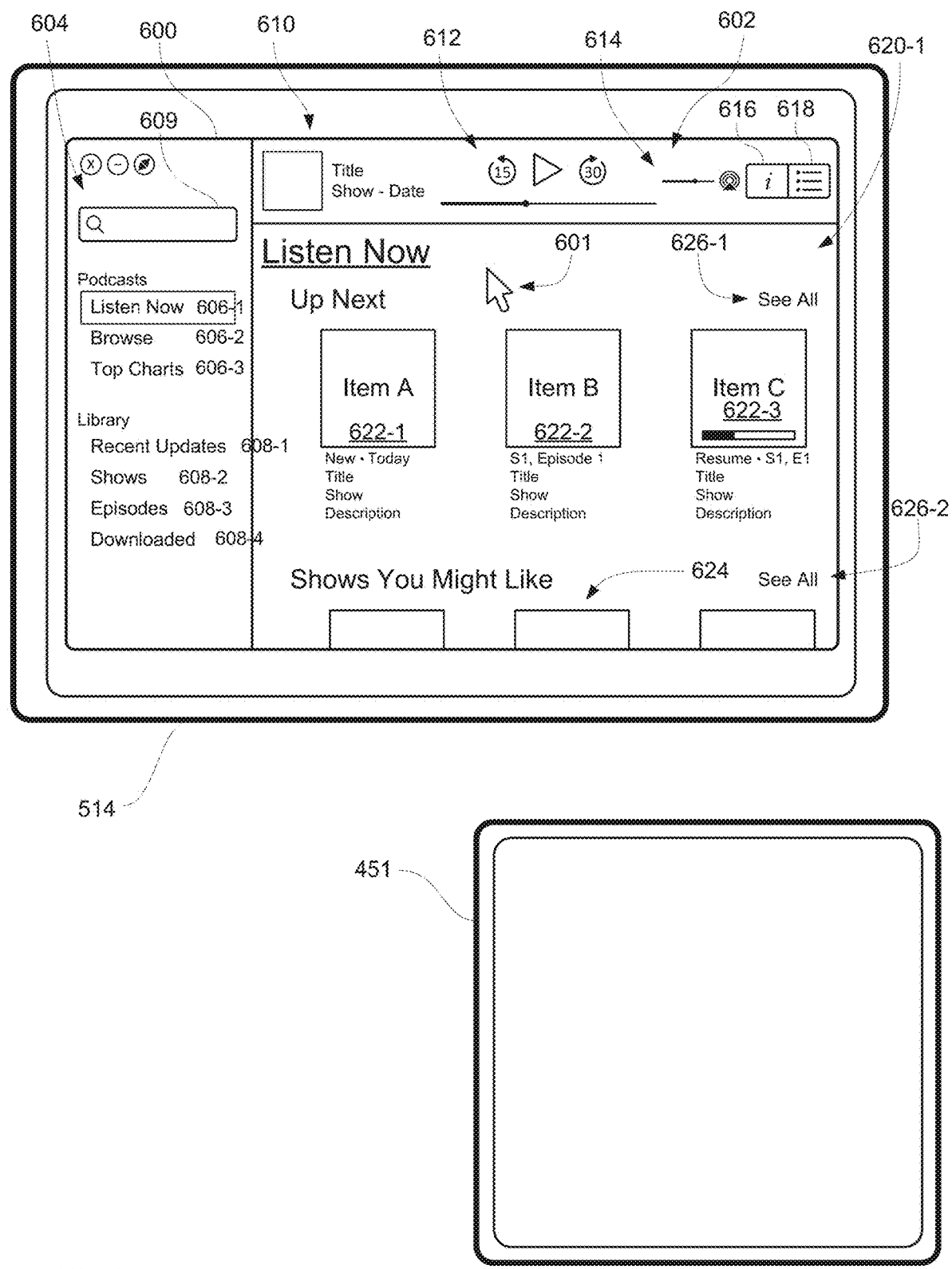
FIGS. 6A-6WW illustrate exemplary ways in which an electronic device searches for content associated with a podcast in accordance with some embodiments of the disclosure.
Figure 6B:
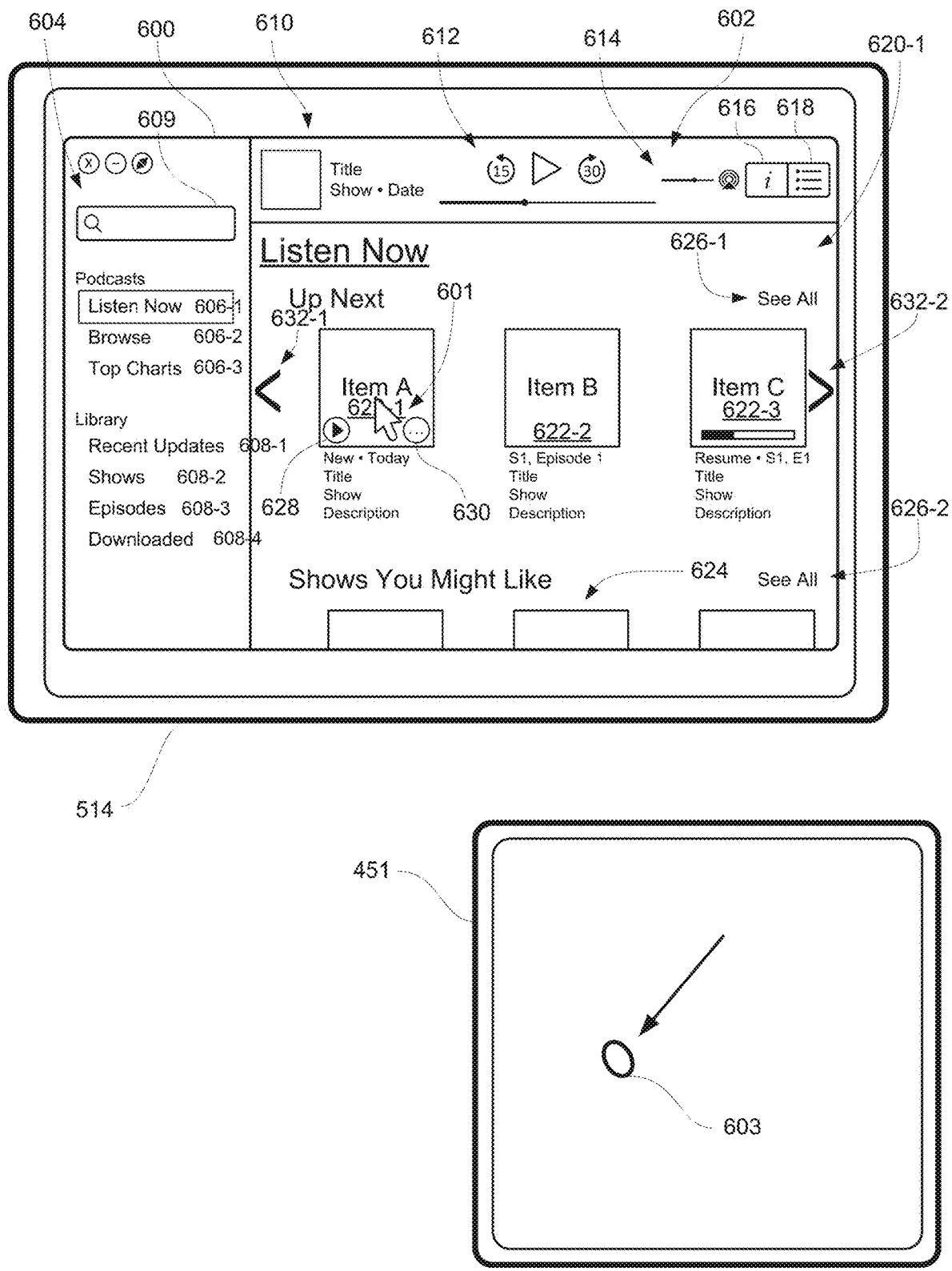
Figure 6C:
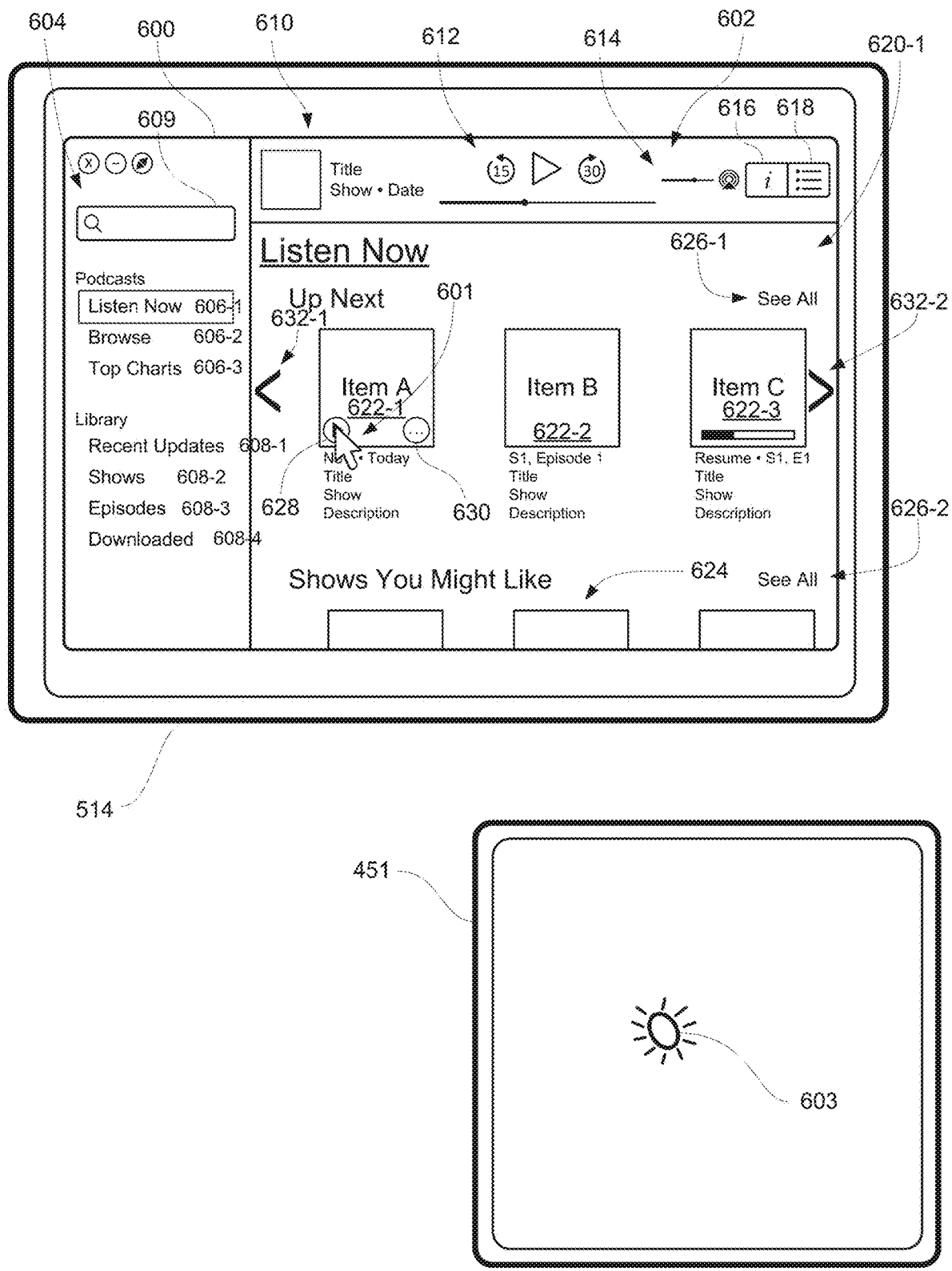
Figure 6D:
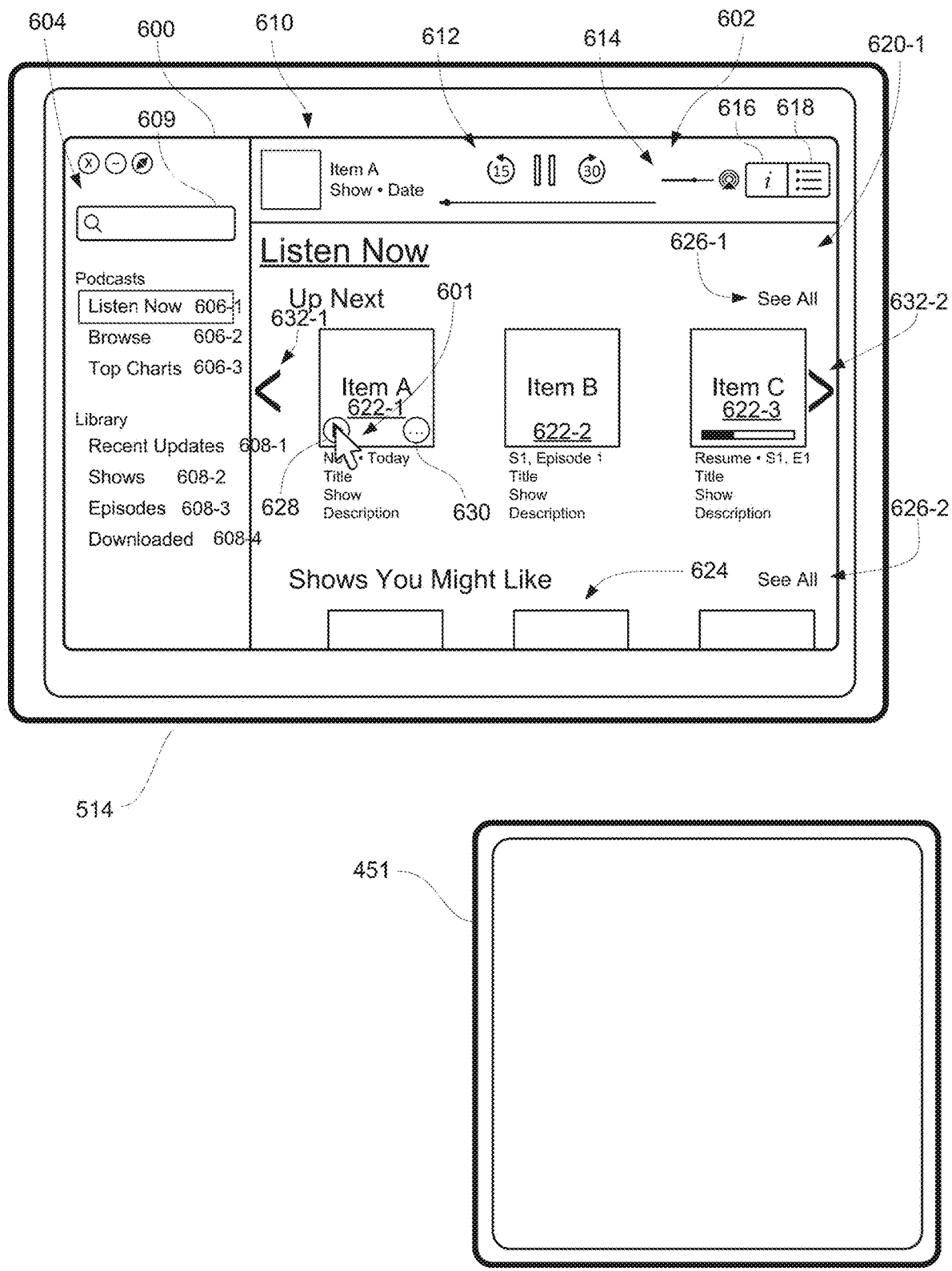
Figure 6E:
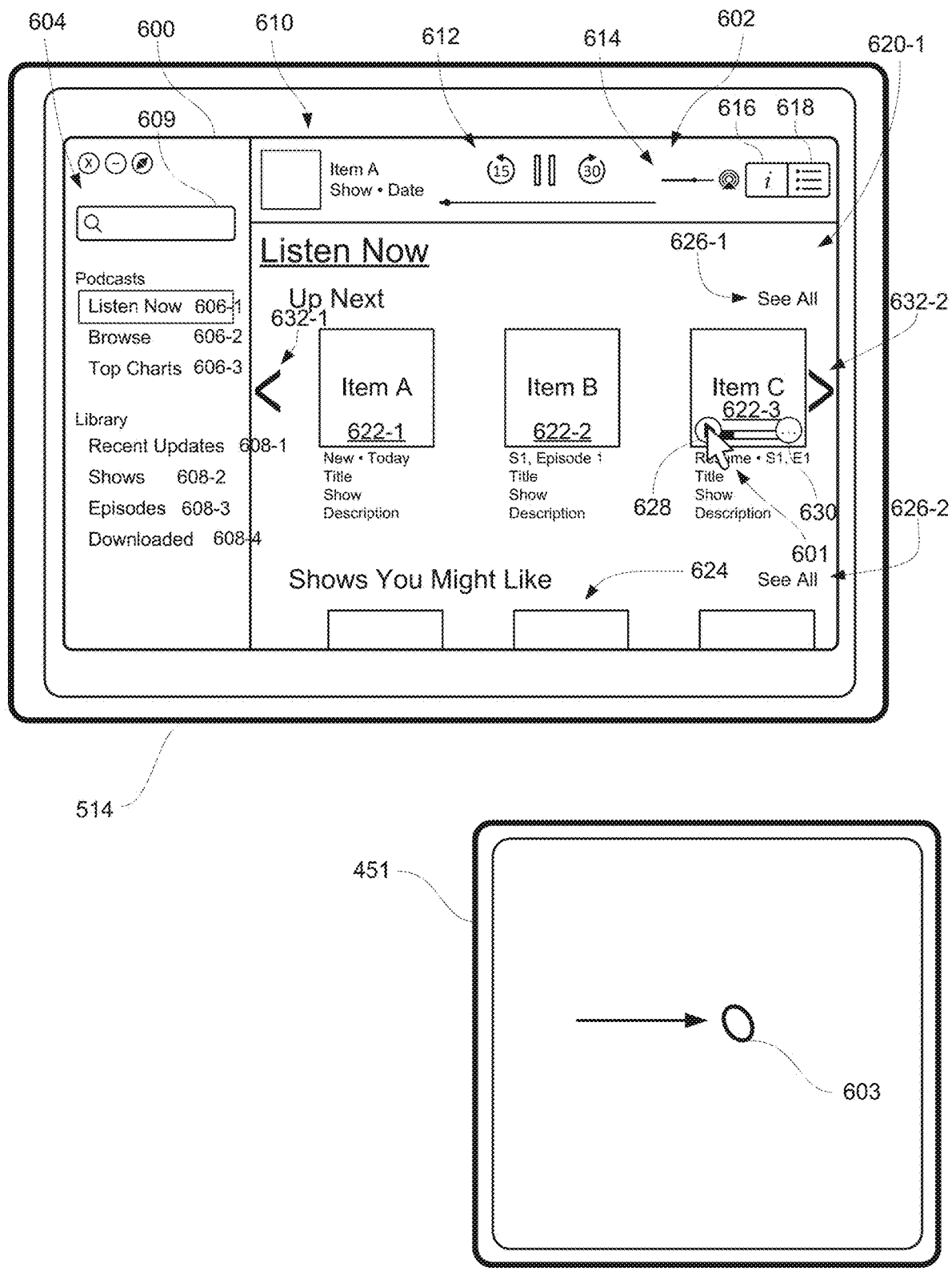
Figure 6F:
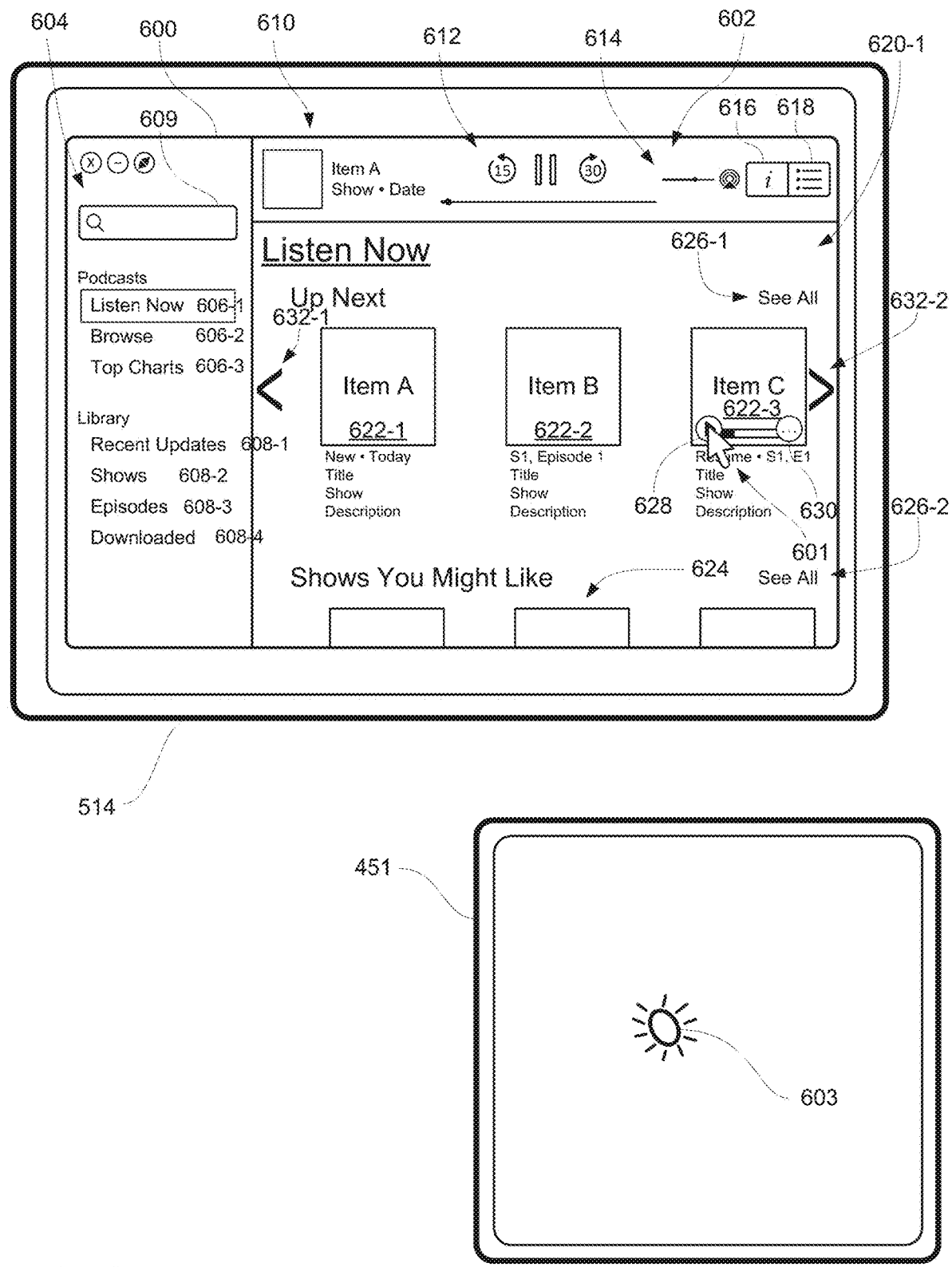
Figure 6G:
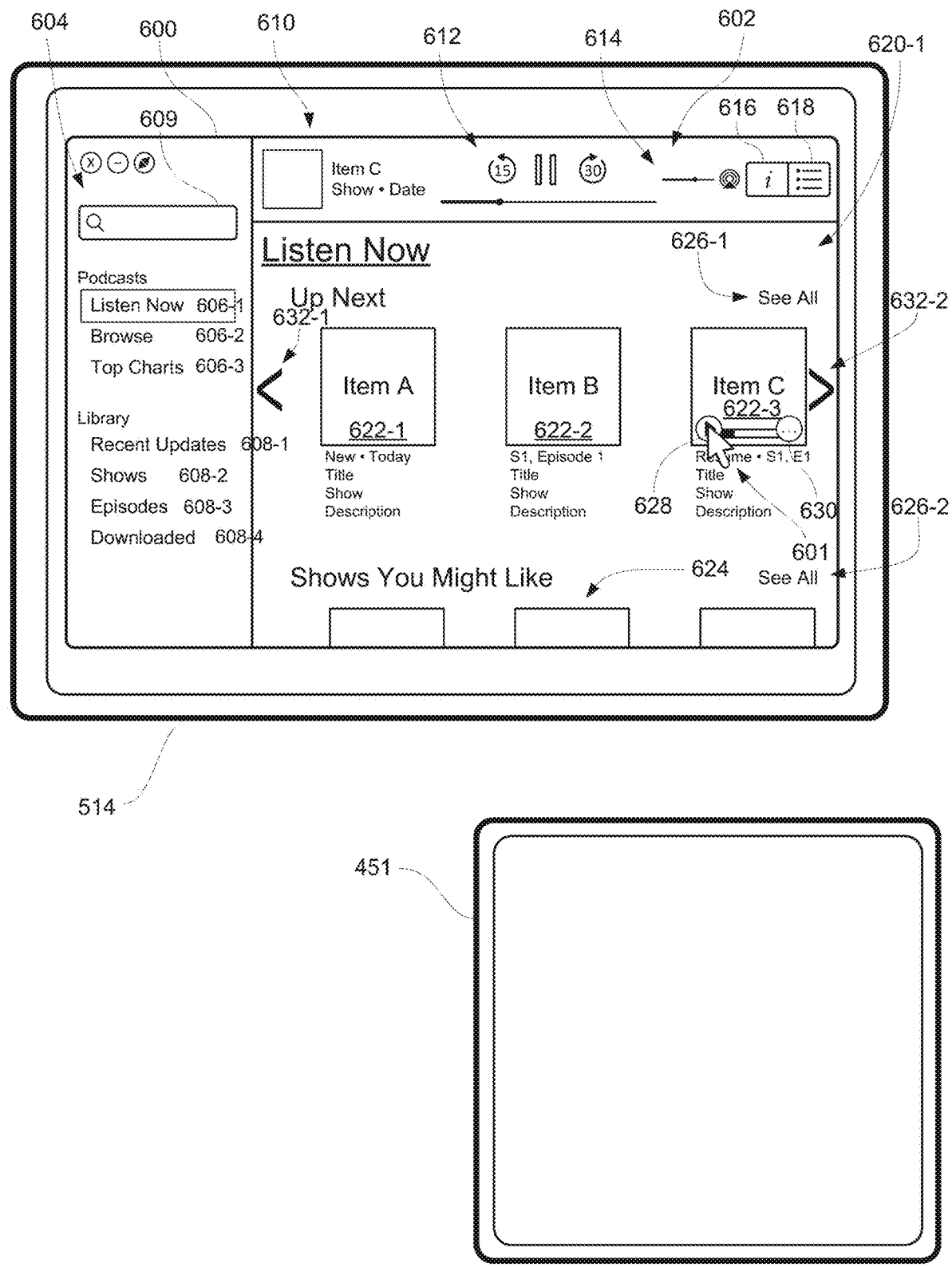
Figure 6H:
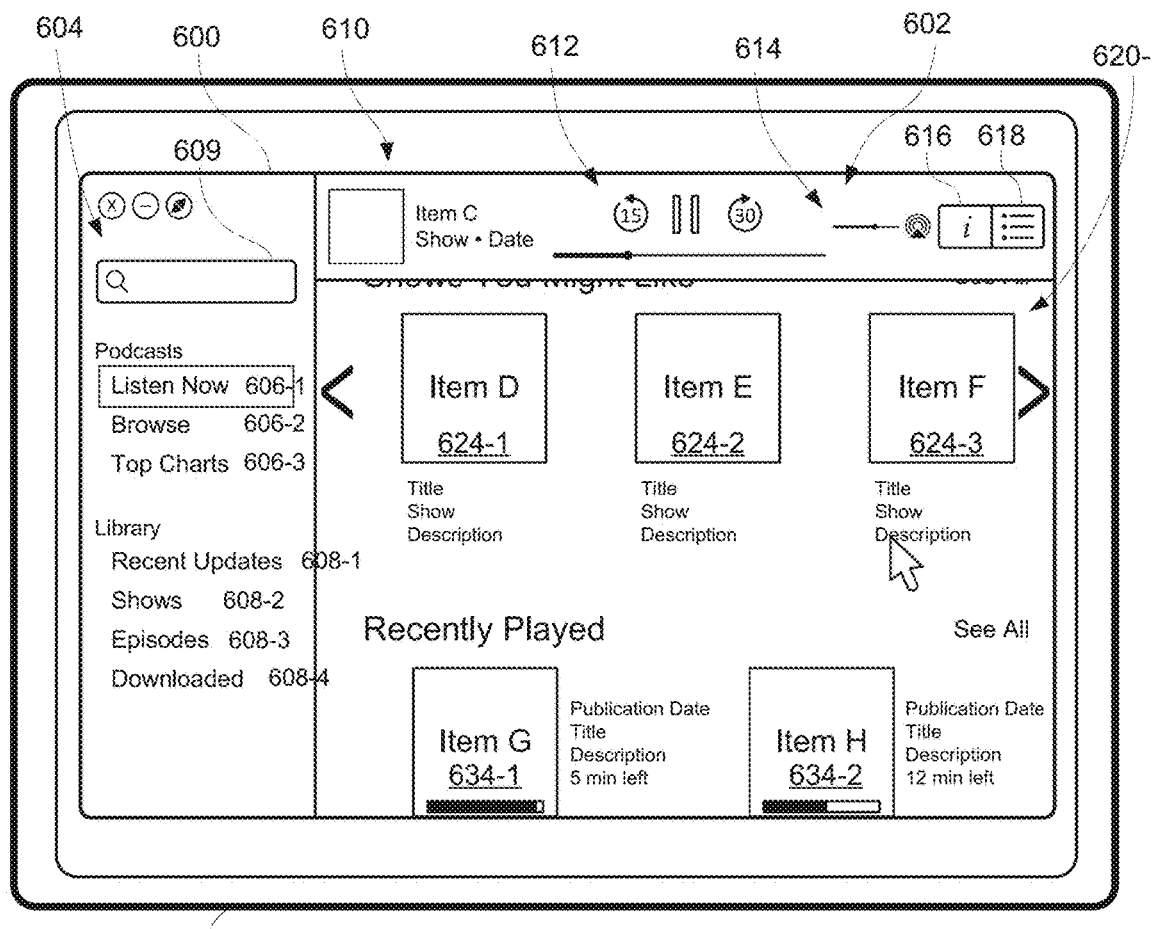
Figure 6I:
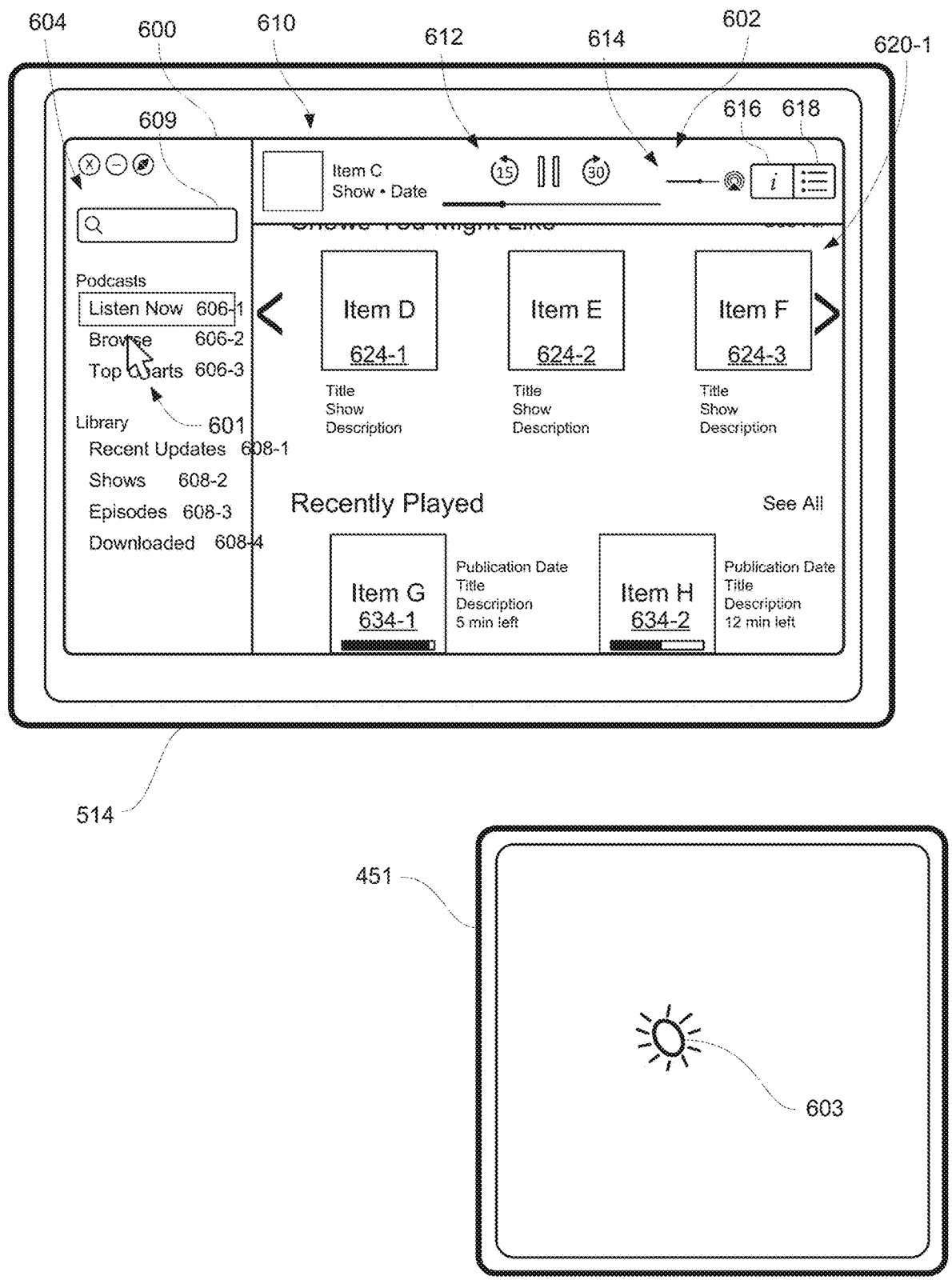
Figure 6J:
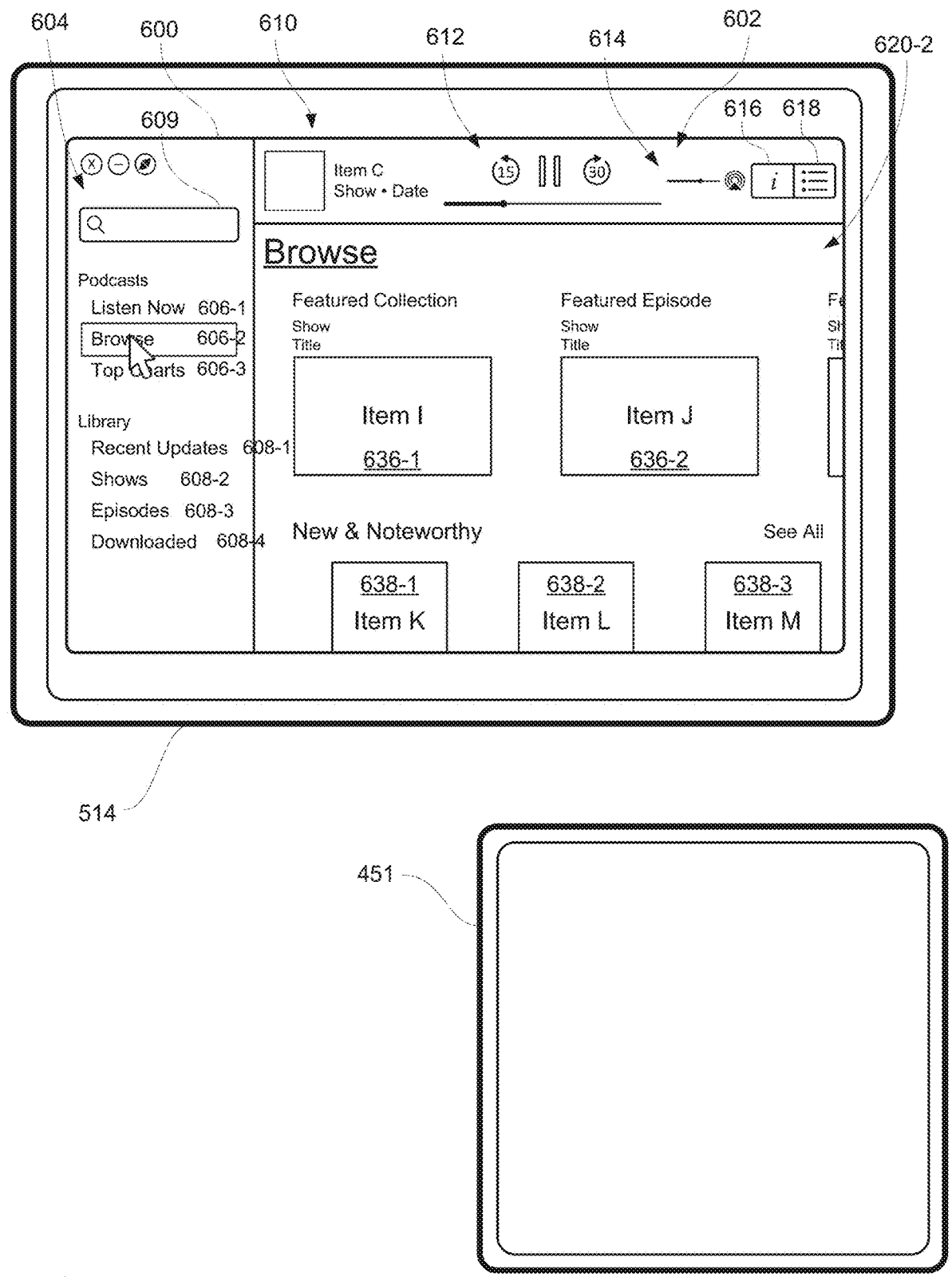
Figure 6K:
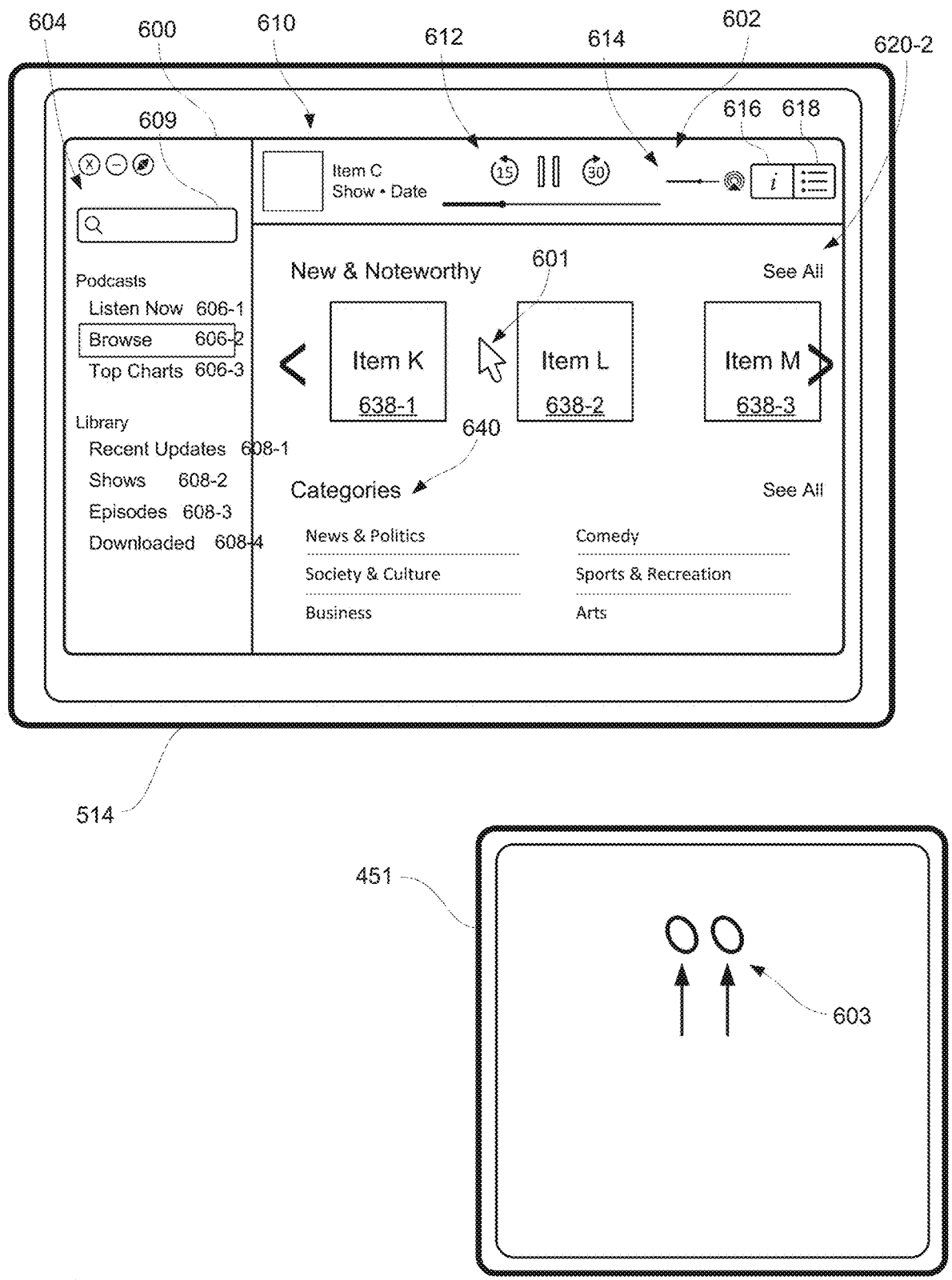
Figure 6L:
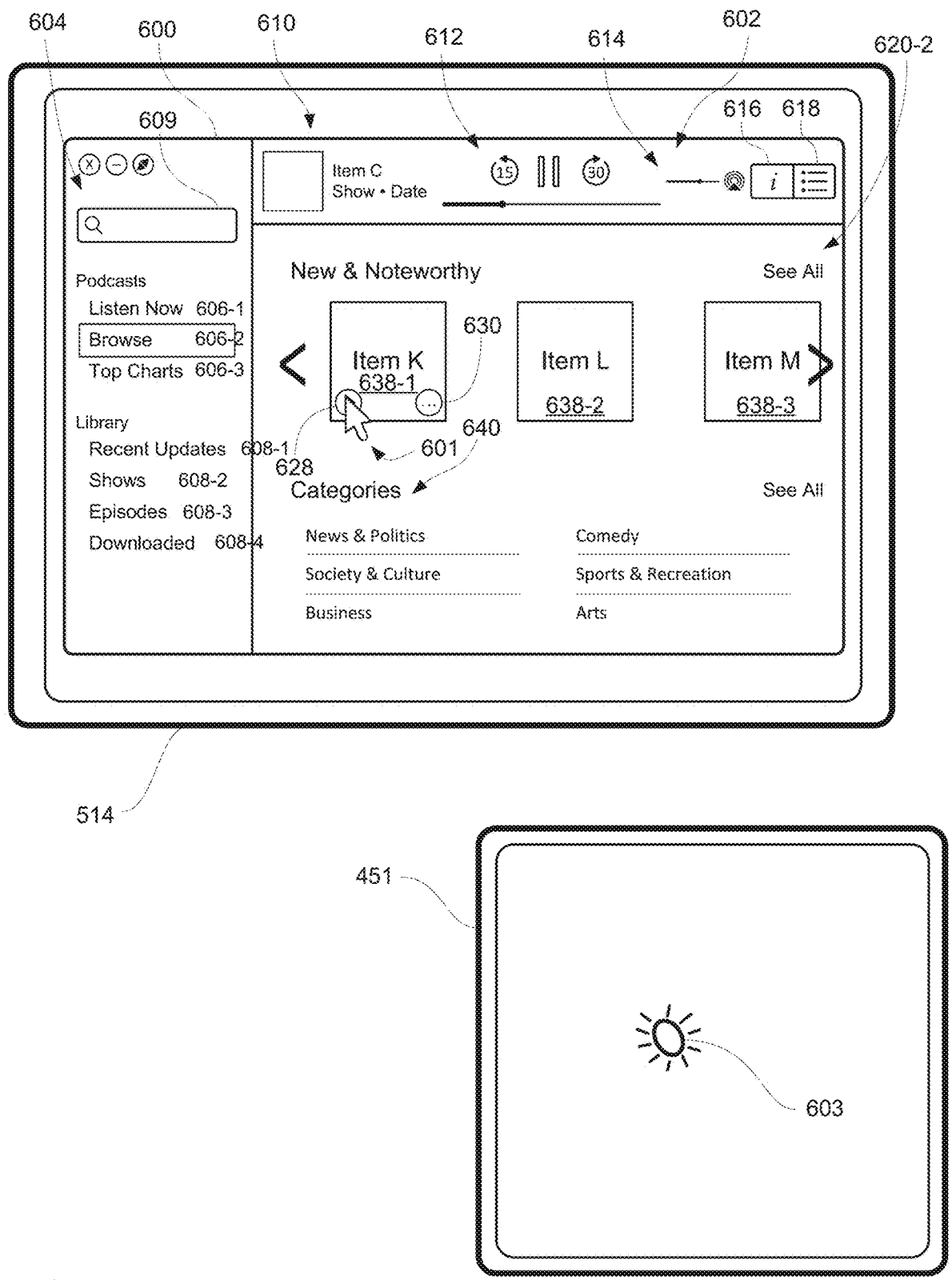
Figure 6M:
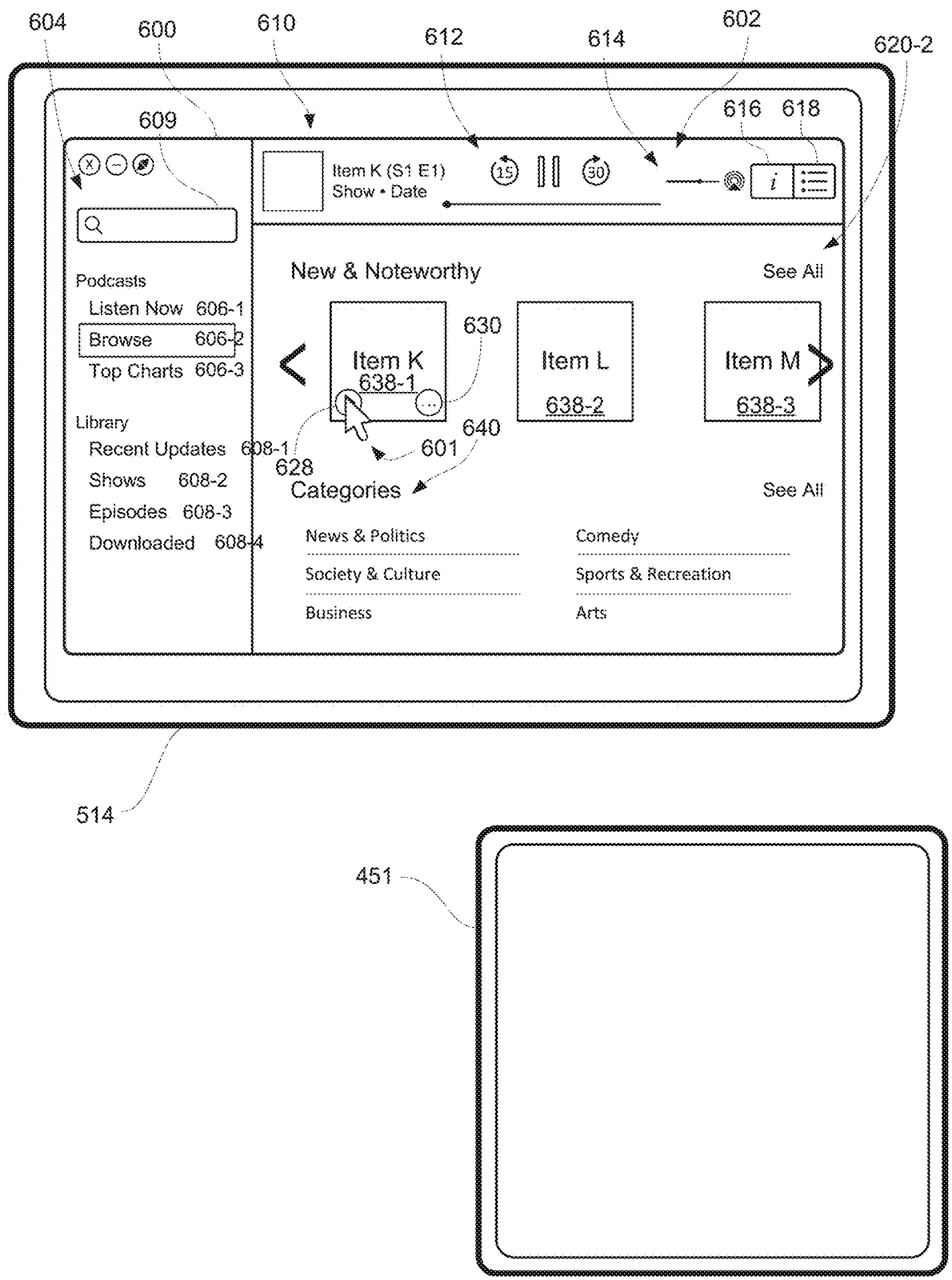
Figure 6N:
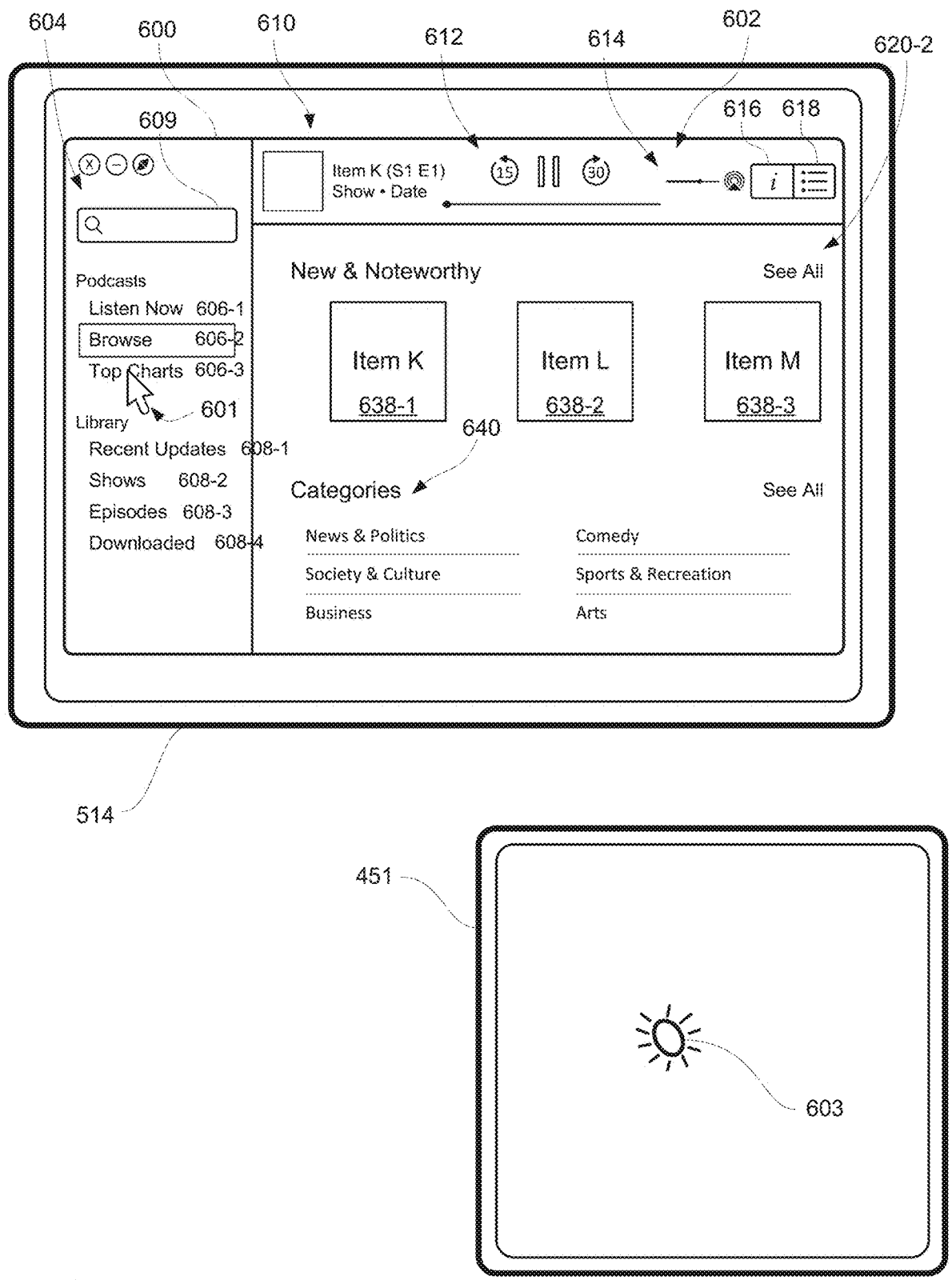
Figure 6O:
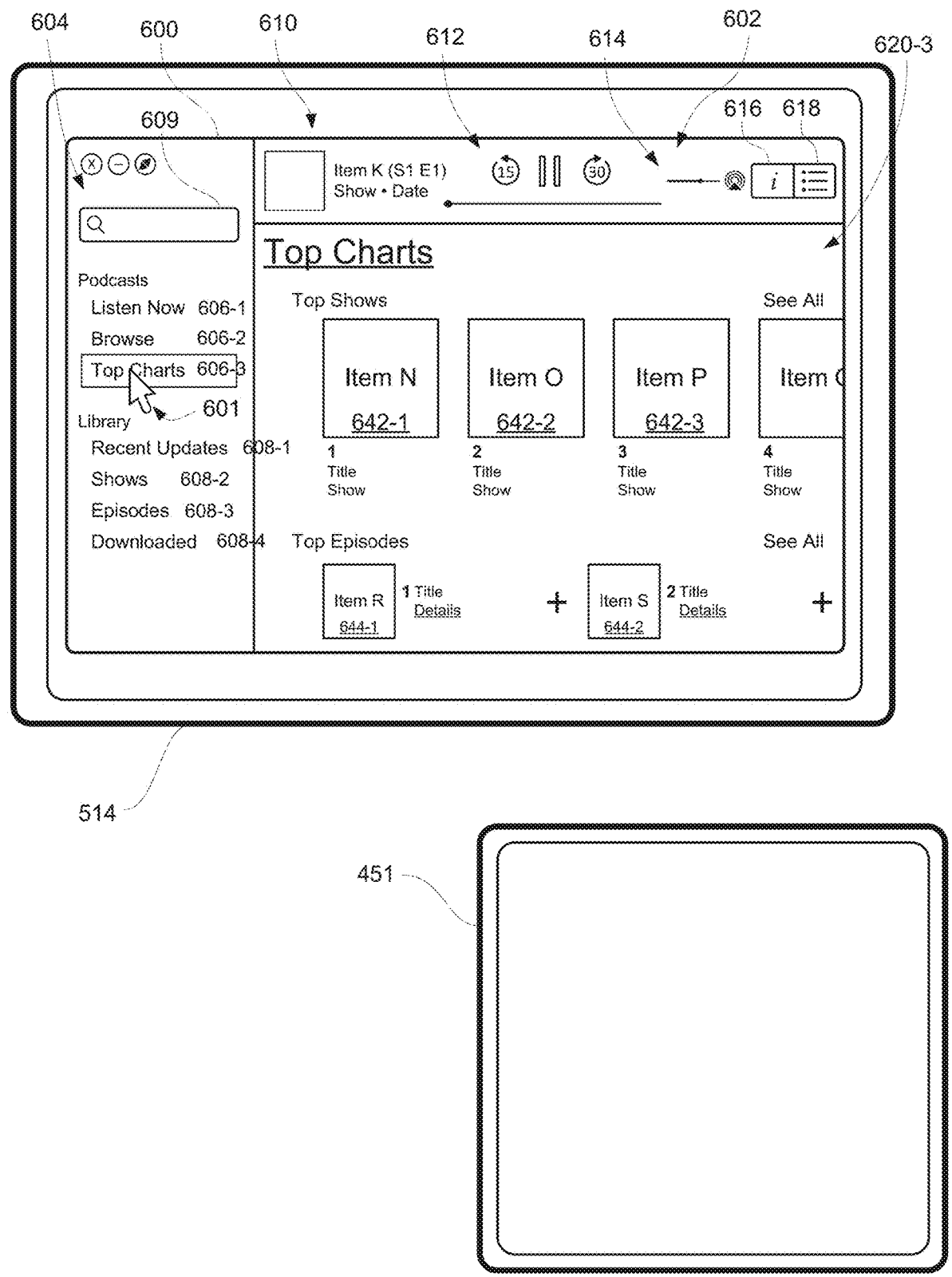
Figure 6P:
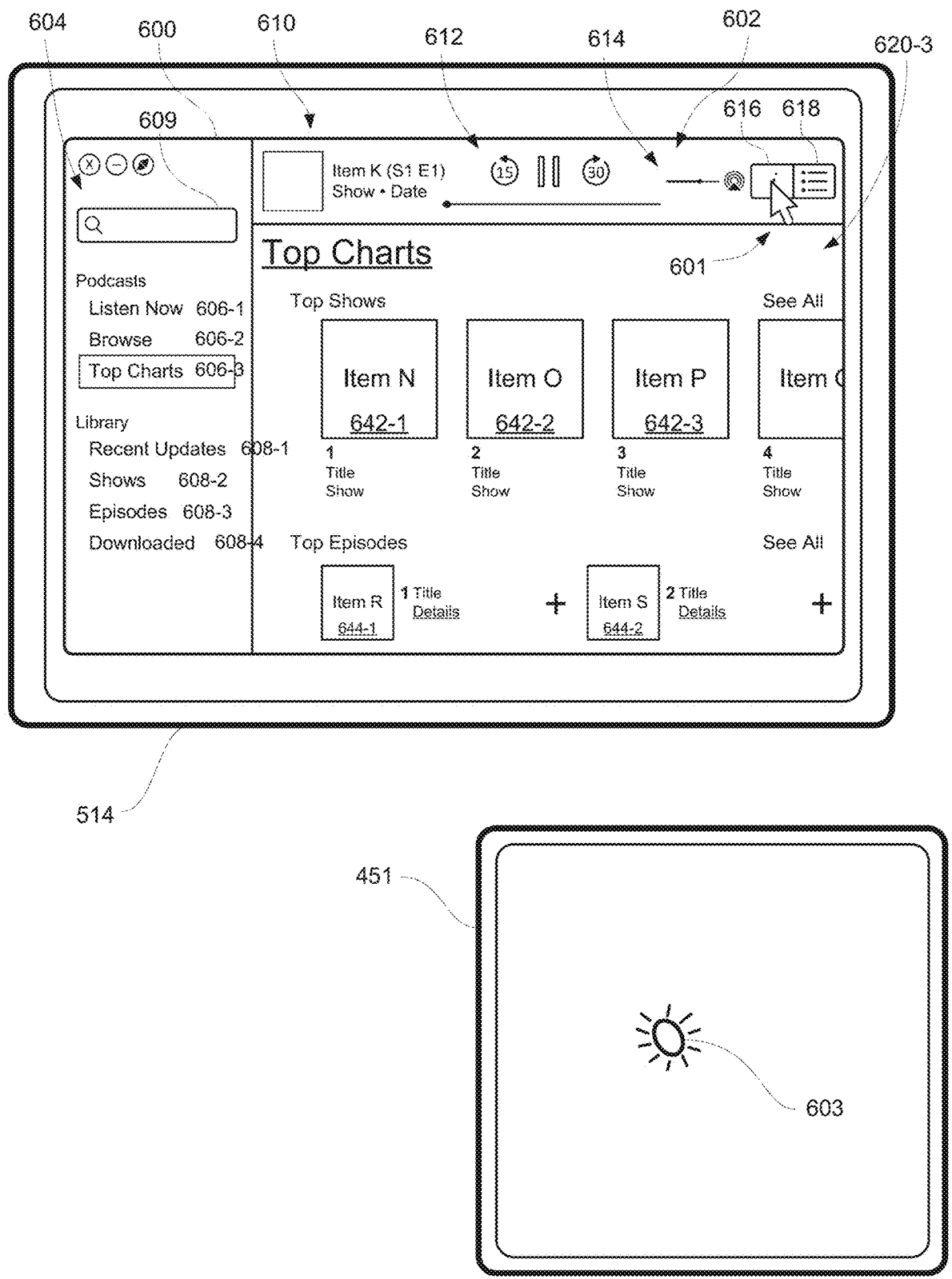
Figure 6Q:
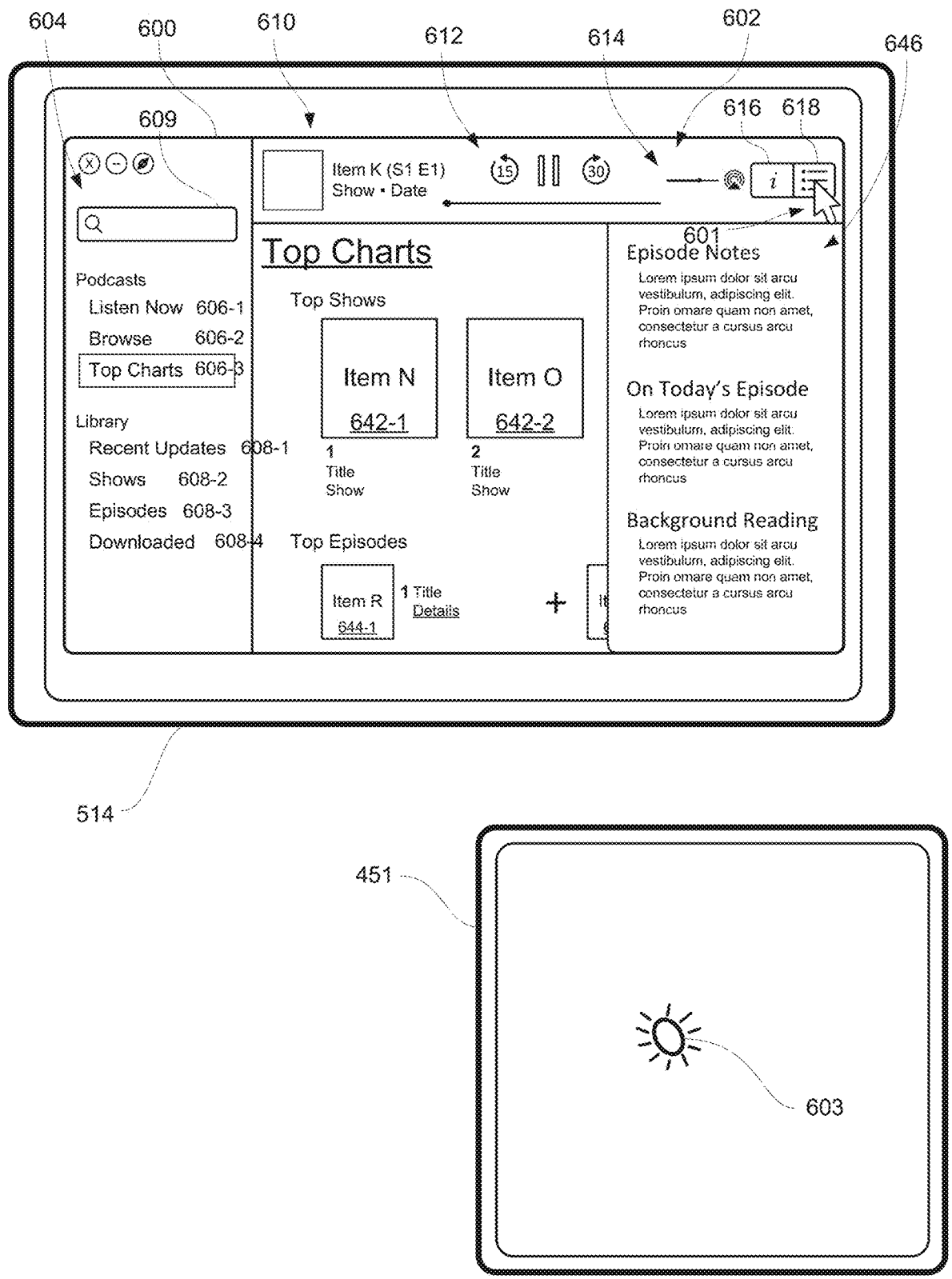
Figure 6R:
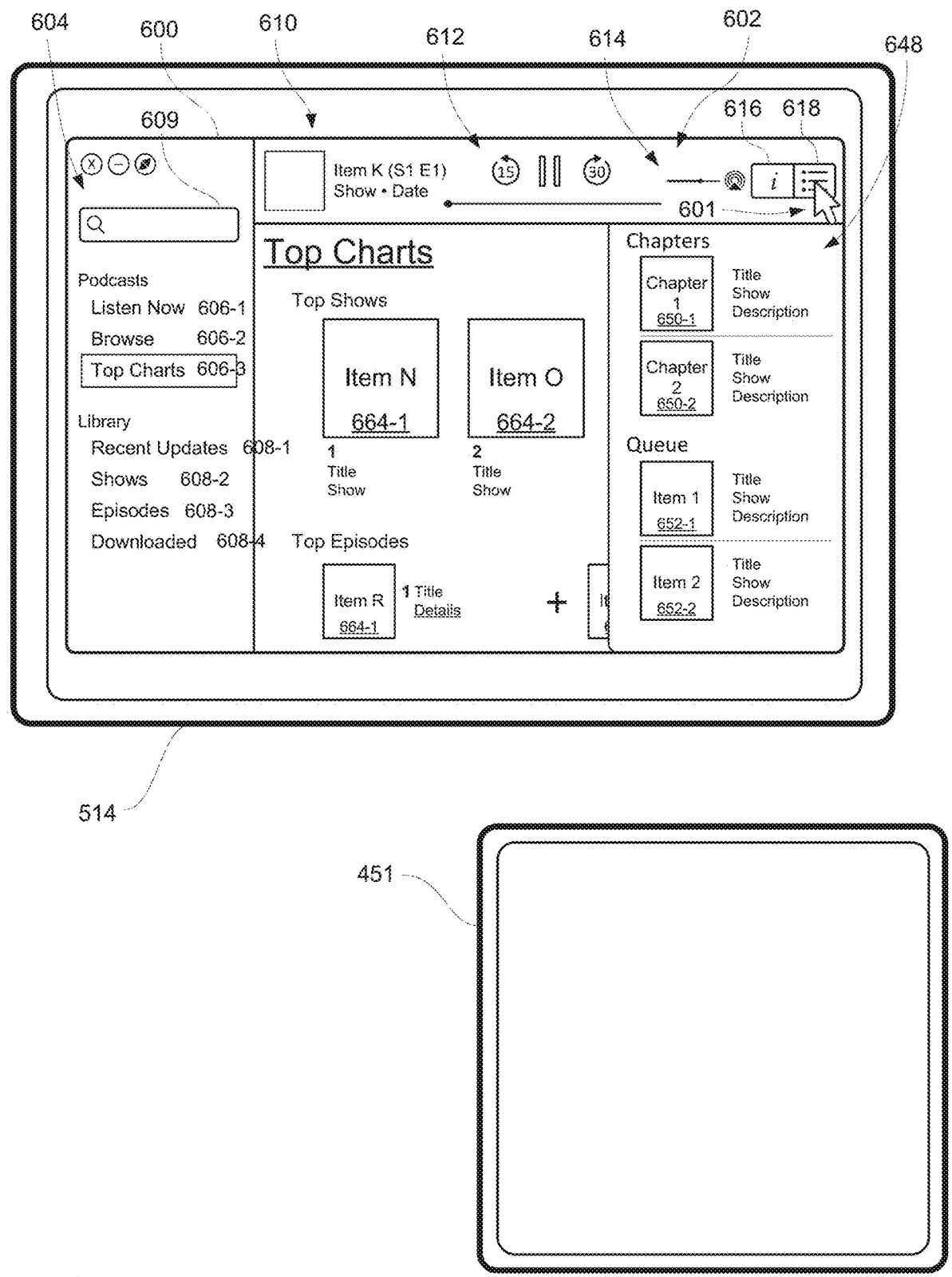
Figure 6S:
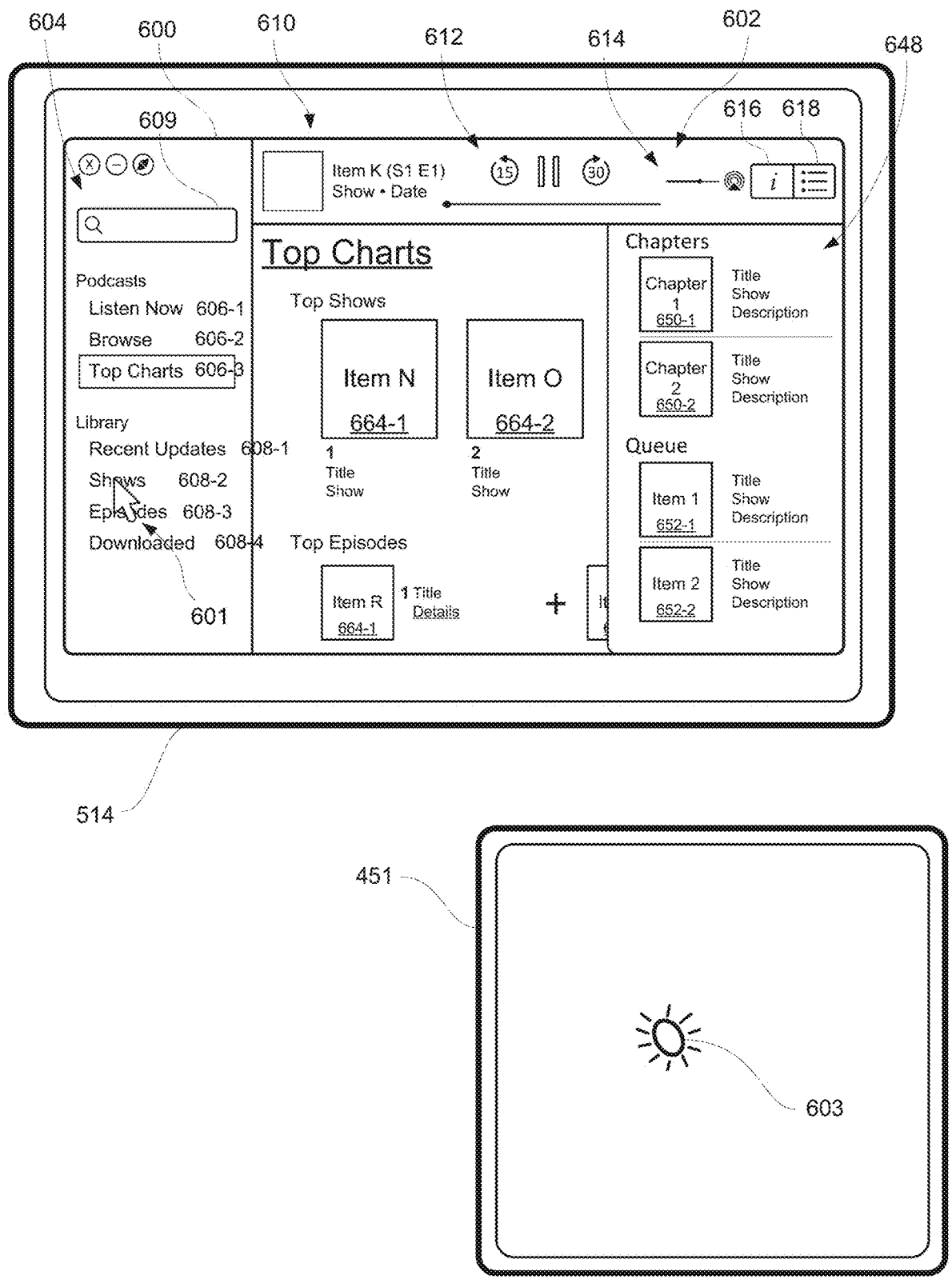
Figure 6T:
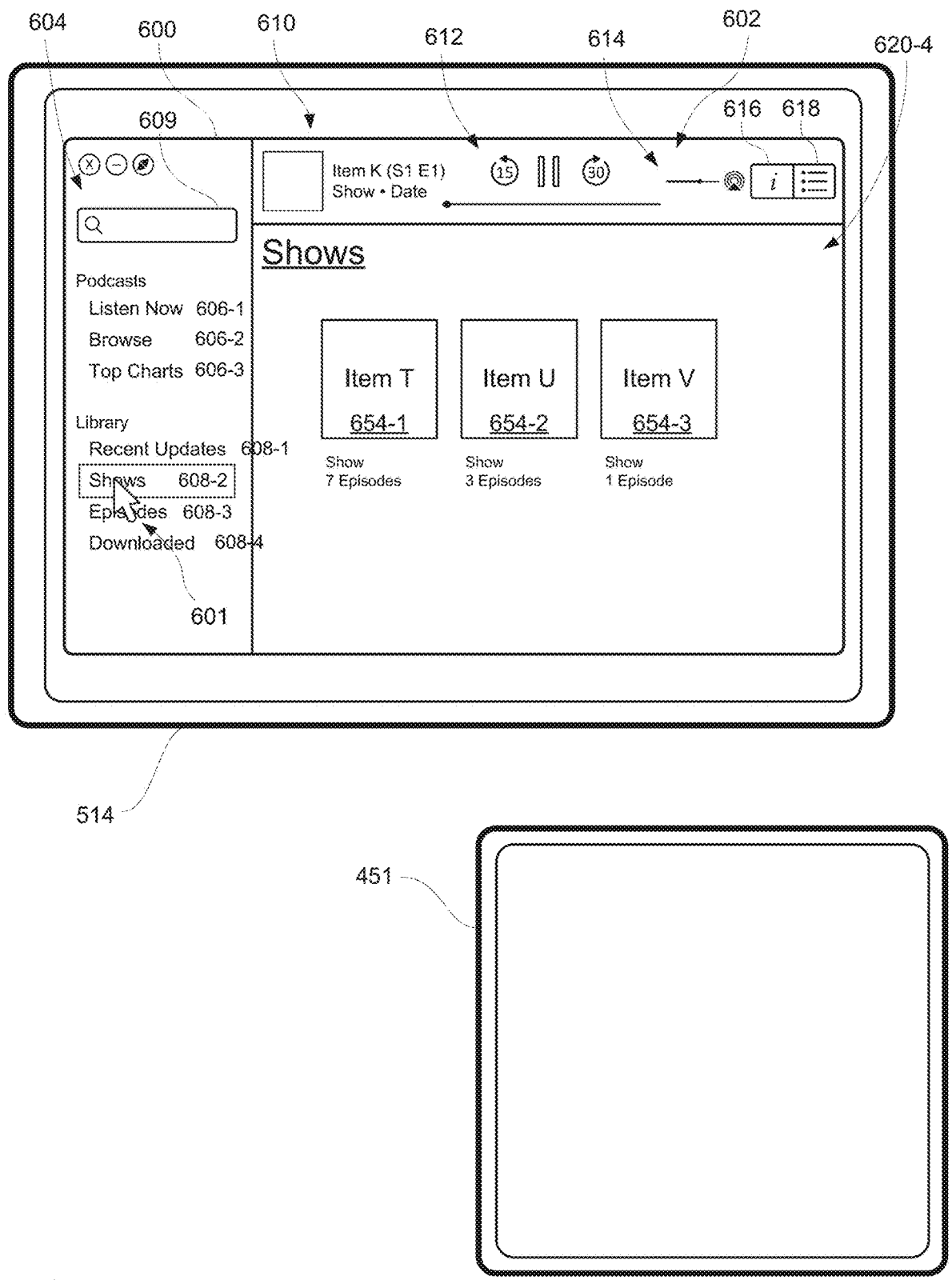
Figure 6U:
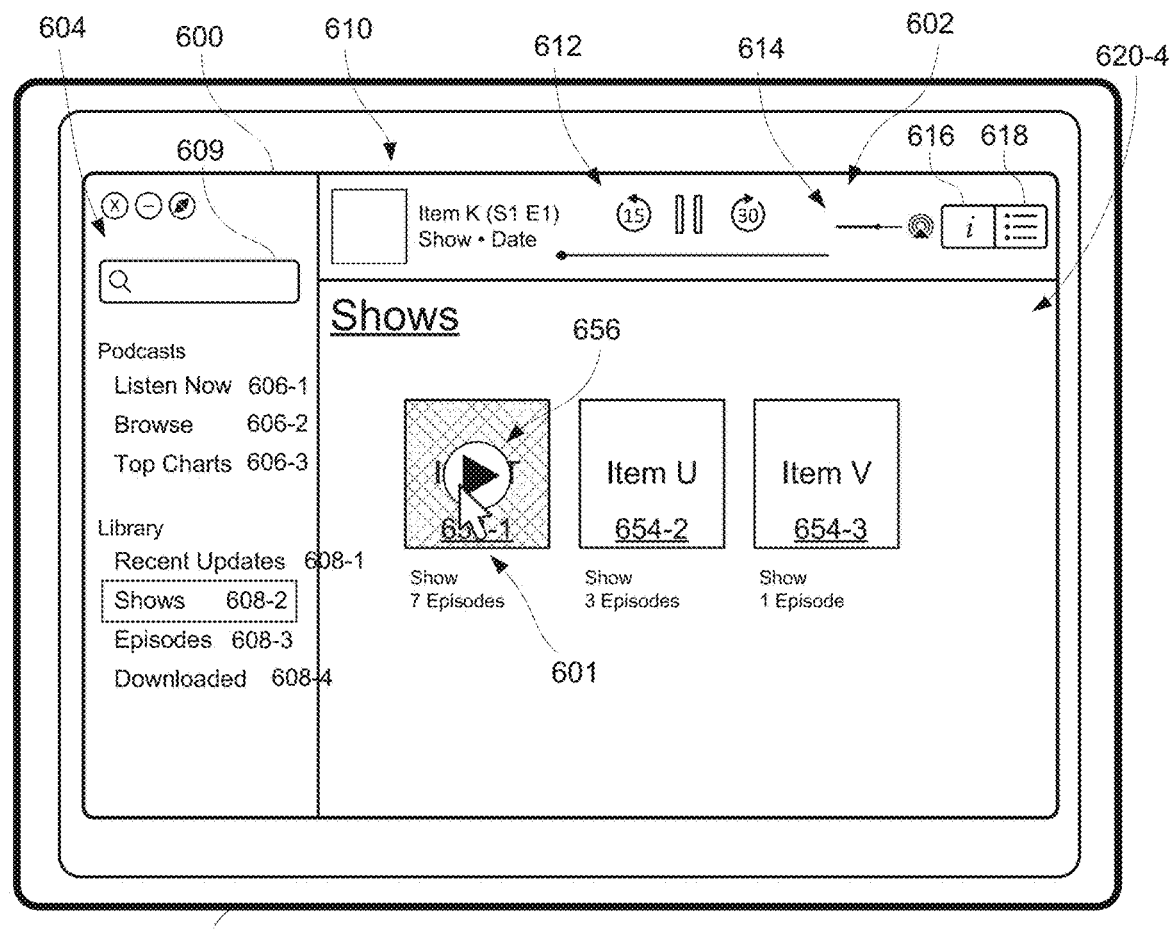
Figure 6U:
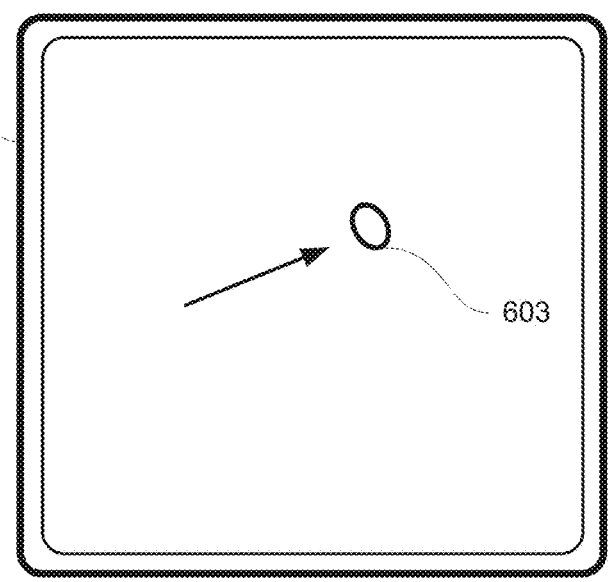
Figure 6V:
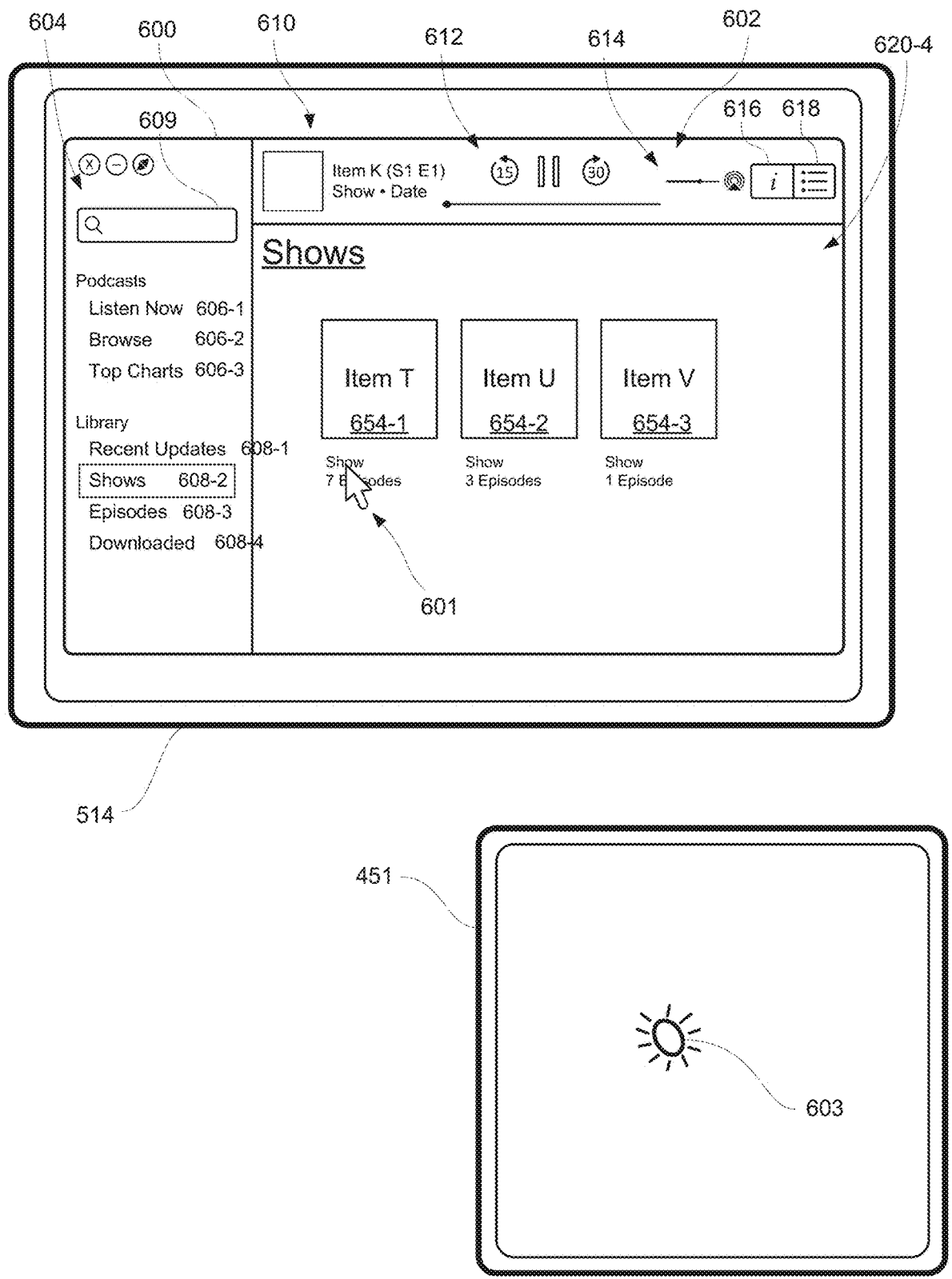
Figure 6W:
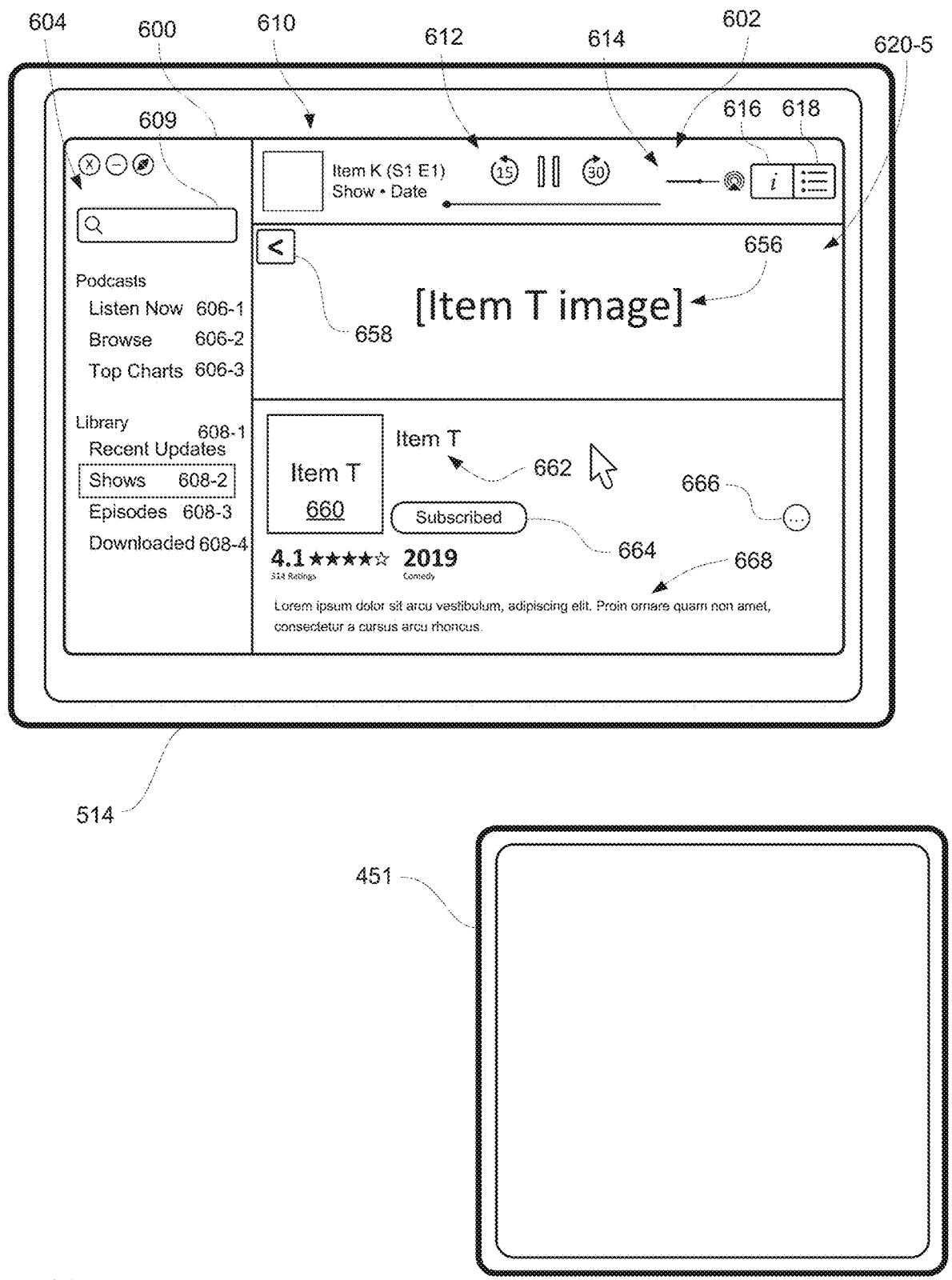

FIGS. 6A-6WW illustrate exemplary ways in which an electronic device searches for content associated with a podcast in accordance with some embodiments of the disclosure. The embodiments in these figures are used to illustrate the processes described below, including the processes described with reference to FIGS. 7A-7G.

FIGS. 6A-6WW illustrate an electronic device 500 searching for content associated with a podcast in a podcast browsing and playback application. FIG. 6A illustrates electronic device (such as electronic device 500, not shown) that is in communication with display 514 (e.g., such as a monitor or integrated display) and an input device (e.g., such as touch-sensitive surface 451). It is understood that the disclosure illustrates the use of touch-sensitive surface 451, but the input device can be any suitable pointer device such as a mouse, touchpad, etc. In some embodiments, device 500 is displaying a podcast browsing and playback application 600. In some embodiments, podcast browsing and playback application 600 is an application installed on device 500.

In some embodiments, podcast browsing and playback application 600 includes three display regions. In some embodiments, podcast browsing and playback application includes podcast playback region 602, navigation panel 604, and a content browsing region.

In some embodiments, podcast playback region 602 is displayed at or near the top of podcast browsing and playback application 600. In some embodiments, podcast playback region 602 displays information about and playback controls for the podcast that is current playing (e.g., or was playing, if paused). In some embodiments, podcast playback region 602 is always displayed even if no podcast is being played or has been played. In some embodiments, podcast playback region 602 includes information about the podcast currently playing, including a representation of the podcast (e.g., an image), a textual label of the title of the respective episode of the podcast, the title of the podcast show, and the date of publication. In some embodiments, podcast playback region 602 includes playback controls, including rewind control, play/pause control, fast-forward control, and/or scrubber bar (e.g., or any combination of the above). In some embodiment, rewind control is selectable to rewind the podcast by a predetermined amount (e.g., 15 seconds, 30 seconds). In some embodiments, play/pause control is selectable to play or pause the playback of the podcast accordingly. In some embodiments, fast-forward control is selectable to fast-forward the playback of the podcast by a predetermined amount (e.g., 15 seconds, 30 seconds). In some embodiments, scrubber bar displays the current playback position of the podcast and is interactable to move the playback to a particular position (e.g., by selecting a respective part of the scrubber bar). In some embodiments, podcast playback region 602 includes audio controls 614. In some embodiment, the volume bar is interactable to change the volume of the playback (e.g., the system volume or the volume of just the podcast browsing and playback application 600). In some embodiments, audio controls 614 include an audio output device affordance that is selectable to set the audio output device (e.g., the device that will receive and play the audio signal provided by device 500). In some embodiments, podcast playback region 602 includes selectable options 616 and 618, which will be described in more detail below with respect to FIGS. 6P-6R.

In some embodiments, navigation panel 604 includes search field 609 that is selectable to search for podcasts within podcast browsing and playback application 600 (as will be described in more detail below with respect to FIGS. 6KK-6WW). In some embodiments, navigation panel 604 includes one or more selectable options that are selectable to cause content browsing region to display one or more content items associated with the selected option. For example, in some embodiments, navigation panel 604 includes selectable option 606-1 corresponding to recommendations for the user, selectable option 606-2 for browsing for podcasts, selectable option 606-3 corresponding to top rated podcasts, selectable option 608-1 for viewing recently updated podcasts that the user has subscribed to, selectable option 608-2 for viewing podcasts that the user has subscribed to, selectable option 608-3 for viewing episodes of podcasts that the user has subscribed to, and selectable option 608-4 for viewing podcasts that the user has downloaded onto device 500.

In FIG. 6A, selectable option 606-1 is currently selected (e.g., as shown by the solid box). In some embodiments, because selectable option 606-1 is currently selected, content browsing region displays user interface 620-1. In some embodiments, user interface 620-1 includes a row of representations of podcasts (e.g., "Up Next" row) that are recommended to the user (e.g., representations 622-1 to 622-3). In some embodiments, the Up Next row of podcasts include podcasts that are recommended to the user based on the users consumption activity. For example, representation 622-1 corresponds to a podcast (e.g., a podcast episode) that has become available today that is recommended to the user. In some embodiments, representation 622-2 corresponds to the next episode of a podcast that the user has subscribed to but has not yet listened to (e.g., episode 1 of season 1 of the podcast). In some embodiments, representation 622-3 corresponds to an episode of a podcast which the user has partially listened to. In some embodiments, representations for partially listened to podcasts include a playback progress bar to indicate the furthest playback progress of the respective podcast. In some embodiments, each podcast in the Up Next row of podcasts include an indicator of the title of the episode, the title of the show, a short description of the podcast and/or episode, and/or the reason why the respective item is recommended to the user (e.g., it's new, it's the next episode, the user has partially played, etc.).

In some embodiments, user interface 620-1 includes further rows of content items corresponding to other categories of content (e.g., such as row 624 for "Shows You Might Like"). In some embodiments, each row of items include a selectable option to display all podcasts in the respective category (e.g., selectable option 626-1 and selectable option 626-2). In some embodiments, the representations discussed above are selectable to cause playback of the respective podcast (e.g., an episode of the podcast). In some embodiments, the representations are selectable to cause display of a user interface specific to the respective podcast (e.g., a user interface for a podcast series).

In FIG. 6B, a user input 603 is received moving pointer 601 to hover over representation 622-1. In some embodiments, in response to the user input, representation 622-1 is displayed with play icon 628 and menu icon 630. In some embodiments, play icon 628 is selectable to cause playback of the respective podcast. In some embodiments, menu icon 630 is selectable to display a contextual menu for interacting with the respective podcast. In some embodiments, while pointer 601 is hovering over an item in the Up Next row of content items (e.g., or optionally anywhere in the row such as between representations or to the left or right of the representations), navigation indicators 632-1 and 632-2 are displayed on the left and right side of the row of items, respectively. In some embodiments, navigation indicators 632-1 and 632-2 are selectable to cause the respective row to navigate leftwards or rightwards, respectively, to reveal further representations of podcasts.

In FIG. 6C, user input 603 is received selecting play icon 628 for representation 622-1. In some embodiments, in response to the user input, podcast browsing and playback application 600 begins playback of Item A, as shown in FIG. 6D.

FIGS. 6E-6F illustrate a user navigating to and selecting play icon 628 of representation 622-3. In some embodiments, because Item C has been partially played by the user, selection of the play icon 628 for Item C causes playback to resume from the furthest playback position. For example, in response to the user input selecting play icon 628, podcast browsing and playback application 600 begins playback of Item C at the previous playback position, as shown in FIG. 6G. In some embodiments, even though Item C has been partially played, because the user requested playback from a user interface associated with a "Podcast" section (e.g., Listen Now, Browse, Top Charts), playback of Item C starts from the beginning of the podcast instead of at the previous playback position.

In FIG. 6H, a user input 603 corresponding to an upward navigational input is received (e.g., an upward or downward swipe on a touch pad, an upward or downward scroll on a scroll wheel, or a downward selection on a scroll bar). In some embodiments, in response to the navigational input user interface 620-1 scrolls upwards to reveal further rows of content corresponding to other categories of content in the "Listen Now" page. For example, user interface 620-1 includes representations 624-1 to 624-3 corresponding to the "Shows You Might Like" row of content (e.g., shows or podcast series recommended to the user based on the user's interest in other content items). In some embodiments, user interface 620-1 includes a "Recently Played" row corresponding to podcasts that the user has recently listened to (e.g., representations 634-1 and 634-2).

It is understood that the order of rows discussed above is merely exemplary and the rows discussed above can be in any row. Further, fewer rows or more rows corresponding to other categories of podcasts can be included in user interface 620-1.

In FIG. 6I, user input 603 is received selecting selectable option 606-2 corresponding to the "Browse" page. In some embodiments, in response to the user input, podcast browsing and playback application 600 displays user interface 620-2 in the content browsing region. In some embodiments, user interface 620-2 includes a row of featured content items, including featured collection (e.g., a podcast series, or a group of podcast series), Item I, and featured episode, Item J. In some embodiments, each item in the row of featured content items includes a representation (e.g., representation 636-1 and 636-2) and the title of the show. In some embodiments, other types of featured content can be included in the featured row of content items such as featured shows, featured hosts, featured guests, etc. In some embodiments, user interface 620-2 includes a row of New & Noteworthy items (e.g., corresponding to representations 638-1, 638-2, and 638-3). In some embodiments, the items in the New & Noteworthy row of items are those that have been recently released and/or are editorially selected to be included in the New & Noteworthy row of items. In some embodiments, representations 636 and 63i are selectable to cause playback of the respective content item (e.g., or optionally are selectable to cause display of a user interface for the respective content item).

FIG. 6K illustrates user interface 620-2 scrolled upwards to reveal category selection region 640. In some embodiments, category selection 640 includes a plurality of categories of podcasts. In some embodiments, each category in the plurality of categories is selectable to cause display of a list of podcasts that fall within the respective categories.

In FIG. 6L, user input 603 is received selecting play icon 628 on representation 638-1 for Item K. In some embodiments, in response to the user input, podcast browsing and playback application 600 begins playback of Item K from the beginning of season 1, episode 1. Thus, in some embodiments, causing playback of a respective content item from the "Browse" user interface causes the podcast to begin playback from the beginning of the first episode (e.g., as opposed to a position based on the user's viewing history, if any).

In FIG. 6N, user input 603 is received selecting selectable option 606-3 corresponding to the "Top Charts" page. In some embodiments, in response to the user input, podcast browsing and playback application 600 displays user interface 620-3 in content browsing region. In some embodiments, user interface 620-3 includes a row of representations (e.g., representations 642-1 to 642-3) of top shows (e.g., popular podcasts, as opposed to popular episodes of podcasts). In some embodiments, representation 642-1 is an image or logo of the respective podcast and is displayed with an indicator of the podcast's rank and title of the podcast. In some embodiments, the row of top shows is horizontally scrollable to reveal further top rated podcasts. In some embodiments, the representations are selectable to cause playback of the respective podcast or to display a user interface specific to the respective podcast.

In some embodiments, user interface 620-3 includes a row of top episodes (e.g., popular individual episodes of podcasts, rather than the podcast as a whole). In some embodiments, each item in the row of top episodes includes a representation (e.g., representation 644-1) of the episode, the title of the episode, and a "Details" link that is selectable to cause display of more information about the respective episode. In some embodiments, the representations include a selectable option ("+") icon that is selectable to add the respective episode to the user's playback queue. In some embodiments, the representation is selectable to cause playback of the respective episode.

In FIG. 6P, user input 603 is received selecting selectable option 616. In some embodiments, in response to the user input, podcast browsing and playback application 600 displays information panel 646. In some embodiments, information panel 646 includes further information and bonus material related to the podcast that is currently playing (e.g., Item K). In some embodiments, information panel 646 includes an "Episode Notes" region that provides insights about the current episode. In some embodiments, information panel 646 includes an "On Today's Episode" region that describes the content about the current episode. In some embodiments, information panel 646 includes a "Background Reading" region that displays background information about the podcast or the content discussed in the current episode. In some embodiments, fewer or more information about the currently playing podcast can be displayed in information panel 646. In some embodiments, the information displayed in information panel 646 is provided by the producer of the podcast.

In FIG. 6Q, user input 603 is received selecting selectable option 618. In some embodiments, in response to the user input, podcast browsing and playback application 600 displays content browsing panel 648, as shown in FIG. 6R. In some embodiments, content browsing panel 648 includes representations (e.g., representation 650-1 and 650-2) of one or more chapters in the currently playing podcasts (if any). In some embodiments, the representations of chapters include an image, the title of the chapter, podcast, and/or episode, and a short description or synopsis of the respective chapter. In some embodiments, representations 650-1 and 650-2 are selectable to jump the playback to the respective chapter in the podcast.

In some embodiments, content browsing panel 648 includes representations (e.g., representation 652-1 and 652-2) of one or more podcasts that are in the user's playback queue (e.g., podcasts that will play after the currently playing podcast completes). In some embodiments, the representations of podcasts include an image, the title of the episode, podcast, and/or a short description or synopsis of the respective podcast. In some embodiments, representations 652-1 and 652-2 are selectable to cause playback of the respective content item (e.g., and optionally to jump ahead in the queue). In some embodiments, the podcast episodes that are in the queue are the next podcast episodes in the podcast series that includes podcast Item K.

In FIG. 6S, user input 603 is received selecting representations 608-2 corresponding to the "Shows" page in the "Library" section of navigation panel 604. In some embodiments, the "Library" section of navigation panel 604 include items which the user has subscribed to or downloaded onto device 500 or another device (e.g., as opposed to items in the "Podcast" section (e.g., Listen Now, Browse, Top Charts) described above, which include all podcasts including those which the user has not subscribed to or downloaded). In some embodiments, any user request to play a content item (e.g., a podcast, an episode of a podcast, etc.) that is received from a user interface in the "Library" section (e.g., Recent Updates, Shows, Episodes, Downloaded), causes playback of the respective content item at the farthest playback position, if the user has previously partially listened to the respective content item (e.g., and optionally from the beginning of the content item if the user has not partially listened to the respective content item).

In some embodiments, in response to the user input, podcast browsing and playback application 600 displays user interface 620-4 in the content browsing region, as shown in FIG. 6T. In some embodiments, user interface 620-4 includes all shows (e.g., podcasts) which the user has subscribed to. In FIG. 6T, user interface 620-4 includes representation 654-1 corresponding to Item T, representation 654-2 corresponding to Item U, and representation 654-3 corresponding to Item V. In some embodiments, each representation is accompanied with a description of how many episodes of the respective show is available (e.g., optionally that the user has not yet listened to).

In FIG. 6U, the user moves pointer 656 to hover over representation 656-1. In some embodiments, large play icon 656 is displayed over representation 656-1 (e.g., as opposed to play icon 628 described above, which is optionally smaller and displayed in a corner over a respective representation). In some embodiments, large play icon 656 is selectable to begin playback of the respective podcast (e.g., to resume playback of the podcast episode in the show that the user was last listening to, to start playback of the next episode in the show if the user has completed listening to the previous episode, to start from the beginning of the first episode if the user has not listened to the podcast at all).

In FIG. 6V, user input 603 is received selecting the description of the podcast (e.g., labeling the item as a show with 7 available episodes). In some embodiments, in response to the user input, content display region displays user interface 620-5, as shown in FIG. 6W. In some embodiments, user interface 620-5 is a user interface specific for the podcast (e.g., Item T, a podcast series comprising multiple podcast episodes). In some embodiments, user interface 620-5 includes a banner image 656 representing the podcast (e.g., an image). In some embodiments, user interface 620-5 includes representation 660 (e.g., an image) of the podcast, the title of podcast 662, and selectable options 664 and 666. In some embodiments, selectable option 664 is selectable to subscribe to the podcast. In some embodiments, if the user is already subscribed to the respective podcast, then selectable option 664 reads "Subscribed" (e.g., as opposed to "Subscribe") and is not selectable to subscribe to the podcast. In some embodiments, selection of selectable option 664 when already subscribed causes unsubscription from the podcast. In some embodiments, selection of selectable option 666 causes the display of a contextual menu for interacting with the podcast. In some embodiments, user interface 620-5 includes description 668 which includes a description or synopsis of the podcast, a rating (e.g., 4.1 out of 5 stars from 314 reviewers), the genre of the podcast (e.g., Comedy), and the year of publication (e.g., 2019).

Figure 6X:
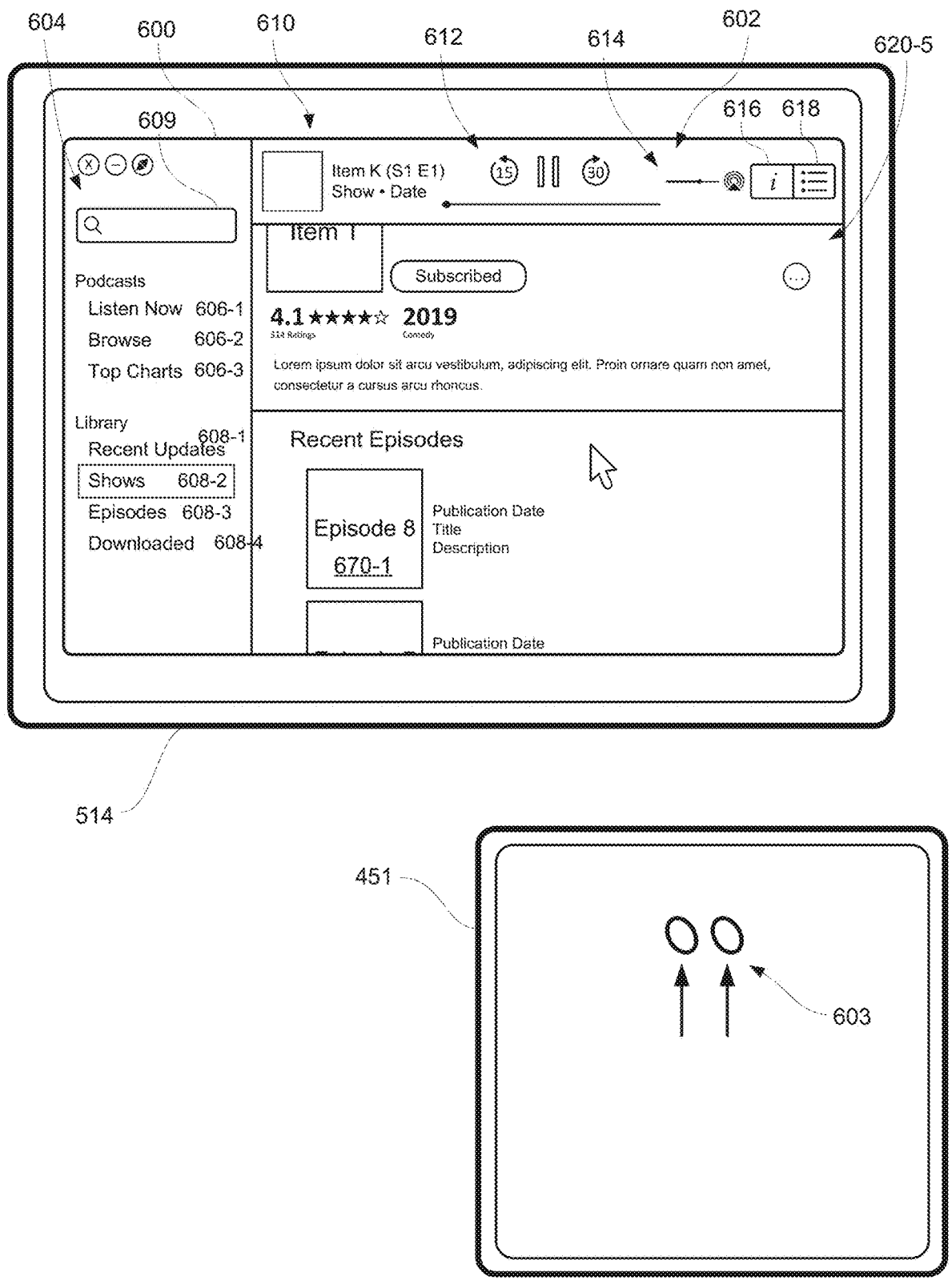

In FIG. 6X, user interface 620-5 is scrolled upwards to reveal the "Recent Episodes" region of user interface 620-5. In some embodiments, user interface 620-5 includes a predetermined amount of recently released episodes (e.g., 3 episodes, 4 episodes, 5 episodes). In some embodiments, the episodes are sorted in reverse chronological order (e.g., most recent at the top). In some embodiments, the episodes are sorted in chronological order (e.g., the oldest at the top). In some embodiments, each episode listing includes a representation or image (e.g., representation 670-1) of the episode, the publication date of the episode, the title of the episode, and/or a description of the episode (e.g., or any combination of the foregoing). Input directed to representations 670 optionally initiates playback of the selected episode, as will be described later.

Figure 6Y:
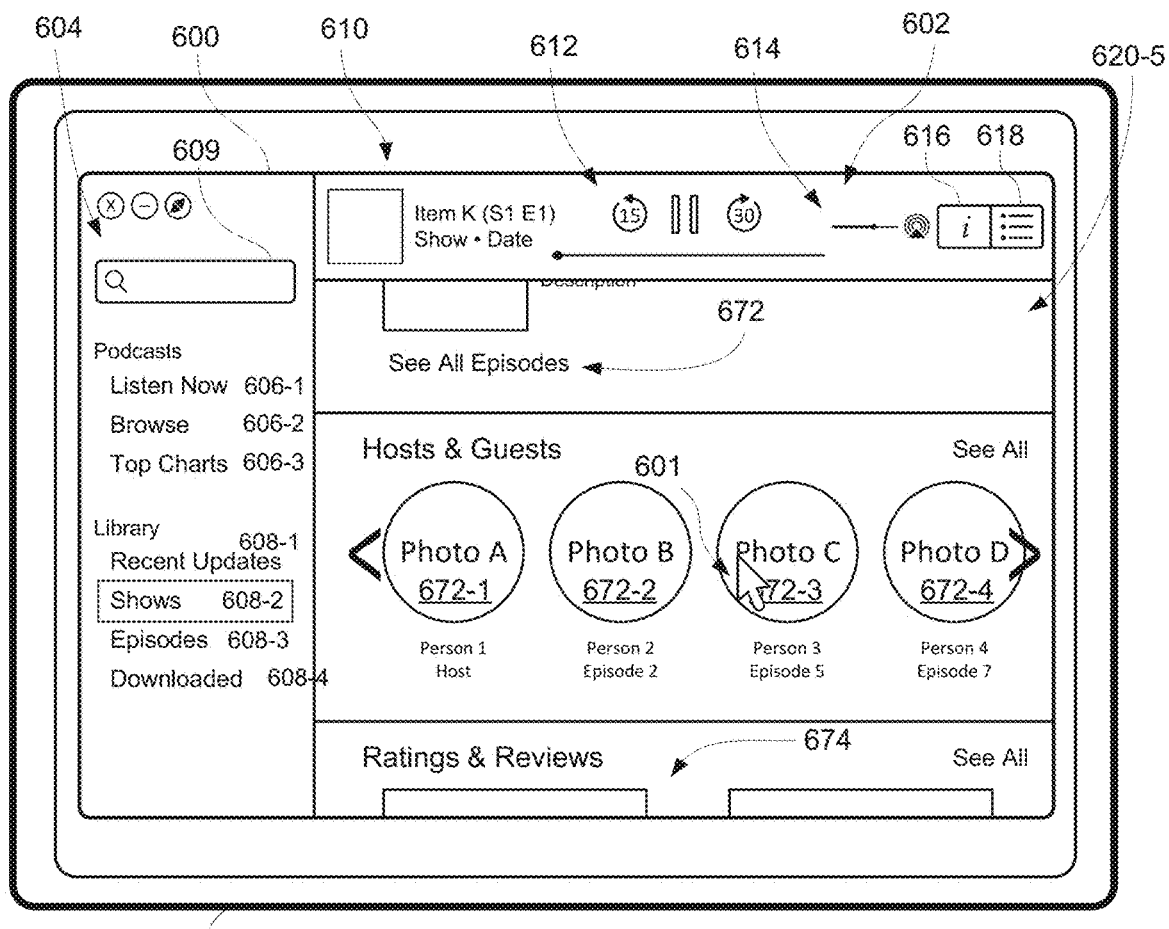
Figure 6Y:
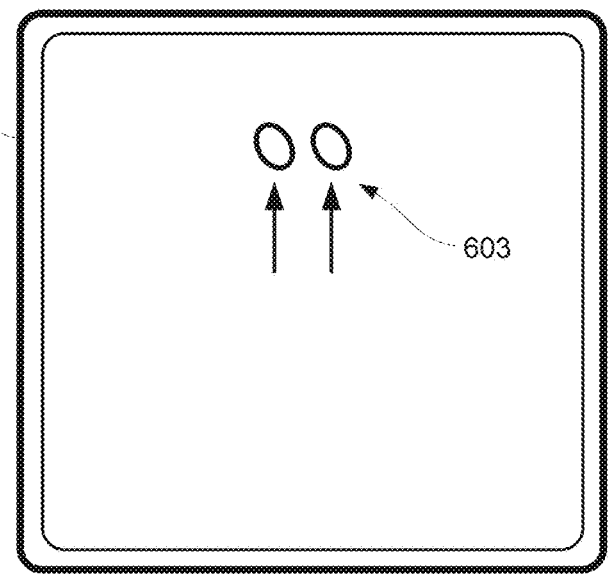

In FIG. 6Y, user interface 620-5 is further scrolled upwards to reveal the "Hosts & Guests" and "Ratings & Reviews" region of user interface 620-5. In some embodiments, the "Hosts & Guests" region of user interface 620-5 includes listings of one or more hosts for the podcast and one or more guests that have participated in the podcast. In some embodiments, each person includes a representation (e.g., photo) of the person, and the name of the person. In some embodiments, if the respective person is a host (e.g., representation 672-1), then the listing includes a label that the person is a host. In some embodiments, if the respective person is a guest (e.g., representations 672-2 to 672-4), then the listing includes a label of what episode(s) the respective guest has appeared on.

In some embodiments, a representation of a host or guest is selectable to cause the podcast browsing and playback application 600 to perform a search using the respective person as a search string/query. For example, in FIG. 6Z, user input 603 is received selecting representation 672-3 for Person 3. In some embodiments, in response to the user input, podcast browsing and playback application 600 performs a search for the respective person (e.g., Person 3) and displays user interface 620-6 in the content browsing region corresponding to a search results user interface. In some embodiments, user interface 620-6 displays the results of the search for Person 3. Further details of the process for searching will be described below with respect to FIGS. 6LL-6WW.

Returning to user interface 620-5 in FIG. 6BB, a user input 603 is received selecting the episode label for Person 3 (e.g., Episode 5—the episode in which Person 3 appears as a guest). In some embodiments, in response to the user input selecting the episode label for Person 3, user interface 620-5 is scrolled to the episodes region and the respective episode (e.g., Episode 5) is highlighted (or otherwise visually distinguished from the other episodes in the episodes region), as shown in FIG. 6CC.

In FIG. 6DD, the user moves pointer 601 to hover over the listing of the episode (e.g., over representation 670-4 or over the title and/or description of the episode). In some embodiments, in response to pointer 601 hovering over the listing, large play icon 656 is displayed over representation 670-4. In some embodiments, large play icon 656 is selectable to cause playback of the respective episode (e.g., to resume playback of the podcast episode at the farthest playback position if the user has previously partially listened to the podcast, or optionally to begin playback from the beginning of the episode if the user has not previously partially listened to the podcast).

In FIG. 6EE, user input 603 is received selecting the description of Episode 5. In some embodiments, in response to the user input, podcast browsing and playback application 600 displays episode card 676 overlaid over user interface 620-5. In some embodiments, episode card 676 includes a title region 678 that includes the title of episode and of the podcast and a label of which episode the respective episode is, description region 680 that includes a description or synopsis of the respective episode, and a Host & Guests region 682 that displays the different people that are associated with the respective episode (e.g., such as Person 1 as the host and Person 3 as the guest). In some embodiments, episode card 676 is vertically scrollable to reveal more of episode card 676, as shown in FIG. 6GG. In some embodiments, as episode card 676 is scrolled downwards, title region 678 is docked (e.g., persistent) such that it is always displayed (e.g., and the rest of the card is scrolled upwards and behind title region 678). In some embodiments, as shown in FIG. 6GG, episode card 676 includes information region 684 that provides details about the episode such as the publication time and date (e.g., May 31, 2019 at 10:00 AM)), the length (e.g., 28 min), and the file format (e.g., file size and type of file, 5.9 MB, Audio File). In some embodiments, episode card 676 includes a link that is selectable to display a webpage for the respective episode (if any).

In FIG. 6HH, user input 603 is received selecting selectable option 608-3 corresponding to the Episodes page in the Library section of navigation panel 604. In some embodiments, in response to the user input, podcast browsing and playback application 600 displays user interface 620-7 in the content browsing region, as shown in FIG. 6II. In some embodiments, user interface 620-7 displays a listing of a plurality of episodes associated with podcasts to which the user has subscribed.

In some embodiments, each listing on user interface 620-7 includes a representation of the respective episode (e.g., an image), information about the respective episode (e.g., the publication date, the title of the episode, the title of the podcast, and a description), a selectable option for adding the respective episode (and/or the podcast series that includes the episode) to the user's playback queue (e.g., the "+" option), and the duration of the episode (e.g., 0:22, 0:25, etc.). In FIG. 6II, user interface 620-7 includes representations 685-1 to 685-4 corresponding to Items W, X, Y, and Z, respectively.

In FIG. 6JJ, the user navigates pointer 601 to hover over the listing for Item Y. In some embodiments, in response to pointer 601 hovering over the listing, play icon 686 is displayed to the side of representation 685-3. In some embodiments, play icon 686 is selectable to begin playback of the respective episode. In some embodiments, each of the representations and/or listings are also selectable to cause playback of the respective episode (e.g., to resume playback of the podcast episode at the farthest playback position if the user has previously partially listened to the podcast, or optionally to begin playback from the beginning of the episode if the user has not previously partially listened to/played the podcast). In some embodiments, play icon 686 is displayed overlaid over the representation (e.g., representation 685-3).

In FIG. 6KK, user input 603 is received selecting search field 609. In some embodiments, in response to the user input, podcast browsing and playback application 600 displays user interface 620-6 corresponding to a search results user interface, as shown in FIG. 6LL. In some embodiments, user interface 620-6 is initially empty. In FIG. 6MM, the user inputs "com" into search field 609. In some embodiments, in response to the user inputting characters into search field 609, user interface 620-6 updates to suggest one or more search terms. For example, user interface 620-6 suggests the search terms "com", "comics", "Comedians in Trucks Getting Water", "Cometgeddon", "The Secret Life of Computers", and "The Composer". In some embodiments, the suggested search terms can be titles of content items (e.g., episodes or podcasts), dictionary words, and/or people (e.g., hosts and/or guests). In some embodiments, one or more of the suggested search terms can indicate that the search will be filtered for certain categories or genres (e.g., "comics within Episodes", or "comics within Action"). In some embodiments, selection of a respective suggested search term causes execution of a search for the selected search term. In some embodiments, pressing "enter" or clicking the search icon on search field 609 causes execution of a search for the search term entered into search field 609.

In FIG. 6MM, user input 603 is received selecting the "comics" suggested search term. In some embodiments, in response to the user input, podcast browsing and playback application 600 executes the search for "comics" and updates user interface 620-6 to display the search results, as shown in FIG. 6NN. As shown in FIG. 6NN, user interface 620-6 includes filter options 687. In some embodiments, filter options 687 are selectable to filter the search results based on the selected option (e.g., search amongst all podcasts, or search only for podcasts from the user's library). In some embodiments, user interface 620-6 displays a row of top results (e.g., representations 688-1 and 688-2). In some embodiments, the row of top results includes a predetermined number of best matches for the search term.

In some embodiments, the row of top results can include different types of items, such as representation 688-1 corresponding to a particular podcast and representation 688-2 corresponding to a particular episode of a podcast (in some embodiments, people are additionally or alternatively included in the top search results). In some embodiments, each item in the top results row displays the date of the podcast and/or episode, the title of the podcast and/or episode, and a description of the podcast and/or episode. In some embodiments, representations 688-1 and 688-2 are selectable to cause playback of the respective item and/or display of a user interface for the respective item.

In some embodiments, user interface 620-6 displays further rows of search results organized by content type. For example, user interface 620-6 includes representations 690-1 and 690-2 corresponding to the episodes row of search results (e.g., for displaying episodes that match the search term), and a shows row 692 of search results (e.g., for displaying podcasts that match the search term). As shown in FIG. 6NN, podcast browser and playback application 600 is able to search within transcripts of episodes of podcasts for matches (e.g., if transcripts are available). In some embodiments, the listings of episodes whose transcripts match some or all of the search term (e.g., if the search term includes a plurality of words) are displayed with an excerpt of the transcript of the podcast. In some embodiments, the excerpts of the transcript displayed are those sections that include the term that matched the search term (e.g., "comics"). In some embodiments, the matching term is displayed with a different visual characteristic than the rest of the words in the transcript (e.g., displayed with a different color, bolded, underlined, larger font, italicized, highlighted, etc.). In some embodiments, the matching term is displayed with a predetermined number of words before and after the matching term (e.g., 3 word, 4 words, 5 words). In some embodiments, multiple excerpts are displayed if multiple matches are found within the transcript. In some embodiments, the representations are selectable to cause playback of the respective episode. In some embodiments, the transcript is selectable to cause playback of the respective portion of the episode, as will be described in more detail below with respect to FIGS. 6UU-6WW.

In FIG. 6OO, user interface 620-6 is scrolled upwards to reveal further rows of results. In some embodiments, user interface 620-6 displays a Hosts & Guests row of items. Thus, in some embodiments, podcast browsing and playback application 600 is able to perform search amongst hosts and guests. For example, a user is able to search for a particular person (e.g., optionally with other search terms) and matching people will be displayed in the Hosts & Guests row. In some embodiments, user interface 620-6 includes representation 694-1 to 694-4 corresponding to Person 1 to Person 4 that match the search term. In some embodiments, representations 694-1 to 696-4 are selectable to search for content associated with the respective person.

FIGS. 6PP-6RR illustrate an alternative embodiment of performing a search in podcast browsing and playback application 600. In FIG. 6PP, in response to a user input selecting search field 609 (such as in FIG. 6KK), user interface 620-6 displays a row of one or more recent searches, a row of recently played items (e.g., podcast series or episodes of podcasts), and one or more other rows of suggested or recommended items (e.g., as opposed to an empty user interface described above with respect to FIG. 6LL). In some embodiments, recent searches row includes options 696-1 to 696-4 corresponding to a predetermined number (e.g., 4, 5, 6) of recent searches performed by the user. In some embodiments, options 696-1 to 696-4 are selectable to cause the podcast browsing and playback application 600 to perform a search for the respective search term. In some embodiments, the row of recently viewed items correspond to podcasts and/or episodes that the user has recently accessed and are selectable to cause playback of the respective item. In some embodiments, the trending row of items correspond to podcasts and/or episodes that are currently trending (e.g., popular with other users, independent of the current user's playback activity) and are selectable to cause playback of the respective item or to display a user interface associated with the respective item.

In FIG. 6QQ, the user has entered "com" into search field 609. In some embodiments, in response to the user input, a drop-down list of suggested search terms is displayed beneath search field 609. In some embodiments, the drop-down list includes one or more suggested search terms, similar to the suggested search terms described above with respect to FIG. 6MM. In some embodiments, user interface 620-6 is not changed when the user enters characters into search field 609 and/or when drop-down list is displayed. In some embodiments, search of the suggested search terms in the drop-down list are selectable to execute a search for the respective search term.

In FIG. 6QQ, user input 603 is received selecting the "comics" suggested search term. In some embodiments, in response to the user input, a search for "comics" is performed and user interface 620-6 is updated to display the results of the search, as shown in FIG. 6RR (e.g., similarly to as described above with respect to FIG. 6NN). In FIG. 6RR, the top results row includes representation 697-2 corresponding to a person that matches the search term. Thus, the top results row of results can include all different types of items, such as episodes of podcasts, podcasts, people, etc.

In FIG. 6SS, pointer 601 has moved to hover over representation 697-1. In some embodiments, because representation 697-1 corresponds to a content item (e.g., an episode of a podcast, or a podcast), in response to pointer 601 hovering over representation 697-1, the play icon and menu icon are displayed. In some embodiments, as described above, the play icon is selectable to cause playback of the respective content item and the menu icon is selectable to display a contextual menu for interacting with the respective content item.

In FIG. 6TT, pointer 601 has moved to hover over representation 697-2. In some embodiments, because representation 697-2 corresponds to a person (e.g., rather than a content item), in response to pointer 601 hovering over representation 697-2, play icon and menu icon are not displayed (e.g., because the listing is not of a content item). In some embodiments, representation 697-2 is selectable to perform a search for the respective person, as described above with respect to FIG. 6AA.

In some embodiments, the transcripts of item AA and item BB match the search term "comics" in at least two places. In some embodiments, because the transcript of item AA matches in multiple places, the excerpt of the transcript is displayed with an excerpt of multiple locations that match the search term. For example, for item AA, the transcript reads " . . . my favorite comics are from the Miracle Universe . . . better than the comics from the Superhuman Universe . . . " thus indicating that the transcript includes at least two matches for the term "comics". In some embodiments, the matched term in the transcript is selectable to cause playback of the respective section of the respective episode.

For example, in FIG. 6UU, user input 603 is received selecting the first "comics" match (e.g., corresponding to the excerpt of "My favorite comics are from the Miracle Universe"). In some embodiments, in response to the user input, podcast browsing and playback application 600 begins playback of the respective content item (e.g., Item AA), and navigates to the playback position of the content item to a position associated with the first matched search term (e.g., at the point where the term was spoken, 3 seconds before the point where the term was spoken, 5 seconds before the point where the term was spoken, etc.), as shown in FIG. 6VV.

In FIG. 6VV, user input 603 is received selecting the second "comics" match (e.g., corresponding to the excerpt of "better than the comics from the Superhuman Universe"). In some embodiments, in response to the user input, podcast browsing and playback application 600 begins playback of the respective content item (e.g., Item AA), and navigates to the playback position of the content item to a position associated with the second matched search term (e.g., which is optionally a different position than the playback position associated with the first matched search term)—for example, to a point where the term was spoken, 3 seconds before the point where the term was spoken, 5 seconds before the point where the term was spoken, etc., as shown in FIG. 6WW. Thus, in some embodiments, the podcast browsing and playback application 600 is able to navigate to the respective section of the podcast that corresponds to the match that the user selected.

FIGS. 7A-7G are flow diagrams illustrating a method 700 of searching for content associated with a podcast in accordance with some embodiments of the disclosure. The method 700 is optionally performed at an electronic device such as device 100, device 300, device 500, and device 511 as described above with reference to FIGS. 1A-1B, 2-3, 4A-4B and 5A-5C. Some operations in method 700 are, optionally combined and/or order of some operations is, optionally, changed.

As described below, the method 700 provides ways to search for content associated with a podcast. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device in communication with a display device and one or more input devices (e.g., a mobile device (e.g., a tablet, a smartphone, a media player, or a wearable device) including a touch screen, a computer including one or more of a keyboard, mouse, trackpad, and touch screen and in communication with a display, or a set-top box in communication with a display and a remote control device), receives (702), via the one or more input devices, an input corresponding to a request to search content available on the electronic device, wherein the input includes one or more search terms, such as in FIGS. 6LL-6NN (e.g., words, phrases, names of people, etc.). In some embodiments, the content is podcasts, music, movies, television shows, etc. In some embodiments, the request to search for content is made in a content application user interface, such as by entering search terms into a search text field (e.g., content that is stored or otherwise accessible, such as via streaming, on the electronic device). In some embodiments, the content searched is only content in a library of a user account of the electronic device. In some embodiments, the content searched includes library content as well as any content that is available on a content store or repository.

In some embodiments, in response receiving the input corresponding to the request to search content available on the electronic device, the electronic device displays (704), via the display device (e.g., in a user interface of the content application), one or more representations of one or more search results including a first representation of a first search result, wherein the first search result is a first content item (e.g., a first episode of a podcast (series) that comprises one or more episodes) that is associated with a first transcript of dialog included in the first content item (e.g., the transcript is a transcript of part or all of the discussion occurring in the first episode), and the first search result is included in the one or more search results as a result of a relationship between the one or more search terms and the first transcript for the first content item, such as in FIG. 6NN. For example, the search results in searching not only the titles, people (e.g., hosts, guests), dates, descriptions of podcast series, podcast episodes, etc., but also the transcripts for those podcasts series, podcast episodes, etc. Thus, the search results optionally include podcast series, podcast episodes, etc. whose transcripts include one or more of the search terms (or whose transcripts include sections that are otherwise related to the one or more search terms). It is understood that while podcast series and podcast episodes are mentioned, the same search behavior optionally applies to other types of content as well such as songs, movies, television shows, etc.

The above-described manner of searching transcripts of content items such as podcasts allows the electronic device to provide the user with search results that are particularly related to the search query, which simplifies the interaction between the user and the electronic device and enhances the operability of the electronic device and makes the user-device interface more efficient (e.g., by not requiring the user to individually listen to podcasts to find podcasts whose discussions are related to the search query but whose descriptions/titles might not reflect as much), which additionally reduces power usage and improves battery life of the electronic device by enabling the user to use the electronic device more quickly and efficiency.

In some embodiments, the first representation of the first search result includes a first portion of the first transcript that is related to the one or more search terms (706), such as in FIG. 6NN (and does not include a second portion of the first transcript that is not related to the one or more search terms). For example, the first search result displays a snippet of the full transcript of the first podcast episode that includes one of the search terms that was used to search the podcasts, or a snippet of the full transcript that is otherwise related to one of the search terms that was used to search the podcasts (e.g., is a snippet of the transcript dealing with food, while not necessarily including the word "food", if the search term was "food").

The above-described manner of including the relevant portion of the transcript in the search result allows the electronic device to provide the user with information about the transcript portion of interest, which simplifies the interaction between the user and the electronic device and enhances the operability of the electronic device and makes the user-device interface more efficient (e.g., by not requiring the user to listen to the podcast or manually search the transcript to understand what part of the transcript is related to the search query), which additionally reduces power usage and improves battery life of the electronic device by enabling the user to use the electronic device more quickly and efficiency.

In some embodiments, the first portion of the first transcript includes at least one of the one or more search terms, and the at least one of the one or more search terms is displayed with a first value for a visual characteristic that is different than a second value for the visual characteristic with which a remainder of the first portion of the first transcript is displayed (708), such as in FIG. 6NN. For example, the snippet of the transcript includes at least one of the search terms, and the search term(s) that is included in the snippet is shown bolded and/or with a different color than the remaining portions of the snippet that is shown in the search result.

The above-described manner of highlighting the search terms in the relevant portion of the transcript allows the electronic device to provide the user with information about where the search terms appear in the transcript, which simplifies the interaction between the user and the electronic device and enhances the operability of the electronic device and makes the user-device interface more efficient (e.g., by not requiring the user to manually search the transcript to understand what part of the transcript is related to the search query), which additionally reduces power usage and improves battery life of the electronic device by enabling the user to use the electronic device more quickly and efficiency.

In some embodiments, the at least one of the one or more search terms includes a first search term (710), and while displaying the first representation of the first search result, the electronic device receives (712), via the one or more input devices, an input corresponding to a selection of the first search term in the first portion of the first transcript, such as in FIG. 6UU (e.g., a touch input on the first search term in the snippet of the transcript, a click input with a cursor on the first search term in the snippet). In some embodiments, in response to receiving the input corresponding to the selection of the first search term, the electronic device plays (714) the first content item from a playback position that corresponds to the first search term, such as in FIG. 6VV. For example, starting playback of the first content item from a portion of the first content item that starts with the selected search term (or a predetermined time before the search term's playback position in the podcast episode, such as 3, 5, 10 seconds before that playback position).

The above-described manner of initiating playback of the podcast allows the electronic device to automatically play the relevant portion of the podcast, which simplifies the interaction between the user and the electronic device and enhances the operability of the electronic device and makes the user-device interface more efficient (e.g., by not requiring the user to listen to the entirety of the podcast or manually search the podcast to locate the relevant portion of the podcast), which additionally reduces power usage and improves battery life of the electronic device by enabling the user to use the electronic device more quickly and efficiency.

In some embodiments, the first portion of the first transcript includes a predetermined number (e.g., 2, 3, 5) of terms before and after the at least one of the one or more search terms (716), such as in FIG. 6NN. Thus, the search result optionally includes sufficient context of where the search term appears in the transcript so that its meaning is understandable to a user.

The above-described manner of including transcript terms before and after the search terms allows the electronic device to provide the user with information about fuller context of the search term in the transcript, which simplifies the interaction between the user and the electronic device and enhances the operability of the electronic device and makes the user-device interface more efficient (e.g., by not requiring the user to listen to the podcast or manually search the transcript to understand the fuller context of the search terms), which additionally reduces power usage and improves battery life of the electronic device by enabling the user to use the electronic device more quickly and efficiency.

In some embodiments, the electronic device displays (718) a user interface that includes a content player user interface, such as in FIG. 6A (e.g., the content player user interface is optionally a region of the content application user interface (the user interface in which the search request was received) that displays information about what content item is currently playing (if any), and controls for controlling playback of the currently playing content item). The content player user interface is optionally always displayed in the same portion of the content application user interface, whether or not a content item is currently playing in the content application user interface. In some embodiments, the content player user interface includes one or more controls for controlling playback of a content item (e.g., a backward skip button to skip backward in the content item that is playing by 15 seconds, a forward skip button to skip forward in the content item by 20 seconds, a play/pause button for playing or pausing the content item), and a selectable option that is selectable to cause display of a sidebar user interface that includes information about the content item that is currently playing while maintaining display of the content player user interface, such as in FIG. 6Q. For example, selection of the sidebar selectable option causes a sidebar (e.g., right side) to be displayed in the content application user interface. The sidebar user interface optionally includes information about the currently playing podcast episode (e.g., hosts, guests, topics of discussion, date of podcast, length of podcast, links to related content, publisher, etc.), and optionally includes the full or partial transcript of the episode, if it is available for the podcast episode.

The above-described manner of only displaying the sidebar user interface upon user input to do so, and maintaining display of the content player, allows the electronic device to conserve display space and maintain the content player as always accessible, which simplifies the interaction between the user and the electronic device and enhances the operability of the electronic device and makes the user-device interface more efficient (e.g., by allowing screen space to be used for other functionalities of the electronic device when not needed to display the information about the currently playing podcast, and not requiring the user to navigate to other user interfaces to continue to provide playback control inputs), which additionally reduces power usage and improves battery life of the electronic device by enabling the user to use the electronic device more quickly and efficiency.

In some embodiments, the electronic device displays (720) a user interface that includes a content player user interface, such as in FIG. 6A (e.g., the content player user interface is optionally a region of the content application user interface (the user interface in which the search request was received) that displays information about what content item is currently playing (if any), and controls for controlling playback of the currently playing content item). The content player user interface is optionally always displayed in the same portion of the content application user interface, whether or not a content item is currently playing in the content application user interface. In some embodiments, the content player user interface includes one or more controls for controlling playback of a content item (e.g., a backward skip button to skip backward in the content item that is playing by 15 seconds, a forward skip button to skip forward in the content item by 20 seconds, a play/pause button for playing or pausing the content item), and a selectable option that is selectable to cause display of a sidebar user interface that includes information about upcoming content items in a playback queue of content items while maintaining display of the content player user interface, such as in FIG. 6R. For example, selection of the sidebar selectable option causes a sidebar (e.g., right side) to be displayed in the content application user interface. The sidebar user interface optionally includes information about/representations of the next episodes in the podcast series that corresponds to the currently playing podcast episode. In some embodiments, the representations are selectable to initiate playback of the selected episode.

The above-described manner of including information about next-playing episodes allows the electronic device to provide this information while conserving display space and maintaining the content player as always accessible, which simplifies the interaction between the user and the electronic device and enhances the operability of the electronic device and makes the user-device interface more efficient (e.g., by allowing screen space to be used for other functionalities of the electronic device when not needed to display the information about the currently playing podcast, and not requiring the user to navigate to other user interfaces to continue to provide playback control inputs), which additionally reduces power usage and improves battery life of the electronic device by enabling the user to use the electronic device more quickly and efficiency.

In some embodiments, the sidebar user interface further includes information about chapters in the content item that is currently playing (722), such as in FIG. 6R. In some embodiments, if the currently playing podcast episode has chapters, the sidebar user interface also include information about/representations of the chapters of the podcast episode. In some embodiments, the representations are selectable to initiated playback of the selected chapter.

The above-described manner of including information about chapters of the current podcast allows the electronic device to provide this information while conserving display space and maintaining the content player as always accessible, which simplifies the interaction between the user and the electronic device and enhances the operability of the electronic device and makes the user-device interface more efficient (e.g., by allowing screen space to be used for other functionalities of the electronic device when not needed to display the information about the currently playing podcast, and not requiring the user to navigate to other user interfaces to continue to provide playback control inputs), which additionally reduces power usage and improves battery life of the electronic device by enabling the user to use the electronic device more quickly and efficiency.

In some embodiments, the electronic device receives (724), via the one or more input devices, an input corresponding to a request to play a respective content item (e.g., a selection of a representation of a podcast series or a podcast episode of a podcast series), wherein a user of the electronic device has partially played the respective content item, such as in FIG. 6L. In some embodiments, in response to receiving the input corresponding to the request to play the respective content item (726), in accordance with a determination that the input was received in a content item browsing user interface that includes content items that are in a library of a user account associated with the electronic device and content items that are not in the library of the user account (e.g., the user was browsing a podcast store/repository in the podcast application that displays information about all podcasts available on the electronic device, independent of whether the user account associated with the electronic device has added those podcasts to a library), the electronic device plays (728) the respective content item from a beginning of the respective content item, such as in FIG. 6M (e.g., selecting a representation of a podcast or podcast episode from a podcast store user interface optionally starts playback of the podcast/episode from the beginning, even if the user has previously listened to a portion of the podcast/episode. Thus, playback from the podcast store optionally proceeds independent of playback history for the podcast/episode). In some embodiments, in accordance with a determination that the input was received in a library user interface that includes content items that are in the library of the user account associated with the electronic device but does not include content items that are not in the library of the user account, the electronic device resumes (730) playback of the respective content item from a last-reached playback position in the respective content item, such as in FIG. 6G. For example, selecting a representation of a podcast or podcast episode from a library user interface in the podcast application optionally proceeds based on the playback history of the user for the podcast/episode. Thus, if the podcast/episode has been previously played, playback from the library user interface will optionally resume playback of the podcast/episode (if the podcast/episode has not been previously played, playback from the library user interface will optionally start playback from the beginning of the podcast/episode). In some embodiments, playback requests from both the podcast store and library user interfaces (even though they are separate user interfaces in the podcast application) will cause playback based on the playback history of the user with respect to the podcast/episode.

The above-described manner of differential playback behavior allows the electronic device to reduce resources needed to track playback history in all context, which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

In some embodiments, the electronic device displays (732), via the display device, a respective representation of respective content, such as in FIG. 6A (e.g., a representation of a podcast series or podcast episode of a podcast series in the podcast application, such as in a library of the user account of the electronic device). In some embodiments, the electronic device detects (734) a hover event over the respective representation of the respective content, such as in FIG. 6B (e.g., a cursor hovering over the representation without clicking the representation, or a finger hovering over the representation without touching down on the representation). In some embodiments, in response to detecting the hover event over the respective representation (736), in accordance with a determination that the respective representation is a representation of a show, such as in FIG. 6B (e.g., a representation of a podcast series, rather than a particular episode of the podcast series. Or in the context of a television show, a representation of the television series as a whole rather than a representation of a particular episode of the television show), the electronic device displays (738), overlaid on the respective representation, a first selectable option that is selectable to initiate playback of a respective episode of the show, and a second selectable option that is selectable to display, via the display device, a contextual menu associated with the show, wherein a remainder of the respective representation is selectable to display, via the display device, a user interface for the show, such as in FIG. 6B (for example, on hover, a play button is shown over the representation of the show, and a contextual menu button is shown over the representation of the show). Selection of the play button will optionally cause playback of the show (e.g., from a first or next episode of the podcast series), selection of the menu button will optionally cause display of a menu from which various actions related to the podcast show can be taken, and selection of a remainder of the representation (e.g., areas other than the play and menu buttons) optionally causes display, in the podcast application, of a user interface dedicated to the podcast series—such as a user interface that includes information about the podcast series and episodes in the podcast series, and from which the podcast can be subscribed to, downloaded, etc.

In some embodiments, in accordance with a determination that the respective representation is a representation of an episode of a show (e.g., a representation of a particular episode of a podcast series, rather than the podcast series as a whole. Or in the context of a television show, a representation of a particular episode of the television series rather than a representation of the television show as a whole), the electronic device displays (740), overlaid on the respective representation, a third selectable option that is selectable to initiate playback of the episode of the show, and a fourth selectable option that is selectable to display, via the display device, a contextual menu associated with the episode of the show, wherein a remainder of the respective representation is also selectable to initiate playback of the episode of the show, such as in FIG. 6E. For example, on hover, a play button is shown over the representation of the podcast episode, and a contextual menu button is shown over the representation of the podcast episode. Selection of the play button will optionally cause playback of the podcast episode (e.g., from a beginning of the podcast episode if not previously played, or from a last-played portion of the podcast episode if previously played), selection of the menu button will optionally cause display of a menu from which various actions related to the podcast episode can be taken, and selection of a remainder of the representation (e.g., areas other than the play and menu buttons) optionally also causes playback of the podcast episode.

The above-described manner of differential overlay behavior allows the electronic device to only display overlay buttons that are available for a given representation, which simplifies the interaction between the user and the electronic device and enhances the operability of the electronic device and makes the user-device interface more efficient (e.g., avoiding display of, and input directed to, non-relevant functions associated with a given representation), which additionally reduces power usage and improves battery life of the electronic device by enabling the user to use the electronic device more quickly and efficiency.

In some embodiments, the electronic device displays (742) a user interface that includes a search text field and a main display region, such as in FIG. 6A (e.g., a user interface of the podcast application that includes a search text field in the upper left, and a large content display region in the lower right. The large content display region is optionally where various content is displayed as the user navigates through podcast application). In some embodiments, while displaying the user interface, the electronic device detects (744) that the search text field has received a current focus, such as in FIG. 6LL (e.g., a cursor has clicking on the search text field without text having been entered in the search text field, or a finger has touched the search text field without text having been entered in the search text field). In some embodiments, in response to detecting that the search text field has received the current focus, the electronic device displays (746), in the main display region, a plurality of representations of suggested search items, such as in FIG. 6MM (e.g., when the search text field gets the current focus, suggested search queries, terms, topics, etc. are optionally displayed in the large content display region. In some embodiments, the suggested search queries, terms, topics, etc. are selectable to initiate a search based on the selection search term, topic, etc.). In some embodiments, while displaying the plurality of representations of suggested search items in the main display region, the electronic device receives (748) a request to search for content using a particular search query, such as in FIG. 6MM (e.g., selection of a suggested search query shown in the large content display region, or entry of text into the search text field). In some embodiments, in response to receiving the request to search for content using the particular search query (750), the electronic device ceases (752) display of the plurality of representations of suggested search items, and displays (754), in the main display region, a plurality of representations of search results based on the particular search query, such as in FIG. 6NN. For example, replacing the suggested search queries with the actual search results after the user has initiated the search. The search results are optionally representations of people (e.g., hosts/guests on podcasts), podcast episodes, podcast series, etc. The representations are optionally selectable to play podcasts/episodes (e.g., if the representation is of a podcast series/episode), or to initiate searches for podcast/episodes related to people (e.g., if the representation is of a guest or host). In some embodiments, instead of search suggestions being shown in the large content display region, they are displayed in a small overlay displayed adjacent the search text field. Once the user selects one of the suggestions in the small overlay, the large content display region is optionally populated with search results related to the selected search suggestion.

The above-described manner of presenting suggestion search queries in the same region in which search results will be displayed allows the electronic device to provide search shortcuts to a user with fewer inputs required from the user while not utilizing more display space that is necessary, which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

In some embodiments, the one or more representations of the one or more search results are displayed in a user interface that includes (756) a first region that includes one or more representations of one or more top search results (758), such as in FIG. 6RR. For example, a first row of results that are the search results most related to the search query. The first row of results is optionally of mixed types (e.g., people, podcast shows, podcast episodes). The representations in the first row are optionally selectable to play the selected podcast show/episode, or to initiate a search for the selected person, as described above. In some embodiments, the user interface includes a second region that includes one or more representations of episodes of shows (760), such as in FIG. 6NN. For example, a second row of results that are all representations of episodes of podcasts that are related to the search query. The representations of the podcast episodes are optionally selectable to play the podcast episodes. In some embodiments, the user interface includes a third region that includes one or more representations of shows (762), such as in FIG. 6NN. For example, a third row of results that are all representations of podcast shows that are related to the search query. The representations of the podcast series are optionally selectable to play the podcast series (e.g., to start playback of an episode of the podcast series). In some embodiments, the user interface includes a fourth region that includes one or more representations of hosts and/or guests for one or more shows (764), such as in FIG. 6OO. For example, a fourth row of results that are all representations of people (e.g., podcast hosts, podcast guests) that are related to the search query. The representations of the people are optionally selectable to initiate searches for the selected person.

The above-described manner of displaying different types of search results in different areas of the user interface allows the electronic device to provide for organized display of search results, which simplifies the interaction between the user and the electronic device and enhances the operability of the electronic device and makes the user-device interface more efficient (e.g., by reducing the need for a user to provide inputs to search through the search results to find the types of search results of interest), which additionally reduces power usage and improves battery life of the electronic device by enabling the user to use the electronic device more quickly and efficiency.

In some embodiments, the first region includes a first representation of a first top search result. In some embodiments, the electronic device detects (768) a hover event over the first representation of the first top search result, such as in FIG. 6SS (e.g., a cursor hovering over the representation without clicking the representation, or a finger hovering over the representation without touching down on the representation). In some embodiments, in response to detecting the hover event over the first representation (770): in accordance with a determination that the first representation is a representation of a show (e.g., a podcast series), the electronic device displays (772), overlaid on the first representation, a first selectable option that is selectable to initiate playback of the show, such as in FIG. 6SS. For example, displaying a play button over the podcast series representation that causes playback of an episode of the podcast series. In some embodiments, the episode that is played is the next episode for the podcast series if the user has already played the prior episodes. In some embodiments, the episode that is played is the first episode for the podcast series if the user has not played any episodes in the podcast series. In some embodiments, the episode that is played is the episode of the podcast series that is most related to the search query.

In some embodiments, in accordance with a determination that the first representation is a representation of an episode of a show, the electronic device displays (774), overlaid on the first representation, a second selectable option that is selectable to initiate playback of the episode of the show, such as in FIG. 6SS. For example, displaying a play button over the podcast episode representation that causes playback of that episode of the podcast series. If the user has already partially played the podcast episode, playback is optionally resuming of the playback of the podcast episode, and if the user has not partially played the podcast episode, playback is optionally playback from the beginning of the podcast episode.

In some embodiments, in accordance with a determination that the first representation is a representation of a person, the electronic device forgoes (776) displaying a selectable option overlaid on the first representation, such as in FIG. 6TT. For example, if the representation is a representation of a person, no play button is displayed over the representation on hover (e.g., because there is optionally no functionality in the podcast application of starting playback of a person). Selection of a representation of a person optionally initiates a search for podcast series/episodes related to that person (e.g., series/episodes that the person has hosted, series/episodes that the person has appeared in as a guest, series/episodes that discuss the person, etc.).

The above-described manner of differential overlay behavior allows the electronic device to only display overlay buttons that are available for a given representation, which simplifies the interaction between the user and the electronic device and enhances the operability of the electronic device and makes the user-device interface more efficient (e.g., avoiding display of, and input directed to, non-relevant functions associated with a given representation), which additionally reduces power usage and improves battery life of the electronic device by enabling the user to use the electronic device more quickly and efficiency.

In some embodiments, the electronic device displays (778), via the display device, a user interface for content (e.g., a product page for a podcast series, or a product page for an episode of a podcast series), wherein the user interface for the content includes one or more representations of one or more people associated with the content, including a respective representation of a respective person associated with the content, such as in FIG. 6Y (e.g., the product page includes information about/representations of host(s) of the podcast series/episodes, guest(s) of the podcast series/episodes, etc. The representations of people optionally include an image of the person and a name of the person). In some embodiments, in accordance with a determination that the respective person associated with the content is a host of the content (e.g., a host of the podcast episode, or a host of the podcast series), the respective representation includes a visual indication that indicates that the respective person is a host (780), such as in FIG. 6Y (e.g., the image/name for the person that is a host is displayed with an image or text indicating that the person is a host, such as the text "host"). In some embodiments, the image/name for the person does not include an indication of any particular episode, as hosts are generally hosts for the podcast as a whole rather than for particular episodes. In some embodiments, in accordance with a determination that the respective person associated with the content is a guest in the content, the respective representation includes a visual indication that indicates an episode in which the respective person is the guest in the content (782), such as in FIG. 6Y. For example, the image/name for the person that is a guest is displayed with an image or text indicating in which episode(s) of the podcast series the person was a guest, such as the text "episode 1".

The above-described manner of providing host/episode information with the representations of the people allows the electronic device to provide such information without the need for user input to provide that information, which simplifies the interaction between the user and the electronic device and enhances the operability of the electronic device and makes the user-device interface more efficient (e.g., by reducing the need for the user to provide input to display such information, or to manually search the podcasts to identify that information), which additionally reduces power usage and improves battery life of the electronic device by enabling the user to use the electronic device more quickly and efficiency.

Figure 6Z:
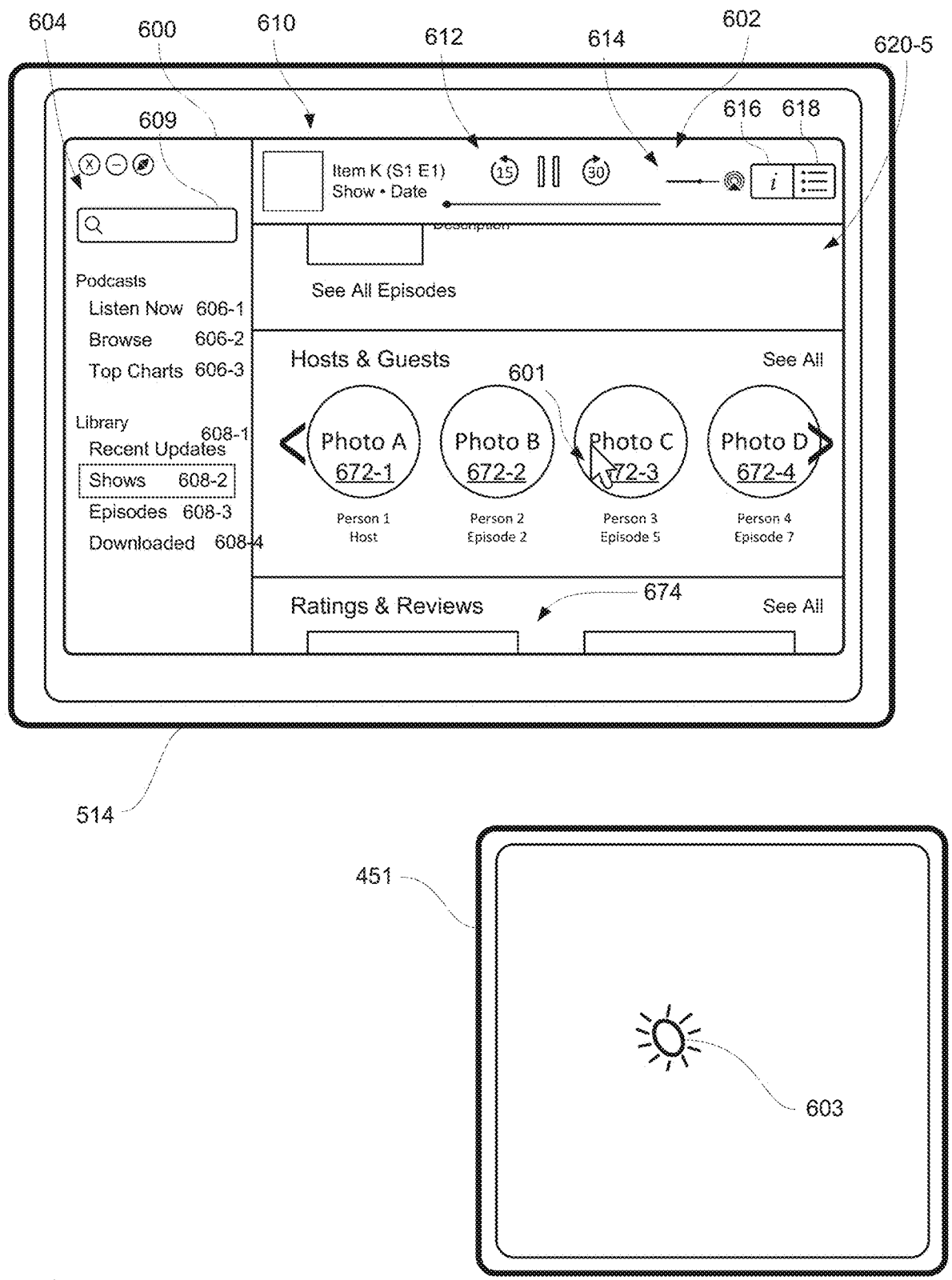
Figure 6A:
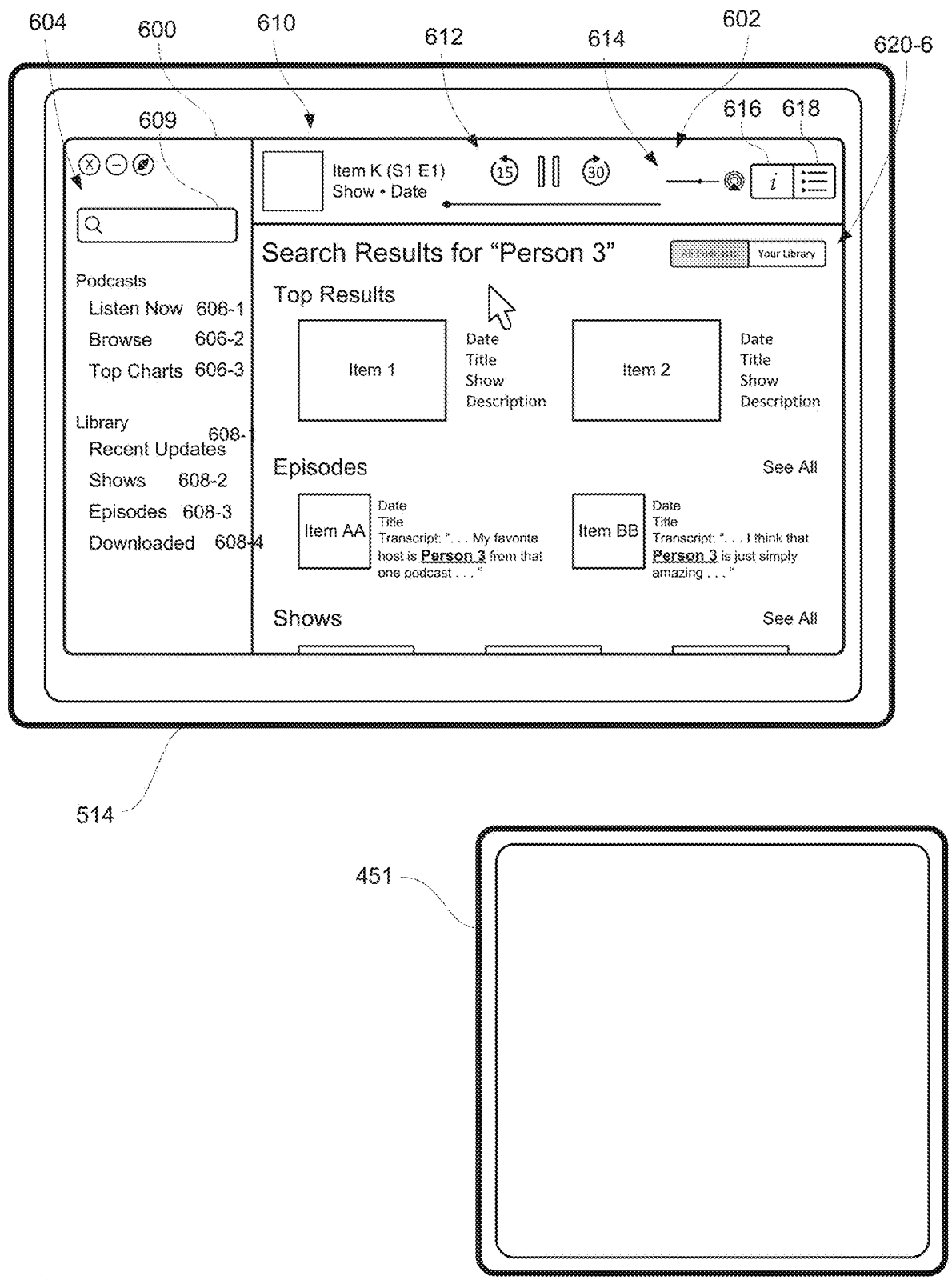
Figure 6B:
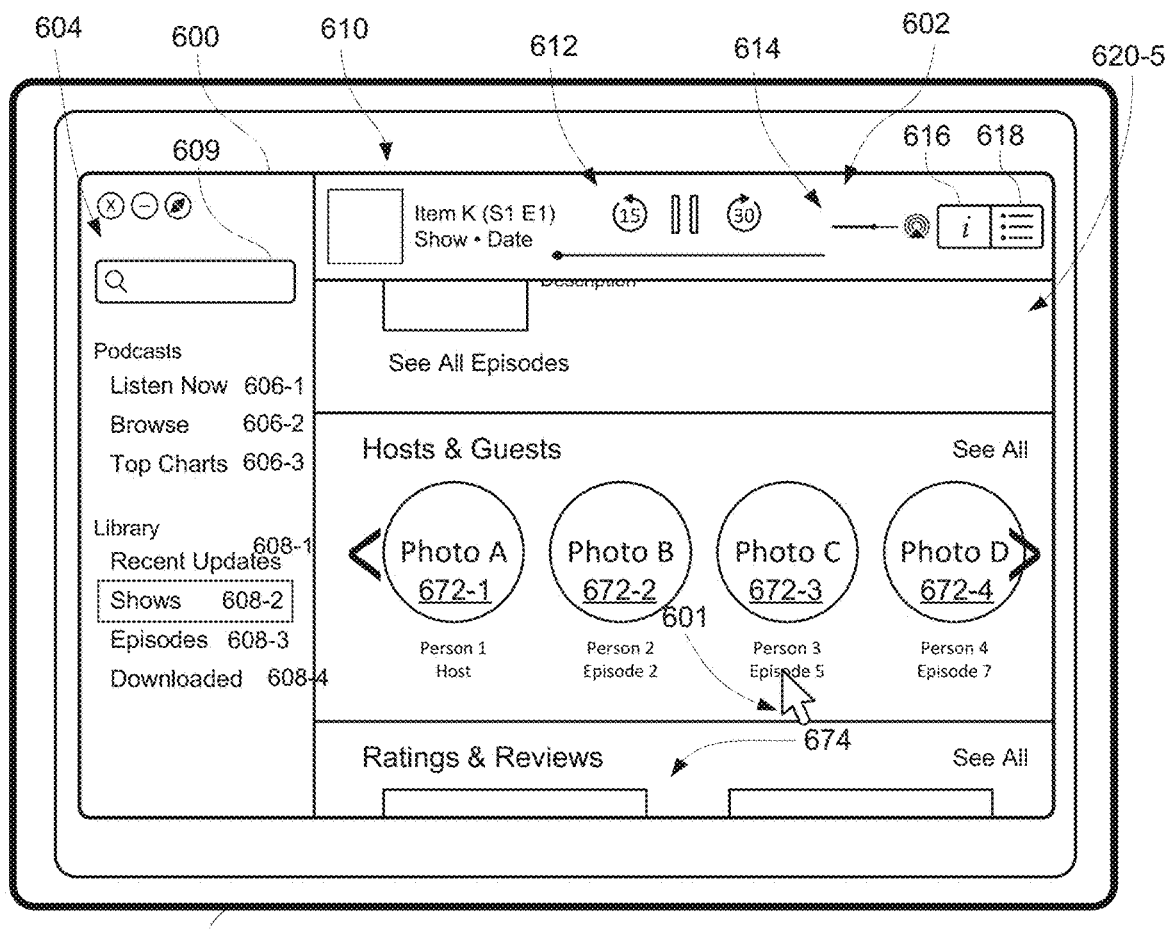
Figure 6B:
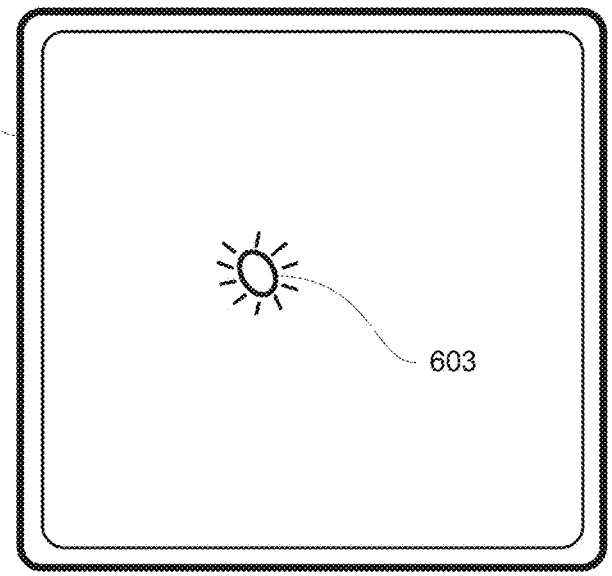
Figure 6C:
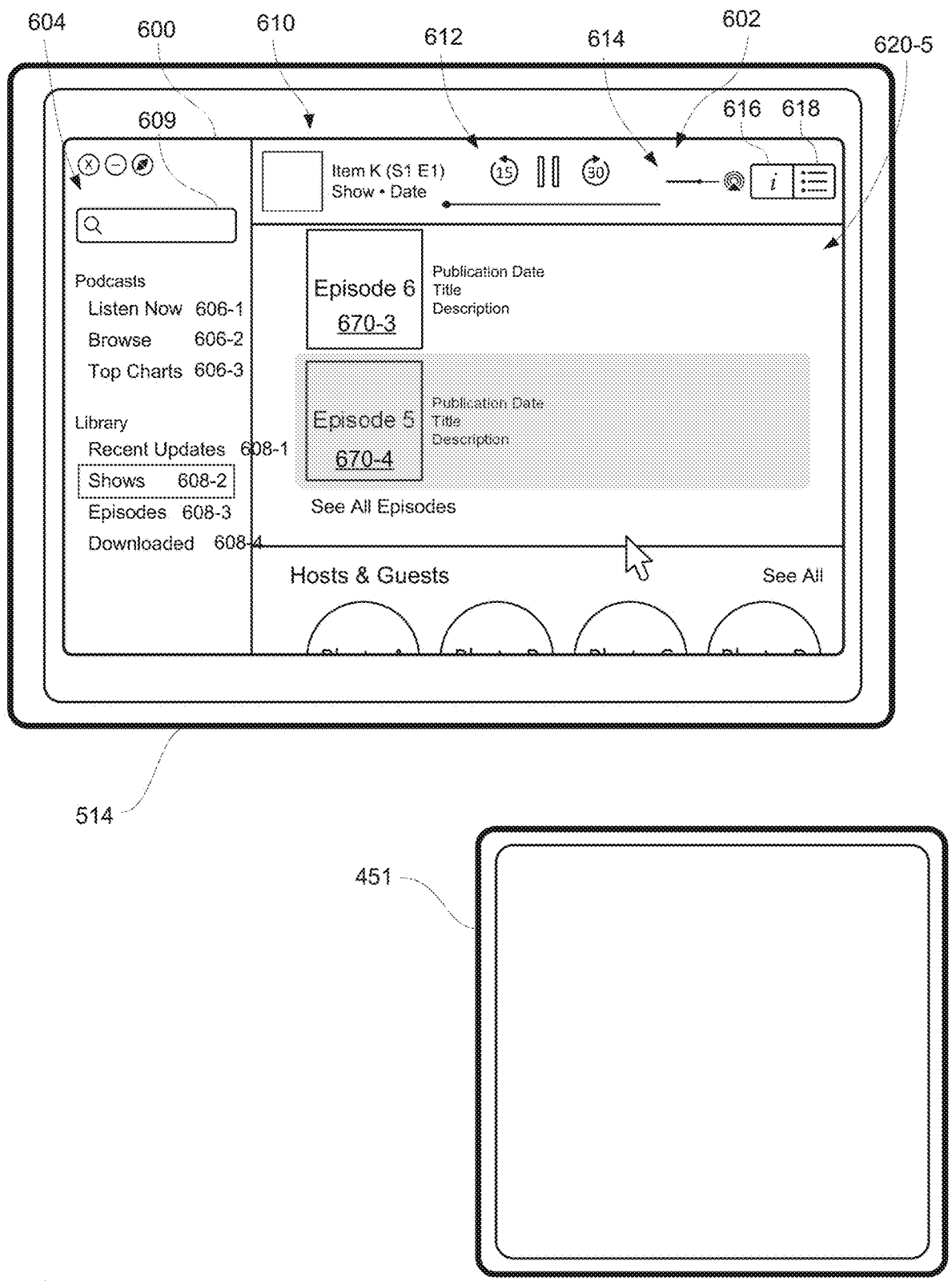
Figure 6D:
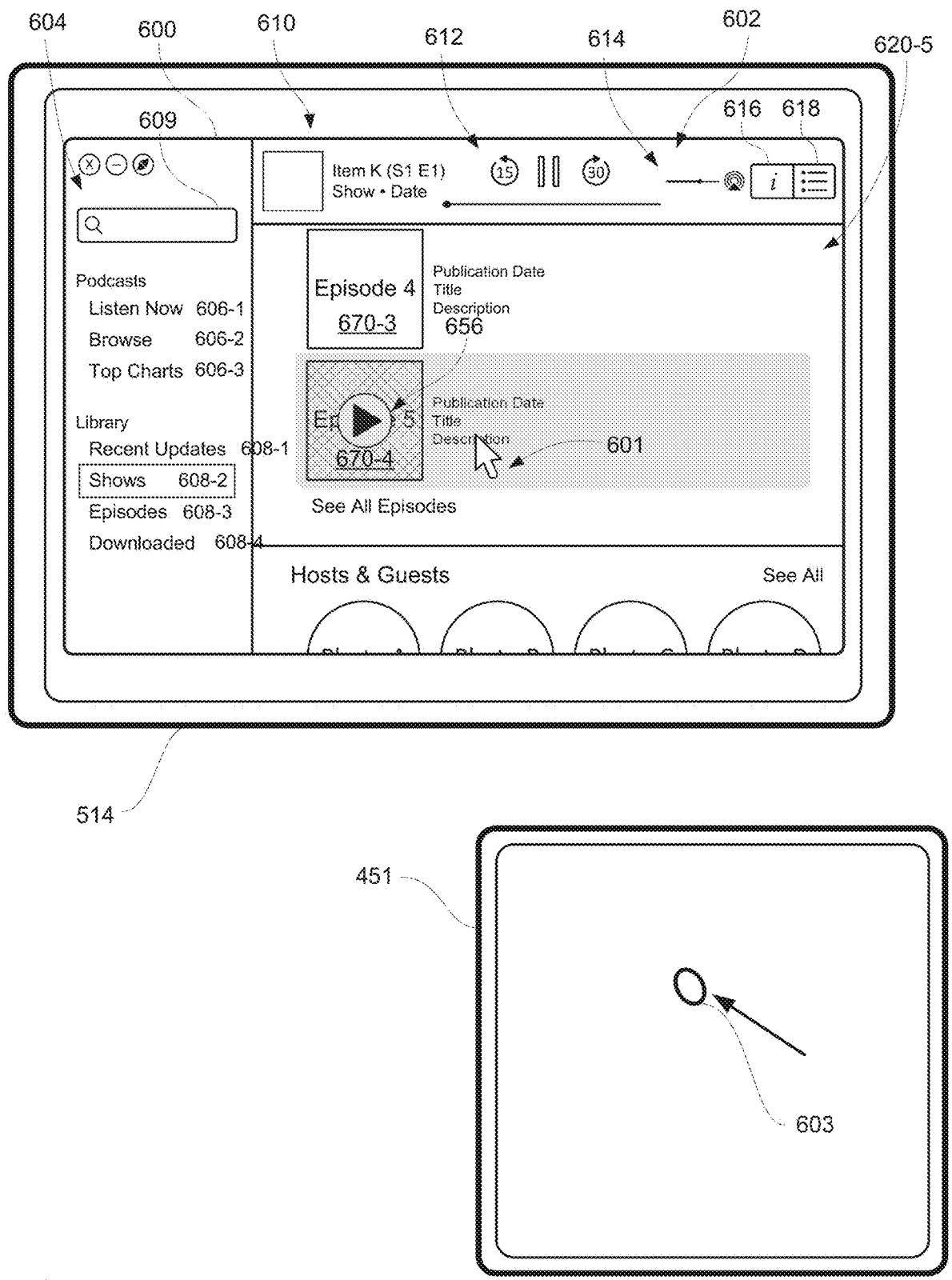
Figure 6E:
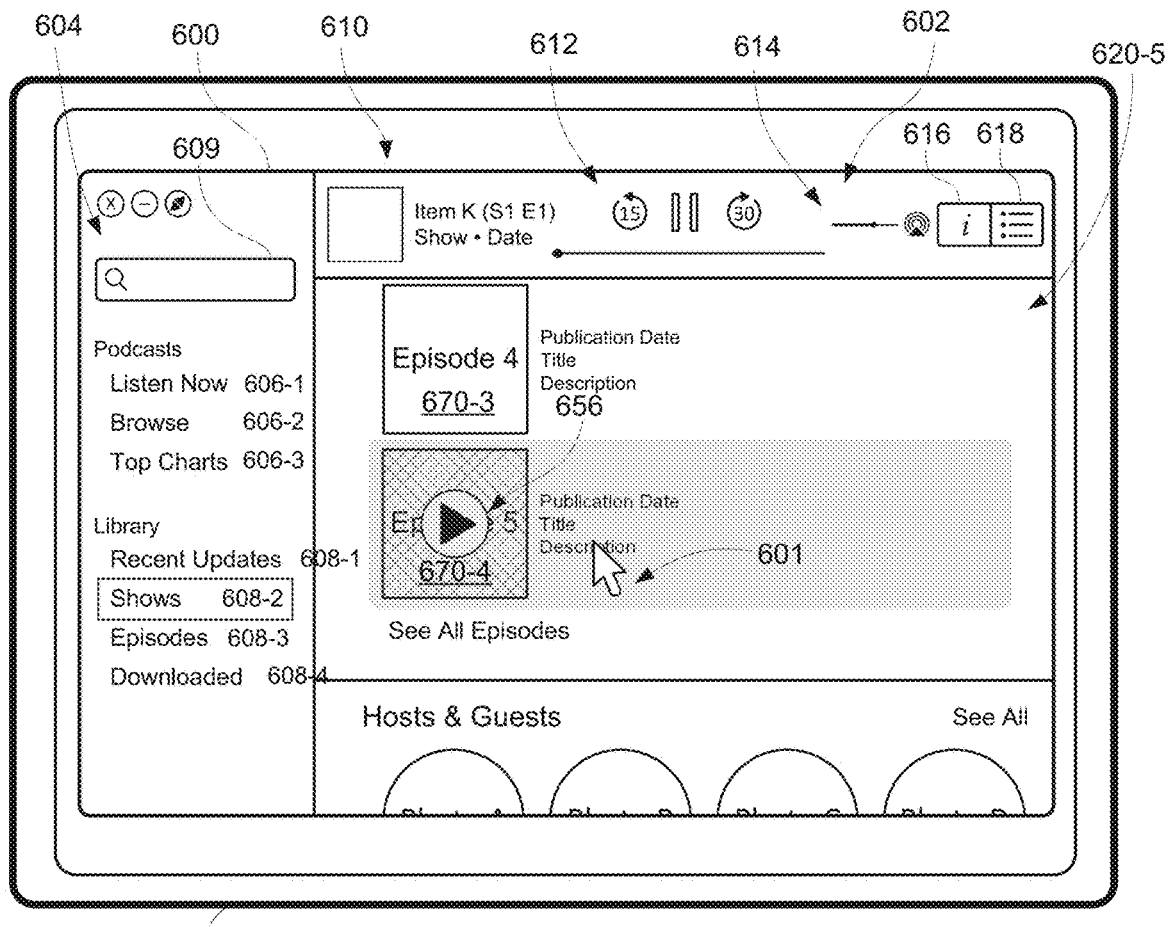
Figure 6E:
Figure 6F:
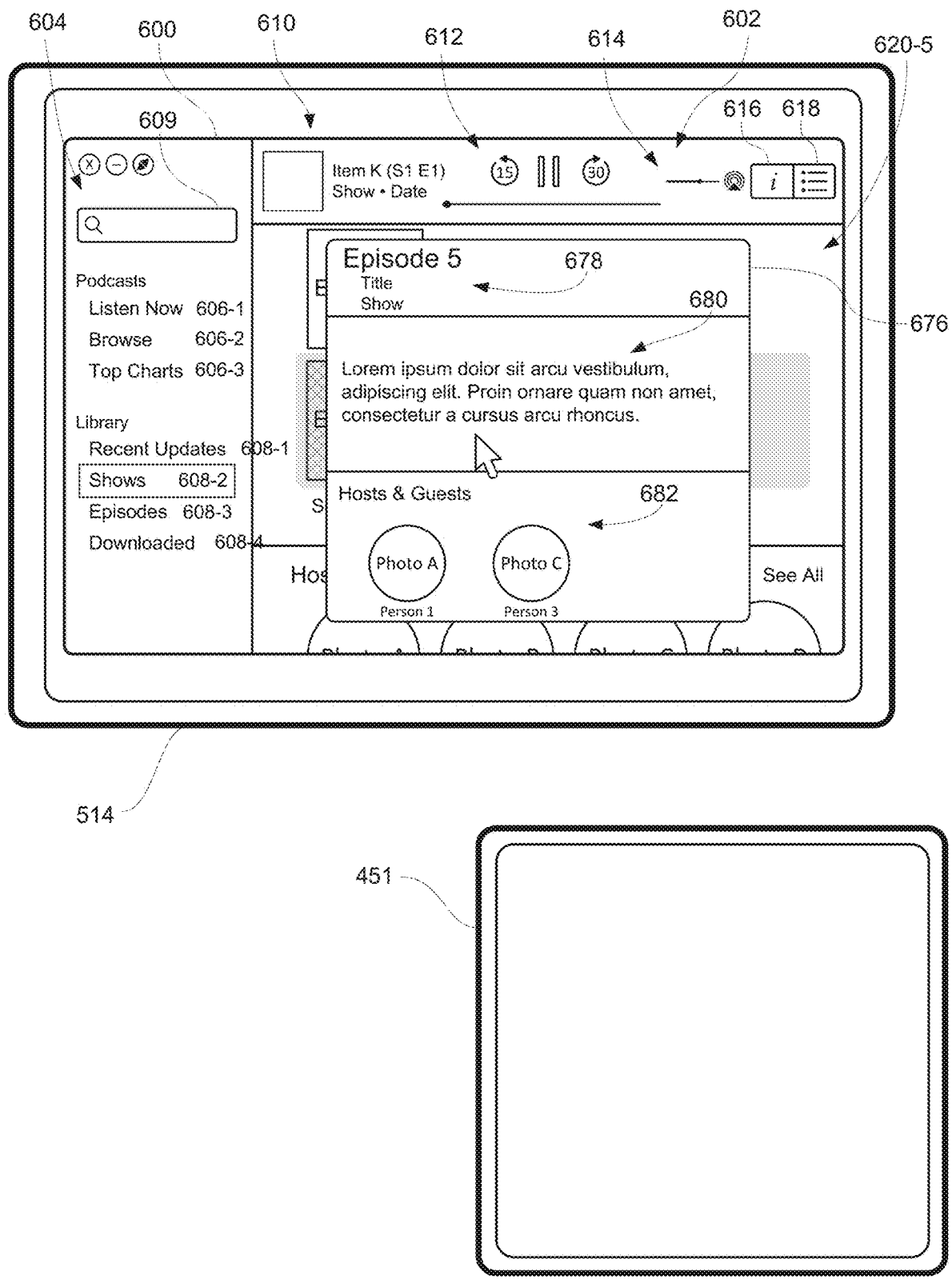
Figure 6G:
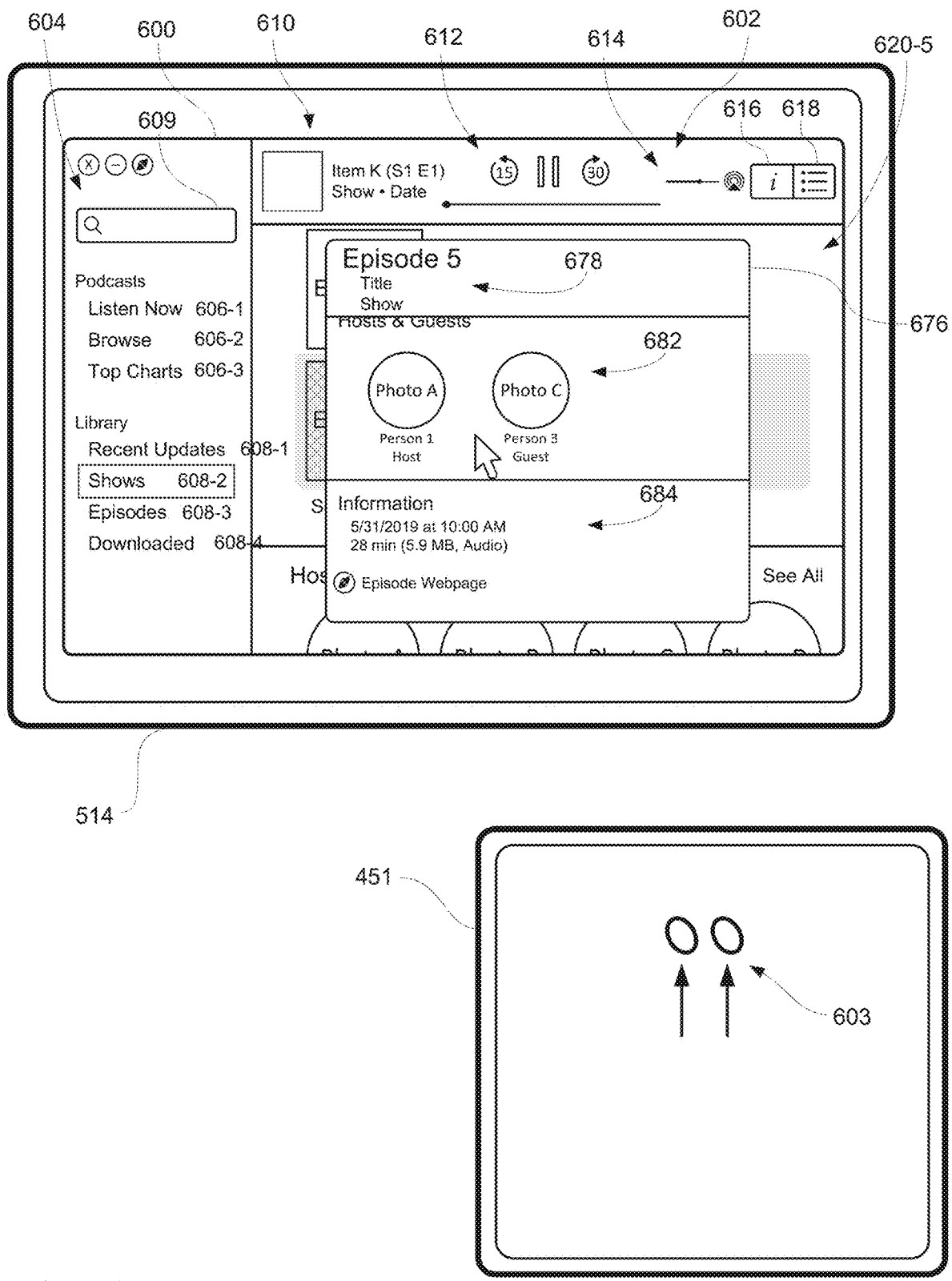
Figure 6H:
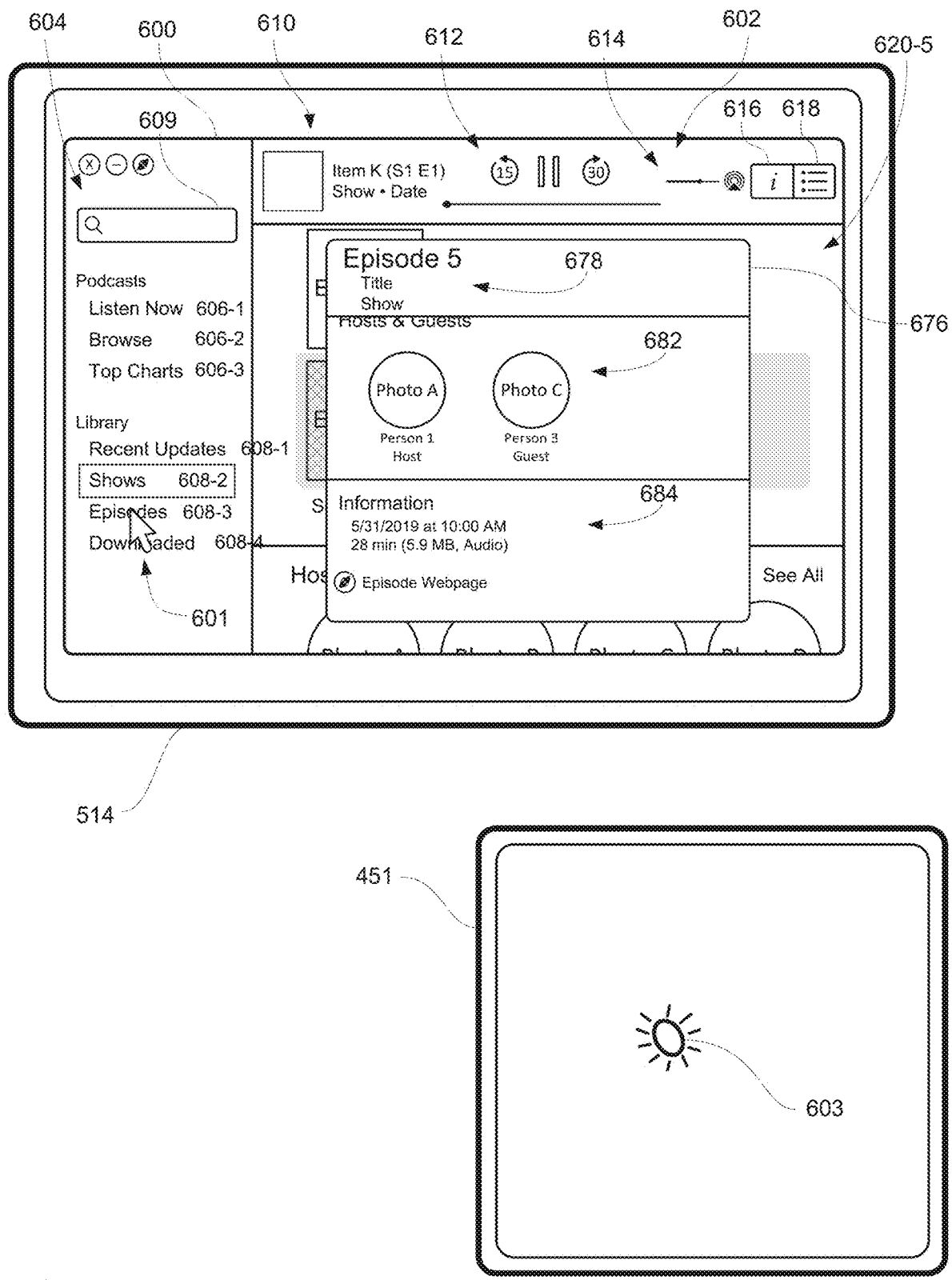
Figure 6I:
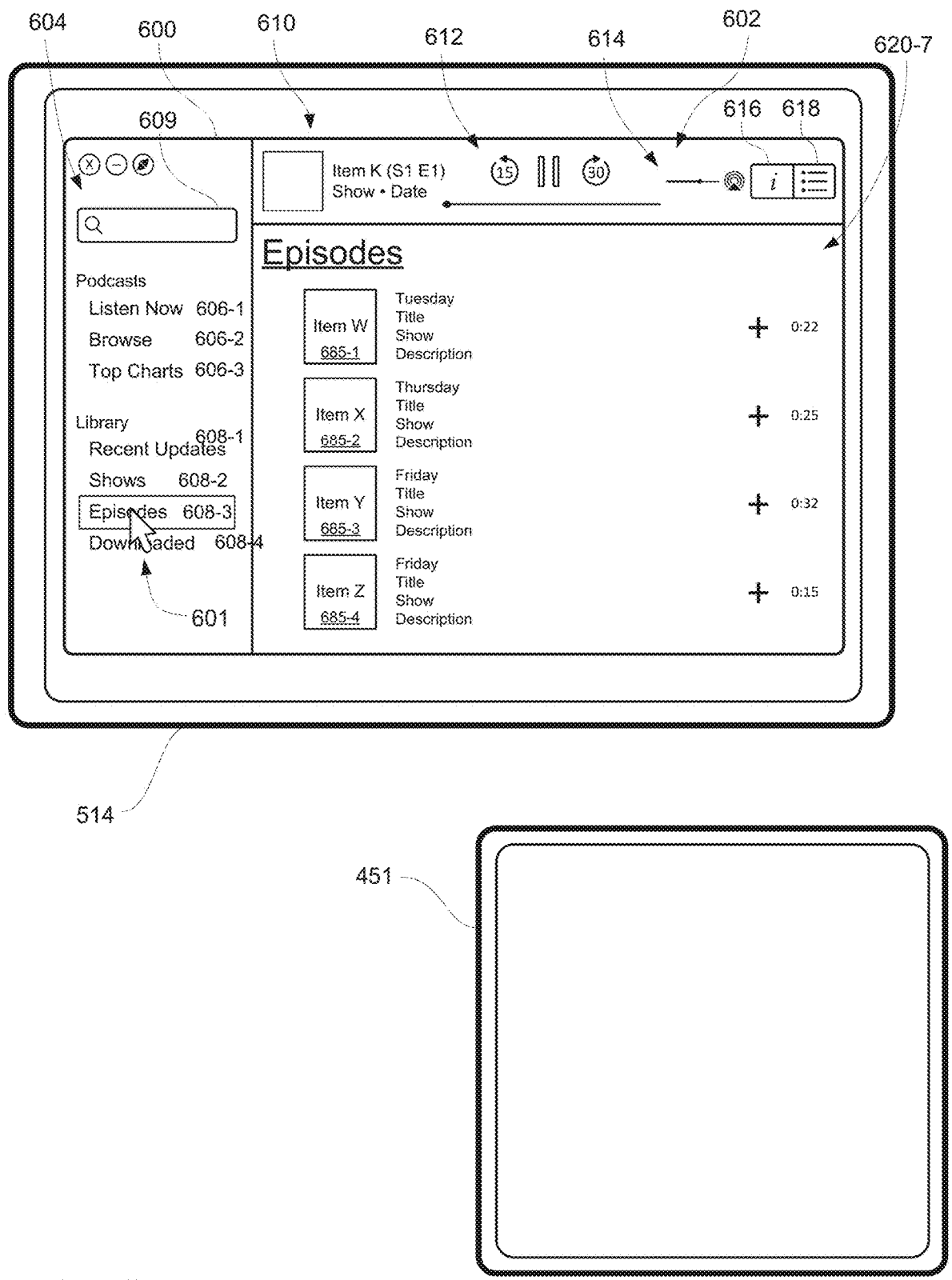
Figure 6J:
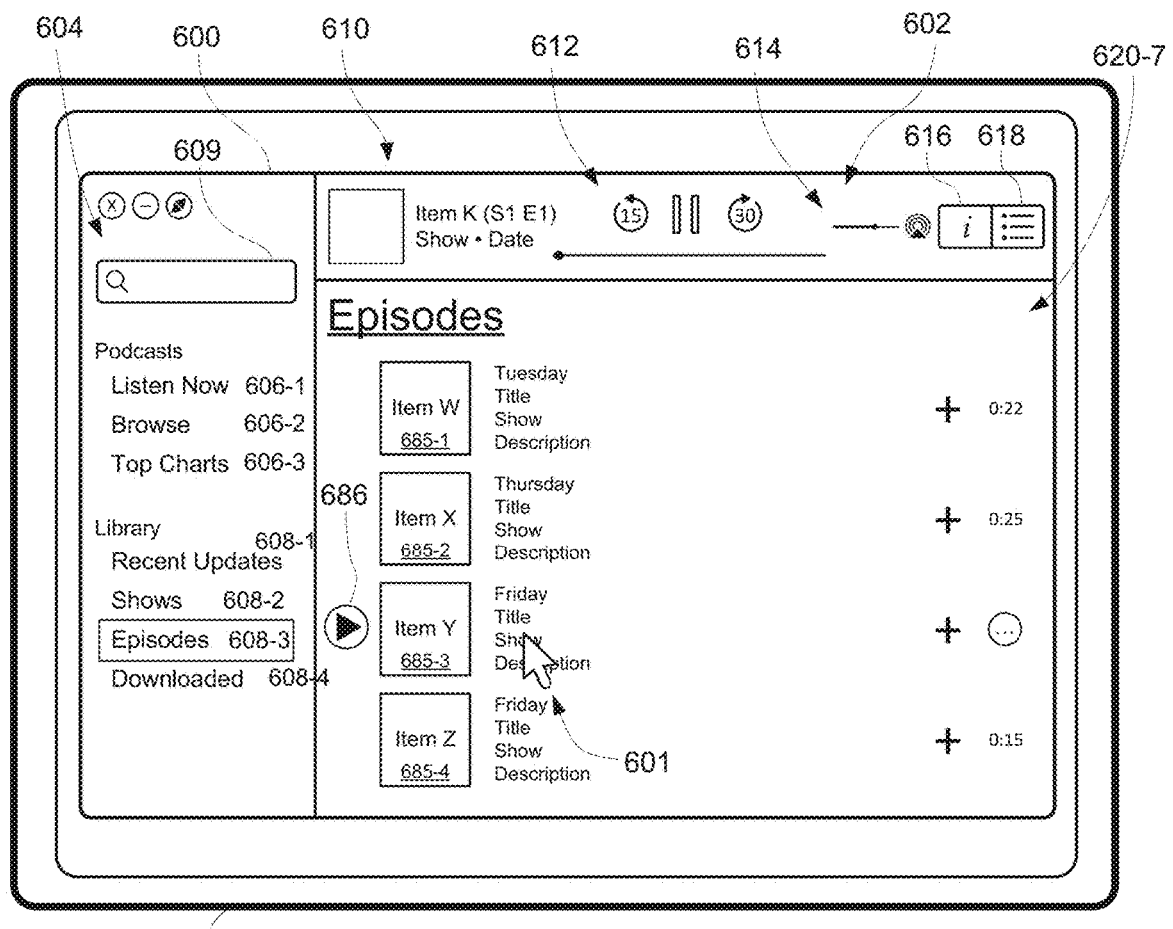
Figure 6K:
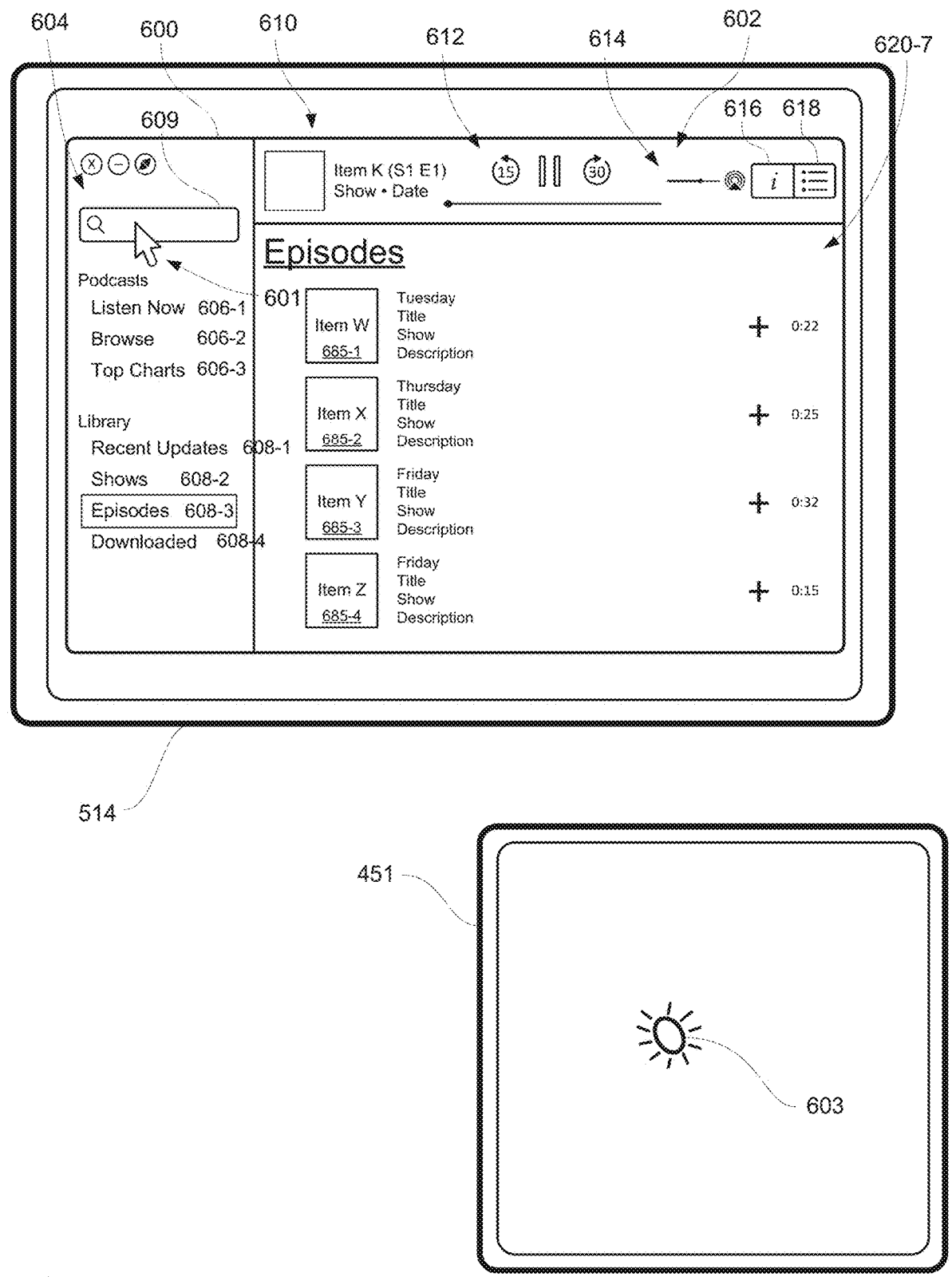
Figure 6L:
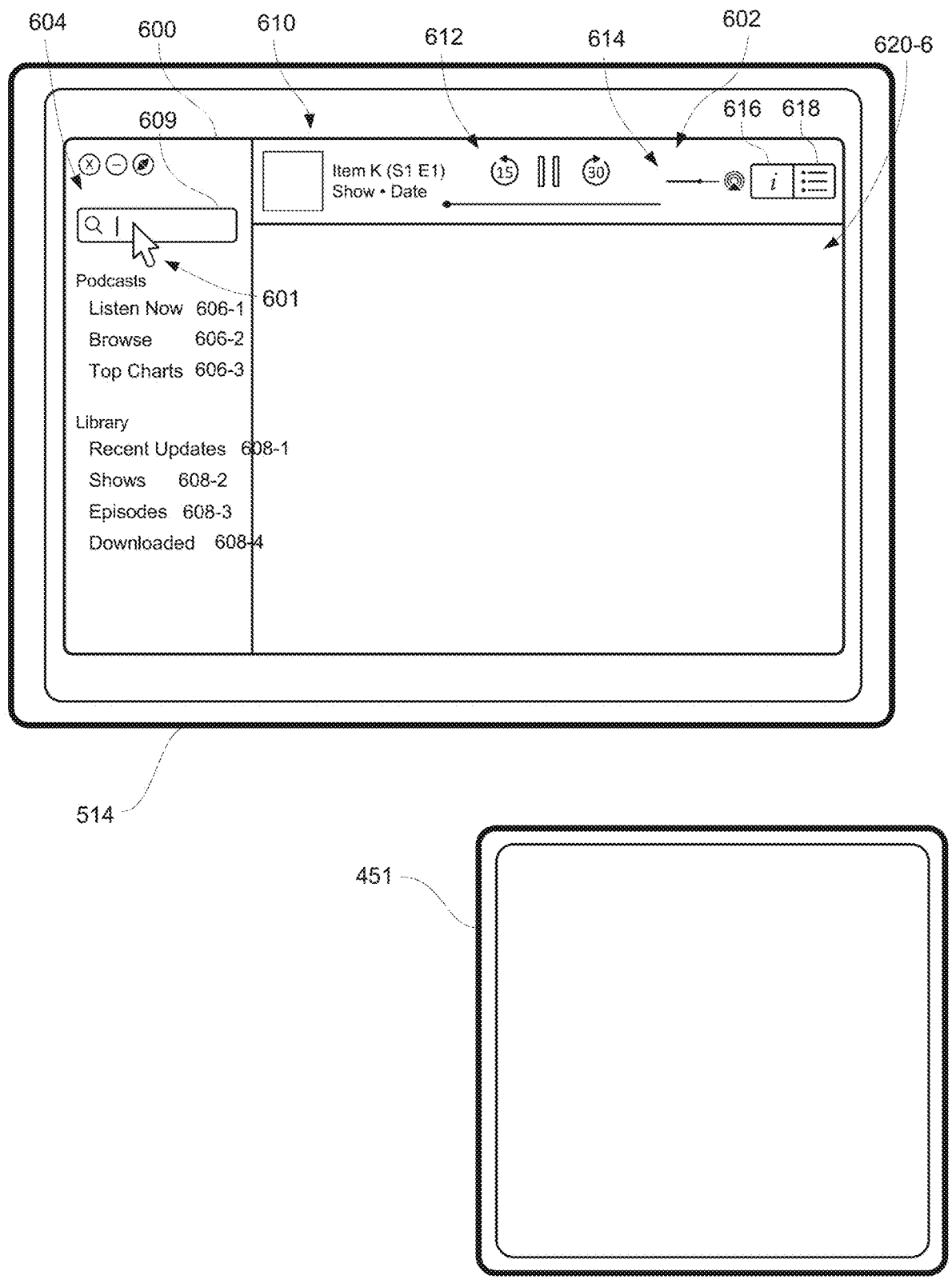
Figure 6M:
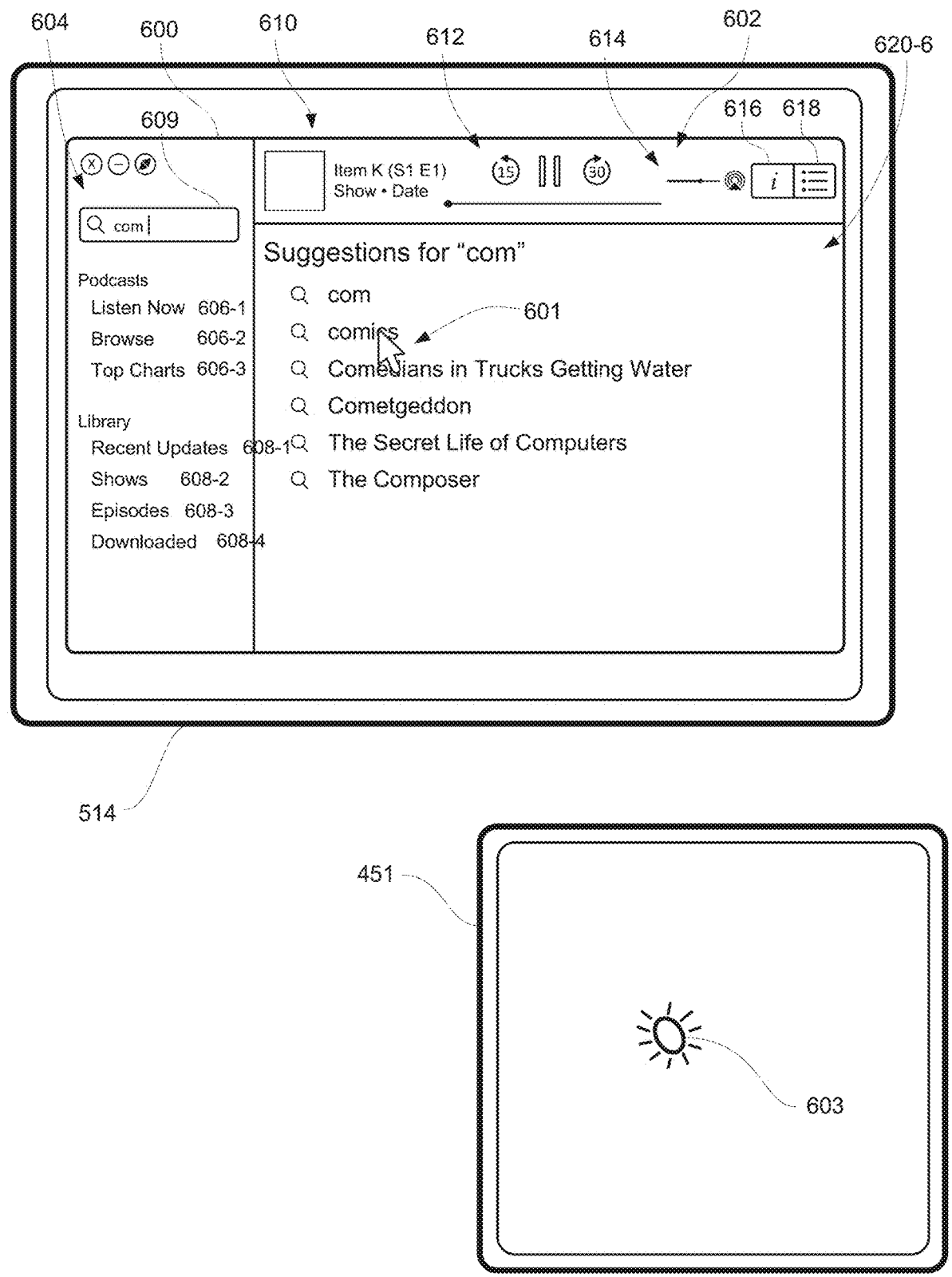
Figure 6N:
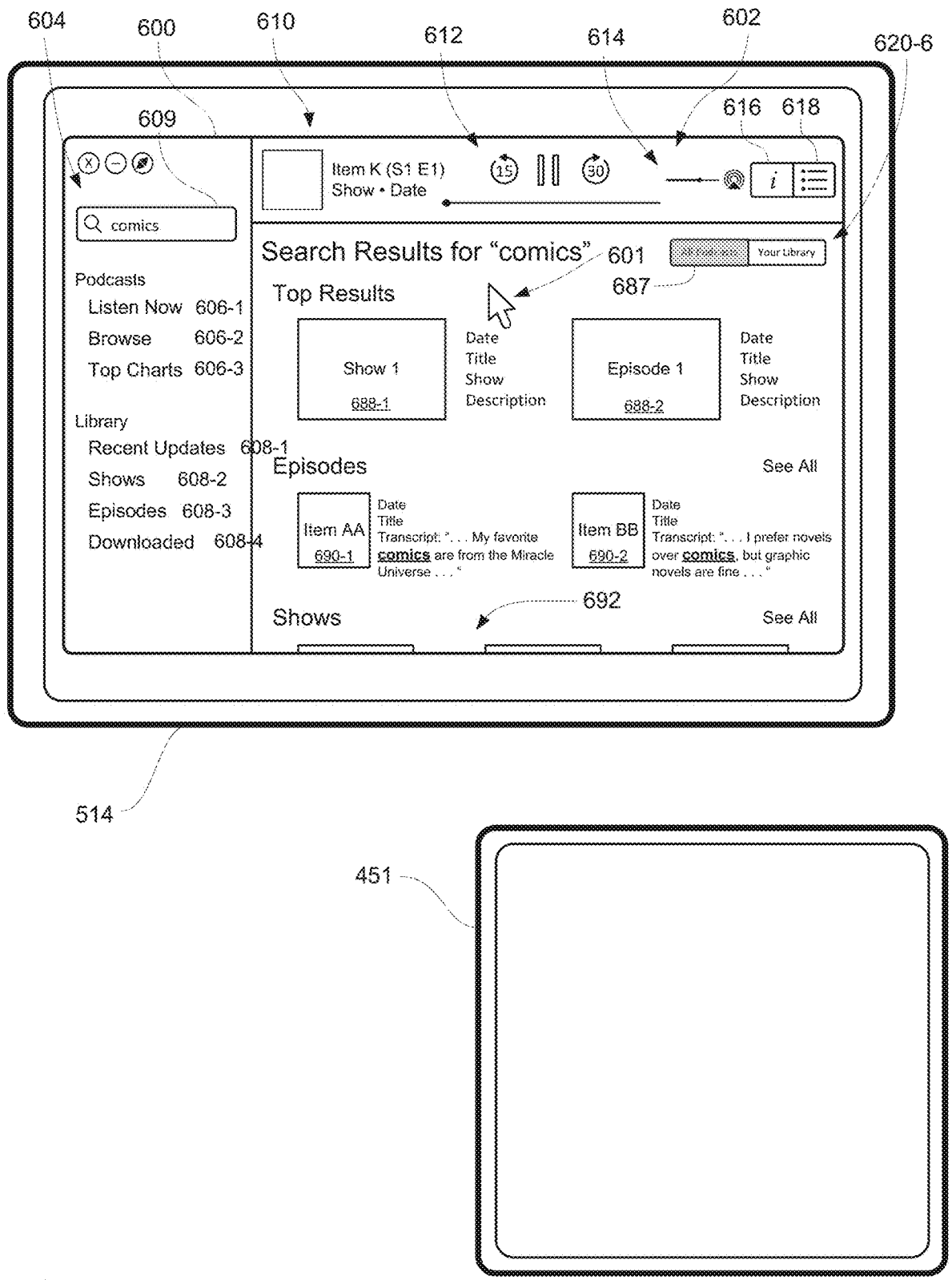
Figure 6O:
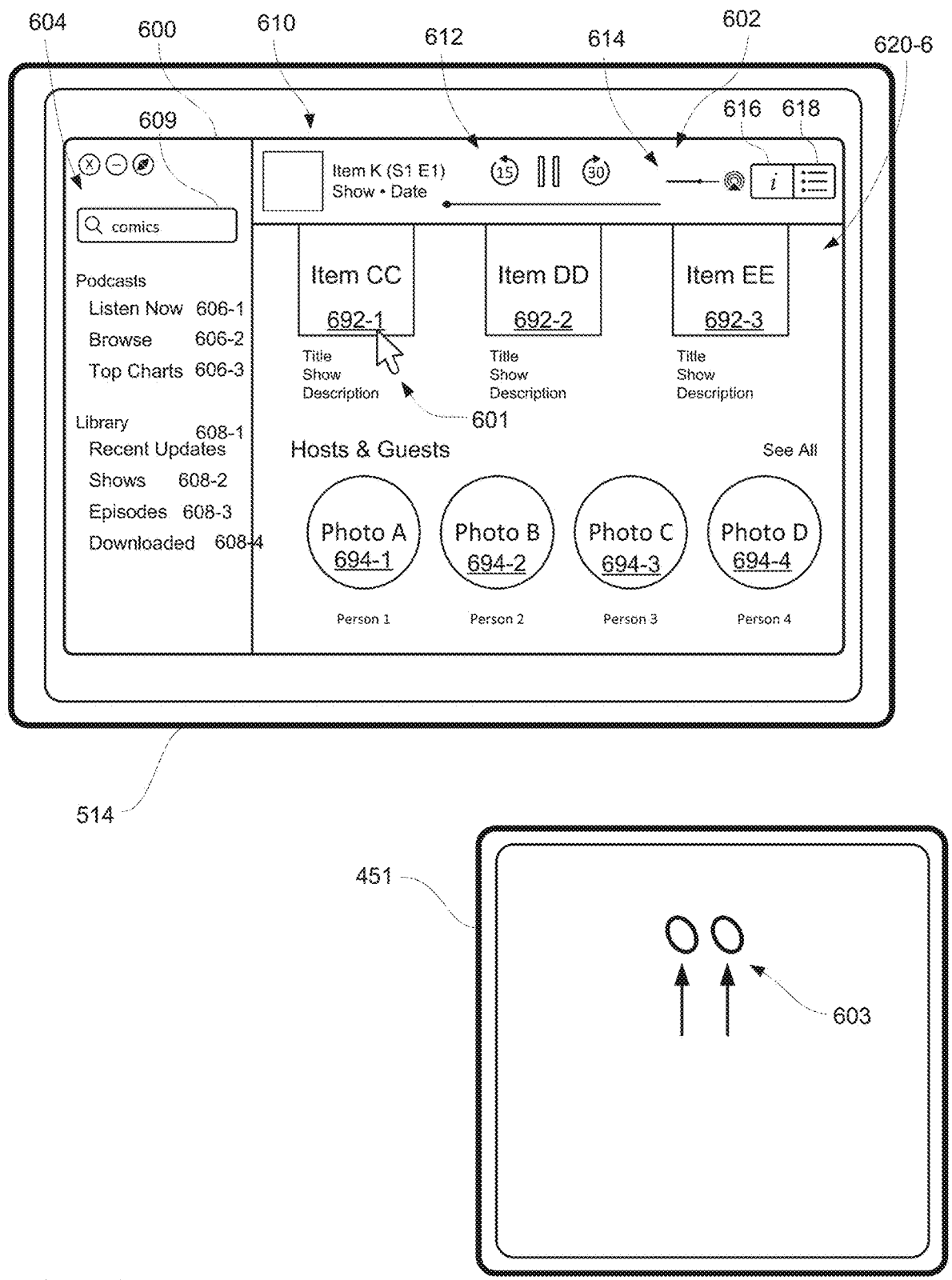
Figure 6P:
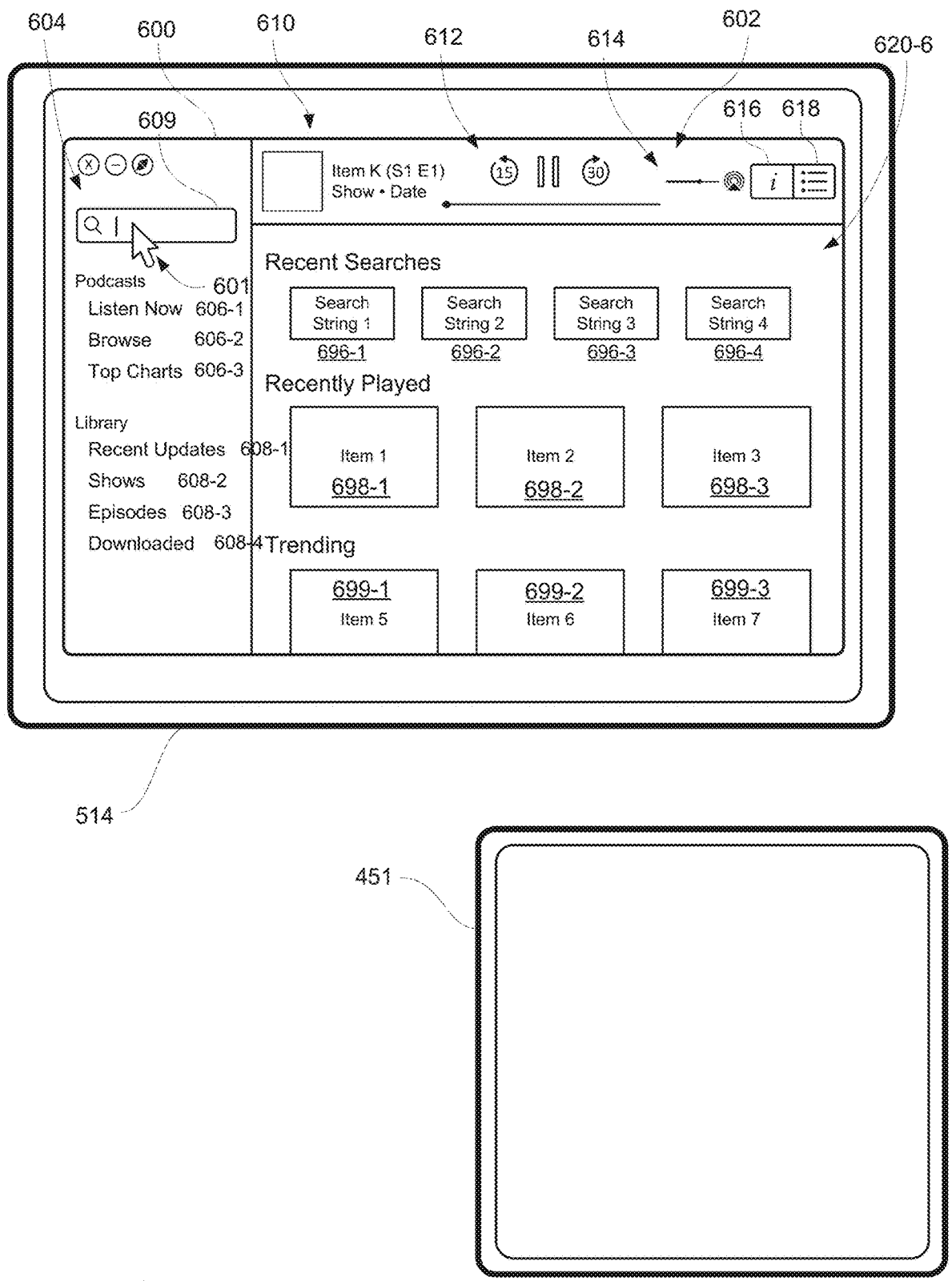
Figure 6Q:
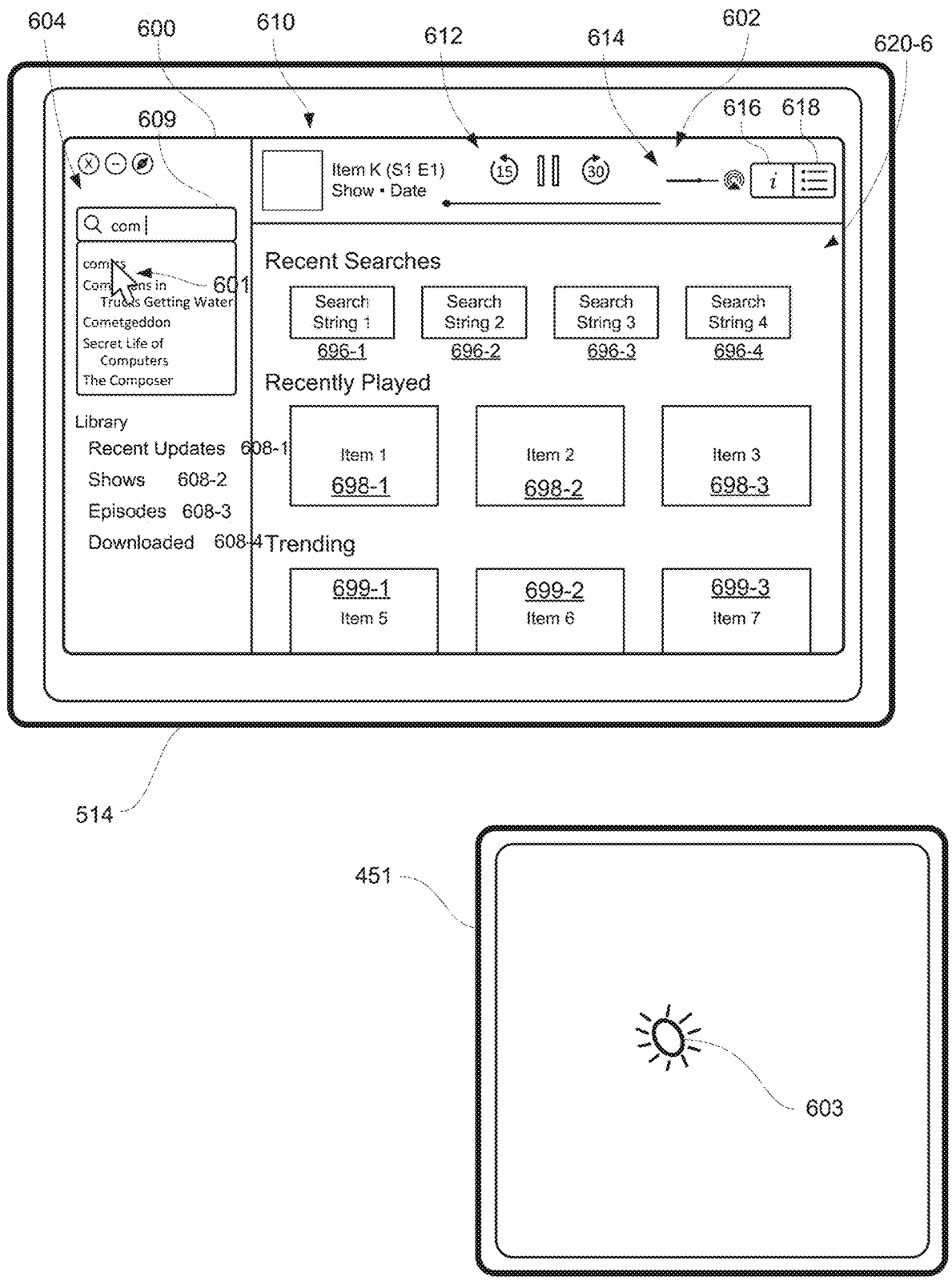
Figure 6R:
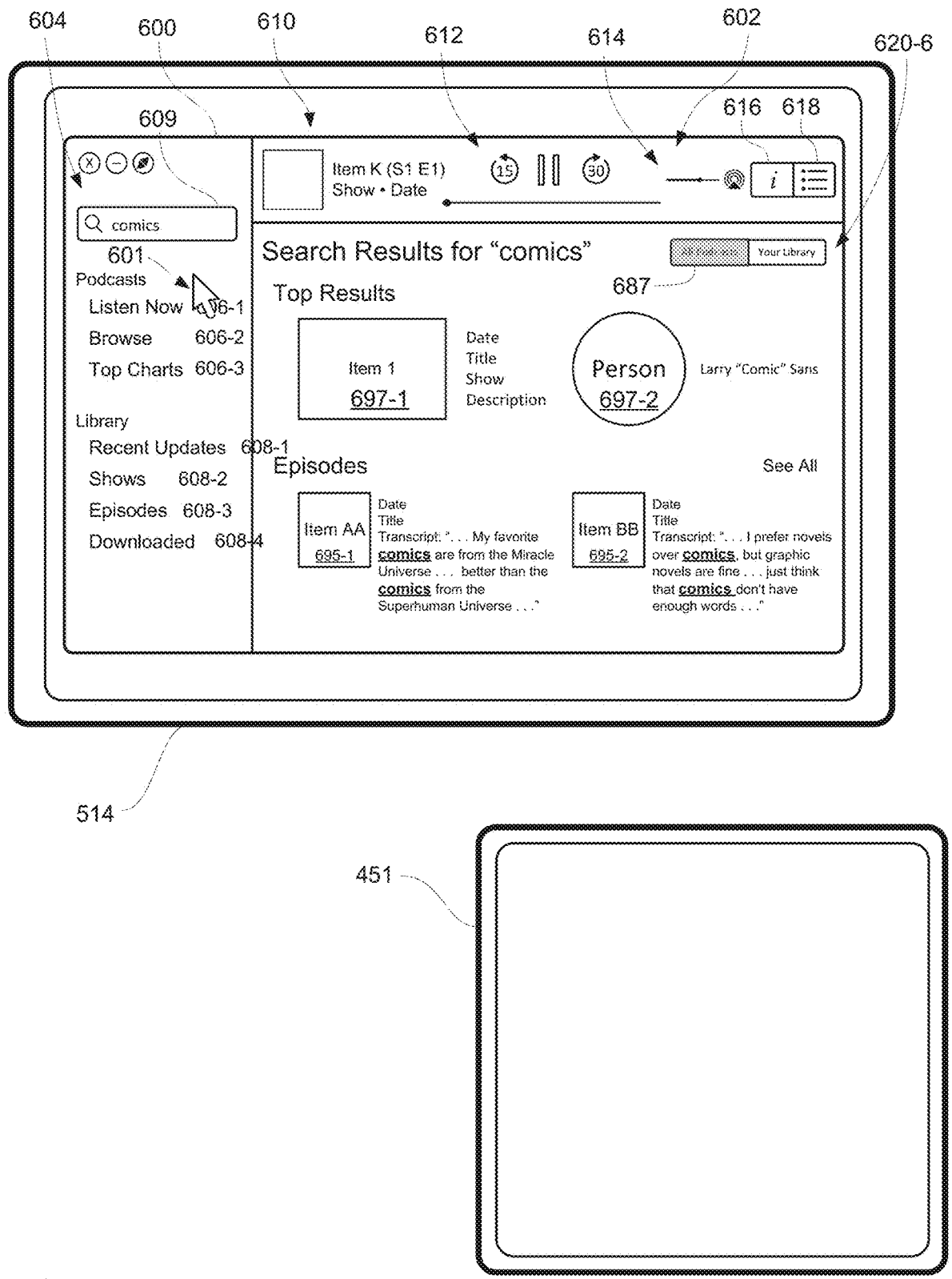
Figure 6S:
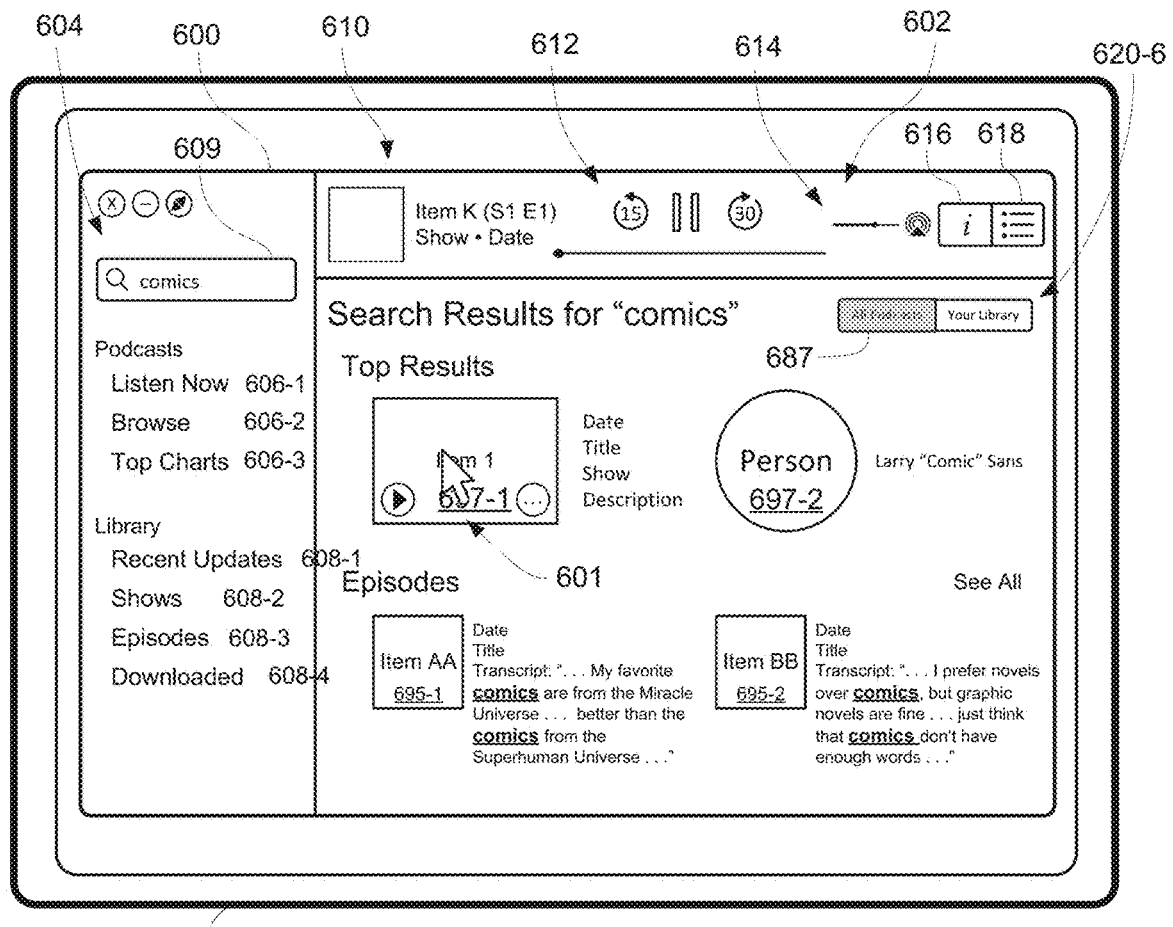
Figure 6T:
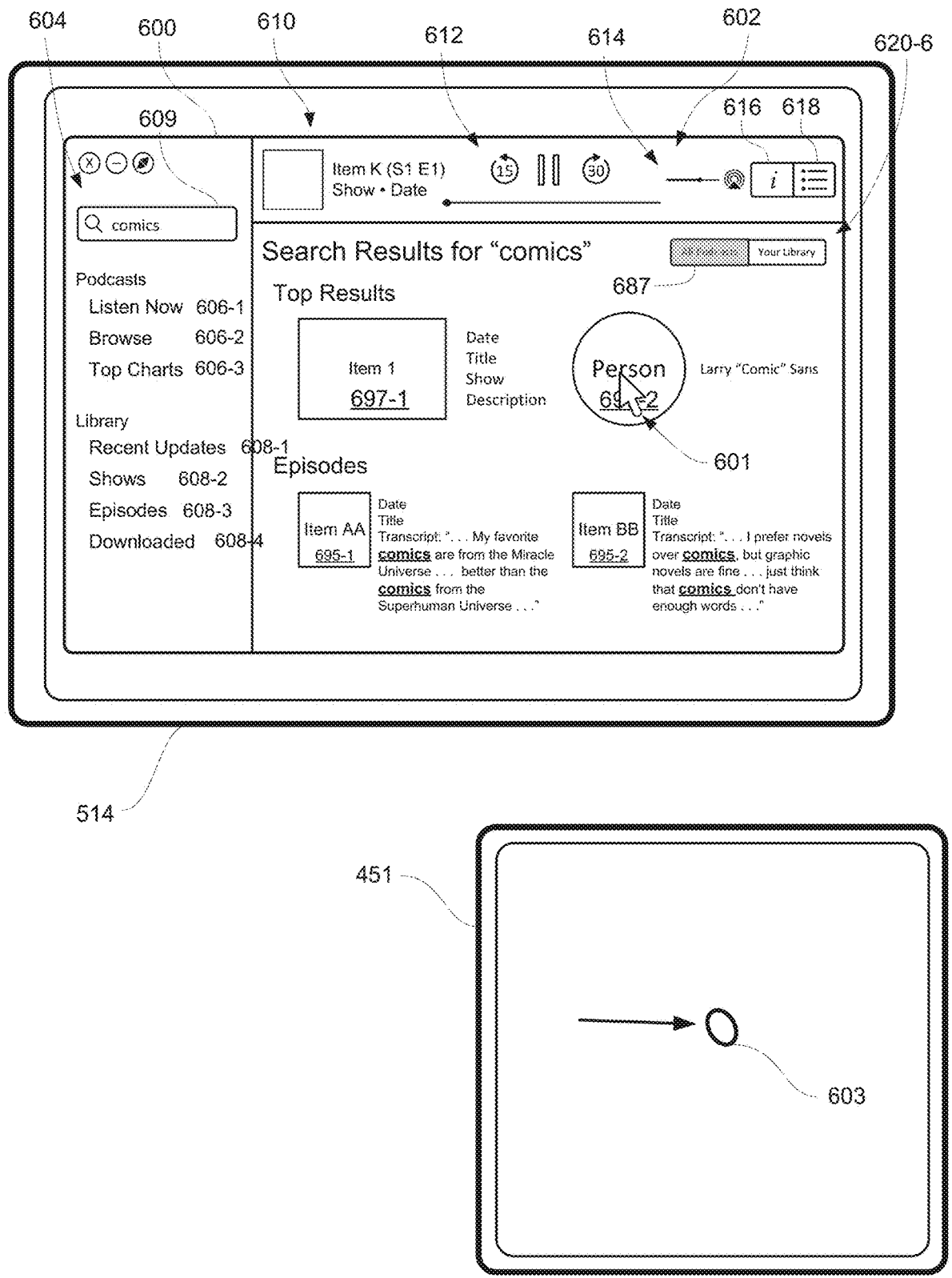
Figure 6U:
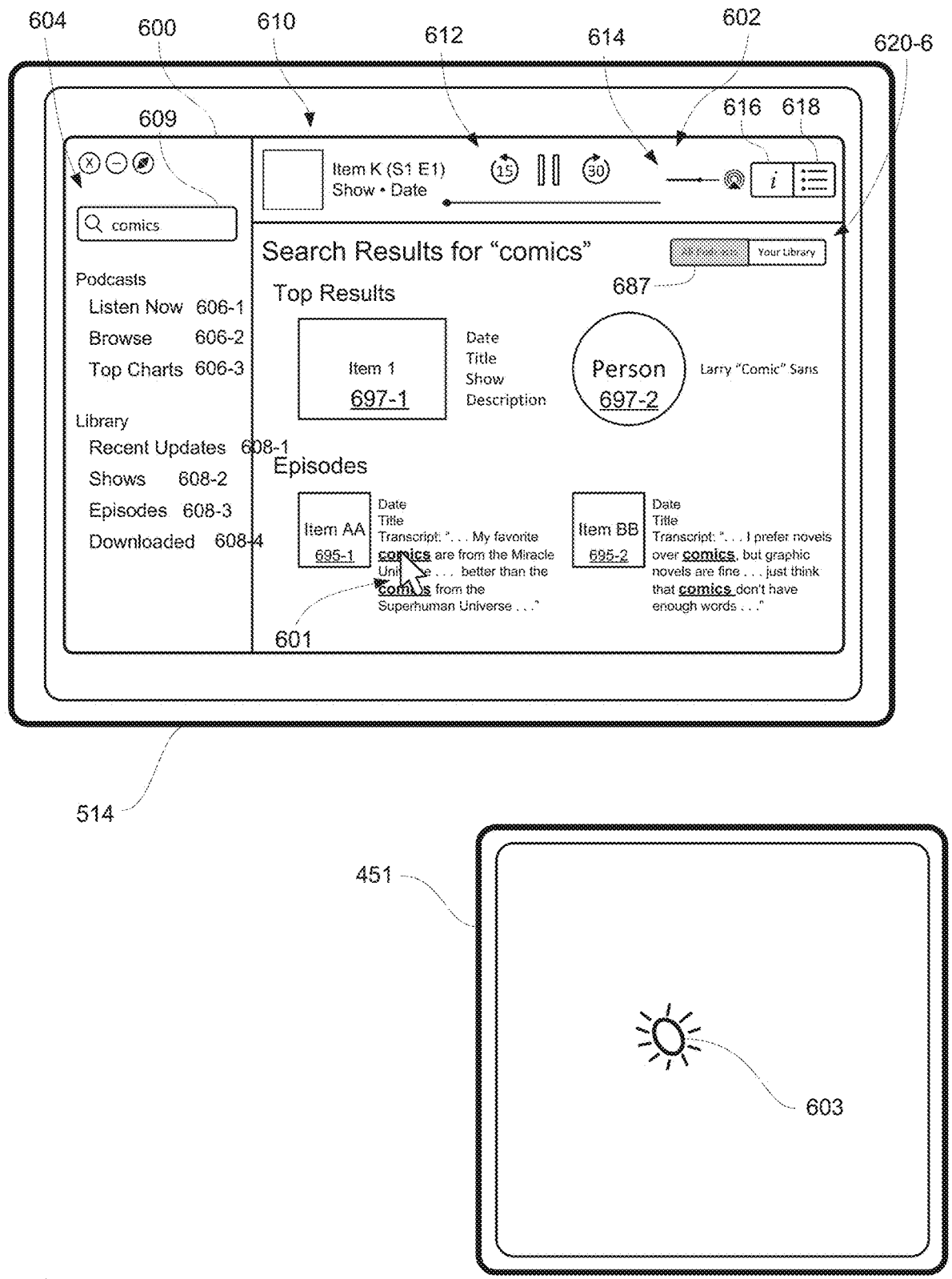
Figure 6V:
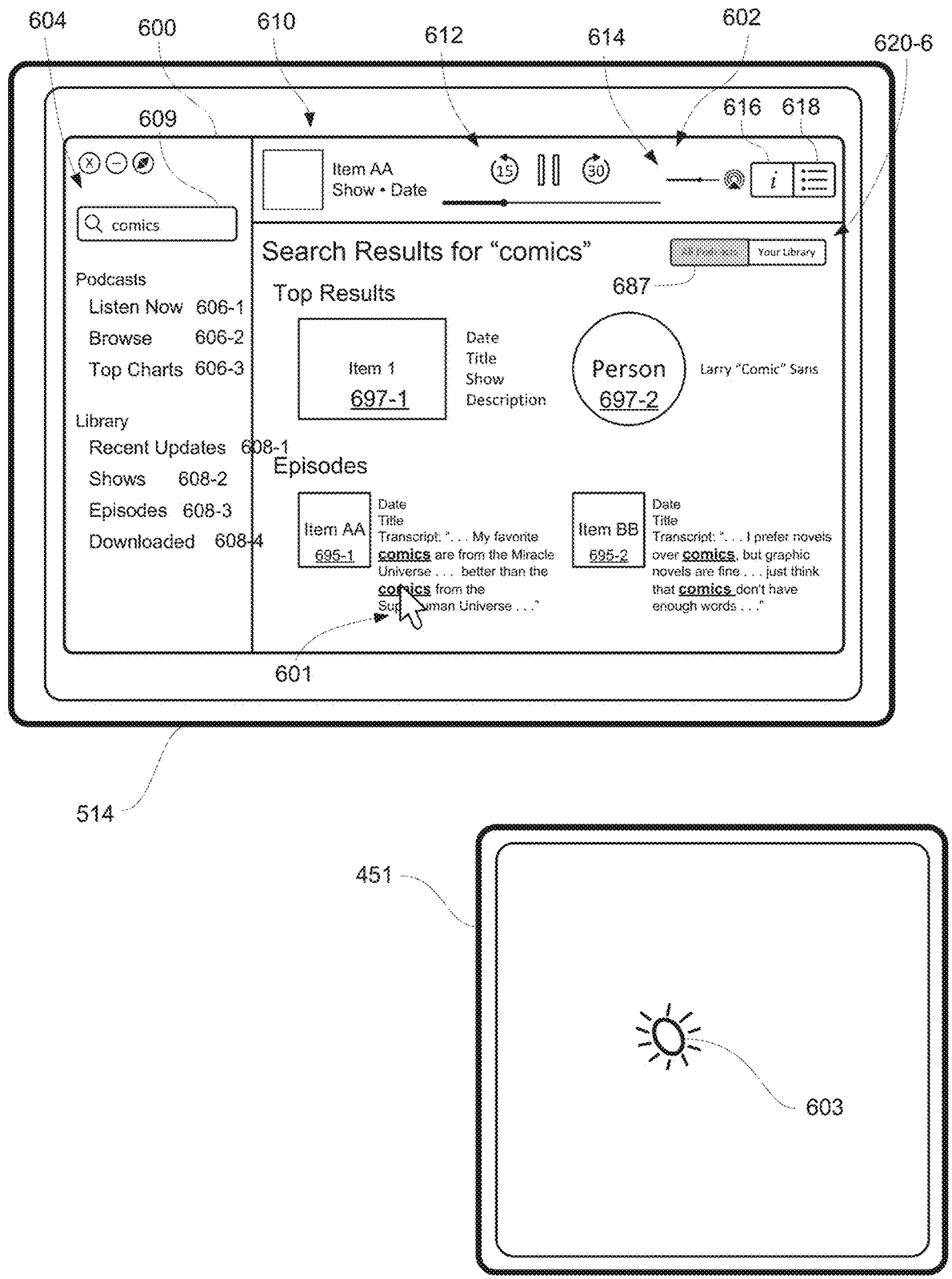
Figure 6W:
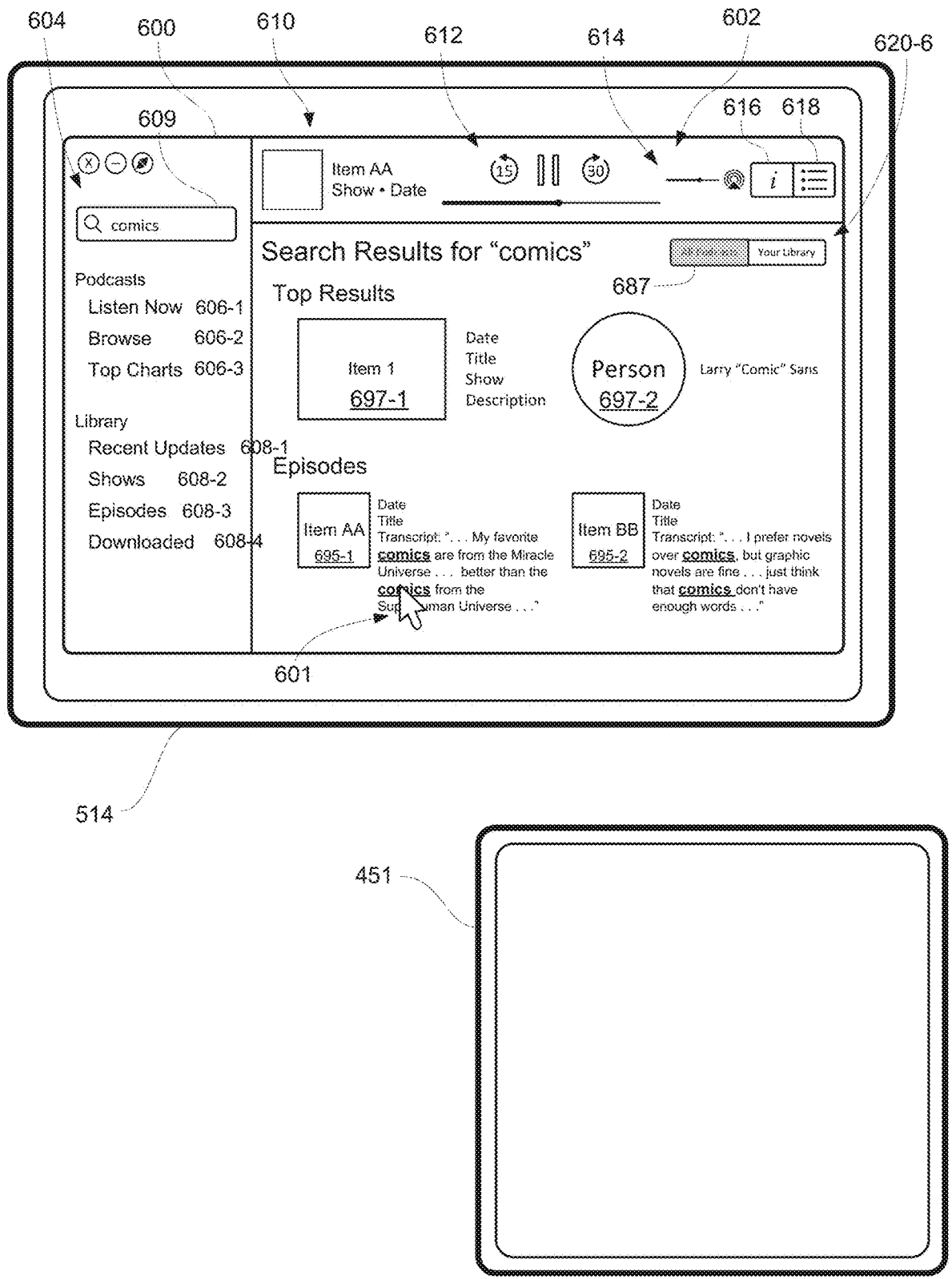
Figure 7A:
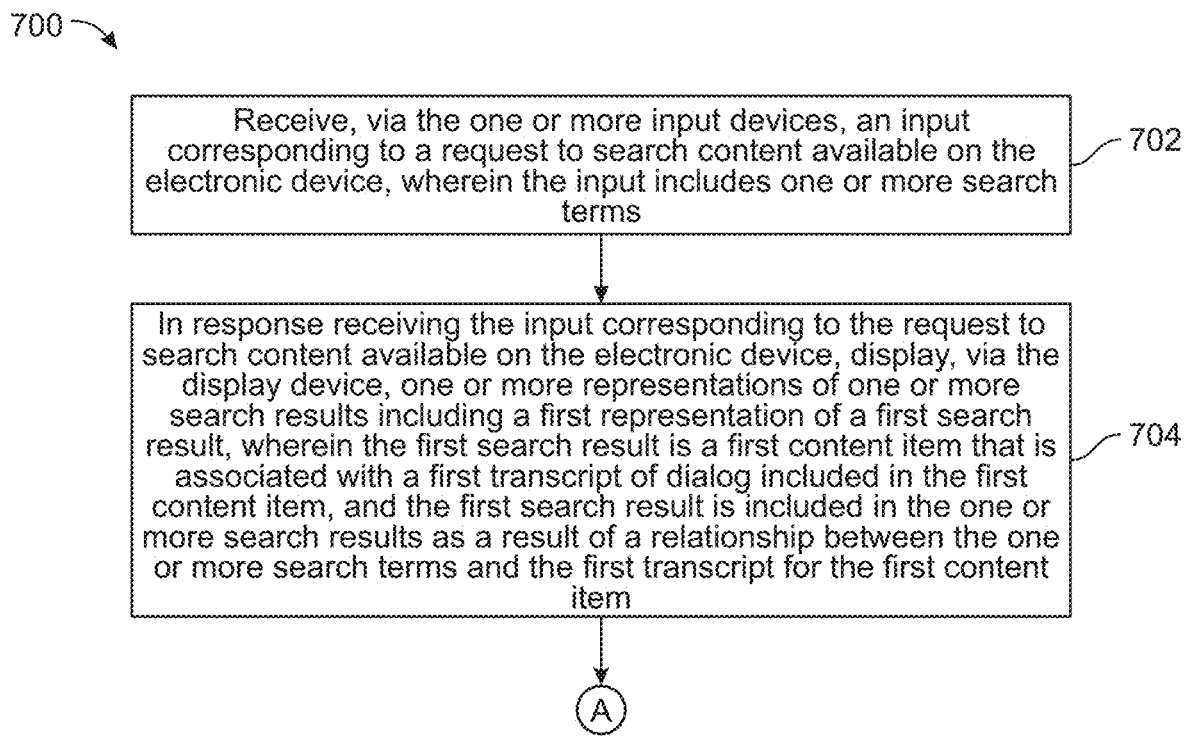
FIGS. 7A-7G are flow diagrams illustrating a method of searching for content associated with a podcast in accordance with some embodiments of the disclosure.
Figure 7B:
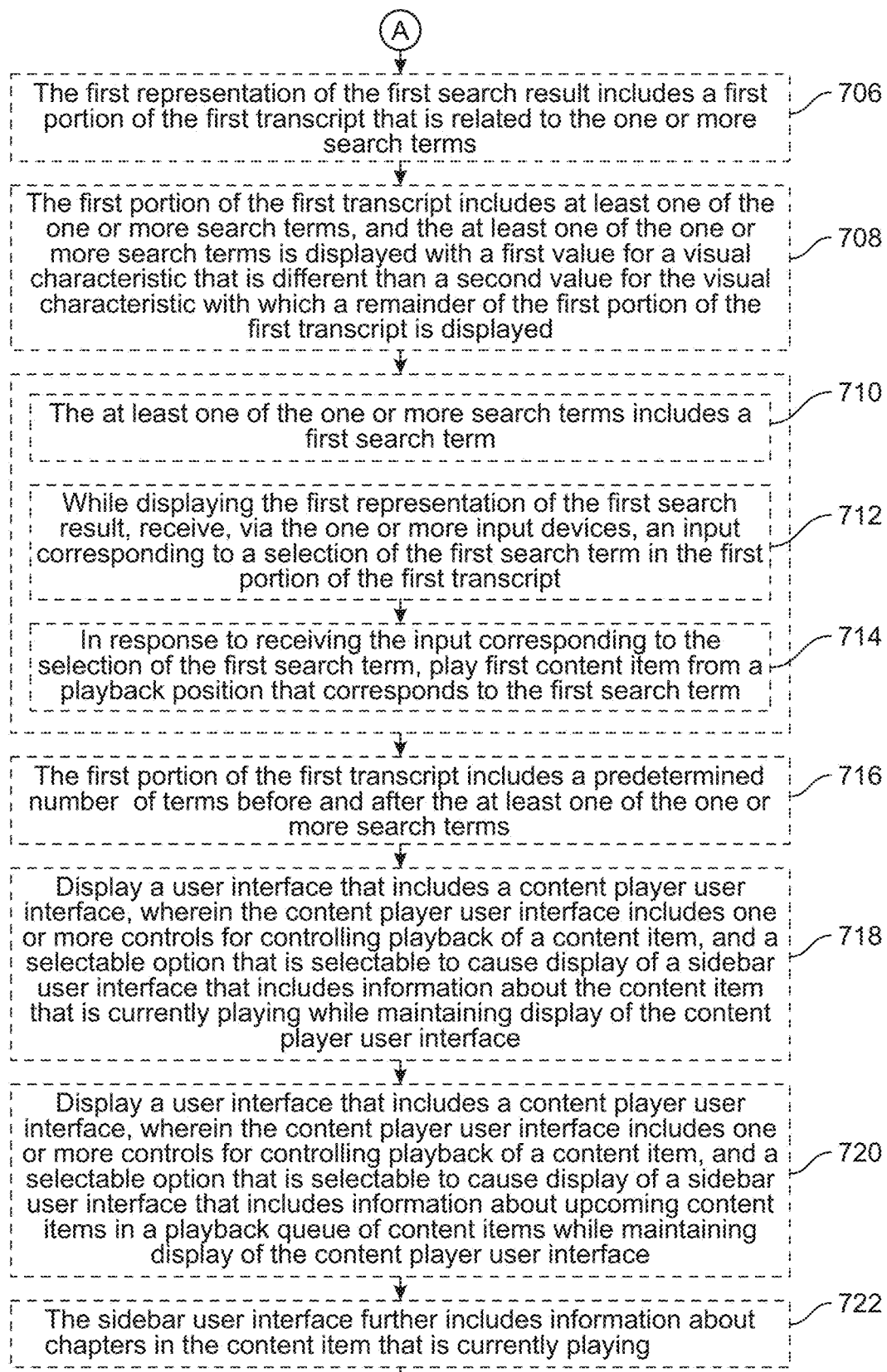
Figure 7C:
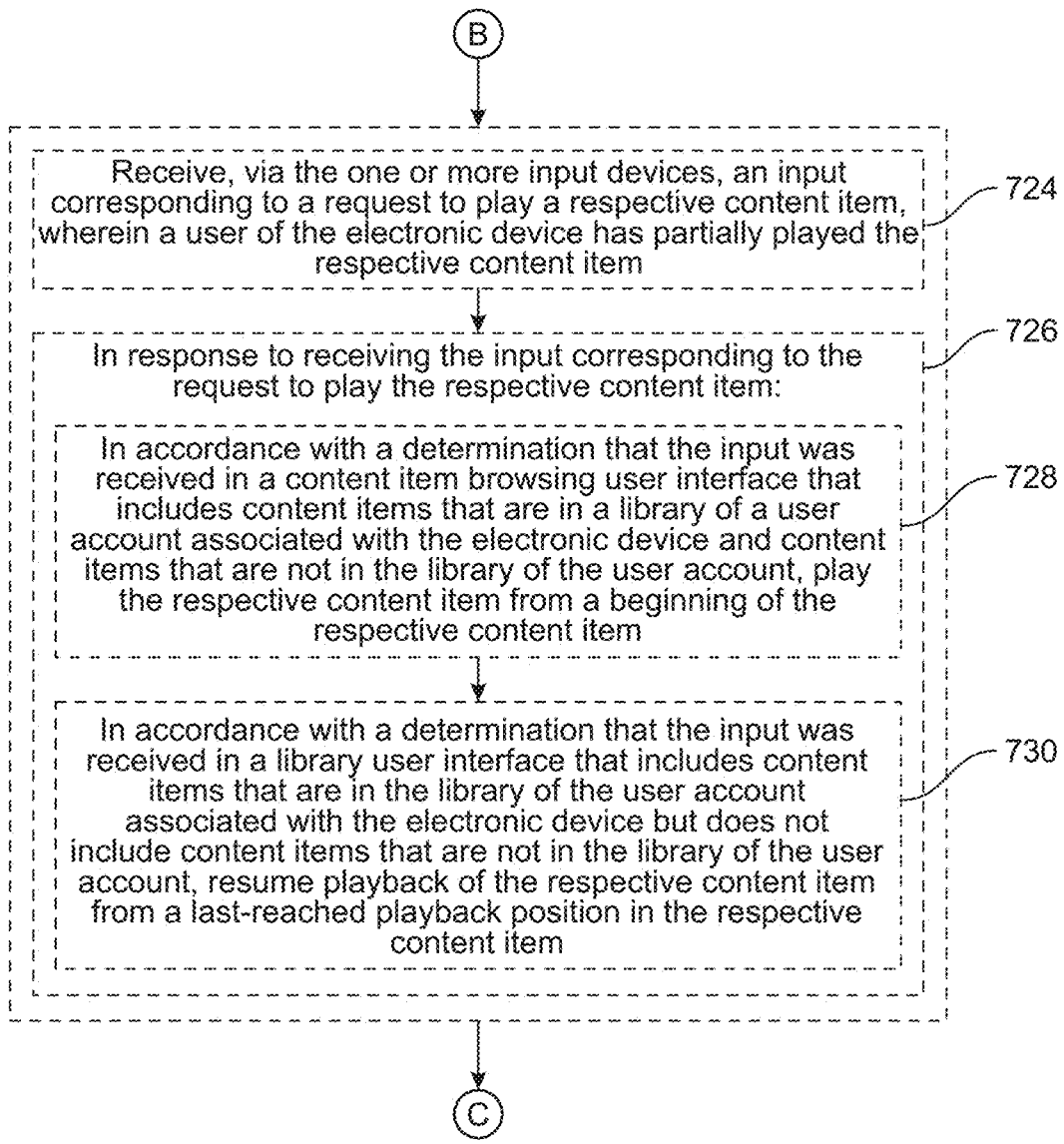
Figure 7D:
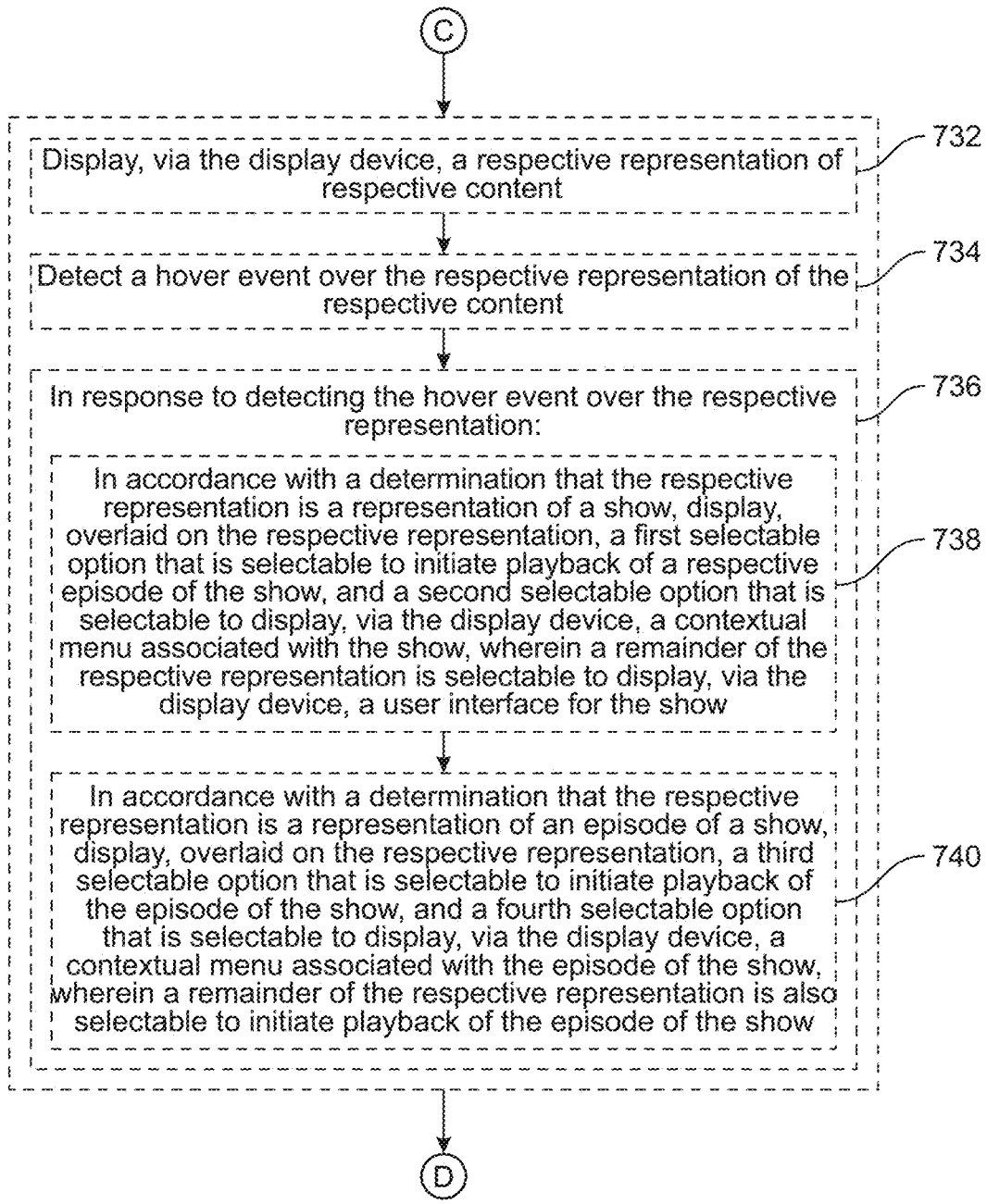
Figure 7E:
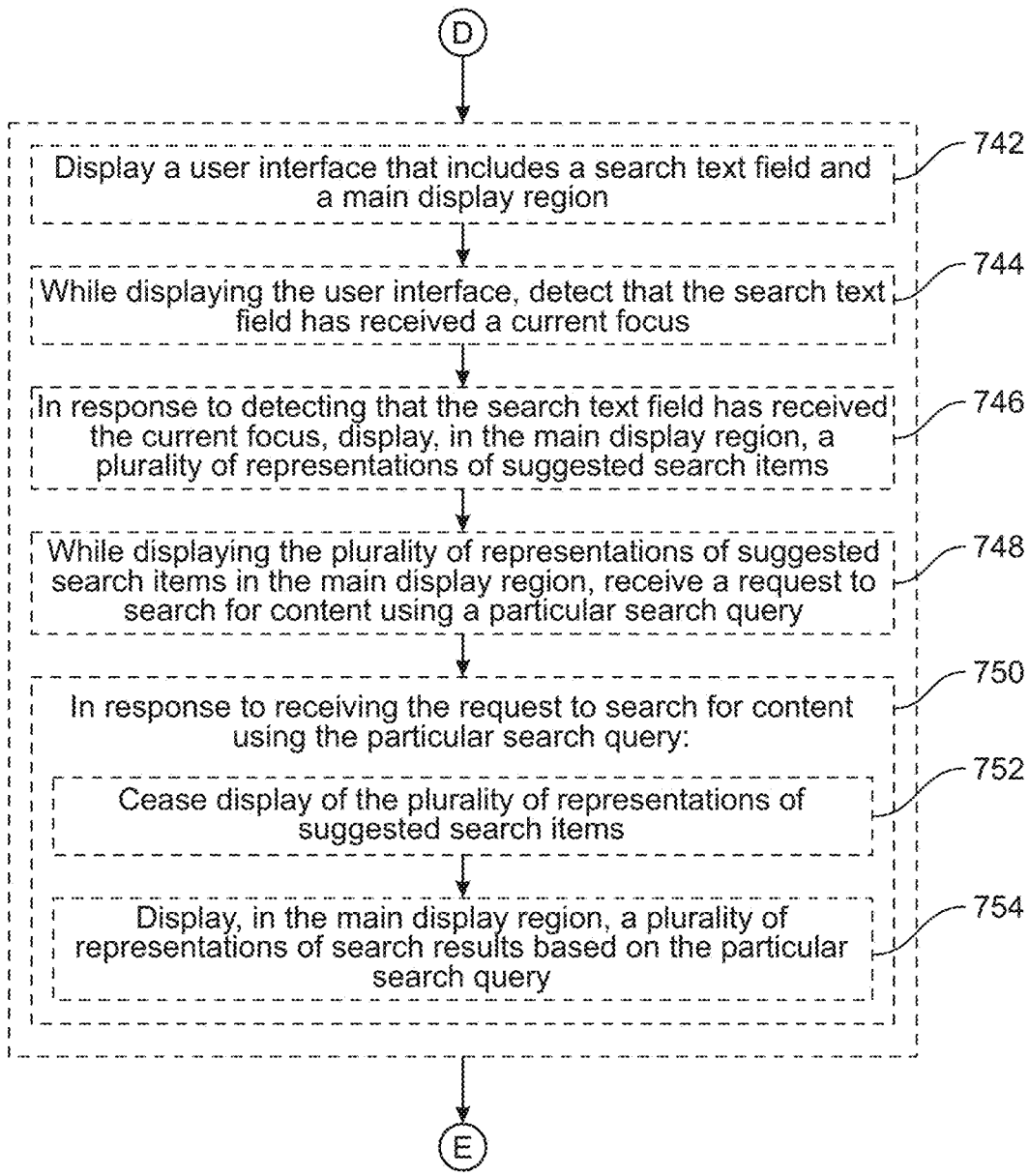
Figure 7F:
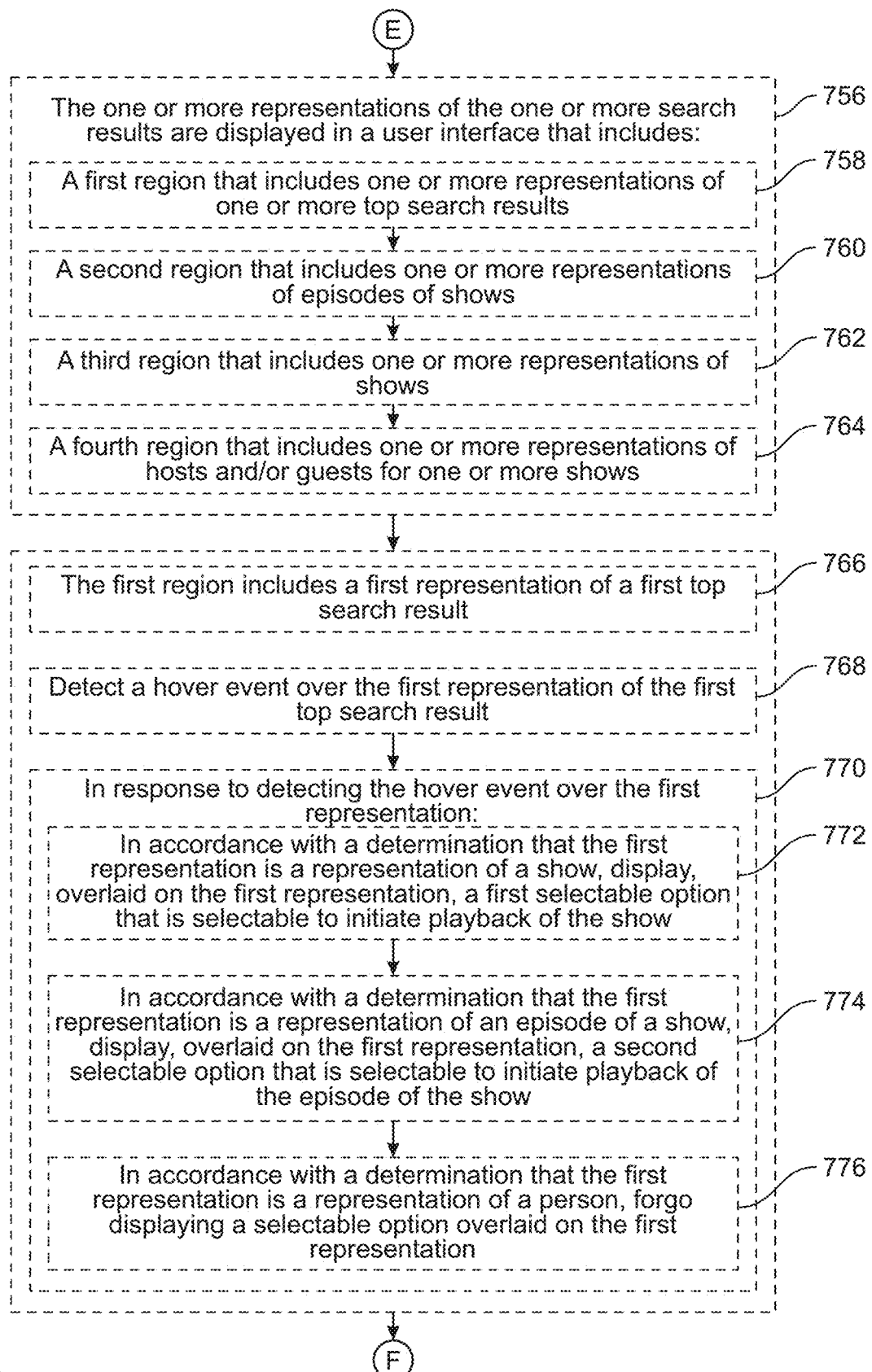
Figure 7G:
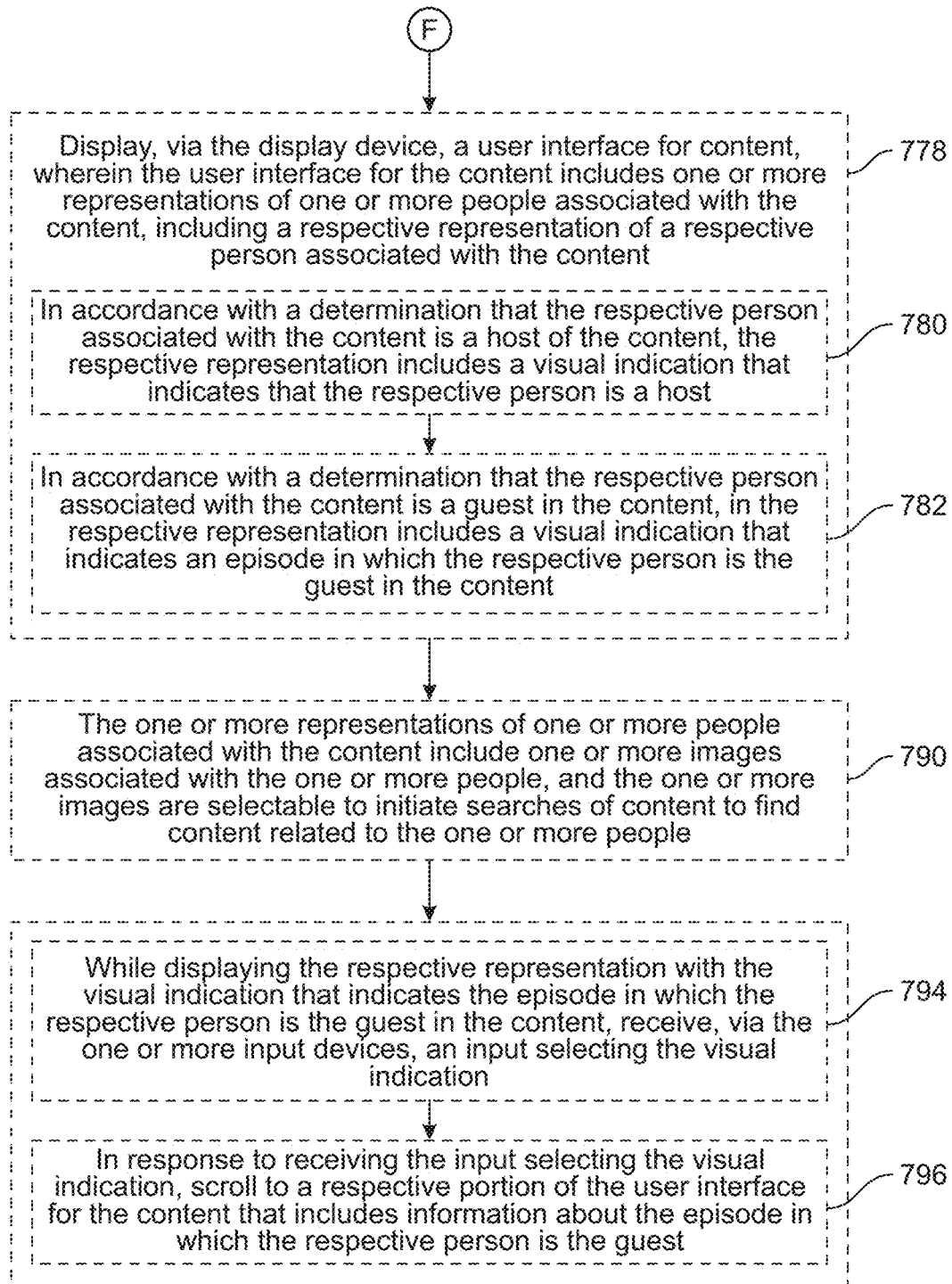

In some embodiments, the one or more representations of one or more people associated with the content include one or more images associated with the one or more people, and the one or more images are selectable to initiate searches of content to find content related to the one or more people (790), such as in FIGS. 6Z-6AA. For example, selecting the image of the person (e.g., host or guest) optionally initiates a search for podcast episodes/series that are related to the selected person (e.g., series/episodes that the person has hosted, series/episodes that the person has appeared in as a guest, series/episodes that discuss the person, etc.).

The above-described manner of initiating a search related to a selected person allows the electronic device to perform the search with minimal user input, which simplifies the interaction between the user and the electronic device and enhances the operability of the electronic device and makes the user-device interface more efficient (e.g., by not requiring the user to manually enter the name of that person in the search text field, for example, or to manually search podcasts to identify that person in the first place), which additionally reduces power usage and improves battery life of the electronic device by enabling the user to use the electronic device more quickly and efficiency.

In some embodiments, while displaying the respective representation with the visual indication that indicates the episode in which the respective person is the guest in the content, the electronic device receives (794), via the one or more input devices, an input selecting the visual indication, such as in FIG. 6BB. In some embodiments, in response to receiving the input selecting the visual indication, the electronic device scrolls (796) to a respective portion of the user interface for the content that includes information about the episode in which the respective person is the guest, such as in FIG. 6CC. For example, if the user interface that is currently displayed is a user interface for the podcast series as a whole, selection of the "episode 3" (or equivalent) text displayed with a guest on that user interface optionally causes the user interface to scroll to the section of the user interface that includes information about the episodes included in the podcast series as a whole. In some embodiments, the user interface is scrolled to where the information about the selected episode (e.g., episode 3) is displayed, and the selected episode information is highlighted/displayed differently than the remaining episodes. In some embodiments, the episode information includes selectable options that are selectable to initiate playback of those episodes so the user is able to quickly initiate playback of the selected episode from the scrolled-to portion of the podcast series user interface. In some embodiments, the section of the podcast series user interface that includes the information about the episodes includes representations of each episode in the podcast series. In response to a hover event over a given representation of a given episode, a play button is optionally displayed adjacent to (or within) the representation of the given episode, selection of which causes playback of the given episode. In some embodiments, the representation of the given episode includes the title/description of the given episode. In some embodiments, selection of the title/description of the given episode causes display of an overlay user interface that includes further information about the given episode, including representations of hosts/guests for that given episode that are optionally selectable to initiate searches for the selected host/guest as previously described.

The above-described manner of scrolling to the correct portion of the podcast series user interface allows the electronic device to provide quick access to the episode of interest, which simplifies the interaction between the user and the electronic device and enhances the operability of the electronic device and makes the user-device interface more efficient (e.g., by not requiring the user to provide input to manually search through the podcast series user interface, which also avoids errors associated with manual user searches), which additionally reduces power usage and improves battery life of the electronic device by enabling the user to use the electronic device more quickly and efficiency.

It should be understood that the particular order in which the operations in FIGS. 7A-7G have been described is merely exemplary and is not intended to indicate that the described order is the only order in which the operations could be performed. One of ordinary skill in the art would recognize various ways to reorder the operations described herein.

The operations in the information processing methods described above are, optionally, implemented by running one or more functional modules in an information processing apparatus such as general purpose processors (e.g., as described with respect to FIGS. 1A-1B, 3, 5A-5C) or application specific chips. Further, the operations described above with reference to FIGS. 7A-7G are, optionally, implemented by components depicted in FIGS. 1A-1B. For example, detecting operations 734, 744, and 768, displaying operations 704, 718, 720, 732, 738, 740, 742, 746, 754, 772, 774, and 778, receiving operations 702, 712, 724, 748, and 794, and initiating operations are, optionally, implemented by event sorter 170, event recognizer 180, and event handler 190. Event monitor 171 in event sorter 170 detects a contact on touch-sensitive surface 604, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology is the gathering and use of data available from specific and legitimate sources to improve the delivery to users of content that may be of interest to them. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to deliver targeted podcasts that may be of greater interest to the user in accordance with their preferences. Accordingly, use of such personal information data enables users to have greater control of the delivered content. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, such as in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely block the development of a baseline mood profile. In addition to providing "opt in" and "opt out" options, the present disclosure contemplates providing notifications relating to the access or use of personal information. For instance, a user may be notified upon downloading an application that their personal information data will be accessed and then reminded again just before personal information data is accessed by the application.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, podcasts can be selected and delivered to users based on aggregated non-personal information data or a bare minimum amount of personal information, such as the podcasts being handled only on the user's device or other non-personal information available to the content delivery services.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:
at an electronic device in communication with a display device and one or more input devices:
receiving, via the one or more input devices, an input corresponding to a request to search content available on the electronic device, wherein the input includes one or more search terms;
in response receiving the input corresponding to the request to search content available on the electronic device, displaying, via the display device, one or more representations of one or more search results including a first representation of a first search result, wherein the first search result is a first content item that is associated with a first transcript of dialog included in the first content item, and the first search result is included in the one or more search results as a result of a relationship between the one or more search terms and the first transcript for the first content item;
receiving, via the one or more input devices, an input corresponding to a request to play a respective content item, wherein a user of the electronic device has partially played the respective content item; and
in response to receiving the input corresponding to the request to play the respective content item:
in accordance with a determination that the input was received in a content item browsing user interface that includes content items that are not in a library of a user account associated with the electronic device, playing the respective content item from a beginning of the respective content item; and
in accordance with a determination that the input was received in a library user interface that includes content items that are in the library of the user account associated with the electronic device but does not include content items that are not in the library of the user account, resuming playback of the respective content item from a last-reached playback position in the respective content item;
wherein the library user interface is different than the content item browsing user interface.

2. The method of claim 1, wherein the first representation of the first search result includes a first portion of the first transcript that is related to the one or more search terms.

3. The method of claim 2, wherein the first portion of the first transcript includes at least one of the one or more search terms, and the at least one of the one or more search terms is displayed with a first value for a visual characteristic that is different than a second value for the visual characteristic with which a remainder of the first portion of the first transcript is displayed.

4. The method of claim 3, wherein the at least one of the one or more search terms includes a first search term, the method further comprising:
while displaying the first representation of the first search result, receiving, via the one or more input devices, an input corresponding to a selection of the first search term in the first portion of the first transcript; and
in response to receiving the input corresponding to the selection of the first search term, playing the first content item from a playback position that corresponds to the first search term.

5. The method of claim 4, wherein the first portion of the first transcript includes a predetermined number of terms before and after the at least one of the one or more search terms.

6. The method of claim 1, further comprising displaying a user interface that includes a content player user interface, wherein the content player user interface includes one or more controls for controlling playback of a content item, and a selectable option that is selectable to cause display of a sidebar user interface that includes information about the content item that is currently playing while maintaining display of the content player user interface.

7. The method of claim 1, further comprising displaying a user interface that includes a content player user interface, wherein the content player user interface includes one or more controls for controlling playback of a content item, and a selectable option that is selectable to cause display of a sidebar user interface that includes information about upcoming content items in a playback queue of content items while maintaining display of the content player user interface.

8. The method of claim 6, wherein the sidebar user interface further includes information about chapters in the content item that is currently playing.

9. The method of claim 1, further comprising:
displaying, via the display device, a respective representation of respective content;

detecting a hover event over the respective representation of the respective content; and in response to detecting the hover event over the respective representation:

in accordance with a determination that the respective representation is a representation of a show, displaying, overlaid on the respective representation, a first selectable option that is selectable to initiate playback of a respective episode of the show, and a second selectable option that is selectable to display, via the display device, a contextual menu associated with the show, wherein a remainder of the respective representation is selectable to display, via the display device, a user interface for the show; and in accordance with a determination that the respective representation is a representation of an episode of a show, displaying, overlaid on the respective representation, a third selectable option that is selectable to initiate playback of the episode of the show, and a fourth selectable option that is selectable to display, via the display device, a contextual menu associated with the episode of the show, wherein a remainder of the respective representation is also selectable to initiate playback of the episode of the show.

10. The method of claim 1, further comprising:

displaying a user interface that includes a search text field and a main display region;

while displaying the user interface, detecting that the search text field has received a current focus;

in response to detecting that the search text field has received the current focus, displaying, in the main display region, a plurality of representations of suggested search items;

while displaying the plurality of representations of suggested search items in the main display region, receiving a request to search for content using a particular search query; and in response to receiving the request to search for content using the particular search query:

ceasing display of the plurality of representations of suggested search items; and displaying, in the main display region, a plurality of representations of search results based on the particular search query.

11. The method of claim 1, wherein the one or more representations of the one or more search results are displayed in a user interface that includes:

a first region that includes one or more representations of one or more top search results;

a second region that includes one or more representations of episodes of shows;

a third region that includes one or more representations of shows; and a fourth region that includes one or more representations of hosts and/or guests for one or more shows.

12. The method of claim 11, wherein the first region includes a first representation of a first top search result, the method further comprising:

detecting a hover event over the first representation of the first top search result; and in response to detecting the hover event over the first representation:

in accordance with a determination that the first representation is a representation of a show, displaying, overlaid on the first representation, a first selectable option that is selectable to initiate playback of the show;

in accordance with a determination that the first representation is a representation of an episode of a show, displaying, overlaid on the first representation, a second selectable option that is selectable to initiate playback of the episode of the show; and in accordance with a determination that the first representation is a representation of a person, forgoing displaying a selectable option overlaid on the first representation.

13. The method of claim 1, further comprising:

displaying, via the display device, a user interface for content, wherein the user interface for the content includes one or more representations of one or more people associated with the content, including a respective representation of a respective person associated with the content, wherein:

in accordance with a determination that the respective person associated with the content is a host of the content, the respective representation includes a visual indication that indicates that the respective person is a host; and in accordance with a determination that the respective person associated with the content is a guest in the content, the respective representation includes a visual indication that indicates an episode in which the respective person is the guest in the content.

14. The method of claim 13, wherein the one or more representations of one or more people associated with the content include one or more images associated with the one or more people, and the one or more images are selectable to initiate searches of content to find content related to the one or more people.

15. The method of claim 13, further comprising:

while displaying the respective representation with the visual indication that indicates the episode in which the respective person is the guest in the content, receiving, via the one or more input devices, an input selecting the visual indication; and in response to receiving the input selecting the visual indication, scrolling to a respective portion of the user interface for the content that includes information about the episode in which the respective person is the guest.

16. An electronic device, comprising:

one or more processors;

memory; and one or more programs, wherein the one or more programs are stored in the memory and configured to be executed by the one or more processors, the one or more programs including instructions for:

receiving, via one or more input devices, an input corresponding to a request to search content available on the electronic device, wherein the input includes one or more search terms; and in response receiving the input corresponding to the request to search content available on the electronic device, displaying, via a display device, one or more representations of one or more search results including a first representation of a first search result, wherein the first search result is a first content item that is associated with a first transcript of dialog included in the first content item, and the first search result is included in the one or more search results as a result of a relationship between the one or more search terms and the first transcript for the first content item;

receiving, via the one or more input devices, an input corresponding to a request to play a respective content item, wherein a user of the electronic device has partially played the respective content item; and in response to receiving the input corresponding to the request to play the respective content item:
  in accordance with a determination that the input was received in a content item browsing user interface that includes content items that are not in a library of a user account associated with the electronic device, playing the respective content item from a beginning of the respective content item; and
  in accordance with a determination that the input was received in a library user interface that includes content items that are in the library of the user account associated with the electronic device but does not include content items that are not in the library of the user account, resuming playback of the respective content item from a last-reached playback position in the respective content item;
  wherein the library user interface is different than the content item browsing user interface.

17. The electronic device of claim 16, wherein the first representation of the first search result includes a first portion of the first transcript that is related to the one or more search terms.

18. The electronic device of claim 17, wherein the first portion of the first transcript includes at least one of the one or more search terms, and the at least one of the one or more search terms is displayed with a first value for a visual characteristic that is different than a second value for the visual characteristic with which a remainder of the first portion of the first transcript is displayed.

19. The electronic device of claim 18, wherein the at least one of the one or more search terms includes a first search term, the one or more programs including instructions for:
  while displaying the first representation of the first search result, receiving, via the one or more input devices, an input corresponding to a selection of the first search term in the first portion of the first transcript; and
  in response to receiving the input corresponding to the selection of the first search term, playing the first content item from a playback position that corresponds to the first search term.

20. The electronic device of claim 19, wherein the first portion of the first transcript includes a predetermined number of terms before and after the at least one of the one or more search terms.

21. The electronic device of claim 16, the one or more programs including instructions for displaying a user interface that includes a content player user interface, wherein the content player user interface includes one or more controls for controlling playback of a content item, and a selectable option that is selectable to cause display of a sidebar user interface that includes information about the content item that is currently playing while maintaining display of the content player user interface.

22. The electronic device of claim 16, the one or more programs including instructions for displaying a user interface that includes a content player user interface, wherein the content player user interface includes one or more controls for controlling playback of a content item, and a selectable option that is selectable to cause display of a sidebar user interface that includes information about upcoming content items in a playback queue of content items while maintaining display of the content player user interface.

23. The electronic device of claim 21, wherein the sidebar user interface further includes information about chapters in the content item that is currently playing.

24. The electronic device of claim 16, the one or more programs including instructions for:
  displaying, via the display device, a respective representation of respective content;
  detecting a hover event over the respective representation of the respective content; and
  in response to detecting the hover event over the respective representation:
    in accordance with a determination that the respective representation is a representation of a show, displaying, overlaid on the respective representation, a first selectable option that is selectable to initiate playback of a respective episode of the show, and a second selectable option that is selectable to display, via the display device, a contextual menu associated with the show, wherein a remainder of the respective representation is selectable to display, via the display device, a user interface for the show; and
    in accordance with a determination that the respective representation is a representation of an episode of a show, displaying, overlaid on the respective representation, a third selectable option that is selectable to initiate playback of the episode of the show, and a fourth selectable option that is selectable to display, via the display device, a contextual menu associated with the episode of the show, wherein a remainder of the respective representation is also selectable to initiate playback of the episode of the show.

25. The electronic device of claim 16, the one or more programs including instructions for:
  displaying a user interface that includes a search text field and a main display region;
  while displaying the user interface, detecting that the search text field has received a current focus;
  in response to detecting that the search text field has received the current focus, displaying, in the main display region, a plurality of representations of suggested search items;
  while displaying the plurality of representations of suggested search items in the main display region, receiving a request to search for content using a particular search query; and
  in response to receiving the request to search for content using the particular search query:
    ceasing display of the plurality of representations of suggested search items; and
    displaying, in the main display region, a plurality of representations of search results based on the particular search query.

26. The electronic device of claim 16, wherein the one or more representations of the one or more search results are displayed in a user interface that includes:
  a first region that includes one or more representations of one or more top search results;
  a second region that includes one or more representations of episodes of shows;
  a third region that includes one or more representations of shows; and
  a fourth region that includes one or more representations of hosts and/or guests for one or more shows.

27. The electronic device of claim 26, wherein the first region includes a first representation of a first top search result, the one or more programs including instructions for:

detecting a hover event over the first representation of the first top search result; and in response to detecting the hover event over the first representation:
in accordance with a determination that the first representation is a representation of a show, displaying, overlaid on the first representation, a first selectable option that is selectable to initiate playback of the show;
in accordance with a determination that the first representation is a representation of an episode of a show, displaying, overlaid on the first representation, a second selectable option that is selectable to initiate playback of the episode of the show; and
in accordance with a determination that the first representation is a representation of a person, forgoing displaying a selectable option overlaid on the first representation.

28. The electronic device of claim 16, the one or more programs including instructions for:
displaying, via the display device, a user interface for content, wherein the user interface for the content includes one or more representations of one or more people associated with the content, including a respective representation of a respective person associated with the content, wherein:
in accordance with a determination that the respective person associated with the content is a host of the content, the respective representation includes a visual indication that indicates that the respective person is a host; and
in accordance with a determination that the respective person associated with the content is a guest in the content, the respective representation includes a visual indication that indicates an episode in which the respective person is the guest in the content.

29. The electronic device of claim 28, wherein the one or more representations of one or more people associated with the content include one or more images associated with the one or more people, and the one or more images are selectable to initiate searches of content to find content related to the one or more people.

30. The electronic device of claim 28, the one or more programs including instructions for:
while displaying the respective representation with the visual indication that indicates the episode in which the respective person is the guest in the content, receiving, via the one or more input devices, an input selecting the visual indication; and
in response to receiving the input selecting the visual indication, scrolling to a respective portion of the user interface for the content that includes information about the episode in which the respective person is the guest.

31. A non-transitory computer readable storage medium storing one or more programs, the one or more programs comprising instructions, which when executed by one or more processors of an electronic device, cause the electronic device to:
receive, via one or more input devices, an input corresponding to a request to search content available on the electronic device, wherein the input includes one or more search terms; and
in response receiving the input corresponding to the request to search content available on the electronic device, display, via a display device, one or more representations of one or more search results including a first representation of a first search result, wherein the first search result is a first content item that is associated with a first transcript of dialog included in the first content item, and the first search result is included in the one or more search results as a result of a relationship between the one or more search terms and the first transcript for the first content item;
receive via the one or more input devices, an input corresponding to a request to play a respective content item, wherein a user of the electronic device has partially played the respective content item; and
in response to receiving the input corresponding to the request to play the respective content item:
in accordance with a determination that the input was received in a content item browsing user interface that includes content items that are not in a library of a user account associated with the electronic device, play the respective content item from a beginning of the respective content item; and
in accordance with a determination that the input was received in a library user interface that includes content items that are in the library of the user account associated with the electronic device but does not include content items that are not in the library of the user account, resume playback of the respective content item from a last-reached playback position in the respective content item;
wherein the library user interface is different than the content item browsing user interface.

32. The non-transitory computer readable storage medium of claim 31, wherein the first representation of the first search result includes a first portion of the first transcript that is related to the one or more search terms.

33. The non-transitory computer readable storage medium of claim 32, wherein the first portion of the first transcript includes at least one of the one or more search terms, and the at least one of the one or more search terms is displayed with a first value for a visual characteristic that is different than a second value for the visual characteristic with which a remainder of the first portion of the first transcript is displayed.

34. The non-transitory computer readable storage medium of claim 33, wherein the at least one of the one or more search terms includes a first search term, and wherein the instructions cause the electronic device to:
while displaying the first representation of the first search result, receive, via the one or more input devices, an input corresponding to a selection of the first search term in the first portion of the first transcript; and
in response to receiving the input corresponding to the selection of the first search term, play the first content item from a playback position that corresponds to the first search term.

35. The non-transitory computer readable storage medium of claim 34, wherein the first portion of the first transcript includes a predetermined number of terms before and after the at least one of the one or more search terms.

36. The non-transitory computer readable storage medium of claim 31, wherein the instructions cause the electronic device to display a user interface that includes a content player user interface, wherein the content player user interface includes one or more controls for controlling playback of a content item, and a selectable option that is selectable to cause display of a sidebar user interface that includes information about the content item that is currently playing while maintaining display of the content player user interface.

37. The non-transitory computer readable storage medium of claim 31, wherein the instructions cause the electronic device to display a user interface that includes a content player user interface, wherein the content player user interface includes one or more controls for controlling playback of a content item, and a selectable option that is selectable to cause display of a sidebar user interface that includes information about upcoming content items in a playback queue of content items while maintaining display of the content player user interface.

38. The non-transitory computer readable storage medium of claim 36, wherein the sidebar user interface further includes information about chapters in the content item that is currently playing.

39. The non-transitory computer readable storage medium of claim 31, wherein the instructions cause the electronic device to:
  display, via the display device, a respective representation of respective content;
  detect a hover event over the respective representation of the respective content; and
  in response to detecting the hover event over the respective representation:
    in accordance with a determination that the respective representation is a representation of a show, display, overlaid on the respective representation, a first selectable option that is selectable to initiate playback of a respective episode of the show, and a second selectable option that is selectable to display, via the display device, a contextual menu associated with the show, wherein a remainder of the respective representation is selectable to display, via the display device, a user interface for the show; and
    in accordance with a determination that the respective representation is a representation of an episode of a show, display, overlaid on the respective representation, a third selectable option that is selectable to initiate playback of the episode of the show, and a fourth selectable option that is selectable to display, via the display device, a contextual menu associated with the episode of the show, wherein a remainder of the respective representation is also selectable to initiate playback of the episode of the show.

40. The non-transitory computer readable storage medium of claim 31, wherein the instructions cause the electronic device to:
  display a user interface that includes a search text field and a main display region;
  while displaying the user interface, detect that the search text field has received a current focus;
  in response to detecting that the search text field has received the current focus, display, in the main display region, a plurality of representations of suggested search items;
  while displaying the plurality of representations of suggested search items in the main display region, receive a request to search for content using a particular search query; and
  in response to receiving the request to search for content using the particular search query:
    cease display of the plurality of representations of suggested search items; and
    display, in the main display region, a plurality of representations of search results based on the particular search query.

41. The non-transitory computer readable storage medium of claim 31, wherein the one or more representations of the one or more search results are displayed in a user interface that includes:
  a first region that includes one or more representations of one or more top search results;
  a second region that includes one or more representations of episodes of shows;
  a third region that includes one or more representations of shows; and
  a fourth region that includes one or more representations of hosts and/or guests for one or more shows.

42. The non-transitory computer readable storage medium of claim 41, wherein the first region includes a first representation of a first top search result, and wherein the instructions cause the electronic device to:
  detect a hover event over the first representation of the first top search result; and
  in response to detecting the hover event over the first representation:
    in accordance with a determination that the first representation is a representation of a show, display, overlaid on the first representation, a first selectable option that is selectable to initiate playback of the show;
    in accordance with a determination that the first representation is a representation of an episode of a show, display, overlaid on the first representation, a second selectable option that is selectable to initiate playback of the episode of the show; and
    in accordance with a determination that the first representation is a representation of a person, forgo displaying a selectable option overlaid on the first representation.

43. The non-transitory computer readable storage medium of claim 31, wherein the instructions cause the electronic device to:
  display, via the display device, a user interface for content, wherein the user interface for the content includes one or more representations of one or more people associated with the content, including a respective representation of a respective person associated with the content, wherein:
    in accordance with a determination that the respective person associated with the content is a host of the content, the respective representation includes a visual indication that indicates that the respective person is a host; and
    in accordance with a determination that the respective person associated with the content is a guest in the content, the respective representation includes a visual indication that indicates an episode in which the respective person is the guest in the content.

44. The non-transitory computer readable storage medium of claim 43, wherein the one or more representations of one or more people associated with the content include one or more images associated with the one or more people, and the one or more images are selectable to initiate searches of content to find content related to the one or more people.

45. The non-transitory computer readable storage medium of claim 43, wherein the instructions cause the electronic device to:
  while displaying the respective representation with the visual indication that indicates the episode in which the respective person is the guest in the content, receive, via the one or more input devices, an input selecting the visual indication; and in response to receiving the input selecting the visual indication, scroll to a respective portion of the user interface for the content that includes information about the episode in which respective person is the guest.

\* \* \* \* \*